United States Patent
Morgan et al.

(10) Patent No.: US 11,194,940 B2
(45) Date of Patent: Dec. 7, 2021

(54) OPTIMIZATION UNDER DISALLOWED COMBINATIONS

(71) Applicant: SAS Institute Inc., Cary, NC (US)

(72) Inventors: Joseph Albert Morgan, Raleigh, NC (US); Yeng Saanchi, Raleigh, NC (US); Laura Carmen Lancaster, Raleigh, NC (US); Christopher Michael Gotwalt, Raleigh, NC (US); Caleb Bridges King, Cary, NC (US); Ryan Adam Lekivetz, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 17/144,420

(22) Filed: Jan. 8, 2021

(65) Prior Publication Data

US 2021/0133366 A1   May 6, 2021

Related U.S. Application Data

(63) Continuation of application No. 17/144,278, filed on Jan. 8, 2021, which is a continuation-in-part of
(Continued)

(51) Int. Cl.
*G06F 30/20* (2020.01)
*G06F 30/12* (2020.01)
(Continued)

(52) U.S. Cl.
CPC ............. *G06F 30/20* (2020.01); *G06F 30/12* (2020.01); *G06F 30/17* (2020.01); *G06F 30/23* (2020.01);
(Continued)

(58) Field of Classification Search
CPC ...... G06F 30/20; G06F 30/12; G06F 11/3684; G06F 3/0484; G06Q 10/10; G06K 9/6209
(Continued)

(56) References Cited

U.S. PATENT DOCUMENTS 6,148,274 A * 11/2000 Watanabe .............. G06Q 10/04
703/6
6,389,379 B1 * 5/2002 Lin ....................... G06F 30/331
703/14
(Continued)

OTHER PUBLICATIONS

Galil, Z. et al., "Construction Methods for D-Optimum Weighing Designs When n=3 mod 4", The Annals of Statistics, 1982, pp. 502-510, vol. 10.
(Continued)

*Primary Examiner* — Thai Q Phan
(74) *Attorney, Agent, or Firm* — Coats & Bennett, PLLC

(57) ABSTRACT

A computing system determines a design space for designing a design system. The computing system receives a request to identify input(s) that will provide a response of the design system that advances a user-defined goal for the design system. The computing system, responsive to the request to identify input(s), generates a design for the design space that provides design cases for generating the response of the design system and obtains responses of the design system generated for multiple design cases of the design for the design system. The computing system selects at least one design case based on obtained responses of the design system for the multiple design cases, and based on the at least one design case, outputs an indication of suggested input(s) for the design system. The suggested input(s) advances the user-defined goal for the design system and is not disallowed according to disallowed combination(s).

30 Claims, 102 Drawing Sheets

Related U.S. Application Data application No. 16/985,512, filed on Aug. 5, 2020, which is a continuation-in-part of application No. 16/719,200, filed on Dec. 18, 2019, now Pat. No. 10,803,214, and a continuation-in-part of application No. 16/692,172, filed on Nov. 22, 2019, now Pat. No. 10,754,764, which is a continuation-in-part of application No. 16/507,769, filed on Jul. 10, 2019, now Pat. No. 10,535,422, which is a continuation-in-part of application No. 16/240,182, filed on Jan. 4, 2019, now Pat. No. 10,386,271, which is a continuation-in-part of application No. 16/154,290, filed on Oct. 8, 2018, now Pat. No. 10,338,993.

(60) Provisional application No. 63/050,106, filed on Jul. 9, 2020, provisional application No. 63/050,105, filed on Jul. 9, 2020, provisional application No. 63/039,280, filed on Jun. 15, 2020, provisional application No. 62/861,563, filed on Jun. 14, 2019, provisional application No. 62/886,189, filed on Aug. 13, 2019, provisional application No. 62/796,214, filed on Jan. 24, 2019, provisional application No. 62/807,286, filed on Feb. 19, 2019, provisional application No. 62/816,150, filed on Mar. 10, 2019, provisional application No. 62/728,361, filed on Sep. 7, 2018, provisional application No. 62/702,247, filed on Jul. 23, 2018, provisional application No. 62/661,057, filed on Apr. 22, 2018.

(51) Int. Cl.
*G06F 30/23* (2020.01)
*G06F 30/17* (2020.01)
*G06F 111/04* (2020.01)
*G06F 111/16* (2020.01)
*G06F 3/0484* (2013.01)

(52) U.S. Cl.
CPC ........ *G06F 3/0484* (2013.01); *G06F 2111/04* (2020.01); *G06F 2111/16* (2020.01)

(58) Field of Classification Search
USPC ............................................ 703/2, 5, 22, 26
See application file for complete search history.

(56) References Cited

U.S. PATENT DOCUMENTS

| | | | |
|---|---|---|---|
| 6,460,068 B1 | 10/2002 | Novaes | |
| 6,577,982 B1 | 6/2003 | Erb | |
| 6,615,163 B1 | 9/2003 | Rasoulian et al. | |
| 7,269,517 B2 | 9/2007 | Bondarenko | |
| 7,308,418 B2 | 12/2007 | Malek et al. | |
| 7,610,257 B1 | 10/2009 | Abrahams | |
| 8,019,049 B2 | 9/2011 | Allen, Jr. et al. | |
| 8,164,345 B2* | 4/2012 | Bushnell | G06F 30/327 324/537 |
| 8,280,805 B1 | 10/2012 | Abrahams et al. | |
| 8,495,583 B2 | 7/2013 | Bassin et al. | |
| 8,595,750 B2 | 11/2013 | Agarwal et al. | |
| 8,756,460 B2 | 6/2014 | Blue et al. | |
| 8,866,818 B2 | 10/2014 | Rubin et al. | |
| 9,218,271 B2 | 12/2015 | Segall et al. | |
| 9,529,700 B2 | 12/2016 | Raghavan et al. | |
| 9,858,559 B2* | 1/2018 | Raleigh | G06Q 40/12 |
| 10,152,458 B1 | 12/2018 | Stepaniants et al. | |
| 10,165,447 B2* | 12/2018 | Raleigh | G06Q 20/40 |
| 10,234,848 B2* | 3/2019 | Mehr | G05B 13/048 |
| 10,338,993 B1 | 7/2019 | Lekivetz et al. | |
| 10,382,473 B1* | 8/2019 | Ashkenazy | G06F 21/577 |
| 10,386,271 B1* | 8/2019 | King | G06F 3/0484 |
| 10,503,846 B2 | 12/2019 | Lekivetz et al. | |
| 10,535,422 B2* | 1/2020 | Lekivetz | G06F 11/2041 |
| 10,539,952 B2* | 1/2020 | Mehr | B22F 10/20 |
| 10,746,797 B1* | 8/2020 | Parekhji | G01R 31/31727 |
| 10,754,764 B2* | 8/2020 | Lekivetz | G06F 11/3684 |
| 10,878,345 B2* | 12/2020 | Lekivetz | G06N 20/00 |
| 2003/0233600 A1 | 12/2003 | Hartman et al. | |
| 2004/0032258 A1 | 2/2004 | Blumich | |
| 2005/0055193 A1 | 3/2005 | Bondarenko | |
| 2005/0240943 A1* | 10/2005 | Smith | G06F 9/465 719/328 |
| 2005/0246716 A1* | 11/2005 | Smith | G06F 9/541 719/315 |
| 2005/0261953 A1 | 11/2005 | Malek et al. | |
| 2006/0270918 A1 | 11/2006 | Stupp et al. | |
| 2008/0120129 A1* | 5/2008 | Seubert | G06Q 10/10 705/35 |
| 2008/0256392 A1 | 10/2008 | Garland et al. | |
| 2009/0070103 A1 | 3/2009 | Beggelman et al. | |
| 2009/0292180 A1 | 11/2009 | Mirow | |
| 2009/0299896 A1* | 12/2009 | Zhang | G06Q 40/025 705/38 |
| 2010/0030521 A1 | 2/2010 | Akhrarov et al. | |
| 2010/0169853 A1 | 7/2010 | Jain et al. | |
| 2011/0184896 A1 | 7/2011 | Guyon | |
| 2012/0084043 A1 | 4/2012 | Courtade et al. | |
| 2012/0284213 A1 | 11/2012 | Lin et al. | |
| 2014/0136554 A1 | 5/2014 | Moradi et al. | |
| 2014/0324521 A1* | 10/2014 | Mun | G06Q 10/04 705/7.28 |
| 2015/0046906 A1 | 2/2015 | Segall et al. | |
| 2015/0213631 A1 | 7/2015 | Vander Broek | |
| 2015/0302436 A1* | 10/2015 | Reynolds | G06Q 30/0201 705/7.32 |
| 2015/0309918 A1 | 10/2015 | Raghavan et al. | |
| 2015/0310149 A1* | 10/2015 | Dunnihoo | G06F 30/23 703/2 |
| 2016/0012152 A1 | 1/2016 | Johnson et al. | |
| 2016/0253311 A1 | 9/2016 | Xu et al. | |
| 2016/0253466 A1 | 9/2016 | Agaian et al. | |
| 2016/0299836 A1 | 10/2016 | Kuhn et al. | |
| 2016/0350671 A1 | 12/2016 | Morris, II et al. | |
| 2017/0103013 A1 | 4/2017 | Grechanik | |
| 2017/0128838 A1 | 5/2017 | Burge et al. | |
| 2018/0060466 A1 | 3/2018 | Morgan et al. | |
| 2018/0060469 A1 | 3/2018 | Morgan et al. | |
| 2018/0060744 A1 | 3/2018 | Achin et al. | |
| 2019/0227525 A1* | 7/2019 | Mehr | B22F 10/00 |
| 2019/0236479 A1 | 8/2019 | Wagner et al. | |
| 2019/0346297 A1* | 11/2019 | Lekivetz | G16C 20/70 |
| 2019/0370158 A1 | 12/2019 | Rivoir | |
| 2020/0117580 A1* | 4/2020 | Lekivetz | G06F 11/3684 |

OTHER PUBLICATIONS

Goethals, J. et al., "Orthogonal matrices with zero diagonal", Canadian Journal of Mathematics, 1967, pp. 1001-1010, vol. 19.

Horadam, K., "Hadamard matrices and their applications", Princeton University Press, 2012, pp. 1-278.

Jones, B. et al., "Partial replication of small two-level factorial designs", Quality Engineering, 2017, pp. 190-195, vol. 29.

Kharaghani, H., "A Construction of D-Optimal Designs for N=2 mod 4", Journal of Combinatorial Theory, 1987, pp. 156-158, vol. 46.

Koukouvinos, C. et al., "Supplementary difference sets and optimal designs.", Discrete Mathematics, 1991, pp. 49-58, vol. 88.

Kounias, S. et al., "Some D-optimal weighing designs for n=3(mod 4)", Journal of Statistical Planning and Inference, 1983, pp. 117-127, vol. 8.

Kounias, S. et al., "A construction of D-optimal weighing designs when n=3 mod 4", Journal of Statistical Planning and Inference, 1984, pp. 177-187, vol. 10.

Kounias, S. et al., "The Non-equivalent Circulant D-Optimal Designs for . . . n=66", Journal of Combinatorial Theory, 1994, pp. 26-38, Series A 65.

Kuhfeld, W. et al., "Large factorial designs for product engineering and marketing research applications", Technometrics, 2005, pp. 132-141, vol. 47, No. 2.

(56) References Cited

OTHER PUBLICATIONS

London, S., "Constructing New Turyn Type Sequences, T-Sequences and Hadamard Matrices", Ph.D. Thesis, 2013, pp. 1-63.
Meyer, R. et al., "The Coordinate-Exchange Algorithm for constructing exact optimal experimental designs", Technometrics, 1995, pp. 60-69, vol. 37, No. 1.
Moyssiadis, C. et al., "The exact D-optimal first order saturated design with 17 observations", Journal of Statistical Planning and Inference, 1982, pp. 13-27, vol. 7.
Paley, R., "On orthogonal matrices", Journal of Mathematics and Physics, 1933, pp. 311-320, vol. 12.
Payne, S., "On Maximizing Det(AT A)", Discrete Mathematics, 1974, pp. 145-158, vol. 10.
Plackett, R. et al., "The design of optimum multifactorial experiments", Biometrika, 1946, pp. 305-325, vol. 33.
Raghavarao, D., "Some Optimum Weighing Designs", Annals of Mathematical Statistics, 1959, pp. 295-303, vol. 30.
Sathe, Y. et al., "Construction Method for Some A- and D-Optimal Weighing Designs When N=3 (mod 4)", Journal of Statistical Planning and Inference, 1990, pp. 369-375, vol. 24.
Seberry, J. et al., "Hadamard matrices, sequences, and block designs", Contemporary Design Theory—A Collection of Surveys, 1992, pp. 431-560, John Wiley and Sons.
Smith, W., "Studies in Computational Geometry Motivated by Mesh Generation", PhD. Thesis Princeton University, 1988, pp. 1-496.
Orrick, W. et al., "Large-determinant sign matrices of order 4k+1", Discrete Mathematics, 2007, pp. 226-236, vol. 307.
Street, D. et al., "Partially Balanced Incomplete Block Designs", Handbook of Combinatorial Designs, 2007, pp. 562-565, 2nd Edition.
Sun, D., "Estimation capacity and related topics in experimental designs", A Thesis presented to the University of Waterloo, 1994, pp. 1-184.
Sylvester, J., "Thoughts on inverse orthogonal matrices, simultaneous sign successions, and tessellated pavements", Philosophical Magazine, 1867, pp. 461-475, vol. 34.
Wallis, J., "On supplementary difference sets", Aequationes Mathematicae, 1972, pp. 242-257, vol. 8.
Wallis, J. et al., "Some classes of Hadamard matrices with constant diagonal" Bulletin of the Australian Mathematical Society, 1972, pp. 233-249, vol. 7.
Williamson, J., "Determinants whose elements are 0 and 1", The American Mathematical Monthly, Oct. 1946, pp. 427-434, vol. 53, No. 8.
Williamson, J. et al., "Hadamard's determinant theorem and the sum of four squares", Duke Mathematical Journal, 1944, pp. 65-81, vol. 11, No. 1.
Xu, H. et al., "Generalized minimum aberration for asymmetrical fractional factorial designs", The Annals of Statistics, Aug. 2001, pp. 1066-1077, vol. 29, No. 4.
Yang, C., "Some designs of maximal (+1, −1) determinant of order n=2 mod 4", Mathematics of Computation, 1966, pp. 147-148, vol. 20.
Yang, C., "On Designs of Maximal (+1, −1 )—Matrices of Order n=2 mod 4", Mathematics of Computation, 1968, pp. 174-180, vol. 22.
Yang, C., "On Designs of Maximal (+1, −1 )—Matrices of Order n=2 mod 4", Mathematics of Computation, 1969, pp. 201-205, vol. 23, No. 105.
Yang, C., "Maximal binary matrices and sum of two squares", Mathematics of Computation, 1976, pp. 148-153, vol. 30, No. 133.
Indiana University, "The Hadamard maximal determinant problem", pp. 1-4, retrieved on Jul. 5, 2019, retrieved from internet http://www.indiana.edu/~maxdet/fullPage.shtml#tableTop.
Ehlich, H., "Determinant estimates are binaries", Mathematische Zeitschrift, 1964, pp. 123-132, vol. 83, No. 2.
Yilmaz, C. et al., "Covering Arrays for Efficient Fault Characterization in Complex Configuration Spaces", IEEE Transactions on Software Engineering, Jan. 30, 2006, pp. 1-10.
Harrison, Jr., D. et al., "Hedonic Housing Prices and the Demand for Clean Air", Journal of Environmental Economic and Management, 1978, pp. 81-102, vol. 5.
Jewell, Z. et al., "Monitoring mountain lion using footprints: A robust new technique", Wild Felid Monitor, 2014, pp. 26 and 27.
Goos, P. et al., "An optimal screening experiment", Optimal Design of Experiments: A Case Study Approach, Chapter 2, 2011, pp. 9-45, John Wiley & Sons, Ltd.
Goos, P. et al., "Adding runs to a screening experiment", Optimal Design of Experiments: A Case Study Approach, Chapter 3, 2011, pp. 47-67, John Wiley & Sons, Ltd.
Goos, P. et al., "Experimental design in the presence of covariates", Optimal Design of Experiments: A Case Study Approach, Chapter 9, 2011, pp. 187-217, John Wiley & Sons, Ltd.
Brownlee, J., "A Gentle Introduction to k-fold Cross-Validation", pp. 1-13, May 23, 2018, retrieved from Internet https://machinelearningmastery.com/k-fold-cross-validation/.
Tian, Jeff, "Better Reliability Assessment and Prediction through Data Clustering", IEEE Transcations on Software Engineering, vol. 28, No. 10, pp. 997-1007 (Oct. 2002).
Jones, B., et al., "Construction, Properties, and Analysis of Group-Orthogonal Supersaturated Designs", Technometrics, Sep. 17, 2019, pp. 1-13, Taylor & Francis.
Butler, Neil A., "Two-level supersaturated designs for 2k runs and other cases", Journal of Statistical Planning and Inference, No. 1 (2009), pp. 23-29 (Year: 2009).
Jones, Bradley, et al., "Effective design-based model selection for definitive screening designs", Technometrics, vol. 59, No. 3 (2017), pp. 319-329 (Year: 2017).
Jones, Bradley, et al., "A class of three-level designs for definitive screening in the presence of second-order effects", Journal of Quality Technology, vol. 43, No. 1 (2011), pp. 1-15 (Year: 2011).
Jones, Bradley, et al., "Model-robust supersaturated and partially supersaturated designs", Journal of Statistical Planning and Inference, vol. 139, No. 1 (2009), pp. 45-53 (Year: 2009).
Gupta, V.K., et al., "Computer-generated efficient two-level supersaturated designs", J. Ind. Soc. Agril. Statist., vol. 62, No. 2 (2008), pp. 183-194 (Year: 2008).
Georgiou, Stelios D., "Supersaturated designs: A review of their construction and analysis", Journal of Statistical Planning and Inference, vol. 144 (2014), pp. 92-109 (Year: 2014).
Kuhn Eet al. "Software Fault Interactions and Implications for Software Testing"; IEEE Transaction on Software Engineering; Jun. 2004; pp. 418-421; vol. 30, No. 6.
Bryce et al. "Prioritized interaction testing for pair-wise coverage with seeding and constraints"; Information and Software Technology; Feb. 27, 2006; pp. 960-970; vol. 48, No. 10.
Chandrasekaran et al. "Evaluating the effectiveness of BEN in localizing different types of software fault"; IEEE 9th International Conference on Software Testing, Verification and Validation Workshops; Apr. 10, 2016; pp. 1-31.
Colbourn et al. "Locating and Detecting Arrays for Interaction Faults"; Journal of Combinatorial Optimization; 2008; pp. 1-34; vol. 15, No. 1.
Dalal et al. "Factor-Covering Designs for Testing Software"; Technometrics; Aug. 1998; pp. 1-14; vol. 40, No. 3.
Demiroz et al. "Cost-Aware Combinatorial Interaction Testing"; Proc. of the International Conference on Advanaces in System Testing and Validation Lifecycles; 2012; pp. 1-8.
Elbaum et al. "Selecting a Cost-Effective Test Case Prioritization Technique"; Software Quality Journal; Apr. 20, 2004; pp. 1-26; vol. 12, No. 3.
Ghandehari et al. "Identifying Failure-Inducing Combinations in a Combinatorial Test Set"; IEEE Fifth International Conference on Software Testing, Verification and Validation; Apr. 2012; pp. 1-10.
Ghandehari et al. "Fault Localization Based on Failure-Inducing Combinations"; IEEE 24th International Symposium on Software Reliability Engineering; Nov. 2013; pp. 168-177.
Alan Hartman "Software and Hardware Testing Using Combinatorial Covering Suites"; The Final Draft; Jul. 3, 2018; pp. 1-41; IBM Haifa Research Laboratory.

(56) References Cited

OTHER PUBLICATIONS

Katona et al. "Two Applications (for Search Theory and Truth Functions) of Sperner Type Theorems"; Periodica Mathematica Hungarica; 1973; pp. 19-26; vol. 3, No. 1-2.
Cohen et al. "Interaction Testing of Highly-Configurable Systems in the Presence of Constraints"; ISSTA '07 London, England, United Kingdom; Jul. 9-12, 2007; pp. 1-11; ACM 978-1-59593-734-6/07/0007.
Cohen et al. "The Combinatorial Design Approach to Automatic Test Generation"; IEEE Software; Sep. 1996; pp. 83-88; vol. 13, No. 5.
Dunietz et al. "Applying Design of Experiments to Software Testing"; Proceedings of 19th ECSE, New York, NY; 1997; pp. 205-215; ACM, Inc.
Cohen et al. "The AETG System: An Approach to Testing Based on Combinatorial Design"; IEEE Transactions on Software Engineering; Jul. 1997; pp. 437-444; vol. 23, No. 7.
Joseph Morgan "Combinatorial Testing: An Approach to Systems and Software Testing Based on Covering Arrays"; Book—Analytic Methods in Systems and Software Testing; 2018; pp. 131-158; John Wiley & Sons Ltd.; Hoboken, NJ, US.
Cohen et al. "Constructing Interaction Test Suites for Highly-Configurable Systems in the Presence of Constraints: A Greedy Approach"; IEEE Transactions on Software Engineering; Sep./Oct. 2008; pp. 633-650; vol. 34, No. 5.
Colbourn et al. "Coverage, Location, Detection, and Measurement"; IEEE Ninth International Conference on Software Testing, Verification and Validation Workshops; Apr. 2016; pp. 19-25.
Kleitman et al. "Families of k-Independent Sets"; Discrete Mathematics; 1973; pp. 255-262; vol. 6, No. 3.
Johnson et al. "Largest Induced Subgraphs of the n-Cube That Contain No 4-Cycles"; Journal of Combinatorial Theory; 1989; pp. 346-355; Series B 46.
Dalal et al. "Model-Based Testing in Practice"; Proceedings of the 21st ICSE, New York, NY; 1999; pp. 1-10.
Moura et al. "Covering Arrays with Mixed Alphabet Sizes"; Journal of Combinatorial Design; 2003; pp. 413-432; vol. 11, No. 6.
Brownlie et al. "Robust Testing of AT&T PMX/StarMAIL Using OATS"; AT&T Technical Journal, May 1992; pp. 41-47; vol. 73, No. 3.
Robert Mandl "Orthogonal Latin Squares: An Application of Experiment Design to Compiler Testing"; Communications of the ACM; Oct. 1985; pp. 1054-1058; vol. 28, No. 10.
Hartman et al. "Problems and algorithms for covering arrays"; Discrete Mathematics; 2004; pp. 149-156; vol. 284, No. 1-3.
Jang, D. et al., "Correlation-Based r-plot for Evaluating Supersaturated Designs", Qual. Reliab. Engng. Int., Mar. 11, 2013, pp. 503-512, John Wiley & Sons, Ltd.
Kim, Y. et al., "Graphical methods for evaluating covering arrays", Quality and Reliability Engineering International, Aug. 31, 2016, pp. 1-24, Los Alamos National Laboratory.
Taylor, W. et al., "A Structure Diagram Symbolization for Analysis of Variance", The American Statistician, May 1981, pp. 85-93, vol. 35, No. 2, Taylor & Francis, Ltd.
Iversen, P. et al., "Visualizing Experimental Designs for Balanced ANOVA Models using Lisp-Stat", Journal of Statistical Software, Feb. 2005, pp. 1-18, vol. 13, Issue 3.
Kay, P., "Why design experiments? Reason 2: Process understanding", JMP User Community/JMP Blog, May 1, 2018, pp. 1-10.
Angel M., "Conducting Experiments with Experiment Manager", Proceedings of the 1996 Winter Simulation Conference, 1996, pp. 535-541.
Ghanbari, M., "Visualization Overview", 2007 Thirty-Ninth Southeastern Symposium on System Theory, Mar. 4-6, 2007, pp. 133-137.
Ehlich, H., "Determinant for binaries with n=3 mod 4", Mathematische Zeitschrift, 1964, pp. 438-447, vol. 84.
Yilmaz, C. et al., "Reliable Effects Screening: A Distributed Continuous Quality Assurance Process for Monitoring Performance Degradation in Evolving Software Systems", IEEE Transactions on Software Engineering, Feb. 2007, pp. 124-141, vol. 33, No. 2.
Yilmaz, C. et al., "Main Effects Screening: A Distributed Continuous Quality Assurance Process for Monitoring Performance Degradation in Evolving Software Systems", 27th Proceedings International Conference on Software Engineering, Jan. 2005, pp. 293-302.
Chadjiconstantinidis, S. et al., "A construction method of new D-, A-optimal weighing designs when n=3 mod 4 and k ≤ n − 1", Discrete Mathematics, 1994, pp. 39-50, vol. 131.
Chadjipantelis, T. et al., "Supplementary Difference Sets and D-Optimal Designs for n=2 mod 4", Discrete Mathematics, 1985, pp. 211-216, vol. 57.
Chadjipantelis, T. et al., "Construction of D-Optimal Designs for N=2 mod 4 Using Block-Circulant Matrices", Journal of Combinatorial Theory, Series A 40, 1985, pp. 125-135.
Chadjipantelis, T. et al., "The maximum determinant of 21×21(+1,−1)-matrices and d-optimal designs", Journal of Statistical Planning and Inference, 1987, pp. 167-178, vol. 16.
Cheng, C., "Optimality of some weighing and 2n fractional factorial designs", The Annals of Statistics, 1980, pp. 436-446, vol. 8, No. 2.
Cohn, J., "On determinants with elements ±1,II", Bulletin of the London Mathematical Society, 1989, pp. 36-42, vol. 21.
Cohn, J., "Almost D-optimal designs", Utilitas Mathematica, 2000, pp. 121-128, vol. 57.
Cuervo, D. et al., "Optimal design of large-scale screening experiments—A critical look at the coordinate-exchange algorithm", Statistics and Computing, 2016, pp. 15-28, vol. 26.
Deng, L. et al., "Generalized resolution and minimum aberration criteria for Plackett-Burman and other nonregular factorial designs", Statistica Sinica, 1999, pp. 1071-1082, vol. 9.
Dokovic, D., "Some new D-optimal designs", Australasian Journal of Combinatorics, 1997, pp. 221-231, vol. 15.
Dokovic, D., et al., "New results on D-optimal matrices", Journal of Combinatorial Designs, 2012, pp. 278-289, vol. 20.
Dokovic, D. et al., "D-optimal matrices of orders 118, 138, 150, 154, and 17", Algebraic Design Theory and Hadamard Matrices, 2015, pp. 72-82, vol. 133 of Springer Proceedings in Mathematics & Statistics.
Farmakis, N. et al.,"The Excess of Hadamard Matrices and Optimal Designs", Discrete Mathematics, 1987, pp. 165-176, vol. 67.
Farmakis, N., et al., "Two new D-optimal designs (83, 56, 12), (83, 55, 12)", Journal of Statistical Planning and Inference, 1987, pp. 247-257, vol. 15.
Fletcher, R. et al., "New D-optimal designs of order 110", Australasian Journal of Combinatorics, 2001, pp. 49-52, vol. 23.
Errore, Anna, et al., "Using definitive screening designs to identify active first-and second-order factor effects", Journal of Quality Technology, vol. 49, No. 3 (2017), pp. 244-264 (Year: 2017).
Bulutoglu, Dursun A., and Ching-Shui Cheng. "Hidden projection properties of some nonregular fractional factorial designs and their applications." The Annals of Statistics 31, No. 3 (2003): 1012-1026 (Year: 2003).
Tsai, Shin-Fu, Chen-Tuo Liao, and Feng-Shun Chai. "D-optimal partially replicated two-level factorial designs." Statistica Sinica (2012): 419-432. (Year: 2012).
Butler, Neil A. "Two-level supersaturated designs for 2k runs and other cases." Journal of Statical Planning and Interference 139, No. 1 (2009): 23-29. (Year: 2009).
Jones, Bradley and Christopehr J. Nachtsheim. "Effective design-based model selection for definitive screening designs." Technometrics 59, No. 3 (2017): 319-329. (Year: 2017).
Marley, C. et al., "A Comparison of Design and Model Selection Methods for Supersaturated Experiments", Computational Statistics & Data Analysis, vol. 54 No. 12, Dec. 1, 2010, pp. 3158-3167, Elsevier.
Jones, B. et al., "Optimal Supersaturated Designs", Journal of the American Statistical Association, vol. 109 No. 508, Jul. 10, 2014, pp. 1592-1600, American Statistical Association.
Jmp, "Estimation Efficiency", Jul. 24, 2020, pp. 1-3, retrieved on Jul. 31, 2020, retrieved from internet: https://www.jmp.com/support/help/en/15.2/index.shtml#page/jmp/estimation-efficiency.shtml.

(56) References Cited

OTHER PUBLICATIONS

Jmp, "Optimality Criteria", Jul. 28, 2020, pp., retrieved on Jul. 31, 2020, retrieved from internet: https://www.jmp.com/support/help/en/15.1/index.shtml#page/jmp/optimality-criteria.shtml#ww600960.

* cited by examiner

| | Factor a | Factor b | Factor c | Factor d | Factor e | Factor f |
|---|---|---|---|---|---|---|
| Level A | Weight =2 | | | Weight=2 | Weight=3 | |
| Level B | | | | | | |

FIG. 16A — 1600

| Test Case | Result | Factor a | Factor b | Factor c | Factor d | Factor e | Factor f |
|---|---|---|---|---|---|---|---|
| 1 | Pass | Level B | Level B | Level B | Level B | Level B | Level B |
| 2 | Pass | Level A | Level A | Level A | Level A | Level A | Level A |
| 3 | Fail | Level A | Level B | Level B | Level B | Level A | Level B |
| 4 | Pass | Level A | Level A | Level B | Level A | Level B | Level B |
| 5 | Pass | Level B | Level B | Level A | Level A | Level A | Level A |
| 6 | Pass | Level B | Level A | Level A | Level B | Level B | Level A |

| | Factor a | Factor b | Factor c | Factor d | Factor e | Factor f |
|---|---|---|---|---|---|---|
| Level A | Weight = 1 | Weight = 1 | Weight = 1 | Weight = 1 | Weight = 3 | Weight = 1 |
| Level B | Weight = 2 | Weight = 1 | Weight = 1 | Weight = 2 | Weight = 1 | Weight = 1 |

| Factor 1 (Level 1) | Factor 2 (Level 2) | Cause Indicator | Normalized Weight |
|---|---|---|---|
| a(A) | b(B) | 1 | 1/14 |
| a(A) | d(B) | 2 | 2/14=1/7 |
| b(B) | c(A) | 1 | 1/14 |
| c(A) | f(B) | 1 | 1/14 |
| d(B) | e(A) | 6 | 6/14=3/7 |
| e(A) | f(B) | 3 | 3/14 |

*FIG. 16D*

| | Factor a | Factor b | Factor c | Factor d | Factor e | Factor f |
|---|---|---|---|---|---|---|
| Level A | Weight=2 | Weight=2 | Weight=1 | Weight=1 | Weight=3 | Weight=1 |
| Level B | Weight=2 | Weight=2 | Weight=1 | Weight=1 | Weight=2 | Weight=1 |

| Test Case | Result | Factor a | Factor b | Factor c | Factor d | Factor e | Factor f |
|---|---|---|---|---|---|---|---|
| 1 | Pass | Level B | Level B | Level B | Level B | Level B | Level B |
| 2 | Pass | Level A | Level A | Level A | Level A | Level A | Level A |
| 3 | Pass | Level A | Level B | Level A | Level B | Level A | Level B |
| 4 | Fail | Level A | Level A | Level B | Level A | Level B | Level B |
| 5 | Fail | Level B | Level B | Level B | Level A | Level A | Level A |
| 6 | Pass | Level B | Level A | Level A | Level B | Level B | Level A |

Test Case 4 Failed — 1720

| Factor 1 (Level 1) | Factor 2 (Level 2) | Combined Weight |
|---|---|---|
| c(B) | d(A) | 1 |
| a(A) | c(B) | 2 |
| a(A) | e(B) | 4 |
| b(A) | c(B) | 2 |
| b(A) | f(B) | 2 |
| d(A) | e(B) | 2 |
| d(A) | f(B) | 1 |

FIG. 17D

Test Case 5 Failed — 1730

| Factor 1 (Level 1) | Factor 2 (Level 2) | Combined Weight |
|---|---|---|
| c(B) | d(A) | 1 |
| a(B) | d(A) | 2 |
| a(B) | e(A) | 6 |
| b(B) | d(A) | 2 |
| b(B) | f(A) | 2 |
| c(B) | e(A) | 3 |
| c(B) | f(A) | 1 |

Test Case 4 Failed Taking Into Account Test Case 5

1740

| Factor 1 (Level 1) | Factor 2 (Level 2) | Cause Indicator |
|---|---|---|
| c(B) | d(A) | 146/354 |
| a(A) | c(B) | 32/354 |
| a(A) | e(B) | 64/354 |
| b(A) | c(B) | 32/354 |
| b(A) | f(B) | 32/354 |
| d(A) | e(B) | 32/354 |
| d(A) | f(B) | 16/354 |

Test Case 5 Failed Taking Into Account Test Case 4

| Factor 1 (Level 1) | Factor 2 (Level 2) | Cause Indicator |
|---|---|---|
| c(B) | d(A) | 146/354 |
| a(B) | d(A) | 26/354 |
| a(B) | e(A) | 78/354 |
| b(B) | d(A) | 26/354 |
| b(B) | f(A) | 26/354 |
| c(B) | e(A) | 39/354 |
| c(B) | f(A) | 13/354 |

*FIG. 17F*

| Factor 1 (Level 1) | Factor 2 (Level 2) | Cause Indicator |
|---|---|---|
| c(B) | d(A) | 146/354 |
| a(B) | e(A) | 78/354 |
| a(A) | e(B) | 64/354 |
| c(B) | e(A) | 39/354 |
| a(A) | c(B) | 32/354 |
| b(A) | c(B) | 32/354 |
| b(A) | f(B) | 32/354 |
| d(A) | e(B) | 32/354 |
| a(B) | d(A) | 26/354 |
| b(B) | d(A) | 26/354 |
| b(B) | f(A) | 26/354 |
| d(A) | f(B) | 16/354 |
| c(B) | f(A) | 13/354 |

*FIG. 17G*

| Test Case | Result | Diagnostic Plot | DensityCurve | GoodnessOfFit | SaveFitQuant | SaveDensForm | SaveSpecLimit |
|---|---|---|---|---|---|---|---|
| 1 | Pass | unchecked | unchecked | unchecked | unchecked | unchecked | unchecked |
| 2 | Pass | checked | checked | checked | checked | checked | checked |
| 3 | Fail | checked | unchecked | checked | unchecked | checked | unchecked |
| 4 | Pass | checked | checked | unchecked | checked | unchecked | unchecked |
| 5 | Pass | unchecked | unchecked | checked | checked | checked | checked |
| 6 | Pass | unchecked | checked | unchecked | unchecked | unchecked | checked |

FIG. 20C

| Categorical Factors | | |
|---|---|---|
| a = DiagnosticPlot | | |
| b = DensityCurve | | |
| c = GoodnessOfFit | | |
| d = SaveFitQuant | | |
| e = SaveDensForm | | |
| f = SaveSpecLimit | | |

| Categorical Factors | Levels | Weights |
|---|---|---|
| DiagnosticPlot | checked | 1 |
|  | unchecked | 2 |
| SaveFitQuant | checked | 1 |
|  | unchecked | 2 |
| SaveDensForm | checked | 3 |
|  | unchecked | 1 |

Apply

*FIG. 20D*

Summary

Success Runs  5
Failure Runs  1
Missing       0

Failure Analysis Details

2 Factor Interactions

| Factors | Failure Levels | Failure Count | Probabilities |
|---|---|---|---|
| SaveFitQuant, SaveDensForm | unchecked, checked | 1 | 0.429 |
| SaveDensForm, SaveSpecLimit | checked, unchecked | 1 | 0.214 |
| DiagnosticPlot, SaveFitQuant | checked, unchecked | 1 | 0.143 |
| DiagnosticPlot, DensityCurve | checked, unchecked | 1 | 0.071 |
| DensityCurve, GoodnessOfFit | unchecked, checked | 1 | 0.071 |
| GoodnessOfFit, SaveSpecLimit | checked, unchecked | 1 | 0.071 |

*FIG. 20E*

*Prior Art*

| trial | factor levels A | B |
|---|---|---|
| 1 | + | − |
| 2 | + | + |
| 3 | − | − |
| 4 | − | + |

| trial | factor levels A | B | C |
|---|---|---|---|
| 1 | + | − | − |
| 2 | + | − | + |
| 3 | + | + | + |
| 4 | + | + | − |
| 5 | − | − | − |
| 6 | − | − | + |
| 7 | − | + | + |
| 8 | − | + | − |

| 78 | TEMPERATURE | | TEMPERATURE | 82 CONCENTRATION |
|---|---|---|---|---|
| | | 95 STIR RATE | 93 | STIR RATE |
| | | 67 | 65 | CONCENTRATION |
| 63 | | CATALYST | 61 FEED RATE | 61 |
| 44 | TEMPERATURE | 49 | 45 | TEMPERATURE | CONCENTRATION |
| 69 | | STIR RATE | | | 60 STIR RATE |
| 56 | | | 63 | | 55 CONCENTRATION |
| | | 53 | 53 | | 56 |

*FIG. 30A*

| 60 | FEED RATE | | FEED RATE | 82 STIR RATE |
|---|---|---|---|---|
| | | 45 CONCENTRATION | 93 | CONCENTRATION |
| | | 49 | 95 | TEMPERATURE | STIR RATE |
| 69 | | 44 | CATALYST | 78 |
| 56 | FEED RATE | 55 | 61 | FEED RATE | STIR RATE |
| 53 | | 63 CONCENTRATION | 61 | | 65 CONCENTRATION |
| 53 | | | | | 67 STIR RATE |
| | | 56 | 63 | | |

| Run 3220 | X1 3201 | X2 3202 | X3 3203 | X4 3204 | X5 3205 | X6 3206 | X7 3208 | Do Not Care 3210 |
|---|---|---|---|---|---|---|---|---|
| 1 | -1 | 1 | -1 | -1 | 1 | -1 | 1 | |
| 2 | 1 | -1 | 1 | -1 | 1 | -1 | 1 | ✓ |
| ... | ... | ... | ... | ... | ... | ... | ... | ... |
| 14 | 1 | -1 | -1 | 1 | 1 | 1 | 1 | ✓ |
| 15 | 1 | 1 | 1 | 1 | 1 | 1 | 1 | ✓ |
| 16 | -1 | 1 | -1 | 1 | 1 | 1 | -1 | ✓ |

GUI 3230

| Design Metrics | Current Design 3241 | Saved Design 3243 | Original Design 3245 |
|---|---|---|---|
| 3-Coverage 3242 | 1 | 1 | 1 |
| 4-Coverage 3244 | 0.78929 | 0.7125 | .7125 |

| crim | zn | indus | chas | nox | rooms | age | distance | radial | tax | pt | b | lstat | mvalue | FoldA | FoldB | FoldC |
|---|---|---|---|---|---|---|---|---|---|---|---|---|---|---|---|---|
| 0.75026 | 0 | 8.14 | 0 | 0.538 | 5.924 | 94.1 | 4.3996 | 4 | 307 | 21 | 394.33 | 16.3 | 15.6 | 1 | 3 | 2 |
| 0.67191 | 0 | 8.14 | 0 | 0.538 | 5.813 | 90.3 | 4.682 | 4 | 307 | 21 | 376.88 | 14.81 | 16.6 | 1 | 5 | 2 |
| 0.18836 | 0 | 6.91 | 0 | 0.448 | 5.786 | 33.3 | 5.1004 | 3 | 233 | 17.9 | 396.9 | 14.15 | 20 | 1 | 2 | 4 |
| 0.25387 | 0 | 6.91 | 0 | 0.448 | 5.399 | 95.3 | 5.87 | 3 | 233 | 17.9 | 396.9 | 30.81 | 14.4 | 1 | 2 | 1 |
| 0.04337 | 21 | 5.64 | 0 | 0.439 | 6.115 | 63 | 6.8147 | 4 | 243 | 16.8 | 393.97 | 9.43 | 20.5 | 1 | 3 | 2 |
| 0.0136 | 75 | 4 | 0 | 0.41 | 5.888 | 47.6 | 7.3197 | 3 | 469 | 21.1 | 396.9 | 14.8 | 18.9 | 1 | 5 | 3 |
| 0.02055 | 85 | 0.74 | 0 | 0.41 | 6.383 | 35.7 | 9.1876 | 2 | 313 | 17.3 | 396.9 | 5.77 | 24.7 | 1 | 5 | 2 |
| 0.12816 | 12.5 | 6.07 | 0 | 0.409 | 5.885 | 33 | 6.498 | 4 | 345 | 18.9 | 396.9 | 8.79 | 20.9 | 1 | 1 | 1 |
| 0.15876 | 0 | 10.81 | 0 | 0.413 | 5.961 | 17.5 | 5.2873 | 4 | 305 | 19.2 | 376.94 | 9.88 | 21.7 | 1 | 5 | 2 |
| 0.08707 | 0 | 12.83 | 0 | 0.437 | 6.14 | 45.8 | 4.0905 | 5 | 398 | 18.7 | 386.96 | 10.27 | 20.8 | 1 | 1 | 2 |
| 0.05646 | 0 | 12.83 | 0 | 0.437 | 6.232 | 53.7 | 5.0141 | 5 | 398 | 18.7 | 386.4 | 12.34 | 21.2 | 1 | 1 | 1 |
| 0.05735 | 0 | 4.49 | 0 | 0.449 | 6.63 | 56.1 | 4.4377 | 3 | 247 | 18.5 | 392.3 | 6.53 | 26.6 | 1 | 3 | 4 |
| 0.03932 | 0 | 3.41 | 0 | 0.489 | 6.405 | 73.9 | 3.0921 | 2 | 270 | 17.8 | 393.55 | 8.2 | 22 | 1 | 1 | 2 |
| 0.11504 | 0 | 2.89 | 0 | 0.445 | 6.163 | 69.6 | 3.4952 | 2 | 276 | 18 | 391.83 | 11.34 | 21.4 | 1 | 5 | 3 |
| 0.13262 | 0 | 8.56 | 0 | 0.52 | 5.851 | 96.7 | 2.1069 | 5 | 384 | 20.9 | 394.05 | 16.47 | 19.5 | 1 | 4 | 1 |
| 0.12802 | 0 | 8.56 | 0 | 0.52 | 6.474 | 97.1 | 2.4329 | 5 | 384 | 20.9 | 395.24 | 12.27 | 19.8 | 1 | 1 | 4 |
| 0.26363 | 0 | 8.56 | 0 | 0.52 | 6.229 | 91.2 | 2.5451 | 5 | 384 | 20.9 | 391.23 | 15.55 | 19.4 | 1 | 5 | 4 |
| 0.15098 | 0 | 10.01 | 0 | 0.547 | 6.021 | 82.6 | 2.7474 | 6 | 432 | 17.8 | 394.51 | 10.3 | 19.2 | 1 | 3 | 3 |
| 0.14476 | 0 | 10.01 | 0 | 0.547 | 5.731 | 65.2 | 2.7592 | 6 | 432 | 17.8 | 391.5 | 13.61 | 19.3 | 1 | 3 | 2 |
| 0.25915 | 0 | 21.89 | 0 | 0.624 | 5.693 | 96 | 1.7883 | 4 | 437 | 21.2 | 392.11 | 17.19 | 16.2 | 1 | 3 | 1 |
| 0.32264 | 0 | 21.89 | 0 | 0.624 | 5.942 | 93.5 | 1.9669 | 4 | 437 | 21.2 | 378.25 | 16.9 | 17.4 | 1 | 5 | 4 |
| 0.54452 | 0 | 21.89 | 0 | 0.624 | 6.151 | 97.9 | 1.6687 | 4 | 437 | 21.2 | 396.9 | 18.46 | 17.8 | 1 | 1 | 1 |
| 4.0974 | 0 | 19.58 | 0 | 0.871 | 5.468 | 100 | 1.4118 | 5 | 403 | 14.7 | 396.9 | 26.42 | 15.6 | 1 | 4 | 3 |
| 2.37934 | 0 | 19.58 | 0 | 0.871 | 6.13 | 100 | 1.4191 | 5 | 403 | 14.7 | 172.91 | 27.8 | 13.8 | 1 | 2 | 4 |
| 2.73397 | 0 | 19.58 | 0 | 0.871 | 5.597 | 94.9 | 1.5257 | 5 | 403 | 14.7 | 351.85 | 21.45 | 15.4 | 1 | 3 | 4 |
| 2.24236 | 0 | 19.58 | 0 | 0.605 | 5.854 | 91.8 | 2.422 | 5 | 403 | 14.7 | 395.11 | 11.64 | 22.7 | 1 | 4 | 3 |
| 2.924 | 0 | 19.58 | 0 | 0.605 | 6.101 | 93 | 2.2834 | 5 | 403 | 14.7 | 240.16 | 9.81 | 25 | 1 | 1 | 3 |
| 1.80028 | 0 | 19.58 | 0 | 0.605 | 5.877 | 79.2 | 2.4259 | 5 | 403 | 14.7 | 227.61 | 12.14 | 23.8 | 1 | 1 | 5 |

FIG. 44

| crim | zn | indus | chas | nox | rooms | age | distance | radial | tax | pt | b | lstat | mvalue | FoldA | FoldB | FoldC |
|---|---|---|---|---|---|---|---|---|---|---|---|---|---|---|---|---|
| 0.75026 | 0 | 8.14 | 0 | 0.538 | 5.924 | 94.1 | 4.3996 | 4 | 307 | 21 | 394.33 | 16.3 | 15.6 | | 2 | 1 |
| 0.67191 | 0 | 8.14 | 0 | 0.538 | 5.813 | 90.3 | 4.682 | 4 | 307 | 21 | 376.88 | 14.81 | 16.6 | | 2 | 1 |
| 0.18836 | 0 | 6.91 | 0 | 0.448 | 5.786 | 33.3 | 5.1004 | 3 | 233 | 17.9 | 396.9 | 14.15 | 20 | | 2 | 1 |
| 0.25387 | 0 | 6.91 | 0 | 0.448 | 5.399 | 95.3 | 5.87 | 3 | 233 | 17.9 | 396.9 | 30.81 | 14.4 | | 2 | 1 |
| 0.04337 | 21 | 5.64 | 0 | 0.439 | 6.115 | 63 | 6.8147 | 4 | 243 | 16.8 | 393.97 | 9.43 | 20.5 | | 2 | 1 |
| 0.0136 | 75 | 4 | 0 | 0.41 | 5.888 | 47.6 | 7.3197 | 3 | 469 | 21.1 | 396.9 | 14.8 | 18.9 | | 2 | 1 |
| 0.02055 | 85 | 0.74 | 0 | 0.41 | 6.383 | 35.7 | 9.1876 | 2 | 313 | 17.3 | 396.9 | 5.77 | 24.7 | | 2 | 1 |
| 0.12816 | 12.5 | 6.07 | 0 | 0.409 | 5.885 | 33 | 6.498 | 4 | 345 | 18.9 | 396.9 | 8.79 | 20.9 | | 2 | 1 |
| 0.15876 | 0 | 10.81 | 0 | 0.413 | 5.961 | 17.5 | 5.2873 | 4 | 305 | 19.2 | 376.94 | 9.88 | 21.7 | | 2 | 1 |
| 0.08707 | 0 | 12.83 | 0 | 0.437 | 6.14 | 45.8 | 4.0905 | 5 | 398 | 18.7 | 386.96 | 10.27 | 20.8 | | 2 | 1 |
| 0.05646 | 0 | 12.83 | 0 | 0.437 | 6.232 | 53.7 | 5.0141 | 5 | 398 | 18.7 | 386.4 | 12.34 | 21.2 | | 2 | 1 |
| 0.05735 | 0 | 4.49 | 0 | 0.449 | 6.63 | 56.1 | 4.4377 | 3 | 247 | 18.5 | 392.3 | 6.53 | 26.6 | | 2 | 1 |
| 0.03932 | 0 | 3.41 | 0 | 0.489 | 6.405 | 73.9 | 3.0921 | 2 | 270 | 17.8 | 393.55 | 8.2 | 22 | | 2 | 1 |
| 0.11504 | 0 | 2.89 | 0 | 0.445 | 6.163 | 69.6 | 3.4952 | 2 | 276 | 18 | 391.83 | 11.34 | 21.4 | | 2 | 1 |
| 0.13262 | 0 | 8.56 | 0 | 0.52 | 5.851 | 96.7 | 2.1069 | 5 | 384 | 20.9 | 394.05 | 16.47 | 19.5 | | 2 | 1 |
| 0.12802 | 0 | 8.56 | 0 | 0.52 | 6.474 | 97.1 | 2.4329 | 5 | 384 | 20.9 | 395.24 | 12.27 | 19.8 | | 2 | 1 |
| 0.26363 | 0 | 8.56 | 0 | 0.52 | 6.229 | 91.2 | 2.5451 | 5 | 384 | 20.9 | 391.23 | 15.55 | 19.4 | | 2 | 1 |
| 0.15098 | 0 | 10.01 | 0 | 0.547 | 6.021 | 82.6 | 2.7474 | 6 | 432 | 17.8 | 394.51 | 10.3 | 19.2 | | 2 | 3 |
| 0.14476 | 0 | 10.01 | 0 | 0.547 | 5.731 | 65.2 | 2.7592 | 6 | 432 | 17.8 | 391.5 | 13.61 | 19.3 | | 3 | 2 |
| 0.25915 | 0 | 21.89 | 0 | 0.624 | 5.693 | 96 | 1.7883 | 4 | 437 | 21.2 | 392.11 | 17.19 | 16.2 | | 3 | 1 |
| 0.32264 | 0 | 21.89 | 0 | 0.624 | 5.942 | 93.5 | 1.9669 | 4 | 437 | 21.2 | 378.25 | 16.9 | 17.4 | | 5 | 4 |
| 0.54452 | 0 | 21.89 | 0 | 0.624 | 6.151 | 97.9 | 1.6687 | 4 | 437 | 21.2 | 396.9 | 18.46 | 17.8 | | 1 | 1 |
| 4.0974 | 0 | 19.58 | 0 | 0.871 | 5.468 | 100 | 1.4118 | 5 | 403 | 14.7 | 396.9 | 26.42 | 15.6 | | 4 | 3 |
| 2.37934 | 0 | 19.58 | 0 | 0.871 | 6.13 | 100 | 1.4191 | 5 | 403 | 14.7 | 172.91 | 27.8 | 13.8 | | 2 | 4 |
| 2.73397 | 0 | 19.58 | 0 | 0.871 | 5.597 | 94.9 | 1.5257 | 5 | 403 | 14.7 | 351.85 | 21.45 | 15.4 | | 3 | 4 |
| 2.24236 | 0 | 19.58 | 0 | 0.605 | 5.854 | 91.8 | 2.422 | 5 | 403 | 14.7 | 395.11 | 11.64 | 22.7 | | 1 | 1 |
| 2.924 | 0 | 19.58 | 0 | 0.605 | 6.101 | 93 | 2.2834 | 5 | 403 | 14.7 | 240.16 | 9.81 | 25 | | 4 | 4 |
| 1.80028 | 0 | 19.58 | 0 | 0.605 | 5.877 | 79.2 | 2.4259 | 5 | 403 | 14.7 | 227.61 | 12.14 | 23.8 | | 1 | 5 |

FIG. 46

| X | Y | Level | Number | Mean | Std Error |
|---|---|---|---|---|---|
| Fold A | mvalue | 1 | 102 | 22.5333 | 0.91428 |
| Fold A | mvalue | 2 | 101 | 22.5376 | 0.91879 |
| Fold A | mvalue | 3 | 101 | 22.5267 | 0.91879 |
| Fold A | mvalue | 4 | 101 | 22.5347 | 0.91879 |
| Fold A | mvalue | 5 | 101 | 22.5317 | 0.91879 |
| Fold B | mvalue | 1 | 101 | 22.5238 | 0.91879 |
| Fold B | mvalue | 2 | 102 | 22.5304 | 0.91428 |
| Fold B | mvalue | 3 | 101 | 22.5436 | 0.91879 |
| Fold B | mvalue | 4 | 101 | 22.5337 | 0.91879 |
| Fold B | mvalue | 5 | 101 | 22.5327 | 0.91879 |
| Fold C | mvalue | 1 | 101 | 22.5376 | 0.91879 |
| Fold C | mvalue | 2 | 101 | 22.5277 | 0.91879 |
| Fold C | mvalue | 3 | 101 | 22.5317 | 0.91879 |
| Fold C | mvalue | 4 | 102 | 22.5314 | 0.91428 |
| Fold C | mvalue | 5 | 101 | 22.5356 | 0.91879 |

|    | A      | B      | C      | X5     | X2     | X3     |
|----|--------|--------|--------|--------|--------|--------|
| A  | 1.0000 | 0.5000 | 0.5000 | 0.0000 | 0.0000 | 0.0000 |
| B  | 0.5000 | 1.0000 | 0.5000 | 0.0000 | 0.0000 | 0.0000 |
| C  | 0.5000 | 0.5000 | 1.0000 | 0.0000 | 0.0000 | 0.0000 |
| X5 | 0.0000 | 0.0000 | 0.0000 | 1.0000 | 0.3333 | 0.3333 |
| X2 | 0.0000 | 0.0000 | 0.0000 | 0.3333 | 1.0000 | 0.3333 |
| X3 | 0.0000 | 0.0000 | 0.0000 | 0.3333 | 0.3333 | 1.0000 |
| X4 | 0.0000 | 0.0000 | 0.0000 | 0.3333 | 0.3333 | 0.3333 |

| Factor Name 5510 | Role 5512 | Lower 5514 | Upper 5516 |
|---|---|---|---|
| Intercept | Continuous | 1 | 1 |
| Impact Duration | Discrete Numeric | .001 | .002 |
| Material Type | Discrete Categorical | glass | plastic |
| Impact Pressure | Continuous | 0 | 1000 |
| X4 | Continuous | -1 | 1 |
| X5 | Continuous | -1 | 1 |
| X6 | Continuous | -1 | 1 |
| X7 | Continuous | -1 | 1 |
| X8 | Continuous | -1 | 1 |

| Run | Const. | P | P | P | A | B | C | D | E | F | G | H | I | J | K | L |
|---|---|---|---|---|---|---|---|---|---|---|---|---|---|---|---|---|
| 1 | 1 | -1 | 1 | 1 | 1 | 1 | 1 | 1 | 1 | 1 | 1 | 1 | 1 | 1 | 1 | 1 |
| 2 | 1 | 1 | -1 | -1 | 1 | -1 | -1 | -1 | 1 | -1 | 1 | -1 | 1 | 1 | 1 | -1 |
| 3 | 1 | 1 | 1 | -1 | -1 | 1 | -1 | -1 | -1 | 1 | -1 | 1 | -1 | 1 | 1 | 1 |
| 4 | 1 | -1 | 1 | 1 | 1 | -1 | 1 | -1 | -1 | -1 | 1 | -1 | 1 | -1 | 1 | 1 |
| 5 | 1 | 1 | -1 | 1 | 1 | 1 | -1 | 1 | -1 | -1 | -1 | 1 | -1 | 1 | -1 | 1 |
| 6 | 1 | 1 | 1 | -1 | 1 | 1 | 1 | -1 | 1 | -1 | -1 | -1 | 1 | -1 | 1 | -1 |
| 7 | 1 | -1 | 1 | 1 | -1 | 1 | 1 | 1 | -1 | 1 | -1 | -1 | -1 | 1 | -1 | 1 |
| 8 | 1 | 1 | -1 | 1 | 1 | -1 | 1 | 1 | 1 | -1 | 1 | -1 | -1 | -1 | 1 | -1 |
| 9 | 1 | -1 | 1 | -1 | -1 | 1 | -1 | 1 | 1 | 1 | -1 | 1 | -1 | -1 | -1 | 1 |
| 10 | 1 | 1 | -1 | 1 | 1 | -1 | 1 | -1 | 1 | 1 | 1 | -1 | 1 | -1 | -1 | -1 |
| 11 | 1 | -1 | 1 | -1 | -1 | 1 | -1 | 1 | -1 | 1 | 1 | 1 | -1 | 1 | -1 | -1 |
| 12 | 1 | -1 | -1 | -1 | -1 | -1 | -1 | -1 | -1 | -1 | -1 | -1 | -1 | -1 | -1 | -1 |

*FIG. 57B*

Fit Group Orthogonal Supersaturated for Y

Group 1

Group 2

| Term | Estimate | Std Error | t Ratio | Prob>|t| |
|---|---|---|---|---|
| X5 | 4.0622 | 0.2218 | 18.311 | <.0001* |
| X6 | 6.1315 | 0.2218 | 27.638 | <.0001* |

Group 3

Group 4

| Term | Estimate | Std Error | t Ratio | Prob>|t| |
|---|---|---|---|---|
| X15 | 3.9105 | 0.2092 | 18.696 | <.0001* |

FIG. 59A

Combined Model Parameter Estimates

| Term | Estimate | Std Error | t Ratio | Prob>|t| |
|---|---|---|---|---|
| X5 | 4.0622 | 0.2629 | 15.453 | <.0001* |
| X6 | 6.1315 | 0.2629 | 23.325 | <.0001* |
| X15 | 3.9105 | 0.2478 | 15.779 | <.0001* |

RMSE 0.8585    DF 8

Make Model    Run Model

FIG. 63B — Transpose of X*1, SR2 = 96

6330 / 6332 / 6334

| | Col1 | Col2 | Col3 | Col4 | Col5 | Col6 | Col7 | Col8 | Col9 | Col10 | Col11 | Col12 | Col13 |
|---|---|---|---|---|---|---|---|---|---|---|---|---|---|
| Row1 | 1 | 1 | 1 | 1 | 1 | 1 | 1 | 1 | 1 | 1 | 1 | 1 | 1 |
| Row2 | 1 | 1 | -1 | 1 | -1 | 1 | 1 | 1 | 1 | -1 | 1 | 1 | -1 |
| Row3 | 1 | -1 | -1 | 1 | 1 | -1 | -1 | 1 | -1 | -1 | 1 | -1 | -1 |
| Row4 | 1 | 1 | 1 | -1 | 1 | 1 | -1 | -1 | -1 | 1 | -1 | -1 | 1 |
| Row5 | 1 | -1 | -1 | 1 | 1 | -1 | 1 | 1 | 1 | 1 | -1 | 1 | -1 |
| Row6 | 1 | 1 | 1 | 1 | -1 | 1 | 1 | -1 | 1 | -1 | 1 | 1 | 1 |
| Row7 | 1 | -1 | 1 | -1 | 1 | 1 | 1 | 1 | 1 | 1 | 1 | -1 | -1 |
| Row8 | 1 | 1 | -1 | -1 | 1 | 1 | 1 | -1 | -1 | 1 | -1 | -1 | -1 |

FIG. 63C — Transpose of X*2, SR2 = 36

6360 / 6362 / 6364

| | Col1 | Col2 | Col3 | Col4 | Col5 | Col6 | Col7 | Col8 | Col9 | Col10 | Col11 | Col12 | Col13 |
|---|---|---|---|---|---|---|---|---|---|---|---|---|---|
| Row1 | -1 | 1 | -1 | 1 | 1 | -1 | -1 | 1 | 1 | 1 | -1 | 1 | 1 |
| Row2 | 1 | 1 | 1 | -1 | -1 | -1 | 1 | 1 | -1 | 1 | -1 | -1 | -1 |
| Row3 | 1 | -1 | 1 | -1 | -1 | -1 | -1 | -1 | -1 | -1 | 1 | -1 | -1 |
| Row4 | 1 | 1 | 1 | 1 | 1 | 1 | 1 | -1 | -1 | 1 | -1 | 1 | 1 |
| Row5 | 1 | 1 | -1 | 1 | 1 | 1 | -1 | 1 | 1 | -1 | -1 | 1 | -1 |
| Row6 | 1 | 1 | 1 | -1 | 1 | -1 | 1 | 1 | 1 | -1 | 1 | 1 | 1 |
| Row7 | 1 | 1 | 1 | 1 | 1 | -1 | 1 | -1 | -1 | -1 | -1 | -1 | -1 |
| Row8 | 1 | 1 | 1 | 1 | 1 | 1 | -1 | 1 | -1 | -1 | -1 | -1 | 1 |

| Estimation Efficiency | | |
|---|---|---|
| Term | Fractional Increase in CI Length | Relative Std Error of Estimate |
| Intercept | 0 | 0.354 |
| X1 | 1.058 | 0.728 |
| X2 | 0 | 0.333 |
| X3 | 1.058 | 0.728 |
| X4 | 1.058 | 0.728 |
| X5 | 1.058 | 0.728 |
| X6 | 1.058 | 0.728 |
| X7 | 0 | 0.333 |
| X8 | 1.058 | 0.728 |
| X9 | 1.058 | 0.728 |
| X10 | 1.058 | 0.728 |
| X11 | 1.058 | 0.728 |
| X12 | 1.058 | 0.728 |

| Estimation Efficiency | | |
|---|---|---|
| Term | Fractional Increase in CI Length | Relative Std Error of Estimate |
| Intercept | 1.306 | 0.815 |
| X1 | 0.937 | 0.685 |
| X2 | 0.998 | 0.706 |
| X3 | 0.937 | 0.685 |
| X4 | 0.788 | 0.632 |
| X5 | 1.039 | 0.721 |
| X6 | 0.842 | 0.651 |
| X7 | 0.842 | 0.651 |
| X8 | 0.842 | 0.651 |
| X9 | 0.842 | 0.651 |
| X10 | 0.788 | 0.632 |
| X11 | 0.842 | 0.651 |
| X12 | 1.252 | 0.796 |

FIG. 65B

| Disallowed Combo 7202 | No. of Runs 7204 | Model 7206 7210 | No. of Optimal settings 7208 | | | | |
|---|---|---|---|---|---|---|---|
| | | | Full factorial | Str 2 7212 | Str 3 7213 | Str 4 7214 | Str 5 7215 |
| X1 == L1 & X4 == L1 \| X1 == L1 & X2 == L2 | 640 | 3X1 + 2X2 + X4 + X5  7220 | 64 | 1/7 | 2/16 | 3/33 | 7/91 |
| X1 == L1 & X4 == L1 \| X1 == L1 & X2 == L2 \| X4 == L1 & X5 == L2 | 512 | 3X1 + 2X2 + X4 + X5 | 64 | 1/7 | 3/18 | 6/38 | 14/89 |
| X1 == L1 & X4 == L1 \| X1 == L1 & X2 == L2 \| X4 == L1 & X5 == L2 | 512 | 3X1 + 2X2 + X4 + X5 - 2X7 | 32 | 1/7 | 2/18 | 2/38 | 7/89 |
| X1 == L1 & X4 == L1 \| X1 == L1 & X2 == L2 & X3 == L1 & X7 == L2 | 736 | 3X1 + 2X2 + X4 + X5 | 64 | 1/7 | 1/16 | 2/31 | 5/90 |
| X1 == L1 & X4 == L1 \| X1 == L1 & X2 == L2 & X3 == L1 & X7 == L2 | 736 | 3X1 + 2X2 + X4 + X5 - 2X1X2 + X2X5 | 64 | 1/7 | 1/16 | 2/31 | 5/90 |

FIG. 72

| Disallowed Combo 7310 | X1 = L1 & X4 = L1 \| X1 = L1 & X2 = L2 \| X1 = L1 & X5 = L2 | | | |
|---|---|---|---|---|
| Model | No. of optimal settings/No. of runs (Function value) 7320 | | | |
| | Full Factorial | CA2 | CA3 | CA4 |
| X1 + 0.9X2 + 0.8X3 + 0.7X4 + 0.6X5 + 0.5X6 + 0.4X7 + 0.3X8 + 0.2 X9 + 0.1 X10 | 1/512 (5.5) | 0/7 (3.7) | 1/18 (5.5) | 1/38 (5.5) |
| X1 + 0.9X2 + 0.8X3 + 0.7X4 + 0.6X5 + 0.5X6 + 0.4X7 + 0.3X8 + 0.2 X9 + 0.1 X10 − 0.3X1X3 + 0.5X2X5 | 1/512 (5.7) | 0/7 (3.9) | 1/18 (5.7) | 1/38 (5.7) |
| 0.8X3 + 0.5X6 + 0.4X7 + 0.3X8 + 0.2 X9 + 0.1 X10 | 8/512 (2.3) | 0/7 (1.1) | 1/18 (2.3) | 1/38 (2.3) |
| 0.8X3 + 0.5X6 + 0.4X7 + 0.3X8 + 0.2 X9 + 0.1 X10 (X4 − 4 Levels, X6 − 3 Levels) | 20/1920 (2.3) 7322 | 0/7 (1.4) | 1/18 (2.3) | 1/38 (2.3) |

FIG. 73

| Disallowed Combo 7410 | X1 = L1 & X4 = L1 \| X1 = L1 & X2 = L2 \| X1 = L1 & X5 = L2 | | | | |
|---|---|---|---|---|---|
| Model | No. of optimal settings/No. of runs (Function value) | | | | |
| | Full Factorial | CA2 | CA3 | CA4 | CA5 |
| X1 + 0.9X2 + 0.8X3 + 0.7X4 + 0.6X5 + 0.5X6 + 0.4X7 + 0.3X8 + 0.2 X9 + 0.1 X10 – 0.3X1X3 + 0.2X1X4 – 0.4X1X7 + 0.5X2X5 + 0.5X1^2 – 0.2X3^2 (X4, X6 – 3-Level Categorical) (X1, X3 – 4-Level Discrete Numeric) 7420A | 1/6528 (17.2) | 0/16 (13.7) | 1/60 (17.2) | 0/164 (14.2) | 0/404 (16.3) |
| 0.8X3 + 0.5X6 + 0.4X7 + 0.3X8 + 0.2X9 + 0.1X10 + 0.2X3^2 – 0.4X3*X6 (X4, X6 – 3-Level Categorical) (X1, X3 – 4-Level Discrete Numeric) 7420B | 34/6528 (8.5) | 0/16 (7.3) | 0/60 (7.9) | 2/164 (8.5) | 1/404 (8.5) |

FIG. 74

| Model (X4, X6 – 3-Level Categorical) (X1, X3 – 4-Level Discrete Numeric) | $-0.86X1 + 1.74X2 + 0.8X3 - 0.22X4 - 1.19X5 + 0.5X6 - 0.96X7 - 1.11X8 + 1.04X9 + 0.36X10 - 0.3X1X3 - 1.61X1X4 + 0.65X1X7 + 0.99X2X5 + 0.5X1^2 - 0.2X3^2$ 7510 | | | |
|---|---|---|---|---|
| Disallowed Combo | X1 = L1 & X4 = L1 \| X1 = L1 & X2 = L2 \| X1 = L1 & X5 = L2  7520 | | | |
| Max. Function value (FF) | 36.0846  7530 | | | |
| Optimal setting | X1 = 4, X2 = L1, X3 = 1, X4 = L1, X5 = L1, X6 = L1, X7 = L1, X8 = L2, X9 = L1, X10 = L1  7540 | | | |
| COVERING ARRAYS | | | | |
| Strength  7550 | CA2 | CA3 | CA4 | CA5 |
| Average Max Function value  7560 | 14.0509 | 18.1093 | 21.9105 | 25.8606 |
| Coverage  7570 | 1/100 | 0/100 | 3/100 | 16/100 |

*FIG. 75A*

Name: Initial Disallowed Combinations

Script:
```
X1 == "L2" & (X2 >= -0.5 & X2 <= 0.75) |
X1 == "L1" & X2 <= 0.2
```

OK | Run | Debug Script | Save | Cancel

Discretization of Continuous Factors

Name: Modified Disallowed Combinations

Script:
```
X1 == "L2" &
( X2 == "L2" | X2 == "L3" | X2 == "L4" ) &
( X2 == "L1" | X2 == "L2" | X2 == "L3") |
X1 == "L1" &
( X2 == "L1" | X2 == "L2" )
```

OK | Run | Debug Script | Save | Cancel

| Name: | Initial Disallowed Combinations | OK |
| Script: | X1 == "L2" & (X2 >= -0.5 & X2 <= .75) | Run |
| | | Debug Script |
| Covering Array Strength: | 4 | Save |
| | | Cancel |

8202 — script box
8204 — covering array strength
8200 — dialog

FIG. 82B

Discretization of Continuous Factors

| Name: | Modified Disallowed Combinations | OK |
| Script: | X1 == "L2" & <br> ( X2 == "L2" \| X2 == "L3" ) & <br> ( X2 == "L1" \| X2 == "L2" ) | Run |
| | | Debug Script |
| | | Save |
| Error: Missing Values t>=3 | | Cancel |

8262
8260

OPTIMIZATION UNDER DISALLOWED COMBINATIONS

CROSS-REFERENCE TO RELATED APPLICATIONS

This application is a continuation of U.S. application Ser. No. 17/144,278, filed Jan. 8, 2021.

U.S. application Ser. No. 17/144,278 claims the benefit of and priority based on 35 U.S.C. § 119 to U.S. Provisional Application No. 63/050,105, filed Jul. 9, 2020 and U.S. Provisional Application No. 63/050,106, filed Jul. 9, 2020, and is a continuation-in-part of U.S. application Ser. No. 16/985,512, filed Aug. 5, 2020.

U.S. application Ser. No. 16/985,512 claims the benefit of and priority based on 35 U.S.C. § 119 to U.S. Provisional Application No. 63/039,280, filed Jun. 15, 2020, and is a continuation-in-part of U.S. application Ser. No. 16/719,200, filed Dec. 18, 2019 and U.S. application Ser. No. 16/692,172, filed Nov. 22, 2019.

U.S. application Ser. No. 16/719,200 claims the benefit of and priority based on 35 U.S.C. § 119 to U.S. Provisional Application No. 62/861,563, filed Jun. 14, 2019.

U.S. application Ser. No. 16/692,172 claims the benefit of and priority based on 35 U.S.C. § 119 to U.S. Provisional Application No. 62/886,189, filed Aug. 13, 2019 and is a continuation-in-part of U.S. application Ser. No. 16/507,769, filed Jul. 10, 2019, which claims the benefit of and priority based on 35 U.S.C. § 119 to U.S. Provisional Application No. 62/796,214, filed Jan. 24, 2019, U.S. Provisional Application No. 62/807,286 filed Feb. 19, 2019, and U.S. Provisional Application No. 62/816,150 filed Mar. 10, 2019, and is a continuation-in-part of U.S. application Ser. No. 16/240,182, filed Jan. 4, 2019, which issued as U.S. Pat. No. 10,386,271 on Aug. 20, 2019, which claims the benefit of and priority based on 35 U.S.C. § 119 to U.S. Provisional Application No. 62/728,361 filed Sep. 7, 2018, and which is a continuation-in-part of U.S. application Ser. No. 16/154,290, filed Oct. 8, 2018, which issued as U.S. Pat. No. 10,338,993 on Jul. 2, 2019, which claims the benefit of and priority based on 35 U.S.C. § 119 to U.S. Provisional Application No. 62/702,247 filed Jul. 23, 2018, and U.S. Provisional Application No. 62/661,057, filed Apr. 22, 2018.

The disclosures of each of these are incorporated herein by reference in their entirety.

BACKGROUND

In a complex system, different components work together to function as the complex system. For example, an airplane may have electrical, mechanical and software components that work together for the airplane to land. An engineer may have different options for a given component in the system (e.g., different control systems or different settings for a control system for the landing gear of the airplane). An engineer testing a complex system can construct a test suite that represents different test cases for the system with selections for the different options for each of the components in the system. The test suite can be referred to as a combinatorial test suite in that it tests different combinations of configurable options for a complex system. If there are failures, the test engineer is faced with the task of identifying the option or combination of options that precipitated the failures (e.g., from a table of entries or summary statistics). When there are multiple components in the complex system, it can be difficult to visualize different options for each component and the results of testing those different options. Further, it is often not practical, possible, or desirable for certain combinations of factor settings to occur together.

An engineer may design an experiment with test cases each test case specifying one of different options for each factor of the experiment (e.g., to test a complex system). The engineer may define disallowed combinations to specify combinations of inputs for factors that will not be allowed (e.g., where it is undesirable to test certain factors together within particular ranges or where one or more factors are not relevant for testing at certain settings of another factor). For example, if the system is a baking system, a test engineer may not wish to cook the food at the highest oven temperature for the longest time possible, when testing to determine optimal oven and cooking time inputs.

A screening design is useful for determining which active factors in the experiment affect the outcome. Data (e.g., input and response system data) can be used to generate a model (e.g., a machine learning algorithm model). Validations techniques can be used to validate data for generating the model (e.g., a K-fold cross-validation).

Experimenters in designing an experiment will sometimes employ a screening design to help identify what potential factors in the experiment may be active factors in determining an outcome of the experiment. A supersaturated design for an experiment is one in which the number of factors investigated in the experiment is larger than the number of test cases. Supersaturated designs are presently underused or avoided by experimenters because these designs cannot estimate all factors for an experiment simultaneously, and it can be difficult to identify active factors using current model selection techniques.

SUMMARY

In an example embodiment, a computer-program product tangibly embodied in a non-transitory machine-readable storage medium is provided. The computer-program product includes instructions to cause a computing system to receive a request for a computer-generated design of an experiment. The experiment comprises a plurality of factors. The computer-program product includes instructions to cause a computing system to define a design space for the computer-generated design of the experiment. The design space is defined by respective candidate inputs for each respective factor of the plurality of factors. The plurality of factors comprise a first factor with a first set of candidate inputs and a second factor with a second set of candidate inputs. The computer-program product includes instructions to cause a computing system to receive a disallowed combination indication indicating a user-defined disallowed combination for the design space. The user-defined disallowed combination constrains a first set of values from the first set of candidate inputs from being assigned, according to the computer-generated design, to the first factor if the second factor is assigned, according to the computer-generated design, one of a second set of values from the second set of candidate inputs. The computer-program product includes instructions to cause a computing system to determine one or more additional constraints on computer generation of the computer-generated design in the design space. The computer-program product includes instructions to cause a computing system to evaluate if a user-defined model can be generated according to the user-defined disallowed combination and the one or more additional constraints on computer generation in the design space. When the user-defined model can be generated, the user-defined model can be used to determine the computer-generated design of the experiment that satisfies both the disallowed combination and the one or more additional constraints on computer generation. The computer-program product includes instructions to cause a computing system to determine based on an evaluation of the user-defined disallowed combination that the user-defined model cannot be generated. The computer-program product includes instructions to cause a computing system to, responsive to determining that the user-defined model cannot be generated, generate a computer suggested modification of the user-defined model such that the computer-generated design can be generated according to the computer suggested modification. The computer suggested modification accounts for the user-defined disallowed combination and the one or more additional constraints on computer generation.

In another example embodiment, a computing device is provided. The computing device includes, but is not limited to, a processor and memory. The memory contains instructions that when executed by the processor control the computing device to generate a computer suggested modification of the user-defined model such that the computer-generated design can be generated according to the computer suggested modification.

In another example embodiment, a method of generating a computer suggested modification of the user-defined model such that the computer-generated design can be generated according to the computer suggested modification is provided.

In another example embodiment, a computer-program product tangibly embodied in a non-transitory machine-readable storage medium is provided. The computer-program product includes instructions to cause a computing system to determine a design space for designing a design system. The design space is defined by a plurality of factors, candidate inputs, and a disallowed combination indication. The candidate inputs comprise a respective set of candidate inputs for each of the plurality of factors. The plurality of factors comprise a first factor with a first set of candidate inputs for the first factor and a second factor with a second set of candidate inputs for the second factor. The disallowed combination indication indicates one or more disallowed combinations for candidate inputs of the plurality of factors. The one or more disallowed combinations comprise a first set of values for the first factor that are restricted from being assigned to the first factor from the first set of candidate inputs if the second factor is assigned one of a second set of values from the second set of candidate inputs. The computer-program product includes instructions to cause a computing system to receive a request to identify a set of inputs that will provide a response of the design system that advances a user-defined goal for the design system. The computer-program product includes instructions to cause a computing system to, responsive to the request to identify the set of inputs, generate a design for the design space that provides a plurality of design cases for generating the response of the design system and obtain responses of the design system generated for multiple design cases of the design for the design system. The computer-program product includes instructions to cause a computing system to select at least one design case based on obtained responses of the design system for the multiple design cases, and based on the at least one design case, output an indication of a suggested set of inputs for the design system. The suggested set of inputs advances the user-defined goal for the design system and is not disallowed according to the one or more disallowed combinations.

In another example embodiment, a computing device is provided. The computing device includes, but is not limited to, a processor and memory. The memory contains instructions that when executed by the processor control the computing device to output an indication of a suggested set of inputs for the design system.

In another example embodiment, a method of outputting an indication of a suggested set of inputs for the design system is provided.

Other features and aspects of example embodiments are presented below in the Detailed Description when read in connection with the drawings presented with this application.

BRIEF DESCRIPTION OF THE DRAWINGS

FIG. 16A illustrates an example set of input weights in at least one embodiment of the present technology.

FIG. 16B illustrates an example single failed test outcome of a test suite in at least one embodiment of the present technology.

FIG. 16C illustrates an example set of input weights with default input weights in at least one embodiment of the present technology.

FIG. 16D illustrates example cause indicators in at least one embodiment of the present technology.

FIG. 17A illustrates an example set of input weights in at least one embodiment of the present technology.

FIG. 17B illustrates example multiple failed test outcomes of a test suite in at least one embodiment of the present technology.

FIGS. 17C-17D illustrate an example combined weight for each test condition of failed tests in at least one embodiment of the present technology.

FIGS. 17E-17F illustrate example cause indicators taking into account multiple failed test outcomes in at least one embodiment of the present technology.

FIG. 17G illustrates an example ordered ranking of cause indicators in at least one embodiment of the present technology.

FIG. 20C illustrates an example failure indication in at least one embodiment of the present technology.

FIGS. 20D-20E illustrate an example graphical user interface for displaying a most likely potential cause for a potential failure in at least one embodiment of the present technology.

FIGS. 30A-30D illustrate example graphical representations of results of an experiment in at least one embodiment of the present technology.

FIGS. 31A-31B illustrate example graphical representations for diagnosing covering arrays in at least one embodiment of the present technology.

FIGS. 32A-32D illustrate an example interactive graphical user interface for controlling do not care cells in at least one embodiment of the present technology.

FIG. 37 illustrates an example graphical user interface for obtaining a primary criterion and a secondary criterion in one or more embodiments.

FIG. 38 illustrates an example initial screening design and modified screening designs in one or more embodiments.

FIG. 39 illustrates an example graphical user interface for outputting an indication of a screening design in one or more embodiments.

FIG. 44 illustrates an example portion of a data set with multiple validations in at least one embodiment of the present technology.

FIG. 46 illustrates an example portion of a data set with a restricted factor level in at least one embodiment of the present technology.

FIGS. 47A-B illustrate example comparison of folds.

FIGS. 50A-B illustrate example graphical user interfaces for generating a supersaturated design in at least one embodiment of the present technology.

FIG. 54 illustrates an example indication of correlation between a portion of factors of a generated supersaturated design in at least one embodiment of the present technology.

FIG. 57B illustrates an example generated supersaturated design in at least one embodiment of the present technology.

FIGS. 59A-59B illustrate example graphical user interfaces for an analysis of a supersaturated design at least one embodiment of the present technology.

FIG. 61A illustrates an example graphical user interface for providing factors in at least one embodiment of the present technology.

FIG. 61B illustrates an example graphical user interface for providing runs in at least one embodiment of the present technology.

FIGS. 63A-63C illustrate example data representations of matrixes in at least one embodiment of the present technology.

FIGS. 65A-65B illustrate example representations of efficiency of estimating a factor in modeling a supersaturated design in at least one embodiment of the present technology.

FIG. 72 illustrates example performance results for a suggested set of inputs for categorical factors of two levels in at least one embodiment of the present technology.

FIG. 73 illustrates example performance results for a suggested set of inputs for categorical factors with more than two levels in at least one embodiment of the present technology.

FIG. 74 illustrates example performance results for a suggested set of inputs for categorical factors and discretized continuous factors in at least one embodiment of the present technology.

FIGS. 75A-75B illustrates example performance results for a suggested set of inputs for categorical factors and discretized continuous factors where there is a local optimum in at least one embodiment of the present technology.

FIGS. 79A-C illustrate example graphical user interfaces for modifying a user-defined disallowed combination in at least one embodiment of the present technology.

FIGS. 82A-C illustrate example graphical user interfaces for modifying a user-defined disallowed combination based on a constraint related to discretized factors in at least one embodiment of the present technology.

DETAILED DESCRIPTION

In the following description, for the purposes of explanation, specific details are set forth to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional operations not included in a figure. A process may correspond to a method, a function, a procedure, a subroutine, a subprogram, etc. When a process corresponds to a function, its termination can correspond to a return of the function to the calling function or the main function.

Systems depicted in some of the figures may be provided in various configurations. In some embodiments, the systems may be configured as a distributed system where one or more components of the system are distributed across one or more networks in a cloud computing system.

Figure 1:
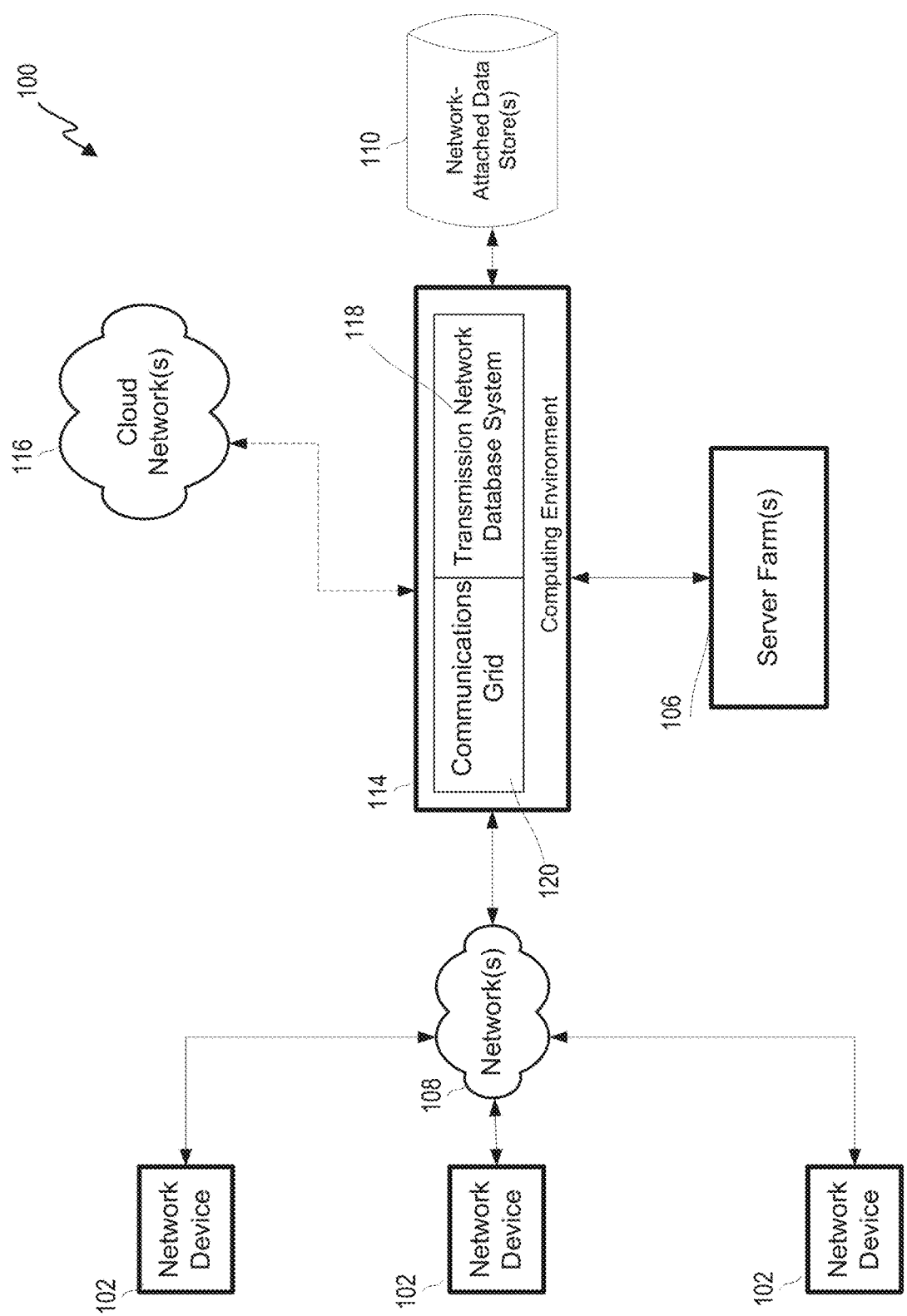
FIG. 1 illustrates a block diagram that provides an illustration of the hardware components of a computing system, according to at least one embodiment of the present technology.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
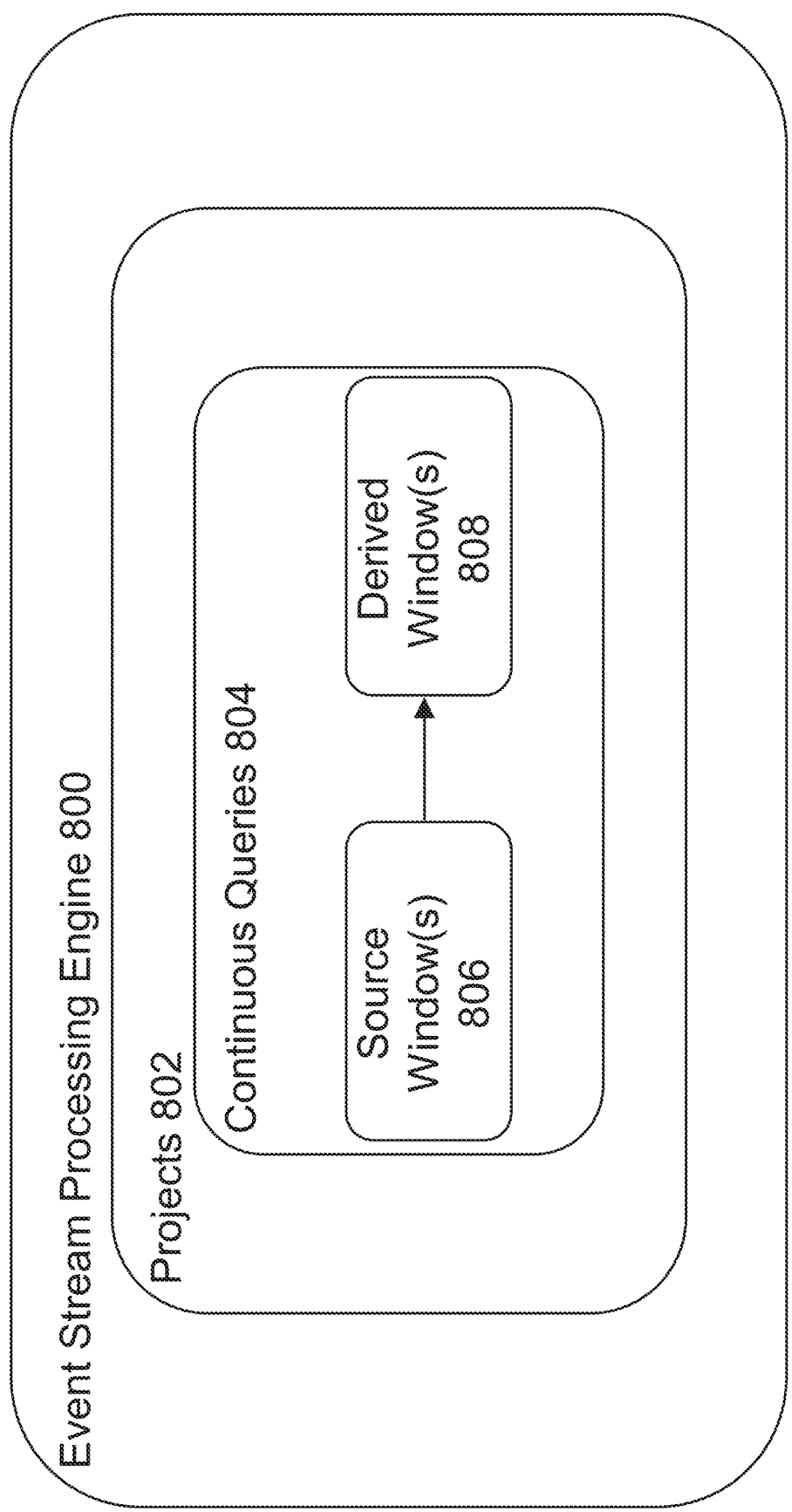
FIG. 8 illustrates a block diagram including components of an Event Stream Processing Engine (ESPE), according to at least one embodiment of the present technology.
Figure 9:
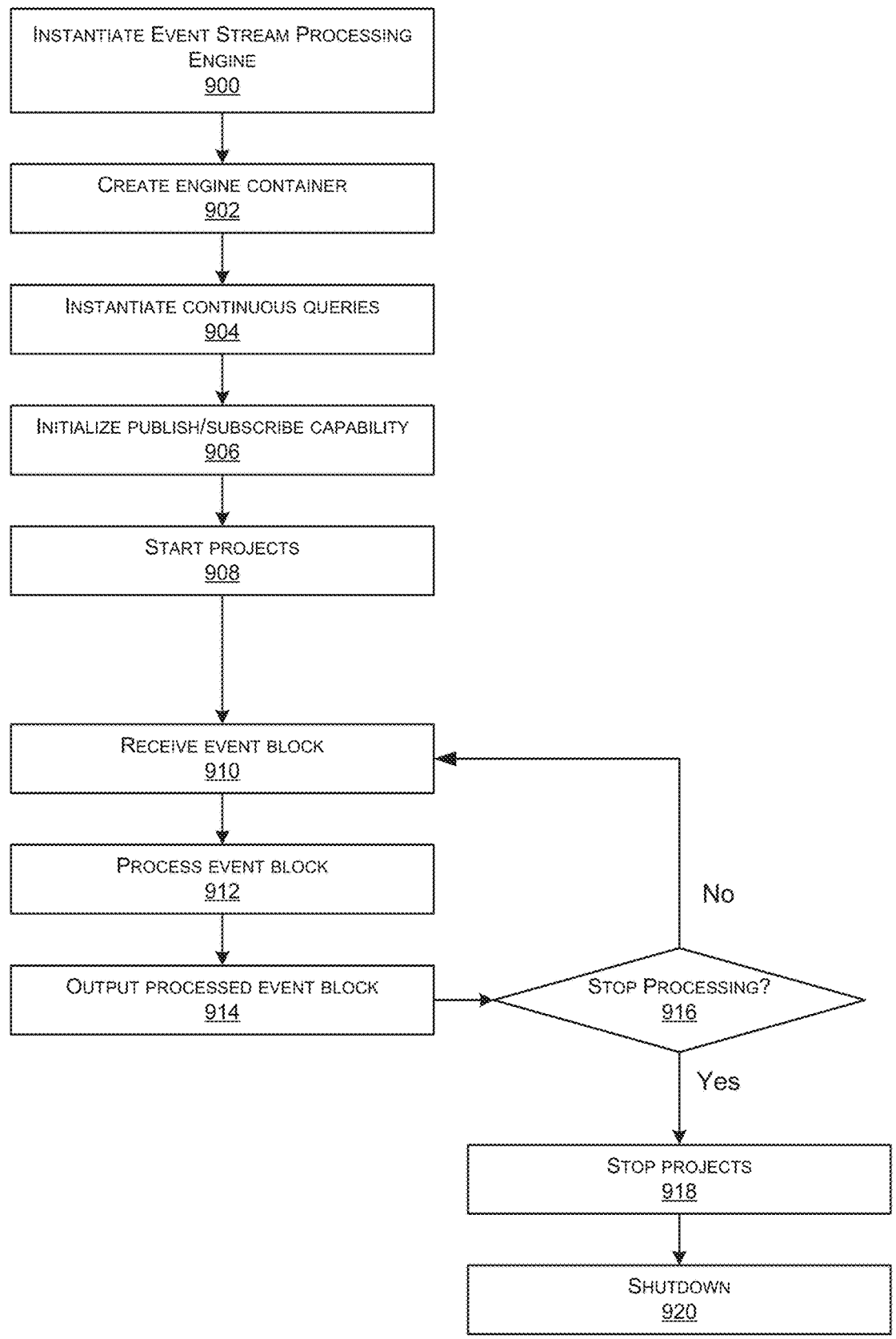
FIG. 9 illustrates a flow chart showing an example process including operations performed by an event stream processing engine, according to at least one embodiment of the present technology.
Figure 10:
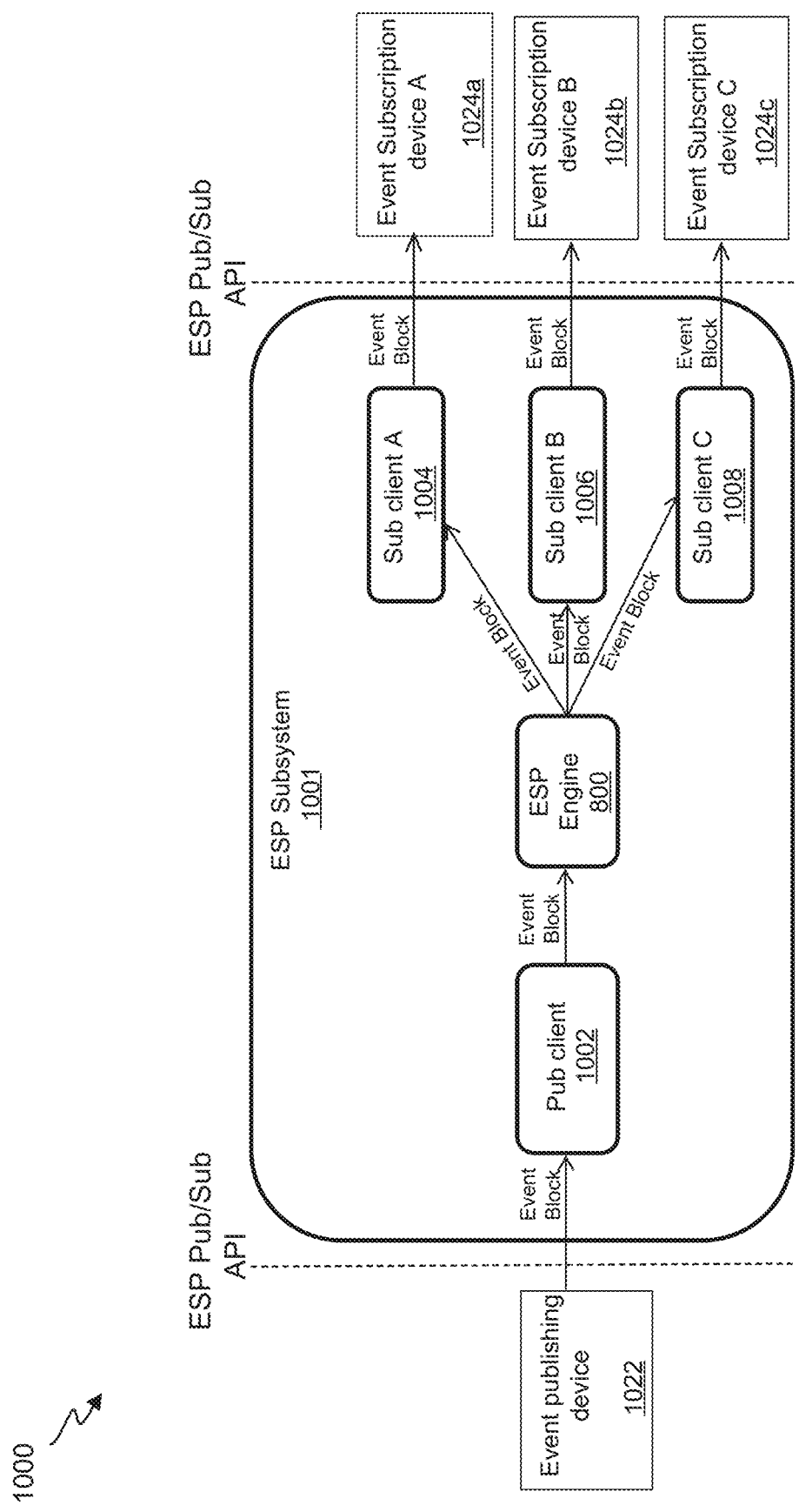
FIG. 10 illustrates an ESP system interfacing between a publishing device and multiple event subscribing devices, according to at least one embodiment of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. IoT may be implemented in various areas, such as for access (technologies that get data and move it), embed-ability (devices with embedded sensors), and services. Industries in the IoT space may automotive (connected car), manufacturing (connected factory), smart cities, energy and retail. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
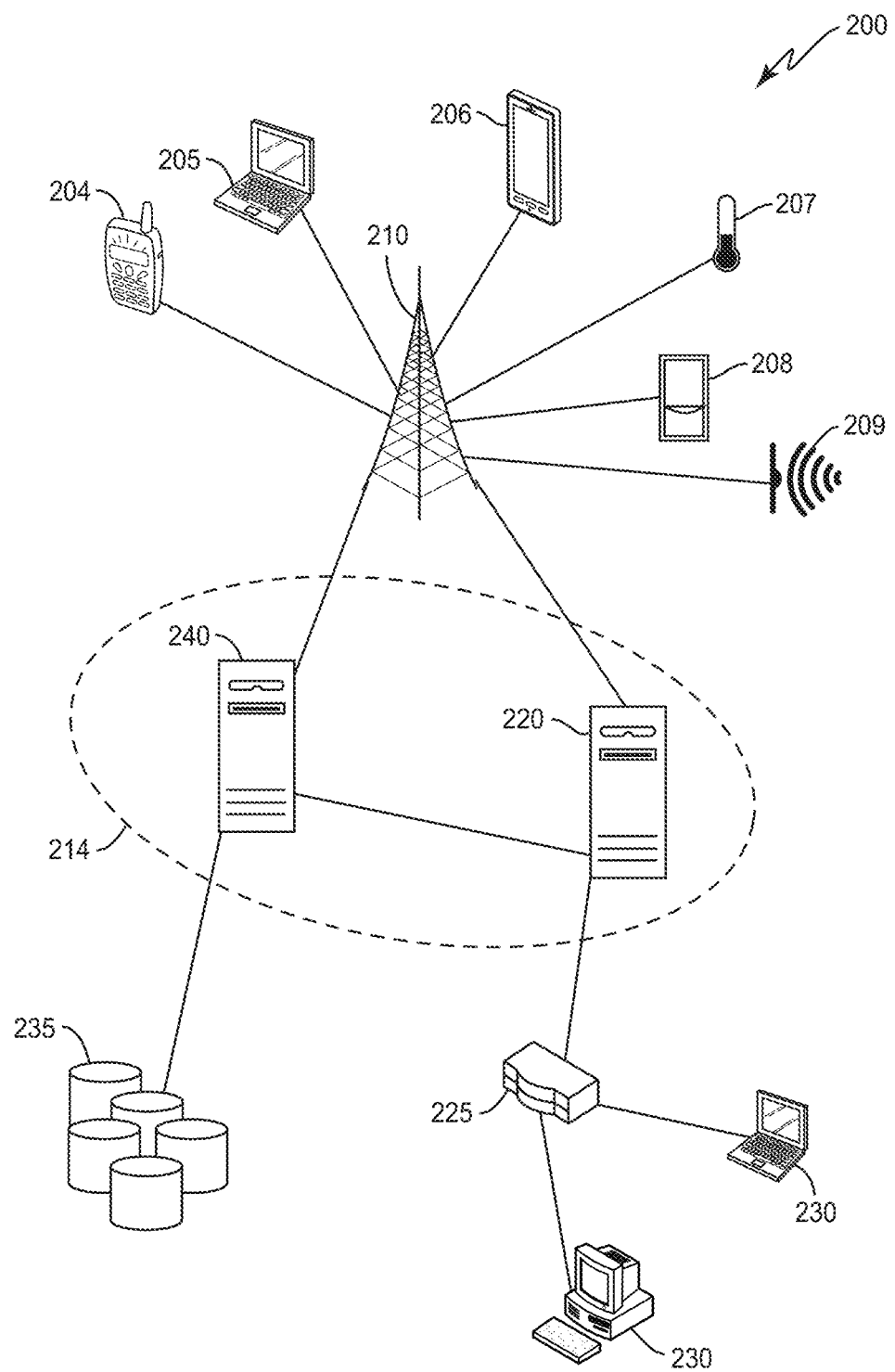
FIG. 2 illustrates an example network including an example set of devices communicating with each other over an exchange system and via a network, according to at least one embodiment of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
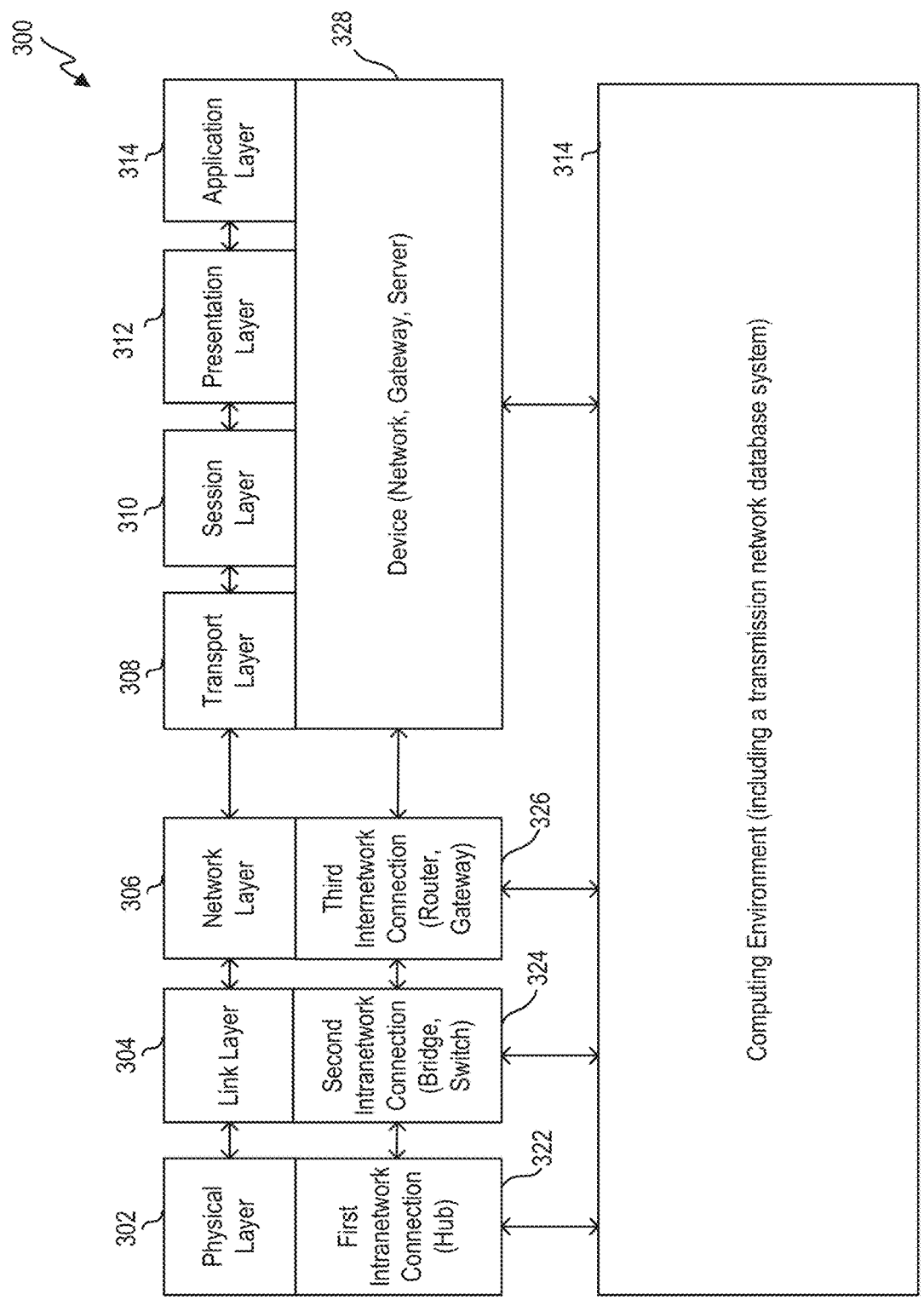
FIG. 3 illustrates a representation of a conceptual model of a communications protocol system, according to at least one embodiment of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 302-314. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data and is the farthest layer from the user in a communications system. On the other hand, the application layer is the highest layer because it interacts directly with a software application.

As noted, the model includes a physical layer 302. Physical layer 302 represents physical communication and can define parameters of that physical communication. For example, such physical communication may come in the form of electrical, optical, or electromagnetic signals. Physical layer 302 also defines protocols that may control communications within a data transmission network.

Link layer 304 defines links and mechanisms used to transmit (i.e., move) data across a network. The link layer manages node-to-node communications, such as within a grid computing environment. Link layer 304 can detect and correct errors (e.g., transmission errors in the physical layer 302). Link layer 304 can also include a media access control (MAC) layer and logical link control (LLC) layer.

Network layer 306 defines the protocol for routing within a network. In other words, the network layer coordinates transferring data across nodes in a same network (e.g., such as a grid computing environment). Network layer 306 can also define the processes used to structure local addressing within the network.

Transport layer 308 can manage the transmission of data and the quality of the transmission and/or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt and/or format data based on data types known to be accepted by an application or network layer.

Application layer 314 interacts directly with software applications and end users, and manages communications between them. Application layer 314 can identify destinations, local resource states or availability and/or communication content or formatting using the applications.

Intra-network connection components 322 and 324 are shown to operate in lower levels, such as physical layer 302 and link layer 304, respectively. For example, a hub can operate in the physical layer and a switch can operate in the link layer. Inter-network connection components 326 and 328 are shown to operate on higher levels, such as layers 306-314. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
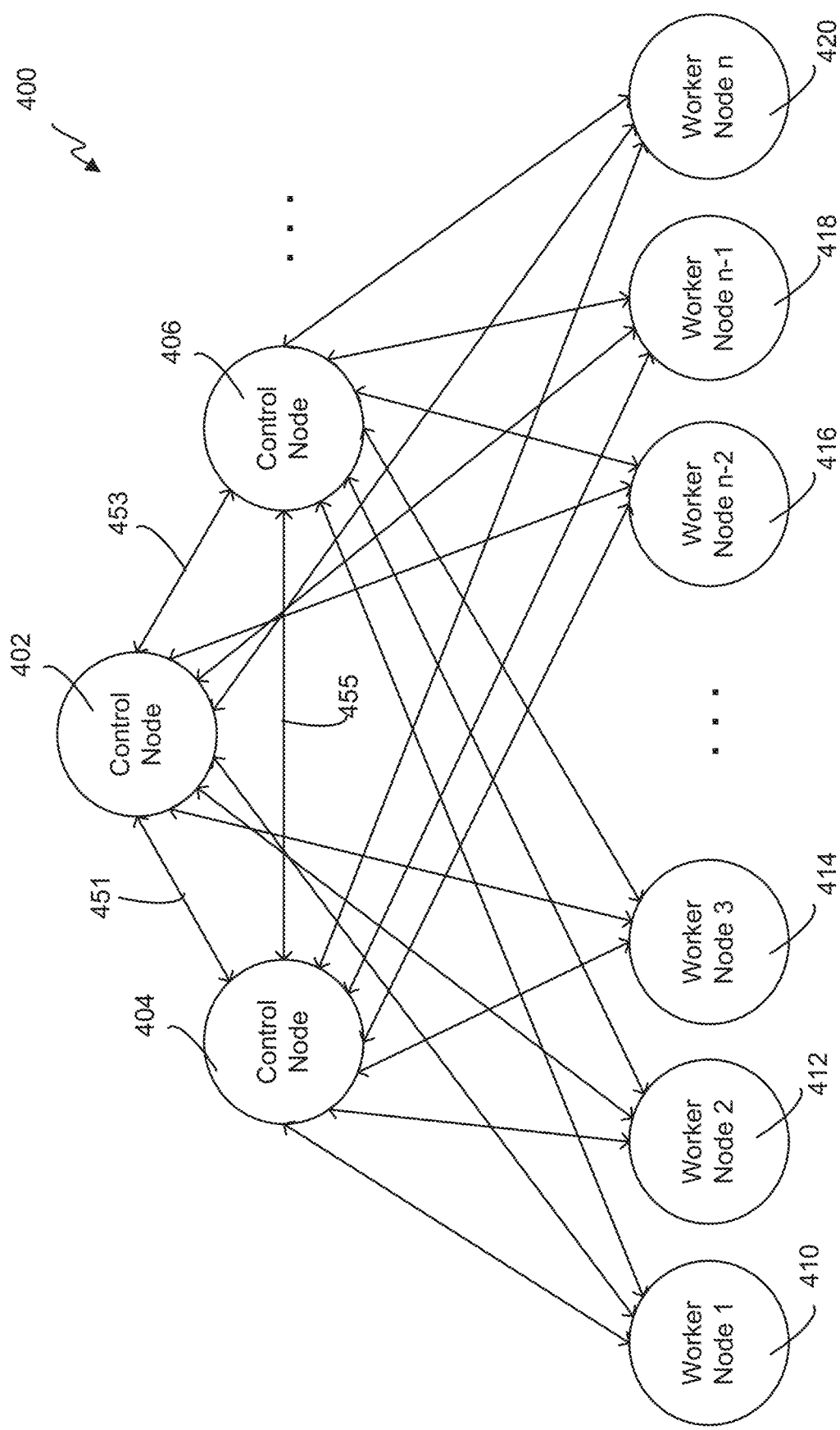
FIG. 4 illustrates a communications grid computing system including a variety of control and worker nodes, according to at least one embodiment of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be receive or stored by a machine other than a control node (e.g., a Hadoop data node).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes). The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
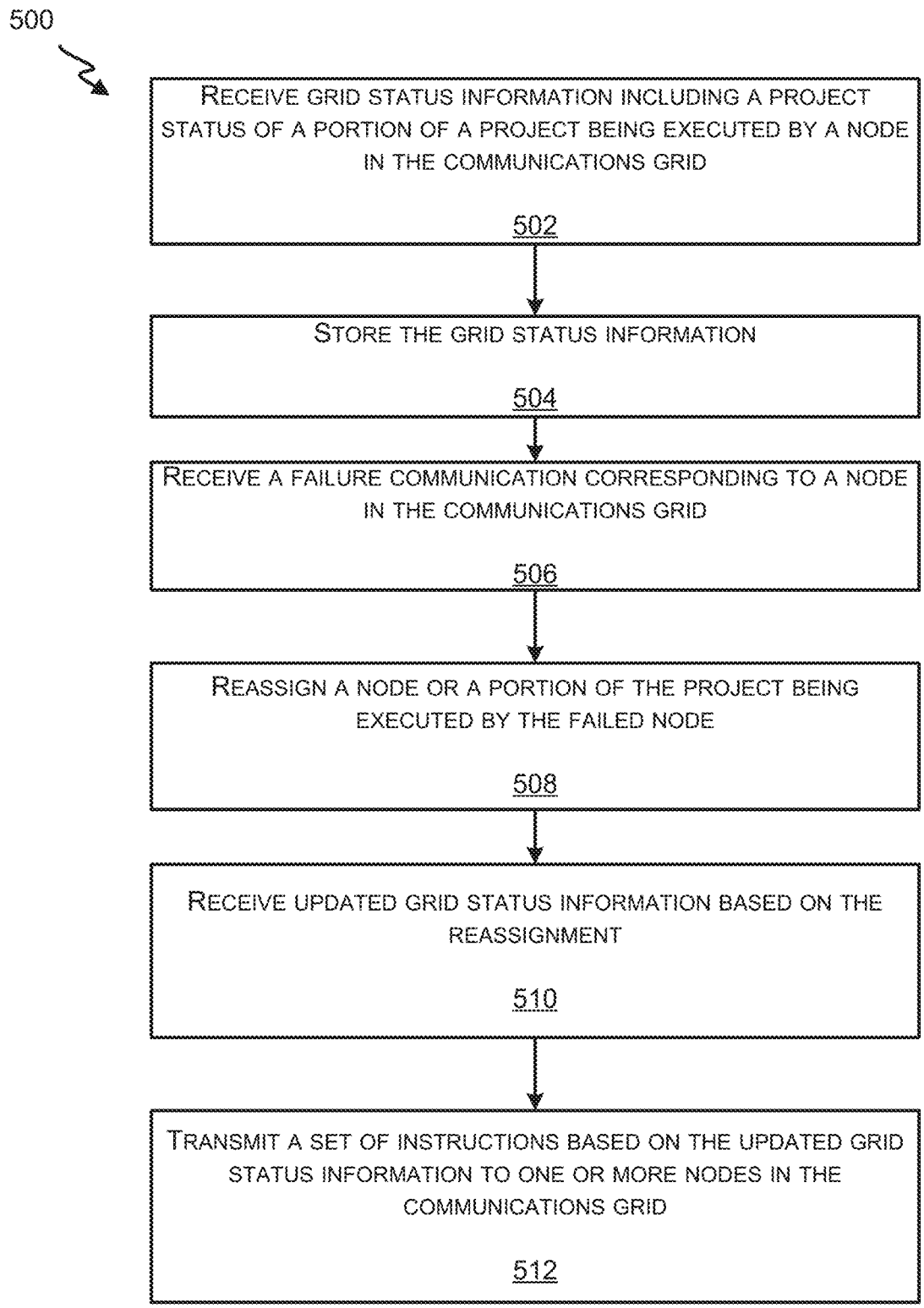
FIG. 5 illustrates a flow chart showing an example process for adjusting a communications grid or a work project in a communications grid after a failure of a node, according to at least one embodiment of the present technology.

FIG. 5 illustrates a flow chart showing an example process for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
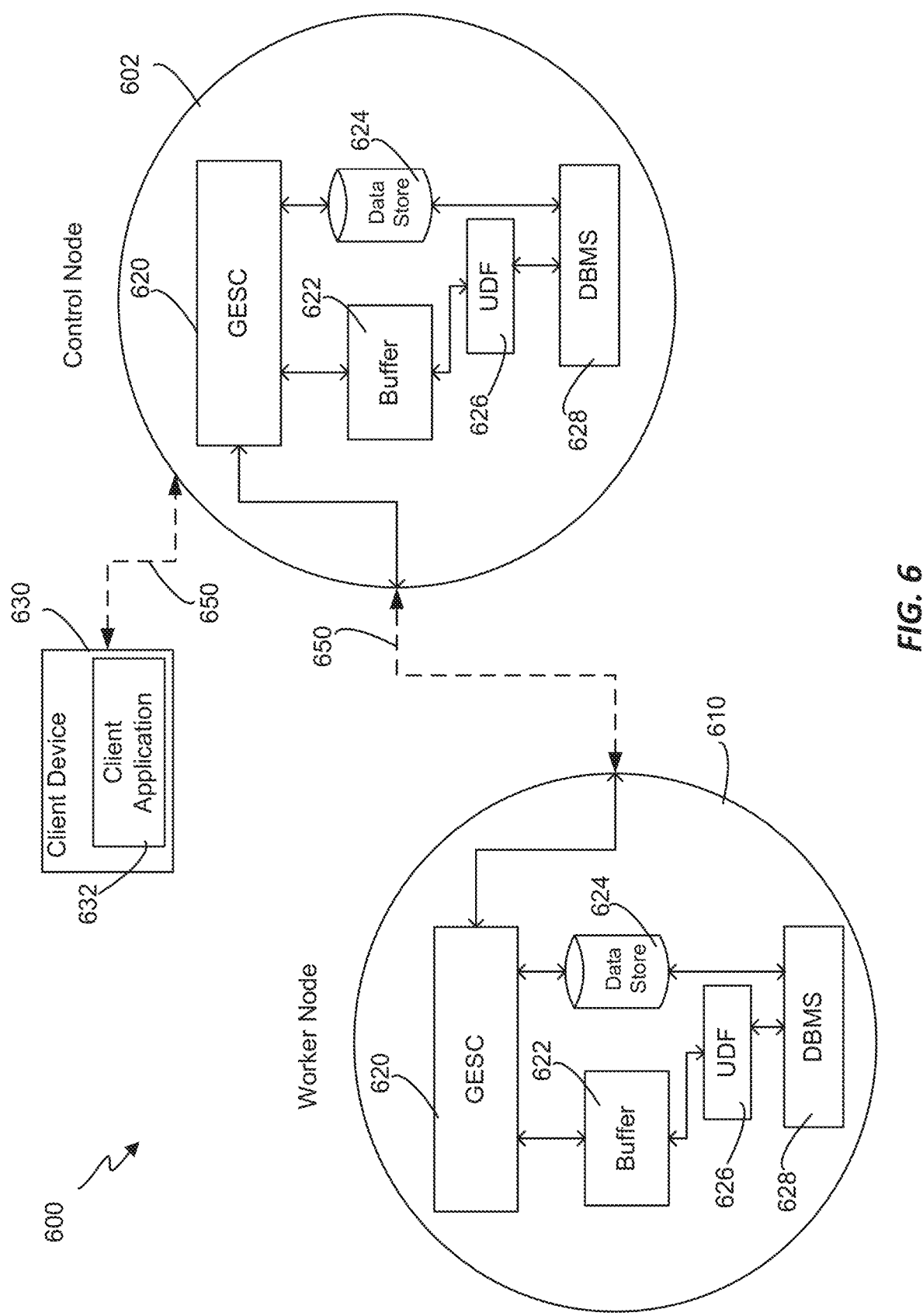
FIG. 6 illustrates a portion of a communications grid computing system including a control node and a worker node, according to at least one embodiment of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
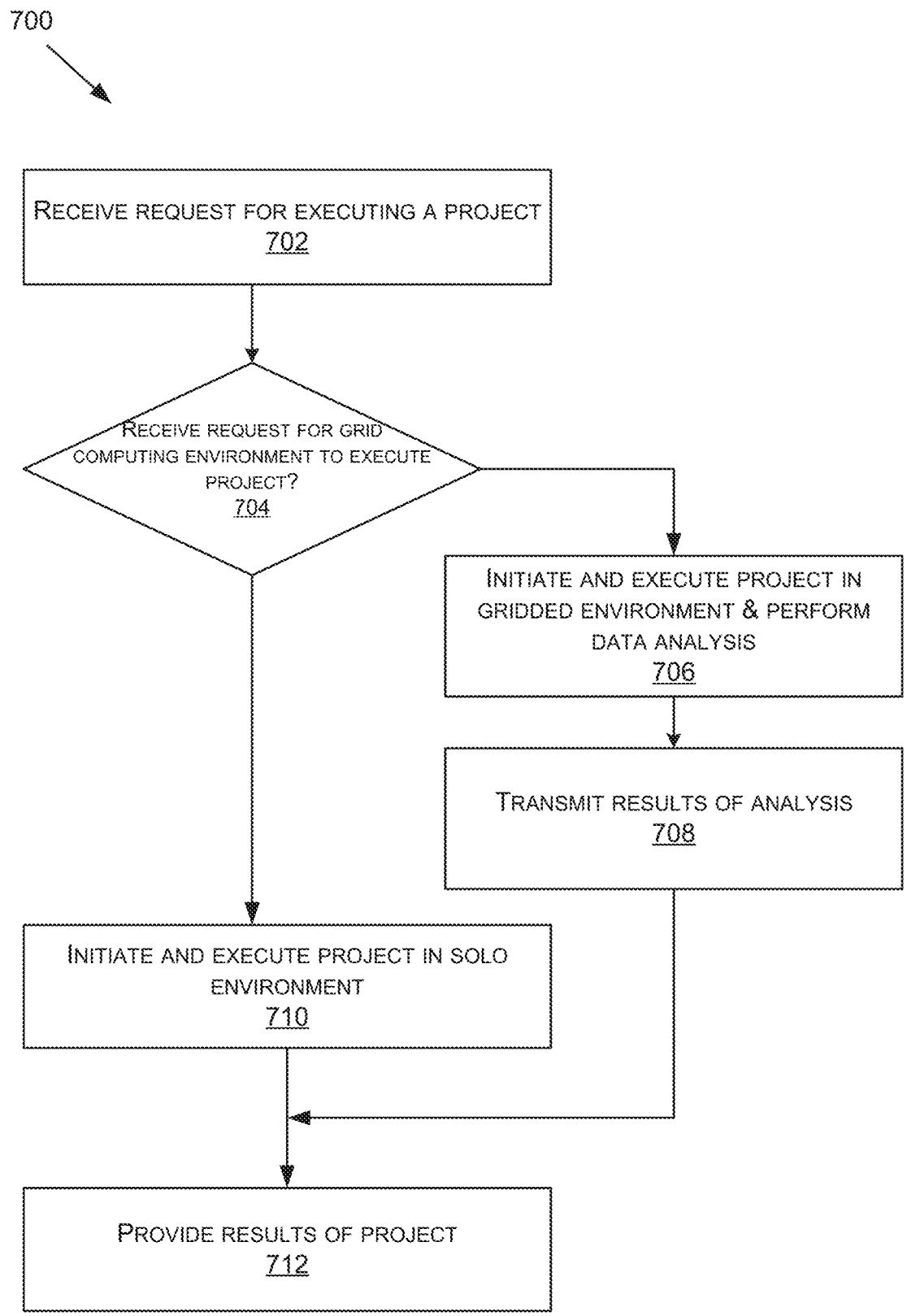
FIG. 7 illustrates a flow chart showing an example process for executing a data analysis or processing project, according to at least one embodiment of the present technology.

FIG. 7 illustrates a flow chart showing an example method for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project After the project has been completed, the control node may transmit results of the analysis yielded by the grid, as described in operation 708. Whether the project is executed in a solo or grid-based environment, the control node provides the results of the project in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024a-c, according to embodiments of the present technology. ESP system 1000 may include ESP device or subsystem 1001, event publishing device 1022, an event subscribing device A 1024a, an event subscribing device B 1024b, and an event subscribing device C 1024c. Input event streams are output to ESP device 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024a, event subscribing device B 1024b, and event subscribing device C 1024c. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024a, event subscribing device B 1024b, and event subscribing device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024a, event subscribing device B 1024b, and event subscribing device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024a using the publish/subscribe API. Subscribing client B 1006 may be started by an event subscription application B executing at event subscribing device B 1024b using the publish/subscribe API. Subscribing client C 1008 may be started by an event subscription application C executing at event subscribing device C 1024c using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 806, and subscribing client C 808 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024a-c. For example, subscribing client A 1004, subscribing client B 1006, and subscribing client C 1008 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
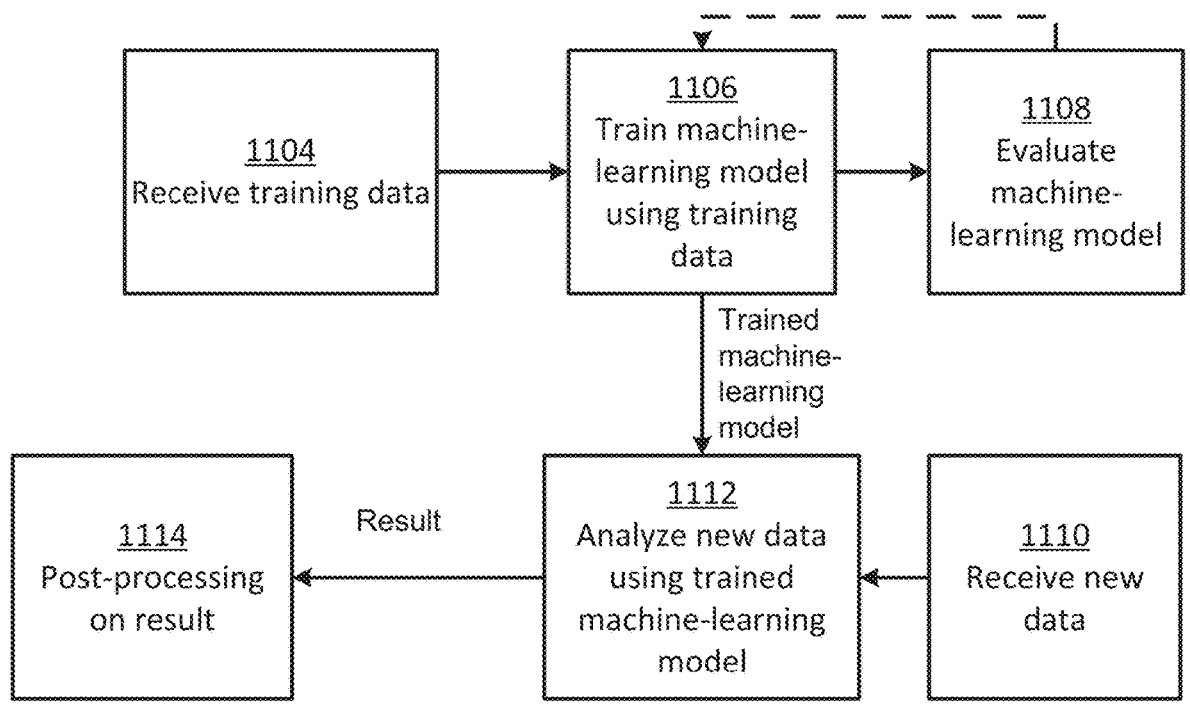
FIG. 11 illustrates a flow chart of an example of a process for generating and using a machine-learning model according to at least one embodiment of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a K-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
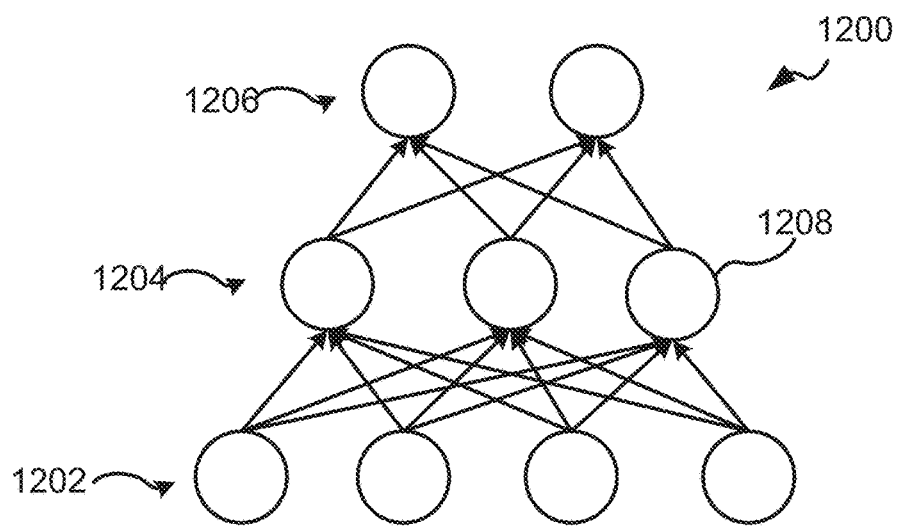
FIG. 12 illustrates an example of a machine-learning model as a neural network.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the following equation:

$$y=\max(x,0)$$

where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. Furthermore, these processors may also be employed in heterogeneous computing architectures with a number of and a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
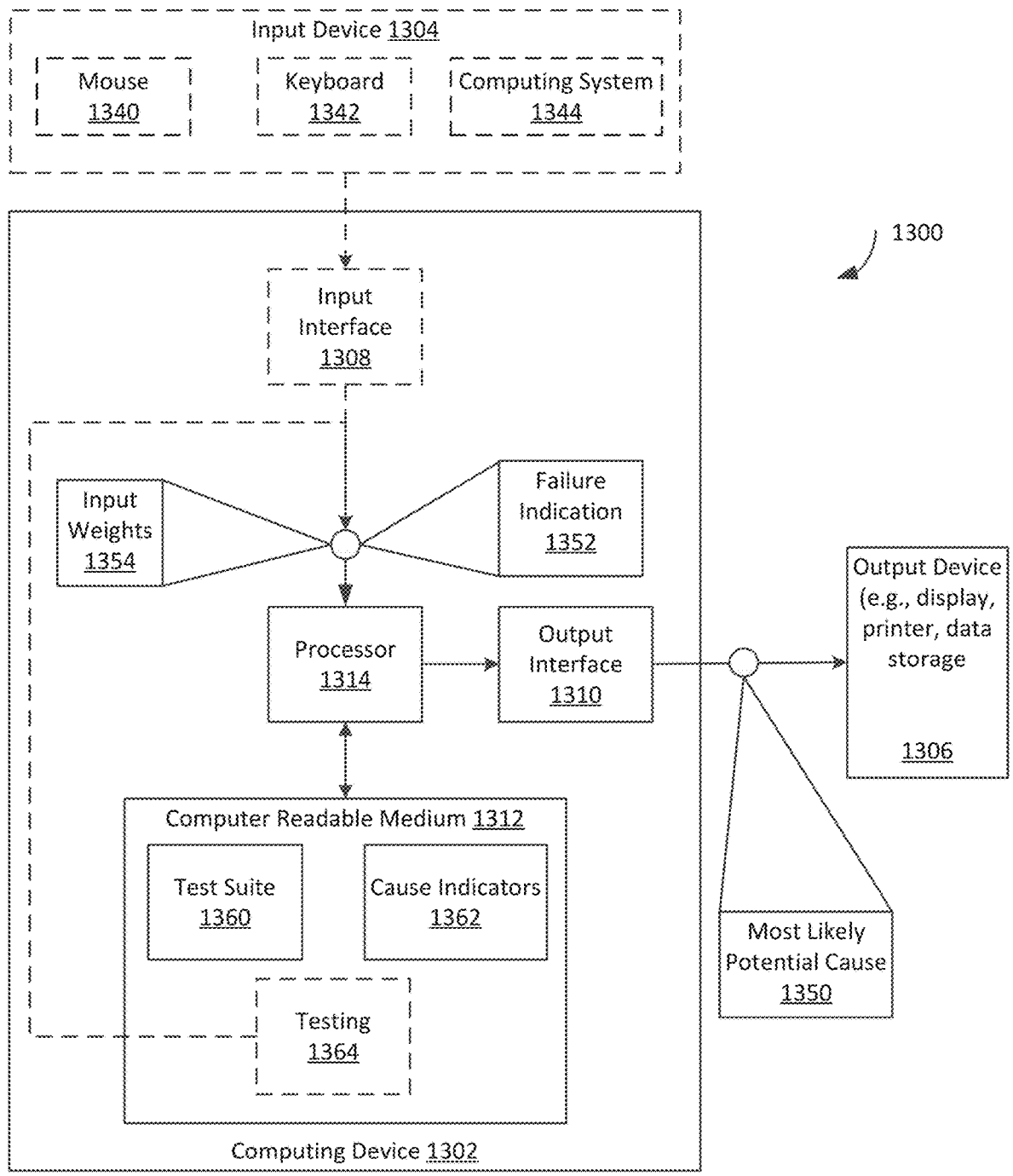
FIG. 13 illustrates an example block diagram of a system for outputting a most likely potential cause for a potential failure in at least one embodiment of the present technology.

FIG. 13 shows a block diagram of a system 1300 in at least one embodiment of the present technology. The system 1300 includes a computing device 1302 and an output device 1306. In one or more embodiments, the system 1300 includes other devices (e.g., input device 1304). The system is configured to exchange information between devices in the system (e.g., via wired and/or wireless transmission). For example, a network (not shown) can connect one or more devices of system 1300 to one or more other devices of system 1300. In one or more embodiments, the system 1300 is useful for outputting to output device 1306 a most likely potential cause 1350 for a potential failure of a complex system (not shown).

The computing device 1302 has a computer-readable medium 1312 and a processor 1314. Computer-readable medium 1312 is an electronic holding place or storage for information so the information can be accessed by processor 1314. Computer-readable medium 1312 can include, but is not limited to, any type of random access memory (RAM), any type of read only memory (ROM), any type of flash memory, etc. such as magnetic storage devices (e.g., hard disk, floppy disk, magnetic strips), optical disks (e.g., compact disc (CD), digital versatile disc (DVD)), smart cards, flash memory devices, etc.

Processor 1314 executes instructions (e.g., stored at the computer readable medium 1312). The instructions can be carried out by a special purpose computer, logic circuits, or hardware circuits. In one or more embodiments, processor 1314 is implemented in hardware and/or firmware. Processor 1314 executes an instruction, meaning it performs or controls the operations called for by that instruction. The term "execution" is the process of running an application or the carrying out of the operation called for by an instruction. The instructions can be written using one or more programming language, scripting language, assembly language, etc. Processor 1314 in one or more embodiments can retrieve a set of instructions from a permanent memory device and copy the instructions in an executable form to a temporary memory device that is generally some form of RAM, for example.

In one or more embodiments computer-readable medium 1312 stores instructions for execution by processor 1314. For example, computer-readable medium 1312 comprises instructions for a test suite application 1360 and cause indicators application 1362.

In one or more embodiments, the test suite application 1360 determines or generates a test suite that provides test cases for testing a complex system. This is useful, for instance, to identify a most likely potential cause 1350 for a potential failure of the system. Complex systems can include software, hardware, mechanical, chemical, biological components, combinations thereof, or computer-simulated models thereof. For example, a complex system could include an airplane as discussed in the background. As another example the test cases could be used to test a mobile phone with different hardware components (e.g., camera types) and different software configurations (e.g., display options and ringtone configurations). Test cases are used to test the mobile phone or a computer-simulation of the mobile phone to determine whether a particular display configuration with a particular camera could cause the mobile phone to fail (e.g., in taking a picture). In another example, the complex system could be a microwave oven and test cases are used to test whether the microwave oven fails (e.g., a control module of the microwave oven fails) when the power is set to one configuration (e.g. "High" or "Low") and the microwave oven receives a certain time input (e.g. 20 minutes or 30 minutes). In yet another example, the complex system could be a sprinkler fire system with different biological agents or chemical agents for corrosion prevention in the system with different piping and mechanical and/or electrical valve options for transporting the water in the sprinkler system. Test cases are used to test whether a particular chemical agent in combination with a particular piping could cause a particular valve to malfunction and the sprinkler system to fail (e.g., fail to initiate in the presence of a fire).

In one or more embodiments, the cause indictors application 1362 determines or generates cause indicators that represent a likelihood that a test condition or combination of test conditions of a test case of the test suite caused a failed test case. For example, in the case of a complex system that is a mobile phone as described above, if the mobile phone fails when taking a picture, a combination of the display option and camera type used when the mobile phone failed could have caused the mobile phone to fail. Alternatively, a combination of the display option and a ringtone configuration used when the mobile phone failed could have caused the mobile phone to fail, or a combination of a camera type and ringtone configuration. Cause indicators would represent the likelihood that it was the display option and camera type versus other possible combinations that caused the failed test case. For example, the cause indicator could be a probability or percentage.

In one or more embodiments, the computer readable medium 1312 also includes a testing application 1364 for testing a complex system according to the test suite and generating an indication of a failed test case. Testing could include testing the actual complex system or a computer-simulated environment modeling the complex system. The complex system is also referred to as a tested system or simply system. For simplicity, these terms to describe the complex system are used interchangeably herein. However, one of ordinary skill in the art will appreciate that a test system in one or more embodiments could be a model (e.g., a computer-simulated model) of the complex system.

In one or more embodiments, one or more applications stored on computer-readable medium 1312 are implemented in software (e.g., computer-readable and/or computer-executable instructions) stored in computer-readable medium 1312 and accessible by processor 1314 for execution of the instructions. The applications can be written using one or more programming languages, assembly languages, scripting languages, etc. The one or more application can be integrated with other analytic tools. As an example, test suite application 1360 and cause indicators 1362 are integrated data analytics software application and/or software architecture such as that offered by SAS Institute Inc. of Cary, N.C., USA. Merely for illustration, the applications are implemented using or integrated with one or more SAS software tools such as JMP®, Base SAS, SAS® Enterprise Miner™, SAS/STAT®, SAS® High Performance Analytics Server, SAS® Visual Data Mining and Machine Learning, SAS® LASR™ SAS® In-Database Products, SAS® Scalable Performance Data Engine, SAS® Cloud Analytic Services, SAS/ORO, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, and SAS/IML® all of which are developed and provided by SAS Institute Inc. of Cary, N.C., USA.

One or more applications stored on computer-readable medium 1312 can be implemented as a Web application. For example, an application can be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

In one or more embodiments, fewer, different, and additional components can be incorporated into computing device 1302. For instance, in one or more embodiments, computing device 1302 further includes an input interface 1308. Processor 1314 operably couples with components of computing device 1302 (e.g., input interface 1308, with output interface 1310 and with computer readable medium 1312) to receive, to send, and to process information.

In one or more embodiments, the computing device 1302 receives information from input device 1304 via input interface 1308. In one or more embodiments, the input device 1304 is one or more devices for user entry (e.g. input weights 1354 and failure indication 1352) into the system 1300. For instance the input device 1304 could include one or more of a mouse 1340 or a keyboard 1342. Alternatively or additionally the input device 1304 includes a display, a track ball, a keypad, one or more buttons, a sensor, a phone, etc. For instance, one or more test engineers tests a physical complex system according to the test suite and inputs failure indication 1352 of a failed test case to the computing device 1302 (e.g., using mouse 1340 or keyboard 1342). In one or more embodiments, failure indication 1352 is multiple failure indications. In the same or different example, one or more test engineers inputs weights for the complex system (e.g., weights representing how likely it is that a given option for a given categorical factor will cause a failure of the complex system).

Alternatively, or additionally, input interface 1308 further provides an interface for receiving information from another device or machine such as a computing system 1344. For instance, in one or more embodiments, another computing system 1344 tests the complex system or a computer simulation of the complex system and generates one or more failure indications of a failed test case and sends failure indication 1352 to computing device 1302.

The computing device 1302 outputs information to output device 1306 via output interface 1310. Output interface 1310 provides an interface for outputting information (e.g., information representing a most likely potential cause 1350) for review by a user and/or for use by another application or device or multiple applications or devices (e.g., a display, printer, data storage).

In an alternative embodiment, the same interface supports both input interface 1308 and output interface 1310. For example, a touch screen provides a mechanism for user input and for presentation of output to the user. Alternatively, the input interface 1308 has more than one input interface that uses the same or different interface technology. Alternatively or additionally, the output interface 1310 has more than one output interface that uses the same or different interface technology.

In one or more embodiments, the computing device 1302 generates one or more input weights 1354 or one or more failure indications 1352. For instance, the testing of the complex system via the testing application 1364 can result in a failure indication 1352 or can be used to generate one or more input weights 1354. Alternatively or additionally, the computing device 1302 can generate default weights of the input weights 1354 (e.g., if an input weight is not received for a particular option via input interface 1308).

In one or more embodiments, the system 1300 implements a method as described herein (e.g., a method shown in FIG. 14) for outputting a most likely potential cause 1350 for a potential failure of the complex system.

Figure 14:
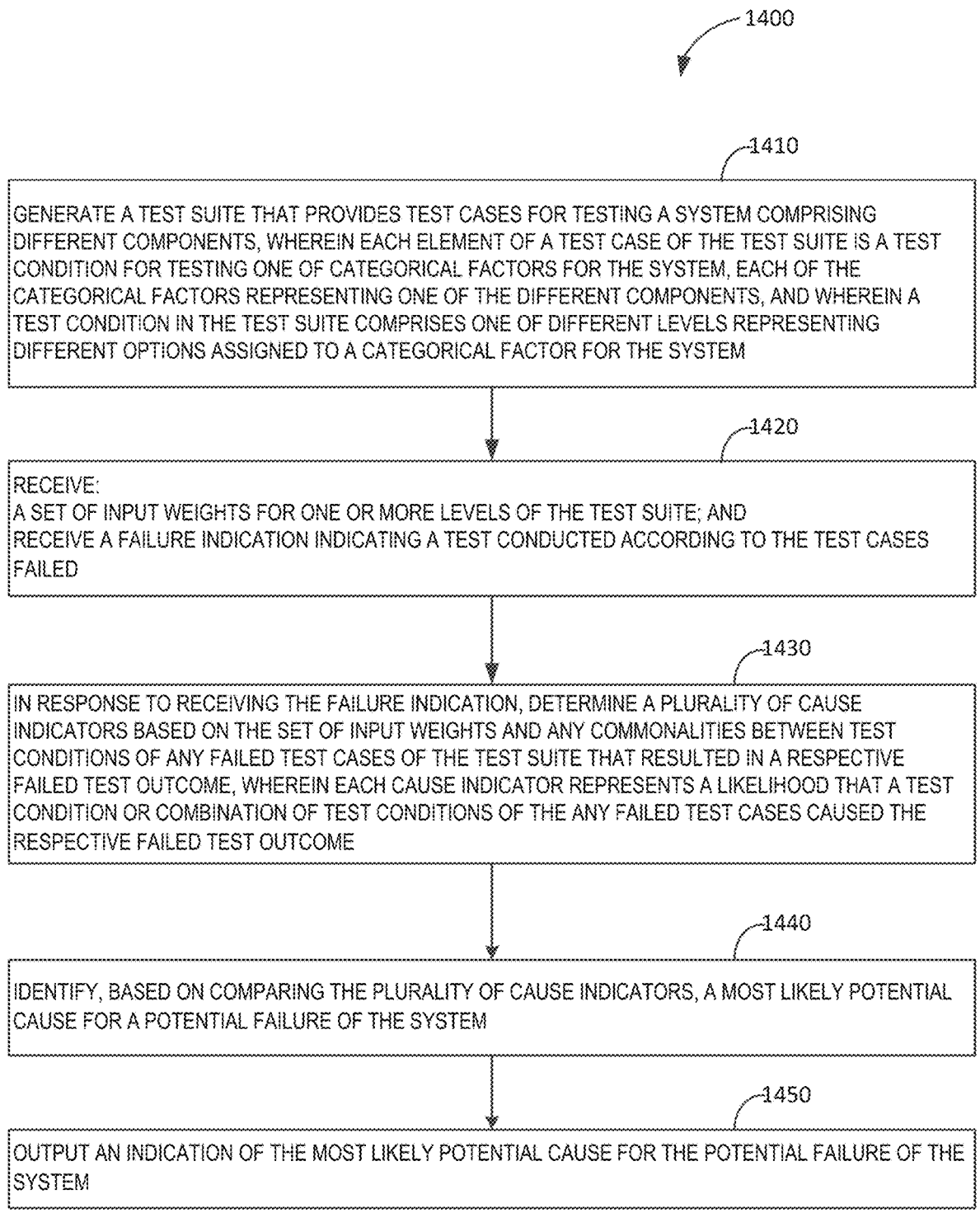
FIG. 14 illustrates an example flow diagram for outputting a most likely potential cause for a potential failure in at least one embodiment of the present technology.

FIG. 14 illustrates a flow diagram for a computer-implemented method 1400 that can be used to output an indication of the most likely potential cause for a potential failure of the system.

The method 1400 illustrates an operation 1410, in which a test suite is generated. In one or more embodiments, the test suite provides test cases for testing a system that has different components. The different components can be represented or referred to as categorical factors for the system. In one or more embodiments herein categorical factors are referred to as factors or inputs interchangeably. Different options for a component can be represented by different levels assigned to the categorical factor. In one or more embodiments, each element of a test case of the test suite is a test condition for testing one of categorical factors for the system. Each of the categorical factors represents one of the different components. A test condition in the test suite comprises one of different levels representing different options assigned to a categorical factor for the system. Typically, a categorical factor has different levels that represent discrete values or options for a component of the complex system in contrast to a continuous variable that describes a range of possible values or options. However, in one or more embodiments, levels of a categorical factor for the system are equivalence classes derived from continuous variables. Discrete values from a particular partitioned range of the possible values for the continuous variable are considered "equivalent" testing for other values in the range. For example, if the system is a software system, equivalence partitioning can be applied to input or output data of the software system to derive categorical factors for the software system.

The method 1400 illustrates an operation 1420 for receiving information. A set of input weights for one or more levels of the test suite is received. For example, a user in one or more embodiments provides the set of input weights. A failure indication is received. The failure indication indicates a test conducted according to the test cases failed.

The method 1400 illustrates an operation 1430 for determining cause indicators. In one or more embodiments, the cause indicators are determined in response to receiving the failure indication. The determined cause indicators are based on the set of input weights and any commonalities between test conditions of any failed test cases of the test suite that resulted in a respective failed test outcome. For example, in one or more embodiments, a same test condition is involved in multiple failed test cases. Each cause indicator represents a likelihood that a test condition or combination of test conditions of the any failed test cases caused the respective failed test outcome. In the same or different embodiments, cause indicators in a test case that received a failure indication are eliminated if they did not cause a failure in a different test case.

The method 1400 illustrates an operation 1440 for identifying, based on comparing the cause indicators, a most likely potential cause for a potential failure of the system. The method 1400 illustrates an operation 1450 in which an indication of the most likely potential cause for a potential failure of the system is output. In one or more embodiments, the indication is part of an ordered ranking of potential causes for a potential failure of the system. In one or more embodiments, one or more of the potential causes precipitated an actual failure of the tested system or a model of the test system. In one or more embodiments, this indication is used for further testing, which may cause the potential failure, and/or for refraining from design a complex system, which may cause the potential failure.

Figure 15:
FIG. 15 illustrates an example test suite in some embodiments of the present technology.

FIG. 15 shows an example test suite 1500 according to embodiments herein. In one or more embodiments shown in FIG. 15, a test suite is a covering array. Covering arrays are useful tools to determine test cases for testing complex engineered systems.

One reason covering arrays are attractive for this purpose is that they are an efficient way to construct test cases that are effective at precipitating failures that are due to the combination of several inputs. Testing complex systems is a difficult undertaking, where test engineers are tasked with constructing a set of test cases that can efficiently identify faults in the system. The engineers are usually expected to work within tight time, computational and resource constraints. Covering arrays ensure that all possible combinations among t categorical factors or inputs appear in a test suite, where t is known as the strength of the covering array.

FIG. 15 shows a test suite 1500 that is a covering array of strength two where each input or categorical factor (factors a-f) has two levels (Level A and Level B). This means that each of the factors or components of a complex system can be one of two options.

Alternatively or additionally, a test suite is another type of array. For example, the array in one or more embodiments is an orthogonal array in which each possible combination occurs the same amount of times (e.g., only once). In one or more embodiments, the array is a randomly generated array with random combinations. In one or more embodiments, the array is generated based on previous failed test cases. In one or more embodiments, a test suite can be referred to as an array D with n rows and l columns. Let column i have $s_i$ levels for i=1, . . . , l. D is said to be a covering array of strength t if any subset of t columns has the property that all $\Pi s_i$ level combinations occur at least once.

Covering arrays have been shown to be effective as a means of identifying suites of test cases for testing complex engineered systems. A software system is an example of such a complex engineered system. In one or more embodiments, each row of the array represents one of the test cases and each column of the array represents one of the categorical factors. For instance, as shown in FIG. 15 the inputs of the system are mapped to the columns of test suite 1500 and the levels of the columns are mapped to the allowed values of the corresponding inputs. The rows of the test suite 1500 are the test cases of test suite 1500. Alternatively, each column of a test suite represents one of the test cases and each row of the test suite represents one of the categorical factors.

Given a test suite derived from a covering array, if all the test cases result in a pass (e.g., produce a success indication and/or the expected result), then the test engineer can ascertain that there are no faults due to combinations of inputs involving t or fewer inputs. However, if there are failures, the test engineer is faced with the task of identifying the particular inputs and their level combinations that precipitated the failures. For instance, there is empirical evidence that nearly all faults are due to some combination of values for five or fewer inputs.[1] For many systems, devising a test suite for the system is only the beginning. If a failure is discovered, the test engineer typically wants to know which combination of inputs and associated levels induced the failure. This is known as the fault location problem. This problem can also be referred to as a failure localization problem. The number of combinations makes it difficult or even infeasible to determine a list of potential causes without using a computing approach.

[1] D. R. Kuhn, D. R. Wallace, and A. M. Gallo, "Software fault interactions and implications for software testing," IEEE Transactions on Software Engineering, vol. 30, no. 6, pp. 418-42l, June 2004.

There are two categories of computing approaches to the fault location problem: exact approaches and stochastic (or probabilistic) approaches. In the simplest form in an exact approach, for combinations involving f inputs, the exact computing method starts with all input combinations involved in test cases that induce a failure, and removes input combinations that appear in the test suite for test cases in which a failure did not occur. The value of f investigated is the smallest value for which the set of potential causes is non-empty. A stochastic computing approach instead uses modeling techniques and statistics to investigate and determine a set of potential causes.

One or more embodiments described herein are an improvement on these traditional computing approaches to the fault location problem. Further this improved computing approach allows modification of the computing based on a test engineer's knowledge of the system. For example, a test engineer typically has prior knowledge of the system, through particular inputs, or combinations of inputs, that may have been problematic in the past when testing a system, or with recent changes to the complex system that may not have been rigorously tested. One or more embodiments provides a method for specifying prior knowledge of inputs and levels in a computing approach to the analysis of a test suite when failures are discovered. This analysis provides a ranking of potential causes for investigating potential causes.

FIGS. 16A-16D are applicable to an example test scenario with 6 inputs (factors a-f), each having two levels (Level A and Level B). FIG. 16A shows an example of representing or quantifying prior knowledge as a set of input weights 1600 for particular inputs and levels (factor a, level B; factor d, level B; and factor e, level A). In one or more embodiments, the weights are all greater than or equal to a predefined threshold and/or a baseline weight. In this example shown in FIG. 16A, define $w_i(j) \geq 0$ as the weight of level j for input i, for $j=1, \ldots, s_i$. While any positive weight in this example can be assigned, for simplicity a baseline weight for any non-provided weight $w_i[j]$ is set to be 1. If level j of input i is assumed more likely to be involved in a failure based on prior knowledge, $w_i[j]$ should be assigned a value greater than 1 as shown in FIG. 16A. A weight of less than 1 is used for levels that are known to be less problematic. A value of 0 can be assigned to a $w_i[j]$, if it is known with absolute certainty that a failure cannot occur due to any interactions that include level j for input i. The weight $w_i[j]$ can be thought of as how much more (or less) likely level j for input i may lead to a failure compared to a baseline input having weight 1.

Based on previous testing, level A of factor e is known to be problematic, as is level B of input a and level B of factor d, but to a lesser extent. The test engineer assigns the highest weight of 3 to level A of factor e, and higher weights of 2 to level B of input a and level B of factor d. The remaining weights are set at the baseline value of 1. FIG. 16C shows an example of weights 1640 assigned to all of the factors and levels for the tested system by assigning a default or baseline weight of 1 to each of the remaining factors.

FIG. 16B presents the results 1620 of testing a test suite 1500 that is a strength 2 covering array, where each input has 2 levels. The outcome of each test case is presented in the results column 1622. Only one test case, test case 3 resulted in a failure indication or "Fail" in results column 1622. The other test cases resulted in a success indication or "Pass" in results column 1622. Since each factor and level of test case 3 is represented in a passed test, the failure is due to a combination of factors. The failure due to test case 3 has six potential causes of a failure for the test system involving combination of two factors. In other examples, a single factor and level is common to several failed test cases, and would be a potential cause. In this case, if it is a strength 2 covering array, the single factor and level would be the only potential cause.

FIG. 16D presents a table 1660 of the potential causes of a potential failure for the test system involving combination of two factors. Input column 1662 presents a first factor (Factor 1) of a given level (Level 1) of the combination and Input column 1664 presents a second factor (Factor 2) of a given level (Level 2) of the combination. The weights 1640 do not themselves provide sufficient information for determining what combination of factors is the most likely potential cause. A cause indicator is computed for each of the combinations, with a cause indicator value assigned for each in Cause Indicator column 1666.

In this example shown in FIG. 16D, the value assigned to each cause indicator is a multiplication of the individual weights for the levels of each of the factors that make up the combinations. For instance, a value for the combination of input $i_1$ at level $j_1$ and input $i_2(i_1 \neq i_2)$ at level $j_2$ is represented as $w_{i_1 i_2}(j_1, j_2)$. The weight of $w_{i_1 i_2}(j_1, j_2)$ is computed as $$w_{i_1 i_2}(j_1, j_2) = w_{i_1}(j_1) w_{i_2}(j_2), \quad (1)$$

where $j_1 \in 1, \ldots, s_{i_1}$, and $j_2 \in 1, \ldots, s_{i_2}$.

Equation (1) does not preclude the test engineer from changing the value of $w_{i_1 i_2}(j_1, j_2)$. In one or more embodiments, the test engineer inputs a value for a combination with the set of input weights or knowledge about particular combinations can be reflected by using a different value for $w_{i_1 i_2}(j_1, j_2)$. Assuming baseline weights of 1, values of $w_{i_1 i_2}(j_1, j_2)$ greater than 1 indicate combinations more likely to induce a failure, while a value less than 1 indicates combinations less likely to induce a failure for determining an ordered ranking and/or a most likely potential cause for a failure of the system.

Cause indicators in Cause Indicator column 1666 can be compared (e.g., to provide an ordered ranking). Alternatively or additionally a normalized weight is computed as shown in Normalized Weight column 1668 for a cause indicator in order to provide an ordered ranking. As shown in FIG. 16D, the normalized weights in the Normalized Weight column 1668 are generated by normalizing any weights assigned to one or more levels or weights assigned to a combination of one or more levels such that each normalized weight is greater than zero and a sum of the normalized weights is one and assign one of the normalized weights to each of the plurality of cause indicators. For example, in FIG. 16D the sum total of all of the cause indicator values in the Cause Indicator column 1666 is 14, so a normalized weight in the Normalized Weight column 1668 is the value in the Cause Indicator column 1666 divided by the sum total (i.e. 14) of all of the cause indicator values.

Based on this analysis, instead of treating all combinations equally likely to have caused the failure, the most likely candidate based on either the Cause Indicator column 1666 or Normalized Weight column 1668 is combination 1670 followed by combination 1672, followed by combination 1674. The remaining potential causes are equally likely. This allows the test engineer to focus on combination 1670 and combination 1672 (e.g., by further testing of combination 1670 and combination 1672) before needing to consider any other combinations (e.g., further testing of combination 1674).

The example shown in FIGS. 16A-16D resulted in a single failed test and assumed that a combination of 2 inputs (i.e. Factor 1 (Level 1) and Factor 2 (Level 2)) is the source of the failed test and thus a potential cause for a potential failure for the system. In other embodiments, the set of potential causes includes a different number of inputs and/or the number of failed tests. In one or more embodiments, to determine the set of potential causes $\psi_k(m)$ involving k inputs given a failure in test case m, determine if all combinations of size k in test case m appear elsewhere in the test suite in a test case that passed. If a combination did pass elsewhere, it is not a potential cause, otherwise it belongs in $\psi_k(m)$ as a potential cause. If all combinations involving k inputs have passed in the test suite, then consider combinations involving k+1 inputs, and so on, until the set of potential causes is not empty. If there is more than one failure, it is also important to determine if an element in $\psi_k(m)$ occurs in $\psi_k(m')$ where m≠m'.

In the simplest case, assume that test case m results in a failure and all potential causes in $\psi_k(m)$ only occur in test case m. Denoting $C_{i_1 i_2}(j_1, j_2)$ as the combination of level $j_1$ for input $i_1$ and level $j_2$ for input $i_2$ with associated weight $w_{i_1 i_2}(j_1, j_2)$, then for $C_{i_1 i_2}(j_1, j_2) \in \psi_k(m)$, the probability that $C_{i_1 i_2}(j_1, j_2)$ is the cause, $P[C_{i_1 i_2}(j_1, j_2) | \psi_k(m)]$, can be calculated as $$P[C_{i_1 i_2}(j_1, j_2) | \psi_k(m)] = \frac{w_{i_1 i_2}(j_1, j_2)}{\sum_{C_{a_1 a_2}(b_1, b_{j_2}) \in \psi_k(m)} w_{a_1 a_2}(b_1, b_{j_2})}, \quad (2)$$

where $P[C_{i_1 i_2}(j_1, j_2) | \psi_k(m)] = 0$ if $C_{i_1 i_2}(j_1, j_2) \notin \psi_k(m)$.

Simply put, if there is a single failure, the likelihood of a particular combination being the cause is the weight for that combination divided by the sum of the weights for all combinations in $\psi_k(m)$. There are two underlying assumptions in using Equation (2): i) that the failure is not caused by a combination of greater than k inputs, and ii) if it is due to a combination of k inputs, there is only one cause for the failure in test case m.

The example presented in FIGS. 16A-16D is a simple example, and yet there are still six potential causes for the single failure. As the number of inputs grows and test suites become larger, the resulting increase in the number of potential causes is an issue that test engineers must deal with. A ranking provided by embodiments herein makes such situations manageable.

FIGS. 17A-17G present an example case in which there are two failed test cases for the test suite 1500 in FIG. 15, which shows a covering array of strength two with 6 inputs (factors a-f) each having two levels. FIG. 17A shows input weights 1700 entered, in this example embodiment, for every one of the potential inputs.

FIG. 17B presents the results 1710 of testing a test suite 1500. The outcome of each test case is presented in the results column 1712. In this example, two test cases, test cases 4 and 5 resulted in a failure indication or "Fail" in results column 1712. The other test cases resulted in a success indication or "Pass" in results column 1712.

Analyzing the failures, for each test case there is a different list of potential causes as shown in FIGS. 17C and 17D. FIG. 17C shows a table 1720 of the potential causes 1722 for test case 4 along with computed or combined weights 1724. The combined weights 1724 are calculated using the input weights of FIG. 17A in Equation (1). FIG. 17D shows a table 1730 of the potential causes 1732 for test case 5 along with their combined weights 1734 as calculated using the input weights of FIG. 17A in Equation (1). While the combined weights are based on the input weights 1700 Tables 1720 and table 1730 do not account for commonalities between test cases.

When the results of a test suite have more than one test case with a failure, and a potential cause occurs in multiple test cases, additional care is taken in determining the relative likelihood a test condition will cause a failure (e.g., considering any commonalities between test conditions of failed test cases). Intuitively, if there are multiple failures and there are potential causes that are common to the multiple test cases, it is more likely that the failures are due to the common cause than distinct causes from the sets of potential causes for each failure. To account for this in one or more embodiments, a joint probability mass function, treating the test cases in which failures occur as random variables, is used to determine a value assigned to a cause indicator.

FIGS. 17E-17G show cause indicators determined based on the combined weight and commonalities between test conditions of failed test cases 4 and 5. Table 1740 in FIG. 17E shows cause indicators 1742 for test case 4 taking into account test case 5. Table 1750 in FIG. 17F shows cause indicators 1752 for test case 4 taking into account test case 5. For example, combination 1770 is common to both table 1740 in FIG. 17E and table 1750 in FIG. 17F. The cause indicators in tables 1740 and 1750 are computed to form a basis for comparison between all the cause indicators for the test cases. As shown, the computations for both tables result in a same cause indicator value for the combination 1770. FIG. 17G shows a single ordered ranking of all the potential causes and cause indicators from tables 1740 and tables 1750. FIG. 17G can also be considered a union of the set of potential causes in table 1740 and table 1750.

In general, a set of potential causes involving k inputs given a failure in test case m is denoted by $\psi_k(m)$. In the case of two failures as shown in FIGS. 17A-17G, where at least one potential cause is common to both test cases (e.g., combination 1770) with failures, define $\psi_k$ for all the test cases as the set $\{\psi_k(m_1) \cup \psi_k(m_2)\}$ where test cases $m_1$ and $m_2$ result in failures (e.g., test cases 4 and 5 of FIG. 17B), and at least one potential cause exists in both $\psi_k(m_1)$ and $\psi_k(m_2)$ (e.g., combination 1770).

If failures have been observed for two test cases $m_1$ and $m_2$, and failures are due to two-input combinations, there are two different possibilities to consider to determine the cause indicators (e.g., via a joint probability mass function):
  1) A single potential cause that exists in both $\psi_2(m_1)$ and $\psi_2(m_2)$ caused the failure for both test cases.
  2) A potential cause in $\psi_2(m_1)$ that is not in $\psi_2(m_2)$ caused the failure for test case $m_1$, and a potential cause in $\psi_2(m_2)$ that is not in $\psi_2(m_1)$ caused the failure for test case $m_2$.

In FIGS. 17E-17G, the combination 1770 appears in both test cases with a failure. As shown in FIGS. 17C and 17D, the combined weight calculated for this combination 1770 is small (a combined weight of 1) relative to the other potential causes. However, because it is a potential cause in both test cases, it becomes a question of whether or not it is more likely than two independent causes from different test cases. That is, what is the probability a given single cause or pair of independent causes result in failures, conditional on observing failures in test cases.

In one or more embodiments, the cause indicators for individual test cases are computed to form a basis for comparison for outputting a most likely potential cause for a potential failure of the system. To find the most likely potential causes for further investigation, the computed probabilities account for the input weights 1700 and commonalities between test conditions of failed test cases (i.e. combination 1770).

To provide a method for comparison, a probability is defined that one would expect to see a failure for any given combination, prior to knowing that any failure has occurred. As an example, the probability is computed as shown in Equation 3:

$$P[C_{i_1 i_2}(j_1, j_2)] = \frac{w_{i_1 i_2}(j_1, j_2)}{\sum_{a_1 < a_2} \sum_{b_1=1}^{s_{a_1}} \sum_{b_2=1}^{s_{a_2}} w_{a_1 a_2}(b_1, b_2)} \quad (3)$$

for $j_1 = 1, \ldots, s_{i_1}$, $j_2 = 1, \ldots s_{i_2}$, and $1 \le i_1 < i_2 \le n$.

Assuming that a two-input combination caused the failure, to find the probability of observing failures for $m_1$ and $m_2$, one considers the combination of configurations in $\psi_k$ that would lead to failures for $m_1$ and $m_2$. The probability of observing failures for $m_1$ and $m_2$, $P[\psi_k]$, can be calculated as the probability that a single combination caused the failure, P[single cause], plus the probability that there are two independent failures, P[two causes]. For each single cause, the probability that it causes a failure can be calculated from Equation (3). Then the probability that a single cause leads to the failures is simply $$P[\text{single cause}] = \sum_{C_{i_1 i_2}(j_1, j_2) \in \psi_2(m_1) \& \psi_2(m_2)} P[C_{i_1 i_2}(j_1, j_2)] \quad (4)$$

In the case of two different causes leading to failures on separate test cases, these occur independently of one another, so to calculate the probability of a particular combination of two different causes requires multiplying the two individual probabilities. Taking the summation of those different combinations, $P[\text{two causes}] = \Sigma_\theta P[C_{i_1 i_2}(j_1, j_2)] P[C_{i_3 i_4}(j_3, j_4)]$ where $\theta = \{C_{i_1 i_2}(j_1, j_2) \in \psi_2(m_1) \& \notin \psi_2(m_2), C_{i_3 i_4}(j_3, j_4) \notin \psi_2(m_1) \& \in \psi_2(m_2)\}.$ (5)

Combining (4) and (5), $P[\psi_k] = P[\text{single cause}] + P[\text{two causes}].$ (6)

For analysis, the probability that a given combination or set of combinations precipitated the failures is determined, given the set of potential causes in which there were observed failures in the particular test cases that generated the set of potential causes. For a potential cause that is common to the two test cases, the probability by Bayes' Theorem that the combination precipitated the failure is then $$P[C_{i_1 i_2}(j_1, j_2) | \psi_k] = \frac{P[C_{i_1 i_2}(j_1, j_2)]}{P[\psi_k]} \quad (7)$$

since $P[\psi_k | C_{i_1 i_2}(j_1, j_2)] = 1$. For a combination $C_{i_1 i_2}(j_1, j_2) \in \psi_2(m_1)$ and $\notin \psi_2(m_2)$ and $C_{i_3 i_4}(j_3, j_4) \notin \psi_2(m_1)$ and $\in \psi_2(m_2)$, the probability the two independent causes precipitated the two failures on different test cases is $$P[C_{i_1 i_2}(j_1, j_2) \cap \psi_k C_{i_3 i_4}(j_3, j_4) | \psi_k] = \quad (8)$$
$$\frac{P[C_{i_1 i_2}(j_1, j_2)] P[C_{i_3 i_4}(j_3, j_4)]}{P[\psi_k]}$$

Through (7) and (8), there is a joint probability mass function for the two failures. If a test engineer wants to focus on the cause for a particular test case, the marginal probability can be calculated by taking the sum of the probabilities in Equation (8) involving the possible combinations from the other test case where a failure occurred.

As an example, the calculation for the cause indicators for combination 1770 and combination 1780 in FIGS. 17E and 17G are calculated. For both cause indicators, $P[\psi_k]$ is computed. Using Equation (4), the only single cause or cause in common to both failed test cases is combination 1770, i.e. the combination of c(B) and d(A).

$P[\text{single cause}] = P[c(B), d(A)] = 1/146 = 146/21316,$ while for the remaining potential causes, using Equation (5), $P[\text{two causes}] = 208/21316.$ Combining these, from Equation (6), $P[\psi_k] = P[\text{single cause}] + P[\text{two causes}] = 354/21316.$ Each of the cause indicators in FIGS. 17E-17G is computed as a conditional probability using Equation (7). For combination 1770, the cause indicator can be defined as:

$$P[c(B), d(A) | \psi_k] = \frac{P[c(B), d(A)]}{P[\psi_k]} = \frac{146/21316}{354/21316} = 146/354$$

Each of the other combinations in FIGS. 17E-G (e.g., combination 1780 and combination 1790) would be independent causes of a failure. This means that different combinations one in each of test cases 4 and 5 caused the respective test case failure. As an example, the cause indicator for combination 1780 is computed taking into account each of the other single cause combinations in FIG. 17F. Combination 1780 is a first single cause combination in FIG. 17E corresponding to factor/level combinations of a(A), c(B). Combination 1790 is a first single cause combination in FIG. 17F corresponding to factor/level combinations of a(B), d(A). Each of these combinations had a weight of 2 as opposed to 1 for combination 1770 as shown in FIGS. 17C and 17D. The probability that these two combinations caused the failures, is computed as:

$$P[a(A), c(B)] \cap P[a(B), d(A)] = \frac{2}{146} * \frac{2}{146} = \frac{4}{21316}$$

The conditional probability then that combination 1780 and combination 1790 caused a failure is then computed using Equation (8):

$$\frac{P[a(A), c(B) \cap a(B), d(A)]}{P[\psi_k]} = \frac{4/21316}{354/21316} = 4/354$$

Each of the remaining probabilities of a failure involving combination 1780 and each of the other independent causes of failure in FIG. 17F is computed similarly. To compute then the cause indicator or P[a(A),c(B)]] for combination 1780, each of these individual probabilities is summed.

$$P[a(A), c(B)]] = \frac{4}{354} + \frac{12}{354} + \frac{4}{354} + \frac{4}{354} + \frac{6}{354} + \frac{2}{354} = \frac{32}{354}$$

As demonstrated in FIGS. 17A-17G, and this example calculation when one or more cause(s) appear for multiple failures, they tend to be the most likely potential cause compared to independent causes for different failures even if an individual cause is weighted higher. That is what intuitively one would expect if failures are rare.

From a practical standpoint, it is often preferable to present potential causes from multiples test cases separately from the unique occurrences. That is, do a weighted comparison of the potential causes appearing in multiple test cases first. If it is discovered that none of the multiple-test case potential causes are a cause, then the test engineer can examine a weighted analysis on the remaining potential causes unique to each test case. If there are more than two failures, this approach is more tractable than generating the joint probability mass function for the multiple failure test cases.

Figure 18:
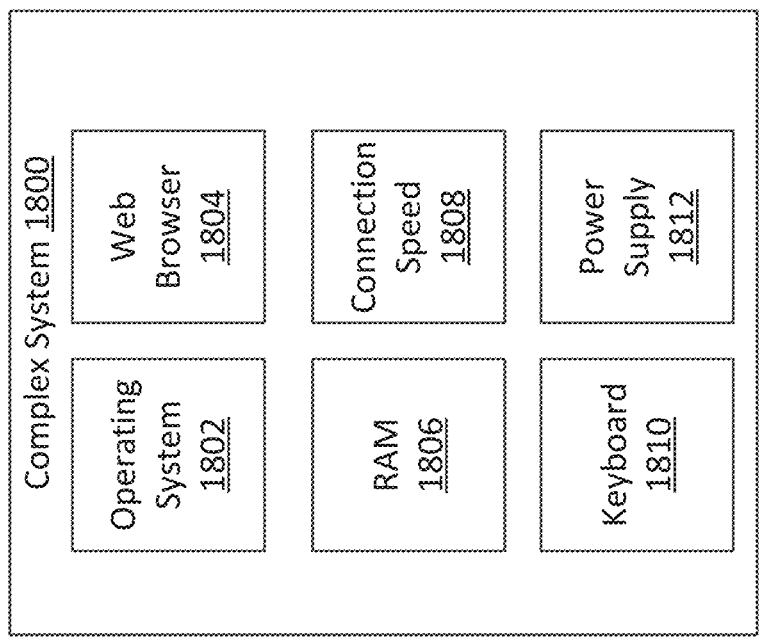
FIG. 18 illustrates an example complex system in at least one embodiment of the present technology.

FIG. 18 illustrates an example complex system 1800 in at least one embodiment of the present technology. The complex system 1800 has many different components or features. For instance, the complex system 1800 comprises software programs (e.g. an operating system 1802) and computer hardware (e.g. keyboard 1810) and other components including a web browser 1804, a RAM 1806, a connection speed 1808, and a power supply 1812. Each of these components is present in the complex system 1800, but a given component takes on different forms or properties depending on options selected by the designer of the complex system. For example, the operating system 1802 could be one of many different types including Windows® or Linux®. The web browser 1804 could be Safari®, Internet Explorer®, Firefox®, or Chrome™. The RAM 1806 could be 4, or 8 MB. The connection speed 1808 could have many different settings leading to different connection speeds including 0-1 Mbps or 1-5 Mbps. The keyboard 1810 could be wireless handheld or wired. The power supply 1812 could have different efficiencies including 80% or 90%. Any one of these features or options alone or in combination with another feature or option of another component could cause a failure in the complex system 1800 if it were designed with that particular combination.

Figure 19:
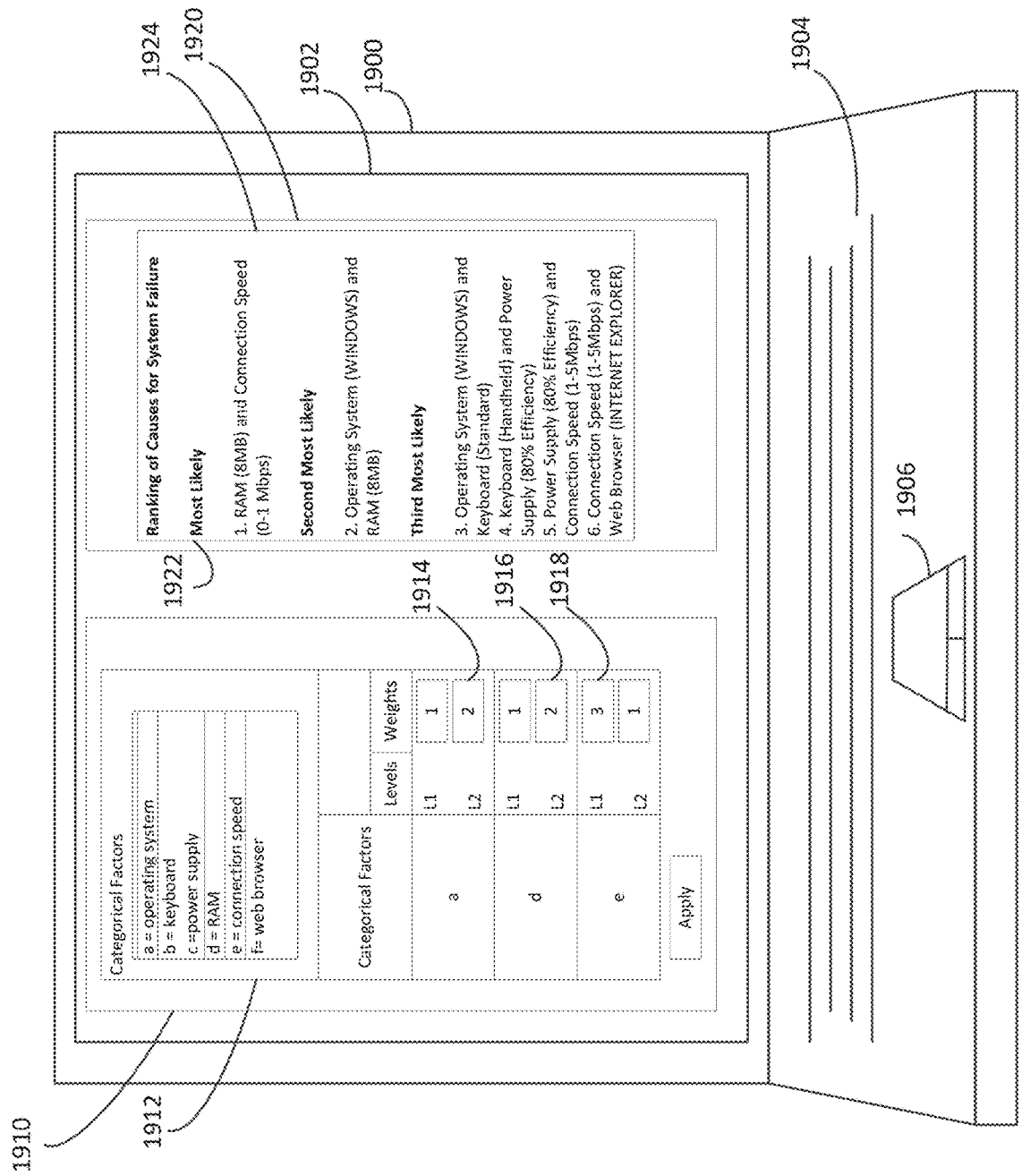
FIG. 19 illustrates an example graphical user interface displaying a most likely potential cause for a potential failure in at least one embodiment of the present technology.

FIG. 19 illustrates an example graphical user interface for displaying an indication of the most likely potential cause for the potential failure of complex system 1800. FIG. 19 shows a computing device 1900 with an integrated display device 1902. The display device 1902 displays a first graphical user interface 1910. The components of the system are represented as categorical factors 1912. In one or more embodiments, the user inputs the particular categorical factors or a number of categorical factors in a same or different interface than graphical user interface 1910. Alternatively or additionally, the user inputs particular levels or a number of levels for the categorical factors in a same or different interface than graphical user interface 1910. In one or more embodiments, the graphical user interface 1910 as shown allows for selection of particular categorical factors 1912 for entry of particular weights for one or more levels assigned to the categorical factor.

As shown in FIG. 19, the graphical user interface 1910 displays text boxes for entry of weights for particular levels of the selected ones of categorical factors 1912. The user sets particular weights in text boxes 1914, 1916, and 1918. For instance, a categorical factor a of L2 corresponds to an operating system of Linux® and has a corresponding text box 1914. A categorical factor d of L2 corresponds to an RAM of 8 MB and has a corresponding text box 1916. A categorical factor e of L1 corresponds to a connection speed of 0-1 Mbps and has a corresponding text box 1918. Default weights can be assigned to the other levels or for levels of unselected categorical factors (e.g., a default weight of 1). As an example, a test engineer based on prior knowledge of testing the complex system 1800 or another system not shown may believe that when the operating system is Linux® or when the RAM used is 8 MB, the complex system 1800 is more likely to fail and thus a weight greater than a predefined threshold (e.g., a default weight of 1) is entered into text box 1914 and text box 1918 using the keyboard 1904 and trackpad 1906. However, in this example this is the first time that a connection speed of 0-1 Mbps is studied, so the test engineer assigns the categorical factor of connection speed in text box 1918 a highest weight to place more attention on this component should failures occur involving this component.

In one or more embodiments, a component models an operation of the software program (e.g., modeling the operation of an operating system 1802). A computing device (e.g., computing device 1302) is used to test each of the test cases of the test suite by executing the software program on computer hardware using respective test conditions of the respective test case (e.g., executing a Windows® or Linux® operating system). In one or more embodiments, a failure indication indicates that executing the software program using the respective test conditions did not operate in accordance with a set of predefined behaviors for the software program. For instance, it may take beyond a predefined threshold for processing time for the operating system 1802 to manage a particular resource of the complex system 1800 or the operating system 1802 fails entirely in an operational task. In other examples, the output from a software program may not produce expected outcomes (e.g., a statistical program using RAM 1806 may produce an unexpected model or mathematical numbers).

In one or more embodiments, the complex system 1800 is a computer-simulated model that represents behavior of computer hardware (e.g., keyboard 1810) for testing a computer-simulated environment. In one or more embodiments, the computer-simulated model is a deterministic model in which the output of the model is fully determined by the parameter values and initial conditions. Other computer-simulated models include stochastic models in which a same set of parameter values and initial conditions will lead to an ensemble of different outputs. Alternatively or additionally, aspects of the system are physically tested. For instance, a categorical factor represents operation of a circuit of the keyboard 1810 in a physical test.

Regardless of the particular testing method performed, as shown in FIG. 19, a graphical user interface 1920 displays an indication 1922 of the most likely potential cause 1922 for a potential failure of the complex system 1800 that accounts for the input weights and any failure indications from testing the complex system 1800. Of course one of ordinary skill in the art will appreciate that weights could be input following testing to generate the ordered ranking. In this case, the most likely cause for a failure is using the RAM of 8 MB and a connection speed of 0-1 Mpbs. Thus, the test engineer will likely test combinations for the test system 1800 that involve this combination and/or recommend refraining from designing a system 1800 with that combination.

As shown in FIG. 19, the indication 1922 is part of an ordered ranking 1924 of combinations for further testing of the system. In one or more embodiments, the graphical user interface displays a single most likely potential cause a particular number of causes, or particular tiers of causes. As shown in FIG. 19, three tiers are shown in which combinations of a same probability are displayed in the same tier. In one or more embodiments, a user sets a preference for display of the most likely potential cause (e.g., the user sets a preference for the number of potential causes to display). Should testing indicate that the combination of RAM (8 MB) and connection speed (0-1 Mbps) does not cause a failure of complex system 1800, a test engineer can test the other combinations according to the ordered ranking.

Figure 20A:
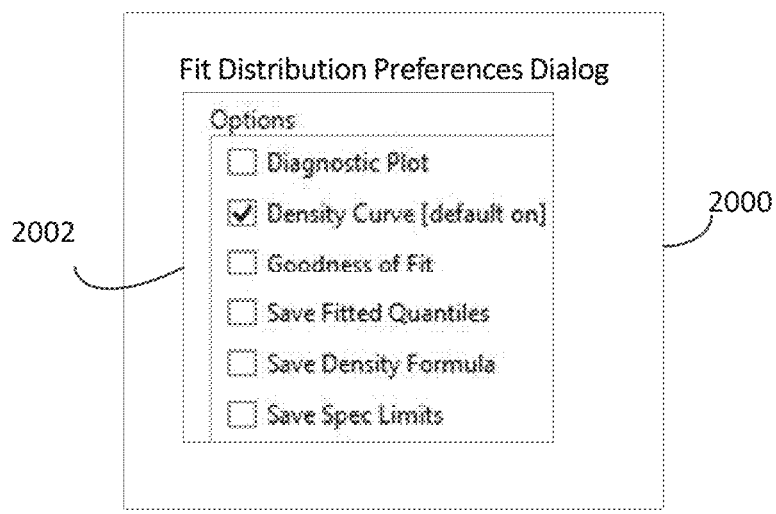
FIG. 20A illustrates an example complex system in at least one embodiment of the present technology.

FIG. 20A illustrates another example complex system 2000. In this example, the complex system 2000 involves components or categorical factors 2002 that are preferences for a fit distribution application of a software program. A user can check or uncheck particular preferences to include or not include these preferences for the fit distribution application. Thus, the options for a particular component are in use or not in use in the application represented by checked or unchecked respectively in a graphical user interface for the fit distribution application.

Figure 20B:
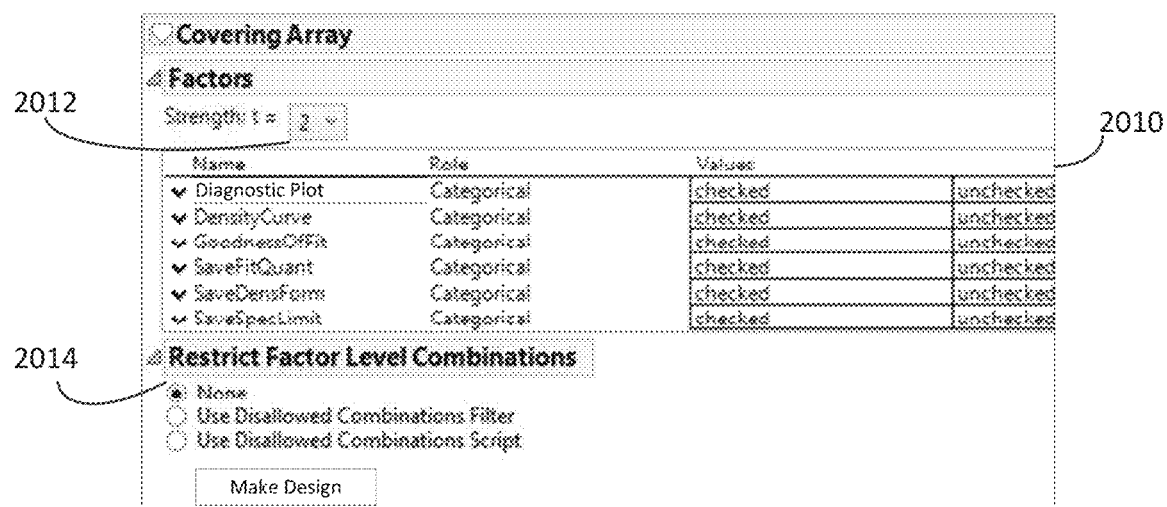
FIG. 20B illustrates an example graphical user interface for a covering array in at least one embodiment of the present technology.

FIG. 20B illustrates an example graphical user interface 2010 for generating a test suite. In one or more embodiments, a graphical user interface is displayed for setting criteria for generating the test suite. For example, in FIG. 20B a covering array is used to test the complex system 2000. The graphical user interface 2010 displays a drop-down box 2012 for setting the strength of the covering array (e.g., a strength of 2) for the categorical factors 2002. The graphical user interface 2010 also shows selections 2014 for restricting certain level combinations that are not allowed in the covering array (i.e., disallowed combinations). An example of a disallowed combination is a given categorical factor is always unchecked whenever another categorical factor is checked. Alternatively or additionally, a disallowed combination could be assigned a weight (e.g. a weight of 0) to indicate that a particular combination would never be a source of error because it is disallowed. One of ordinary skill in the art will appreciate other settings for generating the test suite, such as setting the test suite to be an orthogonal array or a number of test cases.

FIG. 20C illustrates a graphical user interface 2020 displaying the results of a test suite for testing complex system 2000 according to the user selections displayed in FIG. 20B. Only test case 3 failed as indicated on the graphical user interface 2020 by indicating "Fail" in the result column 2022. A success indication is displayed in the graphical user interface 2020 for the other test cases by indicating "Pass" for the respective test case.

FIG. 20D illustrates an example graphical user interface 2040 for user entry of weights for selected categorical factors. As shown the user has selected particular ones of the categorical factors 2002 for assigning weights. The user has input particular weights in text boxes 2042, 2044, and 2046.

FIG. 20E illustrates an example graphical user interface 2050 that indicates the most likely potential cause for the potential failure of the system. As shown in FIG. 20E, the graphical user interface 2050 displays an ordered ranking 2052 of potential causes for a potential failure of the system arranged based on cause indicators expressed as probabilities 2054 assigned to particular combinations. As shown each of the categorical factors of a combination in the ordered ranking 2052 was involved in the test case that resulted in a failure indication as shown in FIG. 20C. In this embodiment, the computing system outputting to a displaying device the indication of the most likely potential cause also tests the test suite, so a summary 2056 of the test results as an example is also shown in graphical user interface 2050.

While example embodiments focused on causes due to combinations involving two inputs, the same methodology holds if all combinations due to two inputs have been ruled out. In addition, if one were to assign a prior weight to interactions of each strength, analysis could include interactions of different strengths that are potential causes. For example, if one believed that two-input combinations are four times more likely than three-input combinations to cause a failure, each $w_{i_1 i_2}(j_1, j_2)$ would be multiplied by four before making comparisons. This can be useful in uncovering cases in which a higher-order combination appears in multiple test cases, and no lower-order combinations appear or have been ruled out.

In one or more example embodiments that extend to three inputs, for distinct inputs $i_1$, $i_2$, and $i_3$ at levels $j_1$, $j_2$, and $j_3$ ($j_a \in 1, \ldots, s_a$), respectively, the weight of the three-input combination, denoted by $w_{i_1 i_2 i_3}(j_1, j_2, j_3)$, can be calculated as $$w_{i_1 i_2 i_3}(j_1, j_2, j_3) = w_{i_1}(j_1) w_{i_2}(j_2) w_{i_3}(j_3) \tag{9}$$

assuming that Equation (1) was used for the weights of two-input combinations. As before, individual weights can be assigned to $w_{i_1 i_2 i_3}(j_1, j_2, j_3)$ (e.g., based on prior knowledge) instead of using Equation (9). If Equation (1) was not used for any pair of inputs in $\{i_1 i_2 i_3\}$, an adjustment should be made for $w_{i_1 i_2 i_3}(j_1, j_2, j_3)$. Two possibilities are:

$$1)\ w_{i_1 i_2 i_3}(j_1, j_2, j_3) = \max\{w_{i_1 i_2}(j_1, j_2) w_{i_3}(j_3), w_{i_1 i_3}(j_1, j_3) w_{i_2}(j_2), w_{i_2 i_3}(j_2, j_3) w_{i_1}(j_1)\}, \tag{10}$$

where max refers to the maximum value among the set of values, or $$2)\ w_{i_1 i_2 i_3}(j_1, j_2, j_3) = \text{ave}\{w_{i_1 i_2}(j_1, j_2) w_{i_3}(j_3), w_{i_1 i_3}(j_1, j_3) w_{i_2}(j_2), w_{i_2 i_3}(j_2, j_3) w_{i_1}(j_1)\}, \tag{11}$$

where ave refers to the average of the values. Equation (10) places greater emphasis on the prior knowledge that has been specified using Equation (1).

Weights for combinations involving more than three inputs can be defined in a similar fashion. In general for f>2 inputs, the weight of a combination is the product of the weights of the individual inputs:

$$w_{i_1 i_2, \ldots, i_f}(j_1, j_2, \ldots, j_f) = w_{i_1}(j_1), w_{i_2}(j_2), \ldots, w_{i_f}(j_f).$$

Equations (10) and (11) can be expressed similarly, with adjustments to the number of ways to group inputs as m increases.

Embodiments herein allows the failures resulting from executing a test suite to be analyzed so that the potential causes of the failures can be ranked. One of ordinary skill in the art will appreciate that embodiments herein are useful for other applications and purposes that those expressly described herein. For example, the use of weights as a criterion for test suites can also be particularly useful when a test engineer has a testing budget that allows more test cases than a covering array of optimal size. Weights can help determine which additional test cases to add to the test suite. These additional test cases can have the beneficial effect of reducing the number of potential causes and can therefore provide a happy medium between optimal size covering arrays and error-locating arrays. Alternatively, one or more embodiments of computing weights could be used by algorithms that construct biased covering arrays or to encode prior information for a test suite prioritization technique. In addition, use of weights could instead represent costs for algorithms that construct cost-aware covering arrays.

Further, in one or more embodiments, the results of testing in accordance with the ranking can be used to augment the weights for future test cases. For example, a test engineer can learn that a combination of test conditions probably should not be weighted as problematic or should be weighted to downgrade the likelihood of it being a potential cause of failure in future test suites if testing indicates it is not a source of failure in a current test suite. In one or more embodiments, a test suite is generated in a repeating pattern (e.g., every day) and the test cases in the test suite or the weights applied can be augmented based on the performance of testing in a previous period of the repeating pattern.

Further, in one or more embodiments, the results of testing in accordance with the ranking can be used to augment the weights for future test cases. For example, a test engineer can learn that a combination of test conditions probably should not be weighted as problematic or should be weighted to downgrade the likelihood of it being a potential cause of failure in future test suites if testing indicates it is not a source of failure in a current test suite. In one or more embodiments, a test suite is generated in a repeating schedule (e.g., every day) and the test cases in the test suite or the weights applied can be augmented based on the performance of testing in a previous period of the repeating pattern.

In one or more embodiments, a graphical user interface is provided to allow users to visualize a test suite in a graphical representation and interact with key aspects of the design of the test suite (e.g., in an interactive report or viewer of the graphical user interface). This is particularly useful when there are more than three factors to test cases of a test suite. For instance, the user of the graphical user interface can interact with the graphical user interface to change levels associated with factors of the test suite and explore projections into fewer factors needed for a test suite. This allows test planners to explore and select different design options for a best design based on a visual assessment rather than solely on a table of entries or summary of statistics of test results resulting in a more complete understanding of their design. In particular, by providing a visual representation of a design, a user of the graphical user interface can identify missing pieces or gaps in a design of an experiment and rearrange levels and factors in the design to see the impact of the changes on the design in real time (e.g., in improving design efficiency or design coverage).

Figure 21:
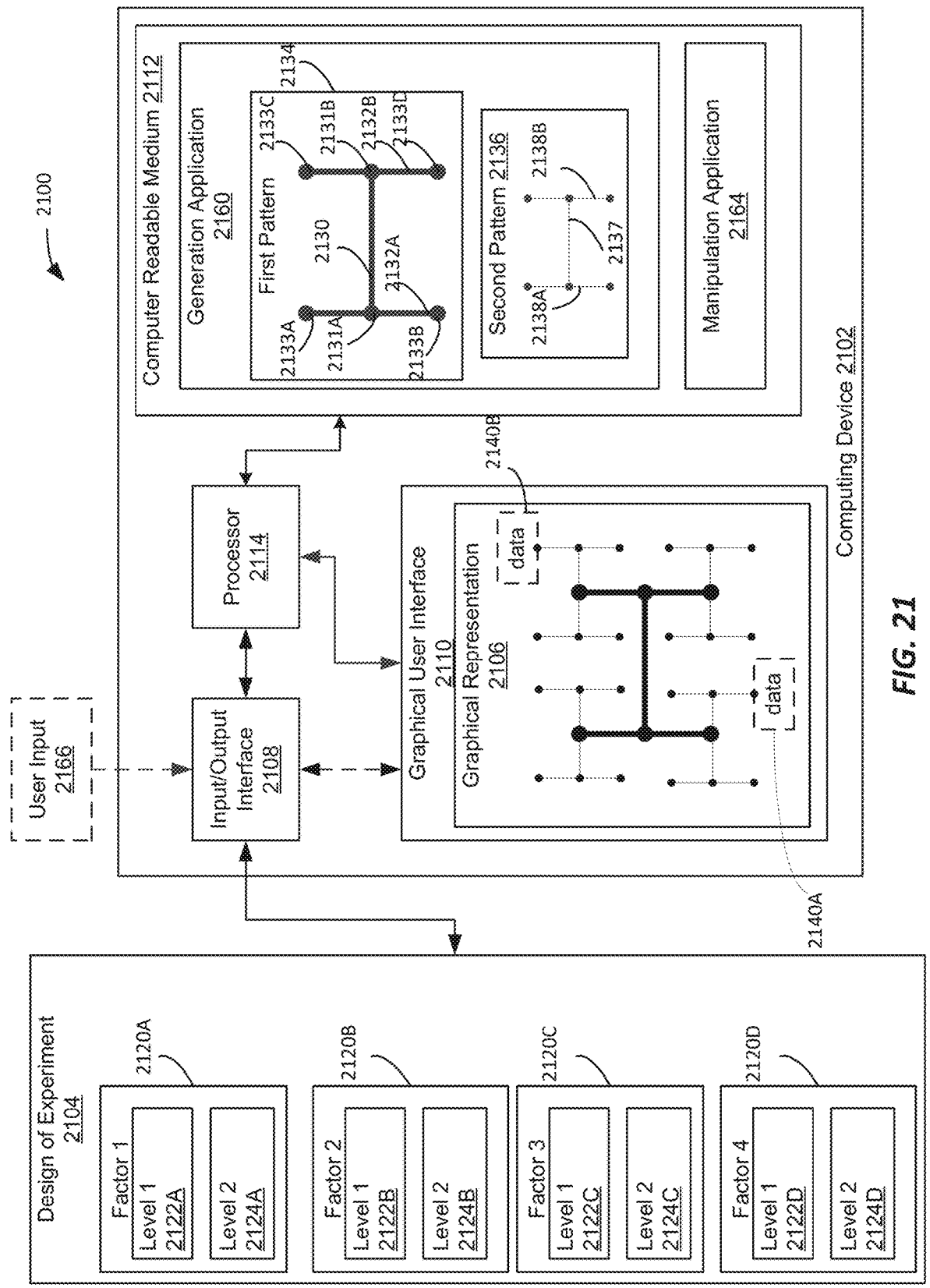
FIG. 21 illustrates an example block diagram of a system for displaying a graphical user interface with a graphical representation in at least one embodiment of the present technology.

FIG. 21 illustrates an example block diagram of a system 2100 for displaying a graphical user interface with a graphical representation. The graphical user interface can be used for applications related to test suites for detecting a potential failure of a complex system described herein and for other applications related to design or design of an experiment (e.g., covering array diagnostics for a design, analysis of response after a designed experiment, etc.).

The system 2100 includes a computing device 2102. In one or more embodiments, the computing device 2102 is the same or different from computing devices described herein (e.g., computing device 1302). In one or more embodiments, the system 1300 includes other devices (e.g., input device 1304 described herein) for receiving information related to the design of an experiment 2104 (e.g., a test suite with test cases as described herein). The system is configured to exchange information between devices in the system (e.g., via wired and/or wireless transmission) and devices in other systems described herein (e.g., system 1300). For example, a network (not shown) can connect one or more devices of system 2100 to one or more other devices of system 2100 or system 1300. In one or more embodiments, fewer, different, and additional components than shown can be incorporated into the system 2100 (e.g., components of system 1300).

The computing device 2102 has a computer-readable medium 2112 (e.g., computer-readable medium 1312) and a processor 2114 (e.g., processor 1314). For instance, computer-readable medium 2112 comprises one or more features of computer-readable medium 1312 or is computer-readable medium 1312. Additionally, or alternatively, processor 2114 comprises one or more features of processor 1314 or is processor 1314. For instance, in one or more embodiments computer-readable medium 2112 stores instructions for execution by processor 2114. For example, computer-readable medium 2112 comprises instructions for a generation application 2160 and a manipulation application 2164.

In one or more embodiments, the generation application 2160 determines or generates a graphical representation 2106 representing the design of an experiment (e.g., test cases of experiment or results of an experiment designed according to the design of an experiment). This is particularly useful for generating a graphical representation 2106 for a design of an experiment that comprises a plurality of test cases, where each element of a test case is a test condition for testing one of factors for an experiment. A test condition comprises one of different levels representing different options for a given factor in the design (e.g., different options for components of a tested complex system described herein). For instance, as shown in FIG. 21, the computing device 2102 in one or more embodiments receives via input/output interface 2108 design of experiment information 2104 related to a plurality of factors 2120 (e.g., four factors 2120A-D) that each comprise at least two levels, a first level 2122 and a second level 2124 representing different options for a given factor in the design of an experiment. One of ordinary skill in the art will appreciate that the computing device can receive design of experiment information 2104 pertaining to more or less factors and that each factor could have more or less levels associated with the factor. In one or more embodiments, the generation application 2160 generates the graphical representation 2106 based on or otherwise responsive to receiving the design of experiment information 2104 (e.g., a number of patterns in a graphical representation is based on received design of experiment information 2104).

In one or more embodiments, the generation application 2160 plots data 2140 on the graphical representation 2106 corresponding to data assigned to one or more test cases of the plurality of test cases on the graphical representation. For instance, data 2140 could include the factors of the test cases, a test case number, a result of a test case, etc. such that the graphical representation provides a visual representation of information to a user of the graphical user interface 2110. In one or more embodiments, the informational value of data is derived or otherwise based on the proximity of data 2140 to one or more patterns of the graphical representation.

In one or more embodiments, the generation application 2160 generates a graphical representation 2106 that comprises a fractal-like representation. For instance, the graphical representation 2106 comprises a first pattern (e.g., first pattern 2134) and a second pattern (e.g., second pattern 2136) of a fractal sequence. For instance, a type of fractal sequence is a fractal in which a curve or geometric figure has a similar pattern recurring at progressively smaller scales. As shown in FIG. 21, the second pattern 2136 is geometrically similar to and proportionality smaller than the first pattern. Geometrically similar as used herein is given its meaning in the field of geometry (e.g., having structures of a same shape). For instance, structures (or geometric curves or figures) in the field of geometry having a same shape would include shapes with corresponding sides proportional and corresponding angles equal.

In the example shown in FIG. 21, the first pattern 2134 has three line segments: a main axis 2130 and secondary axes 2132A and 2132B. The second pattern 2136 has corresponding line segments (2137, 2138A and 2138B) of a shorter length. The angles at the attachment points 2131 of the line segments of the first pattern 2134 form approximately right angles (i.e. 90 degree angles). The second pattern 2136 has approximately similar angles at attachment points of its respective line segments. Fractal sequences with this particular shape or structure of patterns are referred to herein for simplicity as a tree fractal sequence with individual axes other than the main axis referred to as branches of the tree. The main axis and a display of this fractal sequence in a display or other viewer of a graphical user interface is referred to herein as a tree view.

In one or more embodiments, the generation application 2160 generates other shapes or selects a shape of a plurality of shape options for a fractal sequence as described in more detail with respect to other embodiments (e.g., a grid view).

In one or more embodiments, the graphical representation 2106 comprises a plurality of axes used in a fractal sequence for respective ones of factors received, indicated, or otherwise represented in the design of experiment information 2104. For instance, an axis (e.g., axis 2132A) of the plurality of axes has two points comprising a first point (i.e. endpoint 2133A) that corresponds to a first level (e.g., level 2112A) of a respective factor (e.g., factor 2120A) and a second point (endpoint 2133B) that corresponds to a second level (e.g., level 2124A) of the respective factor. In one or more embodiments, data 2140 labeling a factor assigned or otherwise corresponding to one or more axes is plotted in proximity to an axis assigned or otherwise corresponding to a particular factor received in the design of experiment information 2104. For instance, each free endpoint terminating one of the axis of the graphical representation 2106 corresponds to a potential test case. Data 2140A corresponds to one test case and data 2140B corresponds to another test case in an example where there are multiple different test cases. The location of the plotted data 2140A and 2140B relative to a free end point of the graphical representation is selected based on the factors and levels assigned to the test case represented by the axes of the graphical representation 2106. Endpoints that do not have plotted data, for instance, correspond to a potential test case that was not selected for an experiment design.

In one or more embodiments, the graphical representation 2106 comprises a tree fractal sequence comprising a first pattern 2134 and a second pattern 2136. The first pattern 2134 is generated by selecting a main axis (e.g., main axis 2130) of the plurality of axis and joining a secondary axis (e.g., secondary axis 2132) of the plurality of axes to the main axis forming the first pattern. In this case, the first pattern 2134 combines two secondary axes 2132A and 2132B to the main axis. The first pattern 2134 comprises at least four endpoints (2133A-2133D) that are endpoints of one or more axes of the first pattern 2134.

In one or more embodiments, the graphical representation 2106 comprises a set of second patterns 2136. Each pattern of the set of the second patterns 2136 is a structure geometrically similar to the first pattern 2134 and proportionally smaller than the first pattern 2134. The structure is formed from axes of the plurality of axes representing factors 2120 of the experiment Each pattern of the set of the second patterns is joined to the first pattern at each of at least four endpoints 2133A-D of the first pattern. In one or more embodiments, data 2140 is plotted at locations according to a fractal sequence of the graphical representation 2106 as a function of factors and levels represented by the fractal sequence. For instance, as shown in FIG. 21, data 2140 is plotted at endpoints of second patterns 2136 of the fractal sequence.

In one or more embodiments, the manipulation application 2164 manipulates the graphical representation 2106 according to one or more manipulations. For instance, a manipulation may be generated by the computing device 2102. As explained, the computing device 2102 could change the designated main axis (e.g., in response to a changed prioritization based on results of an experiment using the factors). Additionally or alternatively, a manipulation is in response to user input 2166 by a user of the graphical user interface 2110. For instance, the user input 2166 could include a manipulation of the display of the graphical representation 2106 (e.g., by selection of one of different structure options for the fractal sequence). Alternatively, or additionally, the user input 2166 could include a manipulation of data represented by the graphical 2106 (e.g., a manipulation of a value corresponding to a level for a factor). The user input 2166 could be received via one or more input devices as described herein (e.g., input device 1304).

In one or more embodiments, the computing device displays or otherwise outputs to a graphical user interface 2110 a graphical representation 2106 of the design of an experiment (e.g., test cases of experiment or results of an experiment designed according to the design of an experiment). Alternatively, as shown in FIG. 13, a graphical user interface can be displayed on an output device (e.g., output device 1306) external to a computing device (e.g., computing device 2102) and information is exchanged between an output device via one or more interfaces with the computing device 2102 (e.g., via input/output interface 2108). One of ordinary skill in the art will appreciate that the computing device 2102 could display the graphical representation 2106 in other ways different from a graphical user interface 2110 (e.g., outputting a graphical representation 2106 to other output devices described herein (e.g., a display, printer or storage).

In one or more embodiments, the graphical user interface 2110 can also be referred to as an interactive graphical user interface that allows manipulation of the graphical representation 2106 (e.g., manipulation in response to changed input regarding the experiment or user input 2166 to the computing device 2102). In one or more embodiments, manipulation of an interactive graphical user interface provides advantages to a user of the interactive graphical user interface for improving the visualization of test cases or changing test conditions of test cases as will be described in more details herein.

Figure 22:
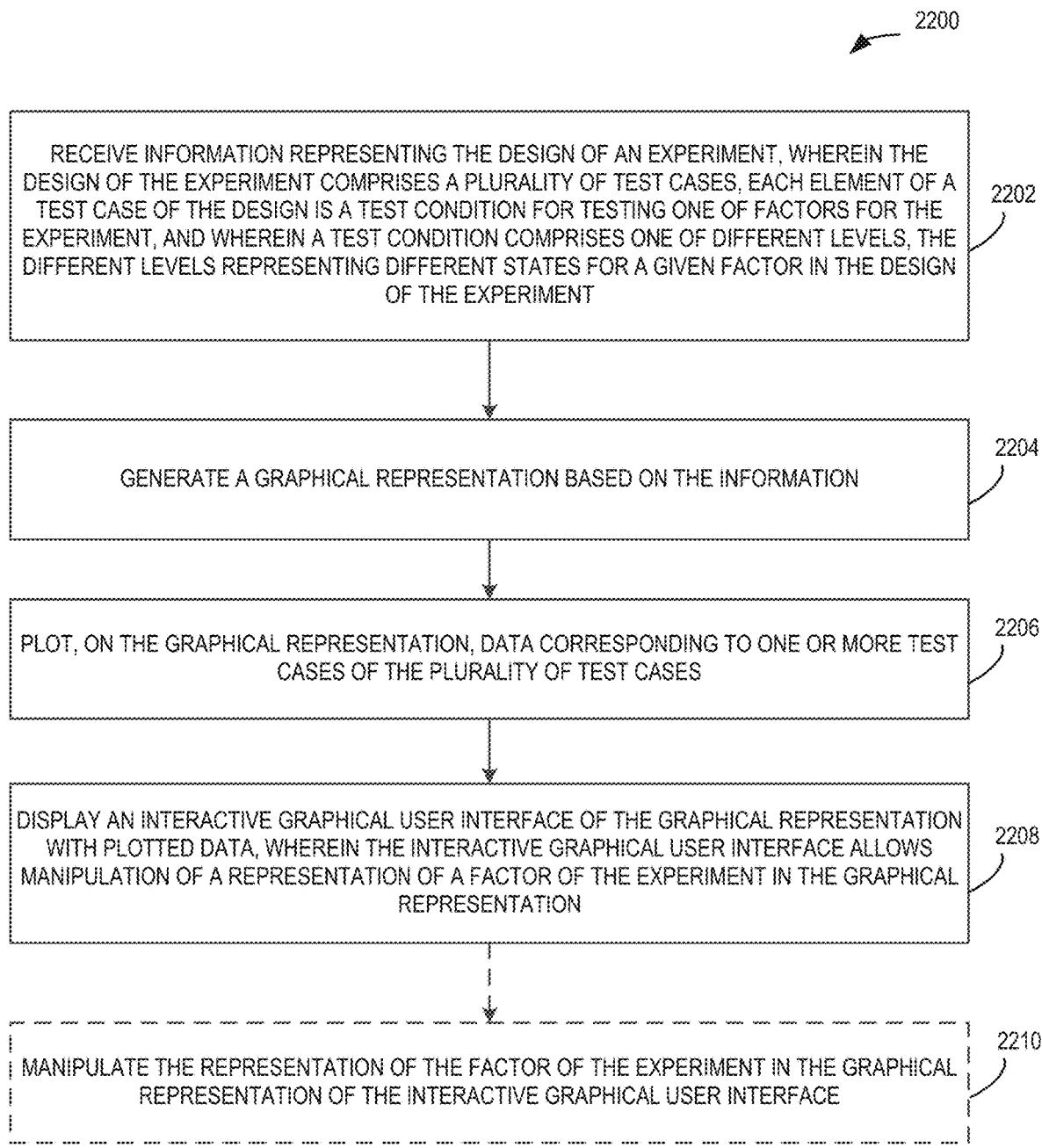
FIG. 22 illustrates an example flow diagram for displaying a graphical user interface with a graphical representation in at least one embodiment of the present technology.

FIG. 22 illustrates an example flow diagram for a computer-implemented method 2200 for displaying an interactive graphical user interface described herein. For instance, in one or more embodiments, the system 2100 implements the method 2200.

The method 2200 includes an operation 2202, that includes receiving information representing a design of an experiment (e.g., design of experiment information 2104). The design of the experiment comprises a plurality of test cases. Each element of a test case of the design is a test condition for testing one of factors for the experiment. A test condition comprises one of different levels, the different levels representing different options for a given factor in the design of the experiment. For instance, in one or more embodiments, the information represents or indicates unique numbers assigned to each test case within the design of the experiment, the number of factors in the design and their corresponding levels, etc. Alternatively or additionally, in one or more embodiments the information represents or indicates results of an experiment according to the design of the experiment. For instance, the results could include values corresponding to a result of each of the test cases for the experiment according to the design.

The method 2200 includes an operation 2204 that includes generating a graphical representation (e.g., graphical representation 2106) based on the received information. For instance, in one or more embodiments, the graphical representation represents levels of factors of the design.

The method 2200 includes an operation 2206, that includes plotting, on the graphical representation, data (e.g., data 2140) corresponding to one or more test cases of the plurality of test cases of the design of the experiment. For instance, the data comprises factor information (e.g., received in the design of experiment information 2104). Additionally or alternatively, the data comprises a value representing a test case or results of an experiment conducted according to the design.

The method 2200 includes an operation 2208, that includes displaying an interactive graphical user interface (e.g., graphical user interface 2110) comprising the graphical representation. The interactive graphical user interface allows manipulation of a representation of a factor of the experiment in the graphical representation.

Optionally, the method 2200 includes an operation 2210, that includes manipulating the representation of a factor of the experiment in the graphical representation of the interactive graphical user interface. For instance, in one or more embodiments, the graphical representation is manipulated by changing a prioritization of the plurality of axes in the fractal sequence (e.g., for a user of the graphical user interface to observe plotted data more relevant to an experiment outcome).

Figure 23:
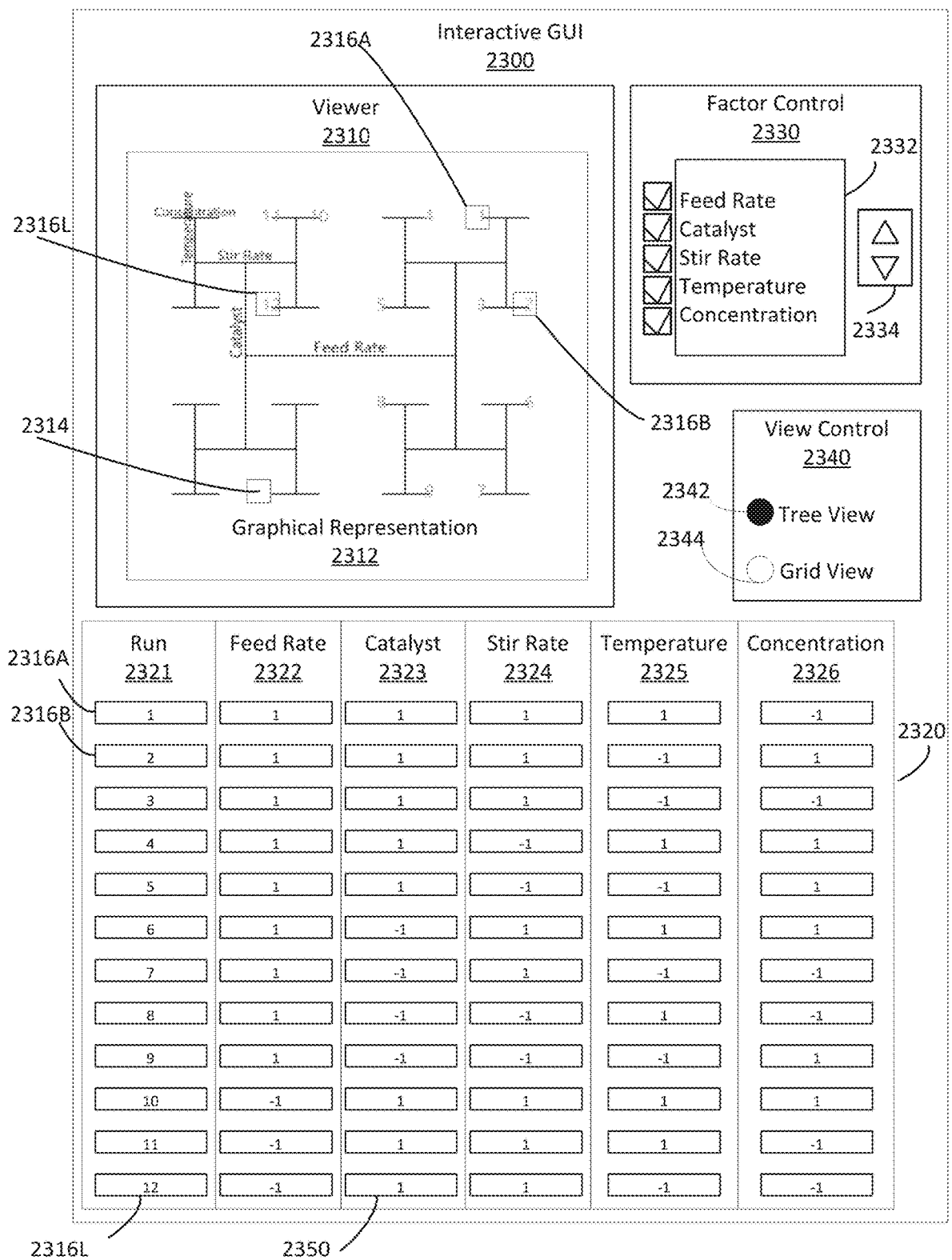
FIG. 23 illustrates an example interactive graphical user interface for controlling a graphical representation in at least one embodiment of the present technology.

FIG. 23 illustrates an example interactive graphical user interface 2300. The interactive graphical user interface 2300 has a viewer 2310 for viewing a displayed graphical representation 2312. An example of a viewer 2310 is a DESIGN FRACTAL GRAPH by SAS Institute Inc. of Cary, N.C. The viewer 2310 displays a graphical representation 2312 that represents five factors for an experiment. The viewer 2310 could be used for one or more different experiments with different numbers of factors and levels. The graphical representation 2312 is generated or otherwise determined using a tree fractal sequence as described herein. Other fractal sequences (e.g., a grid fractal sequence) could be used.

The example interactive graphical user interface 2300 displays a report involving mixing a catalyst into a chemical. In other words, the experiment tests a complex system of a chemical solution involving a catalyst and a chemical where different mechanisms of combining the catalyst and chemical solution provide different results for the resulting chemical solution. A first factor feed rate 2322 is related to how fast the catalyst is fed into the chemical. A second factor catalyst 2323 is related to the type of catalyst used. A third factor stir rate 2324 is related to how fast or how long the catalyst is stirred in the chemical once added. A fourth factor temperature 2325 is related to the temperature of the chemical when the catalyst is added or a reaction temperature. A fifth factor concentration 2326 is related to amount of catalyst per chemical solution. The scenario of the chemical solution is merely an example. The interactive graphical user interface 2300 could be used for the design of any experiment (e.g., for testing a complex system described herein).

The first pattern of the graphical representation 2312 has axes corresponding to feed rate 2322 (horizontal axis) and catalyst 2322 (vertical axes). The set of second patterns have axes corresponding to stir rate 2324 (horizontal axes) and temperature 2325 (vertical axes). The number of factors is an odd number, so the fractal sequence is terminated by axes corresponding to concentration 2326 (horizontal axes).

FIG. 23 illustrates a number of controls for a user of the graphical interface to manipulate the graphical representation 2312. A data control 2320 allows manipulation of plotted data (e.g., data 2136) displayed in the graphical representation 2312. An example of a data control 2320 is design exploration by SAS Institute Inc. of Cary, N.C. Data control 2320 in this case displays a matrix of each of the test cases of the experiment. A run column 2321 denotes the order of the test cases (e.g., indicated by received design of experiment information). Data in run column 2321 can then be plotted in a graphical representation (e.g., data 2136 plotted graphical representation 2312).

Each of the other columns in the data control 2320 denote a level assigned to the factor for each of the test cases. The levels are represented by a "1" and a "−1". These are merely symbolic representations of two options for a factor. For example, in the context of temperature 2325 factor, a "−1" could represent or otherwise indicate a temperature of 90 degrees and a "1" could represent or otherwise indicate a temperature of 100 degrees. The actual value assigned to a level could instead be displayed in the data control 2320 or other symbols could be used to represent different options (e.g., a "+" and a "−"). A value (e.g., either −1 or 1) is assigned to each test condition of a given test case of the test cases displayed in data control 2320.

In one or more embodiments, a computing device (e.g., computing device 2102) displays interactive graphical user interface (graphical user interface) by displaying the graphical representation 2312 in proximity to a data control 2320 displaying data values assigned to each test condition of the design of the experiment. The graphical representation displays plotted values corresponding to the values assigned to each test case of the design of the experiment in the run column 2321 (i.e., runs 1-12). In the tree view shown, up is positive for the vertical branches and right is positive for the horizontal branches. Following run 1 from the main axis corresponding to feed rate, the number "1" is displayed in proximity to almost the furthest endpoint up and to the right. However, the last factor concentration 2326 is given a "−1" so the "1" is plotted just to the left side of the branch. Other orientations for a tree view could be used. For example, the main axis could be vertical rather than horizontal. Alternatively or additionally, up could be negative and/or right could be negative.

In one or more embodiments, displaying the runs graphically in the viewer 2310 enables a designer of an experiment to consider their coverage of various factors. For example, as shown in the graphical representation 2312, there are no runs plotted in the pattern in the left bottom corner. This may encourage a designer to consider having test cases that would depict a run in that pattern in the left bottom corner.

In one or more embodiments, the graphical representation and matrix of the data control 2320 are interdependent such that changing a value displayed in the matrix changes a display of a plotted value in the graphical representation in the interactive graphical user interface, or changing the display of a plotted value in the graphical representation in the interactive graphical user interface changes a value displayed in the matrix. For instance, the numbers displayed in the matrix could be "buttons" that toggle the value assigned when clicked by a user of the graphical user interface 2300 (e.g., with a mouse 1340). Clicking on a button would then change the location of the plotted run to the opposite side of the graph along the axis determined by the column where that button was located. For instance, toggling data 2350, which currently has a value of "1", assigned to catalyst 2323 in run 12 to "−1" would move the data 2316L representing plotted run "12" to the opposite side of the catalyst axis to a region 2314. As another example, toggling the "1" for feed rate 2322 of run 7 would move the plotted "7" to the region 2314. If both changes were made, a value of "7" and "12" would both be displayed in the region 2314. Alternatively or additionally, a value displayed can be pulled to a different region of a graphical representation (e.g., using a mouse 1340), and the corresponding value displayed in the data control 2320 will change.

One of ordinary skill in the art will appreciate other ways to augment the values displayed in the data control 2320. For example, the "buttons" could instead be text boxes for typing a different level value. This would be more useful in situations where there are more than two possible levels for a given factor (e.g., in other examples described herein with multiple possible levels for a given factor). Further, the run values could be text boxes for assigning a run. Alternatively, the numbers in the run 2321 column are static and the user could move test cases corresponding to a displayed run to a different row assigned to a different run to change the value assigned to that test case (e.g., using a mouse or arrow buttons).

In one or more embodiments, the interactive graphical user interface 2300 displays a factor control 2330 with each of the factors for the experiment. In one or more embodiments, a computing device (e.g., computing device 2102) manipulates the graphical representation by reducing or increasing the factors displayed in the graphical representation. For example, the computing device could receive user input (e.g., by checking a box associated with factors displayed in the factor control 2330).

In this case all the factors are checked so all the factors are displayed in the graphical representation 2312. In other examples, one or more boxes are unchecked which allows the user to project across the corresponding factors to a design in fewer factors. This would be of special interest in a screening design or application in which key factors are identified that impacted or affected the outcome or response in an experiment. In a screening application, it is expected that not all factors are significant, and so the graphical user interface 2300 allows a user to assess a design of an experiment and the significance of a factor or certain subsets of the factors in the experiment.

Other methods could be used to indicate the display of a factor. For instance, a drop down box could be displayed in proximity to a factor with options to set a color for axes associated with a given factor or to exclude the factor from display.

In one or more embodiments, a computing device (e.g., computing device 2102) manipulates the graphical representation based on a changed prioritization of factors in the graphical representation. This could be accomplished by the user manipulating the factor control 2330, e.g., by selecting one or more factors in a plot hierarchy 2332 and using up and down arrows 2324 to move the factors in the plot hierarchy 2332. For instance, as shown feed rate 2322 is at the top of the list in the factor control, so it is depicted in the graphical representation 2312 as the main axis. In this case, the main axis is displayed as a central horizontal axis. Other techniques could be used to further emphasize a main axis (e.g., a pattern or color assigned to the main axis). Catalyst 2323 is next highest in the plot hierarchy 2332, so it is depicted in the graphical representation 2312 as a secondary axis of the first pattern of the fractal sequence. This can be useful for assessing how the experimental runs are distributed in different configurations of the current design without projecting across less factors or otherwise changing the current design.

In one or more embodiments, the computing device changes a prioritization of factors in the graphical representation by replacing the main axis with a different axis of the plurality of axes. For instance, if catalyst 2323 and feed rate 2322 where switched by the user in the plot hierarchy 2332, the main axis would represent catalyst 2323 and the secondary axes of the first pattern would represent feed rate 2322.

Alternatively or additionally, the computing device changes the prioritization or sets a default prioritization based on the values in the data control 2320. For instance, the computing device could arrange or rearrange the graphical representation to better display coverage holes or gaps. A coverage hole or gap would include a region of the graphical representation correlating with a possible test case that is without plotted data, which would indicate a lack of coverage of this test case in the design of an experiment.

In one or more embodiments, the interactive graphical user interface 2300 displays options for changing the design of a pattern of the fractal sequence. For example, view control 2340 displays two options for a view of the graphical representation. A tree view 2342 is currently selected, but in other embodiments a grid view 2344 is selected.

Figure 24:
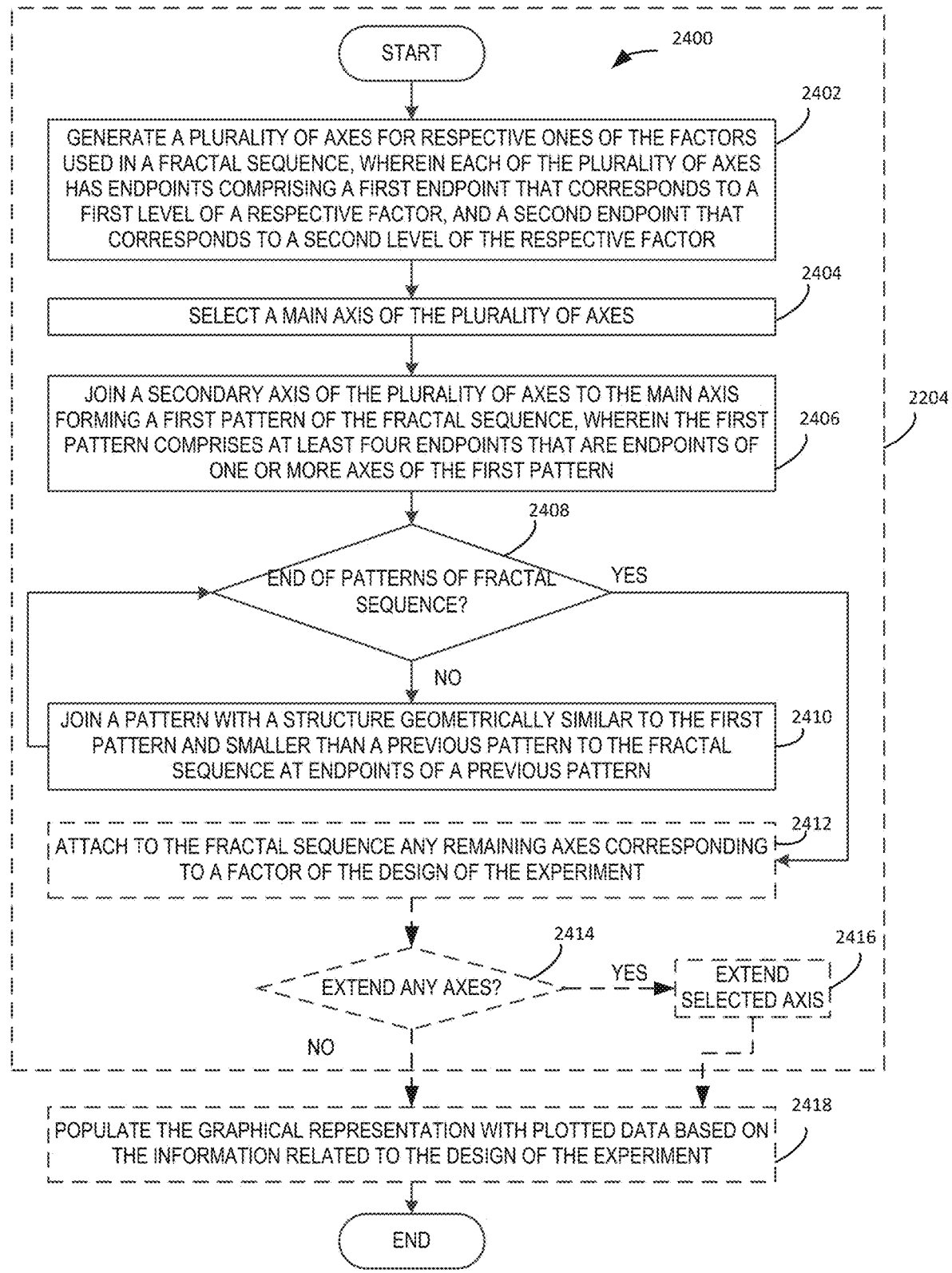
FIG. 24 illustrates an example flow diagram for generating a graphical representation in at least one embodiment of the present technology.
Figure 25A:
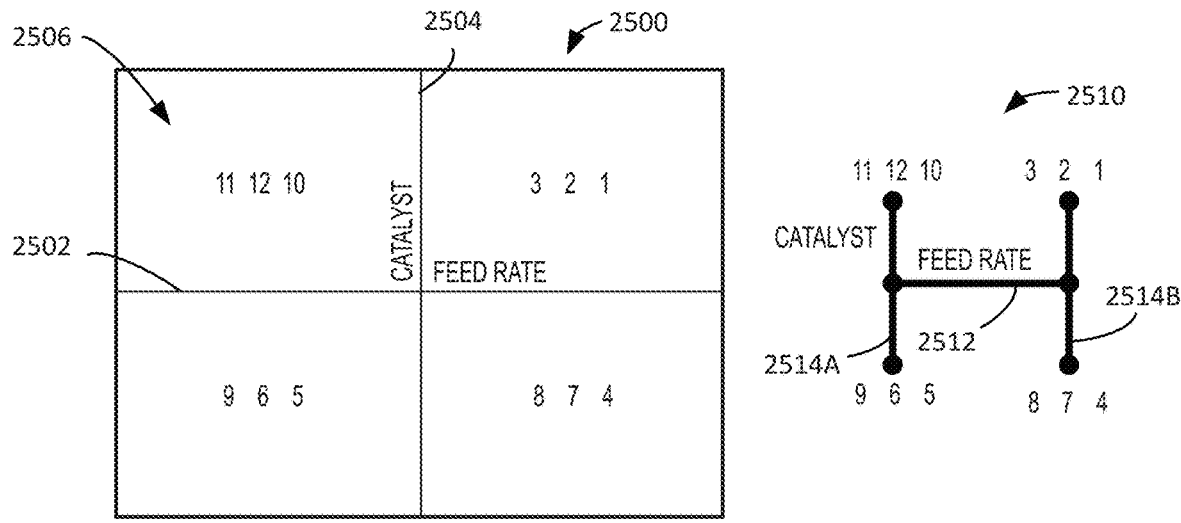
FIGS. 25A-25C illustrate example graphical representations involving multiple factors with each factor having two levels in at least one embodiment of the present technology.
Figure 25B:
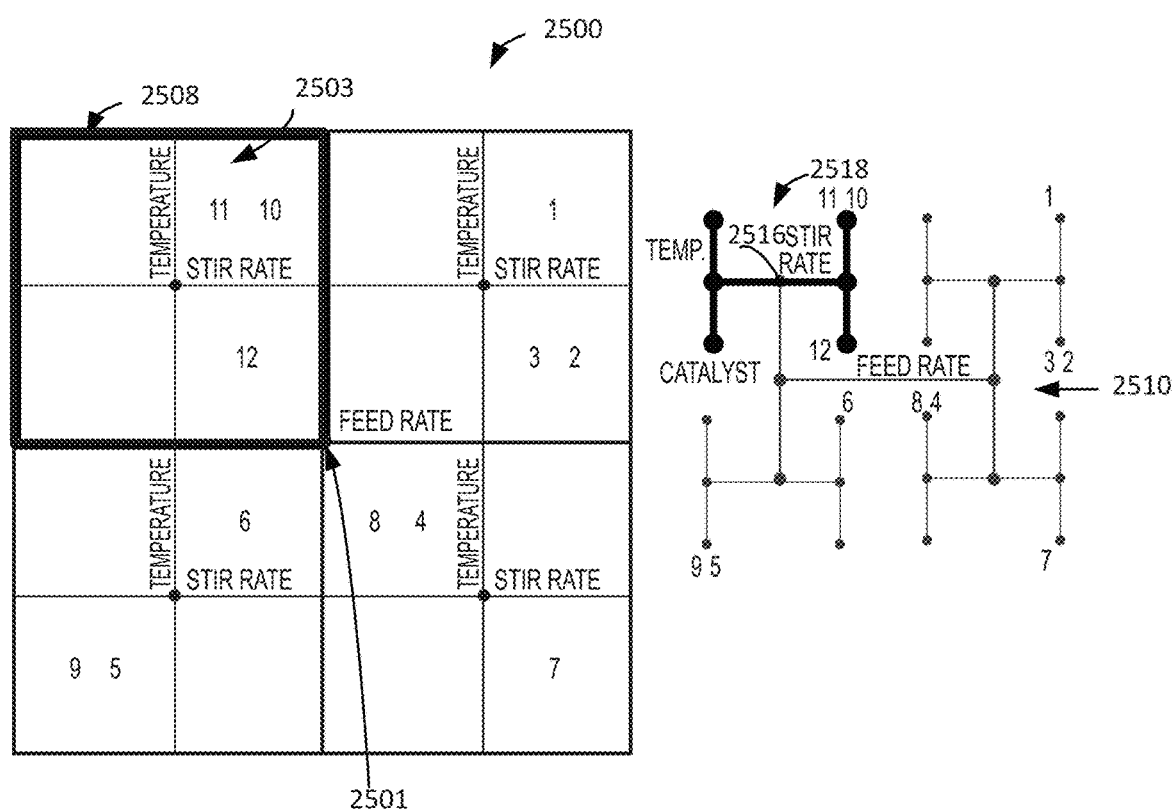
Figure 25C:
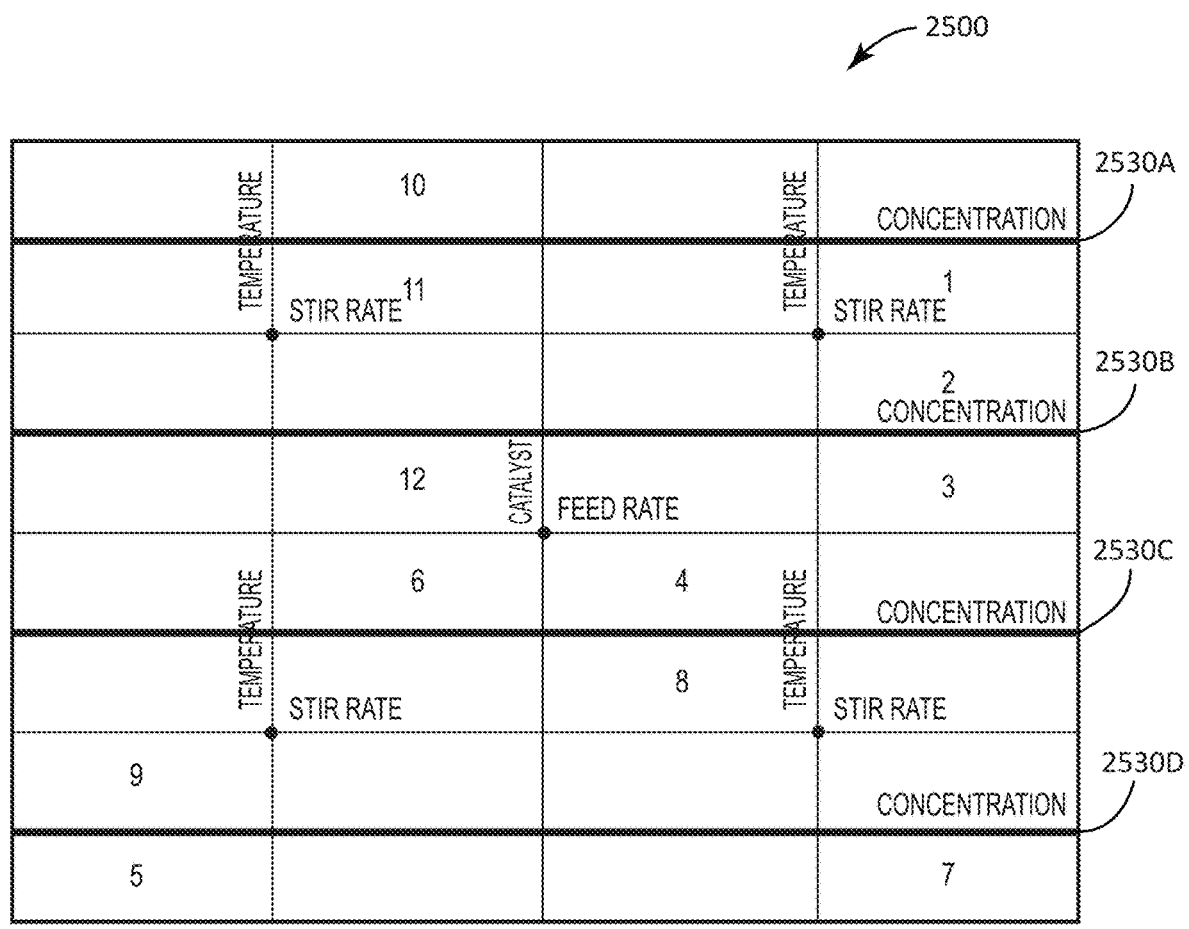

FIG. 24 illustrates an example flow diagram for a method 2400 for generating a graphical representation in at least one embodiment. In one or more embodiments, method 2400 is part of an operation 2204 of method 2200. FIGS. 25A-25C illustrate an example graphical representations (e.g., generated using the method 2400). These are merely examples; other graphical representations could be used.

The method 2400 comprises an operation 2402 that includes generating a plurality of axes for respective ones of the factors used in a fractal sequence. Each of the plurality of axes has endpoints comprising a first endpoint that corresponds to a first level of a respective factor, and a second endpoint that corresponds to a second level of the respective factor. In one or more embodiments, the operation 2402 comprises determining how many factors are to be represented by the graphical representation (e.g., based on user input selecting the factors). Method 2400 is used to show a method for generating a graphical representation of a plurality of factors. One of ordinary skill in the art will appreciate that the graphical representation could be used to represent only a single factor (e.g., in which only a single axis would be generated).

Operation 2402 can be completed prior to, contemporaneous with, or after other operations in the method 2400. For instance, the method 2400 comprises an operation 2404 that includes selecting a main axis of the plurality of axes. Operation 2402 could comprise generating a single axe=is of the plurality of axes for the main axis prior to, after or contemporaneous with selecting a main axis. Other axes of the plurality of axes could be generated prior to, after, or contemporaneous with other method steps. For instance, the method 2400 comprises an operation 2406 that includes joining a secondary axis of the plurality of axes to the main axis forming the first pattern. This operation could be done prior to or contemporaneous with generating an axis corresponding to the secondary axis.

FIG. 25A shows graphical representations each comprising a first pattern of a fractal sequence (i.e. grid pattern 2500 and tree pattern 2510) as described herein.

In one or more embodiments, a graphical representation (e.g., a tree fractal sequence or tree view) comprises a plurality of axes (e.g., axes 2512 and 2514). The structure of a first pattern (e.g., tree pattern 2510) comprises a first axis 2512 of the plurality of axes with a secondary axis 2514 of the plurality of axes. The secondary axis 1514 of the plurality of axes is perpendicular to the first axis 2512 of the plurality of axes and at an endpoint of the first axis 2512 of the plurality of axes. In the tree pattern 2510, there is a secondary axis 2514 at each endpoint of first axis 2512 (i.e. secondary axis 2514A and secondary axis 2514B). Each of the second axes can be considered a branch branching out from each endpoint of the main axes 2512, where each endpoint represents different levels of a factor represented by the main axis. A given branch off the main axis branches in opposite directions from the main axes (trunk) 2512 at an exposed endpoint to represent different levels of a given factor represented by the branch.

In one or more embodiments, the tree pattern 2510 is formed by generating two secondary axis (i.e. the branches) 2514. Each of the two secondary axes is perpendicular to the main axis (i.e. trunk) 2512 and comprises a respective middle point between the two endpoints of the respective one of the secondary axes 2514. The respective middle point is attached to each end point of the main axis 2512.

In other embodiments, a different graphical representation is used (e.g., a grid fractal sequence or grid view) comprises a plurality of axes. For instance, grid pattern 2500 also comprises a plurality of axes (e.g., axes 2502 and 2504). In this case the structure of grid pattern 2500 comprises perpendicular axes (i.e., axes 2502 and 2504) and a window 2506 defined by endpoints of the perpendicular axes 2502 and 2504. In this case there is a visual rectangle shown surrounding the perpendicular axes. However, in other embodiments a visual border of the window 2506 is not represented in the grid pattern 2500. Rather, it is merely the endpoints that define a rectangular edge of the window. In one or more embodiments, the window 2506 is a portion or all of a window of a viewer of a graphical user interface (e.g., viewer 2310 of graphical user interface 2300). Generating the window 2506 comprises defining a portion or all of a window of the viewer (e.g., by generating the perpendicular axes 2502 and 2504).

In one or more embodiments, the graphical representation only comprises a single axis or a single pattern. However, in other embodiments, the graphical representation is used to represent more than one or two factors.

Method 2400 comprises a step of determining whether to end the patterns of fractal sequence in an operation 2408. For instance, if there are only one, two, or three factors represented the method would proceed to operation 2412. However if there are more than three factors represented the method would proceed to operation 2410. In an operation 2410, the method comprises joining a pattern with a structure geometrically similar to the first pattern (e.g., grid pattern 2500 and tree pattern 2510) until an end of patterns of a fractal sequence. For instance, the determination of an end of a fractal sequence could be based on how many factors are selected for representation in the graphical representation.

FIG. 25B shows a graphical representation with a branch pattern 2518 joined to, within, or as apart of, tree pattern 2510. A branch pattern is made up of all branch axes off a branch axis of the tree pattern. Each branch pattern is joined at an end point of a branch axis. For instance, branch pattern 2518 is joined at an end point 2516 which also forms a midpoint of one of the branch axes (in this case, one corresponding to a factor of stir rate) of the branch pattern 2518.

Branch pattern 2518 and tree pattern 2510 form a fractal sequence (e.g., a tree fractal sequence) with a set of a tree pattern (with only one first pattern) and a set of branch patterns (with four second patterns). In one or more embodiments, the fractal sequence is an ordering of a plurality of sets of patterns, where each pattern of a given one of the plurality of sets of patterns is proportionally smaller than a given pattern of a previous set of patterns in the ordering and attached to one of free endpoints of the previous set of patterns in the ordering. For instance, if there was a third set of patterns in the fractal sequence added to branch patterns 2518, there could be up to 16 third patterns attached to the endpoints of the branch patterns 2518. As with any fractal sequence, theoretically there could be an infinite amount or number of patterns in the sequence that are progressively smaller. Practically, the tree view can handle designs with up to 12 factors and still provide good visual clarity to a user of the graphical user interface 2110. Most experiments do not typically involve more than 12 factors, so this visualization technique is useful in the majority of situations involving the design of an experiment.

FIG. 25B alternatively shows a grid fractal sequence with a small grid pattern 2508 joined to large grid pattern 2500. The large grid pattern 2500 comprises an intersection point 2501 that is the middle point between perpendicular axes. The axes 2504 and 2502 form four quadrants in the window 2506. A small grid pattern 2508 is in each of the quadrants. The generated axes of the small grid pattern 2508 define or otherwise generate a window 2503 that is a portion of the window 2506. The small grid pattern 2508 is joined to the large grid pattern 2500 such that a vertex of the window 2503 is at an endpoint of axis 2502 and/or an endpoint of axis 2504. In this case, a vertex of the window 2503 is also at the intersection point 2501. The same is true for small grid patterns in each of the other quadrants of large grid pattern.

In this fractal sequence for the grid view, the grid fractal sequence comprises an ordering of a plurality of sets of patterns as with the tree view where each pattern of a given one of the plurality of sets of patterns is proportionally smaller than a given pattern of a previous set of patterns in the ordering. With respect to the grid view, each pattern of the given one is within a quadrant formed by respective perpendicular axes in a respective window of a previous set of patterns in the ordering.

FIG. 25B shows an example where the number of factors represented in the graphical representation is even. In one or more embodiments, the graphical representation represents an odd number of factors as shown in FIG. 23 and FIG. 25C. In other words, there is an even-numbered set of factors used in the fractal sequence and a remaining single factor. In one or more embodiments, the generating a plurality of axis (e.g., in operation 2402 of method 2400) comprises generating remaining axes for the remaining single factor that terminates the fractal sequence.

In one or more embodiments, the method 2400 optionally comprises an operation 2412 that includes attaching any remaining axis corresponding to a factor of the design of the experiment to the fractal sequence (e.g., in cases where there are an odd number of factors). In one or more embodiments, attaching any remaining axes comprises determining if there are any remaining axes (e.g., by determining if there are an odd or even number of factors for representation in a graphical representation).

One example of a tree view with an odd number of factors is shown in FIG. 23. Each of the remaining axes comprises a respective middle point between the two endpoints of the respective remaining axes. Each of the remaining axes is attached at free endpoints of axes of the fractal sequence at the middle point.

Another example is a grid view with an odd number of factors as shown in FIG. 25C. In this case remaining axes 2530 corresponding to a factor of concentration intersects each of the vertical axes of the last set of patterns (i.e., axes corresponding to a factor of temperature). Based on the arrangement of the grid view, the remaining axes 2530 also cross the vertical axes corresponding to a factor of catalyst One of ordinary skill in the art will appreciate that the remaining axes 2530 could have instead intersected each of the horizontal axes of the last set of patterns (here, axes corresponding to a factor of stir rate). Since there were only two level assigned to the factor of concentration, there is only one axes in each of the quadrants formed by the last set of patterns of the fractal sequence. However, if there were more levels, there could be more axes intersecting the vertical (or horizontal) axes of the last set of patterns. For instance, if there were k levels, there would be k-1 axes intersecting the vertical (or horizontal) axes of the last set of patterns.

In one or more embodiments, the method 2400 optionally comprises an operation 2410 that includes determining whether to extend any axes 2414. This is useful in embodiments in which the factors potentially have different numbers of levels assigned to each factor. For instance, a given factor may have more than two levels (or some other minimum number of levels assigned to a factor). In a scenario in which it is determined that an extension is useful to represent more levels, in an operation 2416, there is an extension of a selected axis.

Figure 26A:
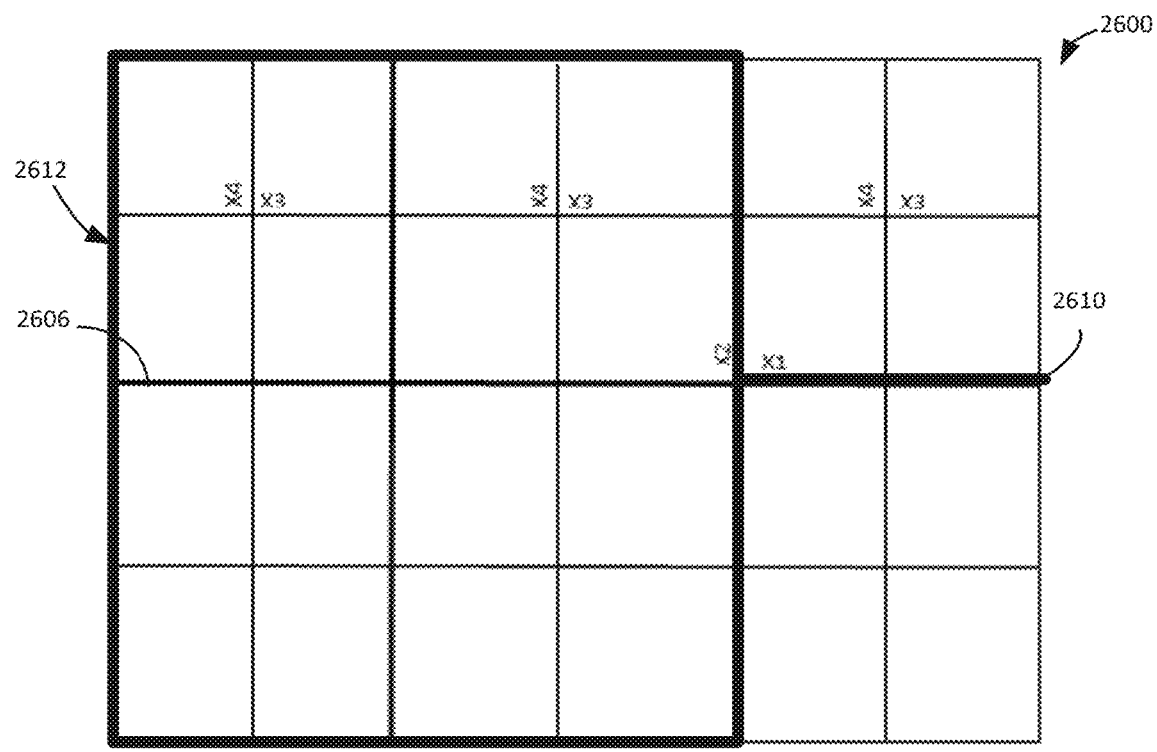
FIGS. 26A-26C illustrate example graphical representations involving multiple factors, with some factors having more than two levels according to a grid view in at least one embodiment of the present technology.
Figure 26B:
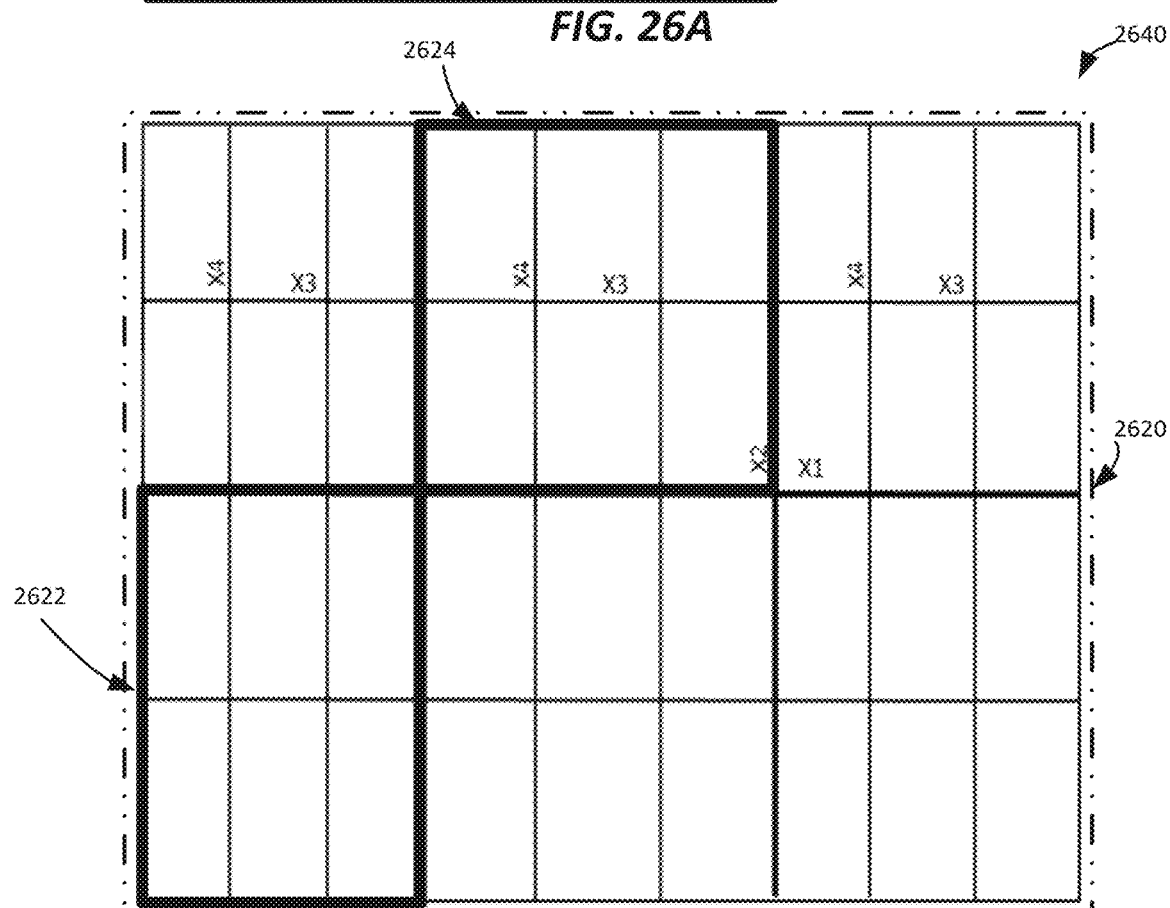
Figure 26C:
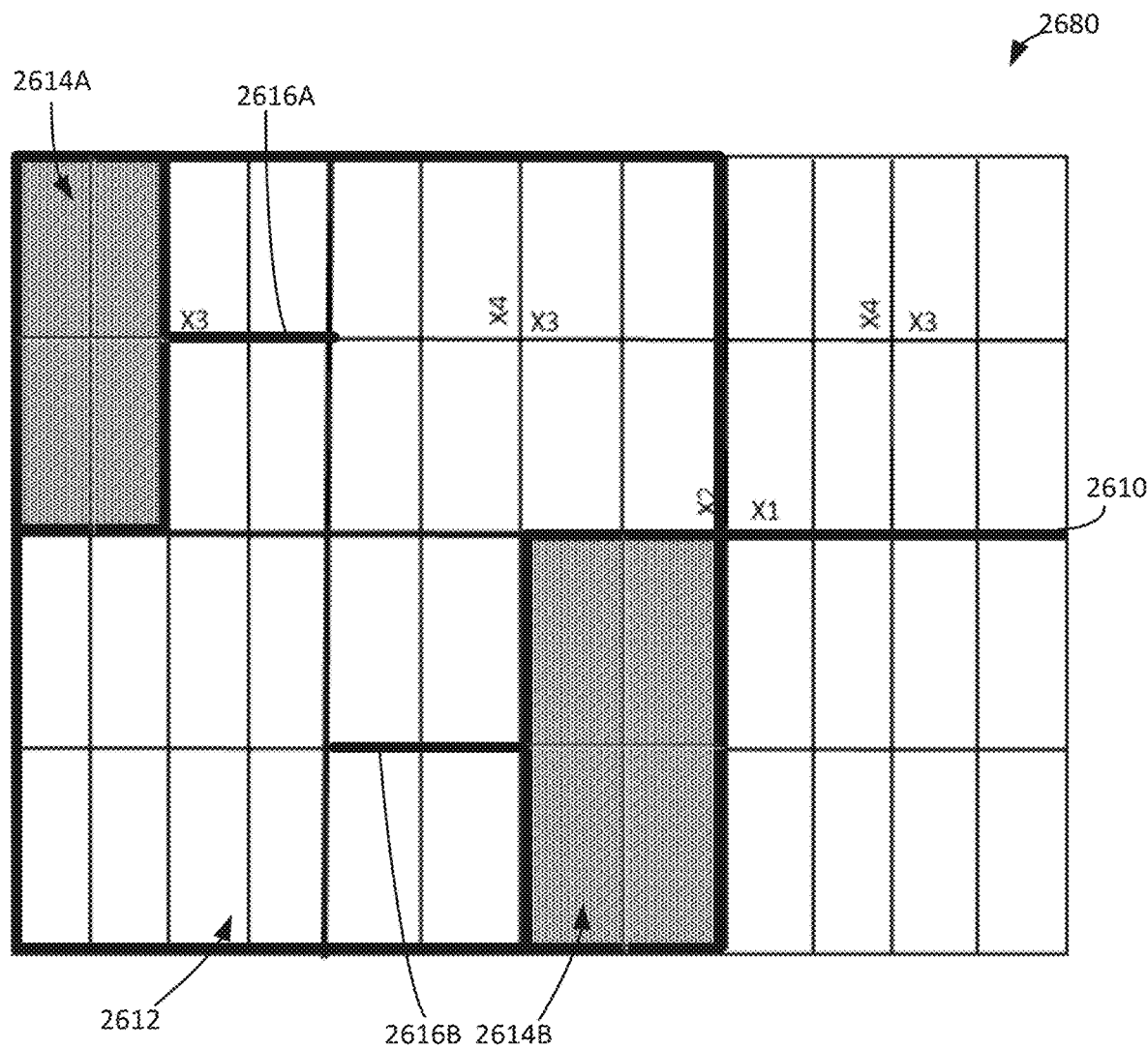

FIGS. 26A-26C illustrate example graphical representations involving multiple factors, with some factors having more than two levels according to a grid view where it may be necessary to extend one or more axes of a fractal sequence. For instance, in one or more embodiments (e.g., ones involving a grid view), a given pattern of the fractal sequence has a first axis of perpendicular axes of the given pattern corresponding to a first factor with k number of levels where k is more than two. The computing device generates the graphical representation with an extended axis from an endpoint of a second axis of the perpendicular axes perpendicular to the first axis with k-1 perpendicular axes spaced on the combined second axis and extended axis, the perpendicular axes corresponding to the first factor of the first axis.

In FIG. 26A-C there are factors X1-X4 displayed in a graphical representation 2600 according to a grid view as described herein. In FIG. 25A, X1, X3, and X4 have two levels allocated to each, and X2 has three levels allocated to it. The X1 axes has an extended axis component 2610 from an endpoint of the main axis 2606 of the first pattern 2612. The entire X1 axis is a combination of the main axis and the extend axis component 2610. Spaced on the X1 axis, are k-1 perpendicular axes where k is equal to the number of levels assigned to the X2 factor.

In FIG. 26B, X1 and X3 have two levels allocated to each, and X2 and X4 has three levels allocated to it. The factors are displayed in a graphical representation 2640 according to a grid view as described herein. Since, the patterns have a common factor for each of respective vertical and horizontal axes, the operation 2414 could involve determining that no extension is necessary. Rather the fractal pattern has a large grid pattern 2620 and a set of small grid patterns (e.g., small grid pattern 2622) joined to the first pattern at the four endpoints of the perpendicular axes of the large grid pattern 2620. There are also interior small grid patterns (e.g., interior small grid pattern 2624) joined to the large grid pattern 2620 at points corresponding to levels of the factors of the grid pattern. Alternatively, this graphical representation could be generated using an extension approach as described with respect to FIG. 26A and FIG. 26C if the pattern of the fractal sequence where different.

In FIG. 26C, X1 and X3 have two levels each; X2 has three levels; X4 has four levels. The factors are displayed in a graphical representation 2680 according to a grid view as described herein. Large grid pattern 2612 has been extended as described with respect to FIG. 26A. In this case small grid pattern 2614 is also extended. FIG. 26C shows two of the small grid patterns 2614A and 2614B with respective extension components 2616A and 2616B. As shown the extension of an extended axis can go in either direction. FIG. 26C shows extended axes 2616 going toward the perpendicular axes of the large grid pattern 2612. FIG. 26C also shows patterns that are proportionally similar in each of two dimensions of the graphical representation 2680. However, they are proportional by a different multiplication factor in individual dimensions.

One of ordinary skill in the art will appreciate a computing device may generate graphical representations with an extended self-similar fractal structures with operations completed in different orders than described in the method 2400 (e.g., for computational efficiency). For instance, the graphical representation in FIG. 26C, may generate a main axis and simply intersect that main axis with axis with k-1 axis where k is the number of levels of the next generated axis (i.e. X2) and the graphical representation may be built using a series of intersection to generate the same extended self-similar fractal structure of FIG. 26C according to an intersecting approach. Similarly, a graphical representation according to a tree approach can be generated according to a series of intersections at endpoints of axes according to an intersecting approach. Further, the generating a graphical representation in one or more embodiments, comprises determining the graphical representation and the displayed graphical representation is done all at once based on a determined graphical representation.

Figure 27A:
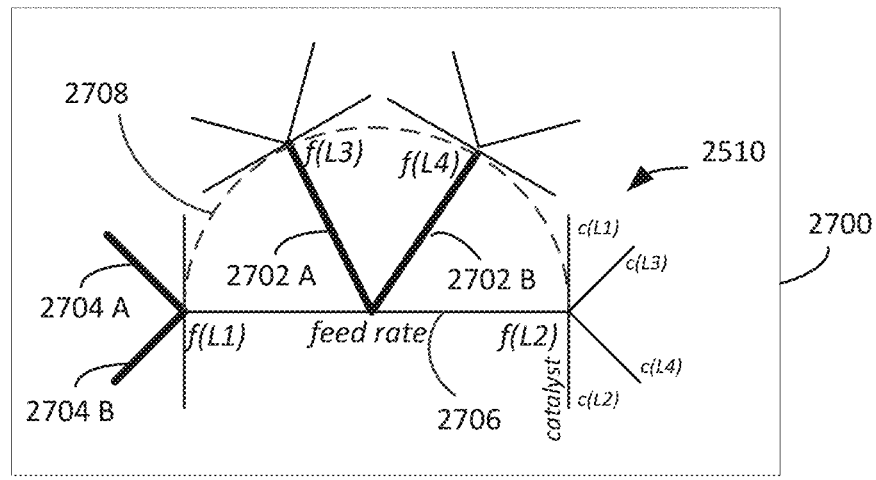
FIGS. 27A-27B illustrate example graphical representations involving multiple factors, with some factors having more than two levels according to a tree view in at least one embodiment of the present technology.
Figure 27B:
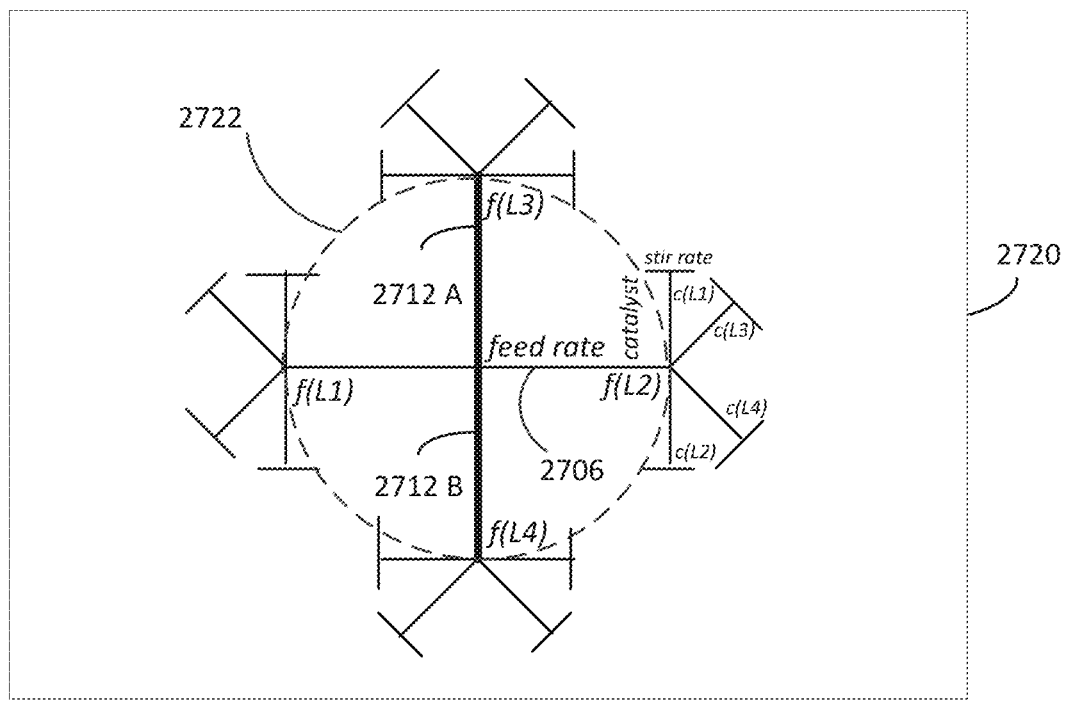

FIGS. 27A-27B illustrate example graphical representations involving multiple factors, with some factors having more than two levels according to a tree view with a design 2700. In this case, a region (e.g., a half-circle or circle) around the axes of the graphical representation (e.g., axes forming a fractal sequence) can be used to provide additional extension branches to represent additional levels for a given factor. In FIG. 27A, the first pattern 2510 has extension axes 2702 branching off an approximately middle point of the main axis. In this case, a factor represented by the main axis has four levels assigned (e.g., a feed rate factor with four possible different feed rates). In the design of 2700, the main axis 2706 forms an upper angle of 180 degrees, and the location of the extension axes 2702 in a half-circle region 2708 above the main axis 2706 are determined in that half-circle region 2708 based on a division of the 180 degrees to provide the maximum region between axes branching off the main axis 2706. This provides better visual clarity between factors. In this case, a factor assigned to the branches of the main axis also has four levels. A similar approach of dividing an upper angle (i.e. upper determined relative to proximity to a main axis) of 180 degrees is used for providing extension branches 2704 off the branches of the first pattern and extension axes 2702 (e.g., for a catalyst factor with four possible catalyst types). Other locations could be selected for extension axes 2702 and extension branches 2704. For instance, axes could be placed closer together to demonstrate a relationship between them (e.g., a relationship between the factors corresponding to the axes). Alternatively, extension axes 2702 could be added in the lower angle below the main axis 2706.

FIG. 27B has an alternative design 2720 in which an entire 360 degrees is used surrounding the main axis 2706 for placing extension axes 2712 in a circle region 2722 surrounding the main axis 2706. As shown this provides better visualization for more factors. The design 2720 also shows an example where there are three factors with the last factor having two levels (e.g. stir rate factor). Subsequent axes can be added differently (e.g., using only 180 degrees).

FIGS. 26A-C and FIGS. 27A-B gave examples of extension of a fractal sequence. Those of ordinary skill in the art could appreciate reductions of a fractal sequence (e.g. not branching in both directions from a main axis for only one level assigned to a factor) or removing axes in response to selecting fewer factors.

In one or more embodiments, the graphical representation represents data correlated with the design of the experiment. For instance in one or more embodiments, the method 2400 comprises an operation 2418 that includes populating the graphical representation with the plotted data (e.g., data 2140) based on information related to the design of the experiment.

As an example, the information related to the design of the experiment could be unique numbers assigned to test cases within the design of the experiment FIG. 23 shows an example graphical representation 2312 populated with plotted unique numbers of the test cases. The run numbers are displayed at end points of the graphical representation based on the test conditions of that experiment as described herein. In one or more embodiments, a computing device displays an interactive graphical user interface (e.g., interactive graphical user interface 2300) with the graphical representation 2312 comprising the unique numbers.

FIGS. 25-25C show examples of run placement in a grid view in which the run numbers are placed within quadrants of a window of the fractal sequence. As shown in FIG. 25A, since the graphical representation with large grid 2500 is collapsed down to only two factors multiple runs are placed within a given quadrant. Similarly, large tree pattern 2510 has multiple run numbers placed at endpoints of the tree pattern.

One or more embodiments described herein, presents a technical improvement over prior art techniques by providing a two-dimensional representation to a user of a graphical interface of a design having more than three factors and/or more than two levels assigned to the different factors.

Figure 28:
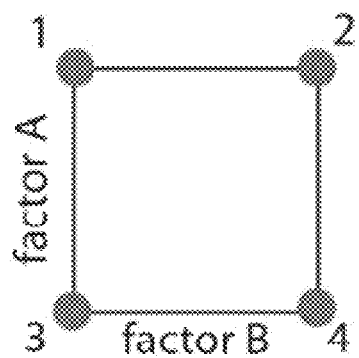
FIG. 28 illustrates a prior art technique of a three-dimensional visualization of factors.
Figure 28:
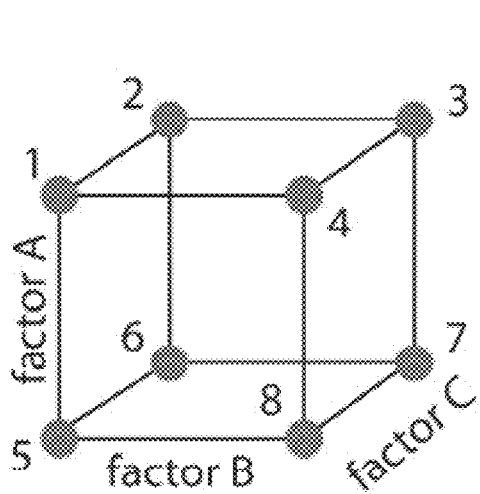

FIG. 28 shows a prior art technique in which a three-dimensional representation is computed to show three factors in more than two levels and each of the factors only has two levels assigned (a "+" level and a "−" level). A single cube could not be used by itself to show more than three factors. Thus, claimed embodiments, provide an advantage of this computing technique by providing a two-dimensional representation of three or more factors. One or more embodiments herein could also be represented three-dimensionally (e.g., using a three dimensional fractal pattern or having extension axis that extended out from a plane formed by a two-dimensional pattern).

One or more embodiments described herein present other technical improvements in specific application that will be described in more detail below. Each of these different examples below are applicable to multi-factor, multi-level applications as described herein. For simplicity examples are described with respect to multiple factor applications, where each factor has two levels.

For instance, one or more embodiments provide an improvement for determining the quality of a design. For instance, a computing device displays in proximity to the graphical representation an indication of a holistic score for the design of the experiment (e.g., a design efficiency).

Figure 29A:
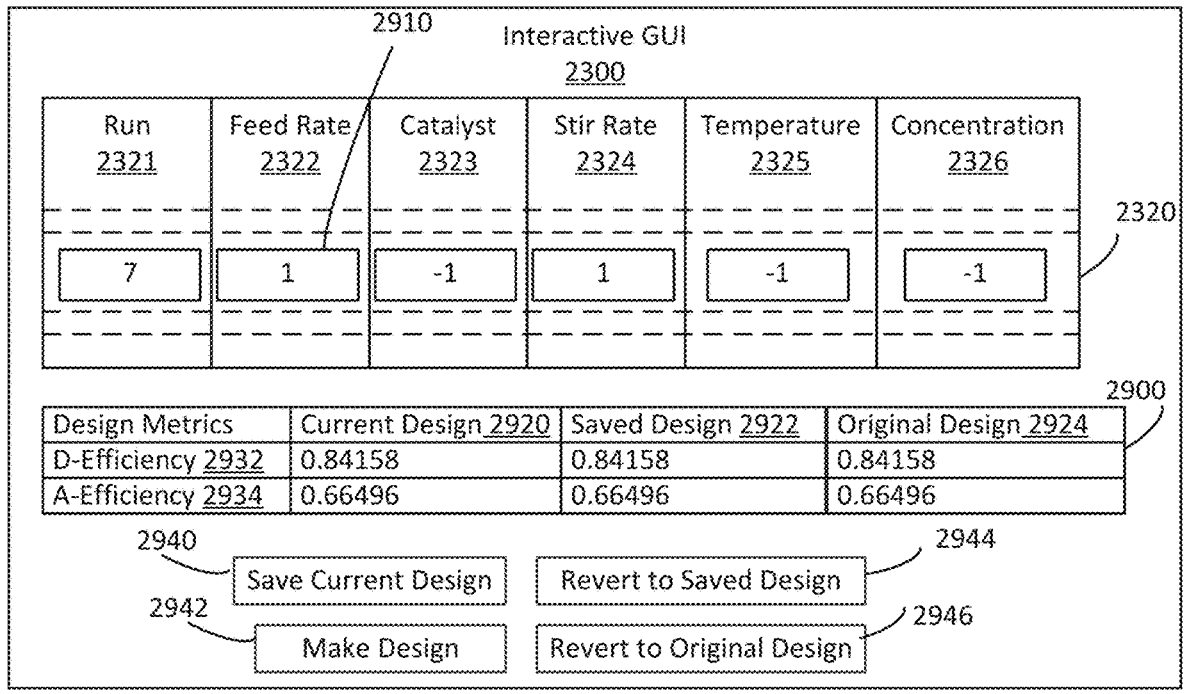
FIGS. 29A-29B illustrate an example interactive graphical user interface with design metric evaluation in at least one embodiment of the present technology.
Figure 29B:
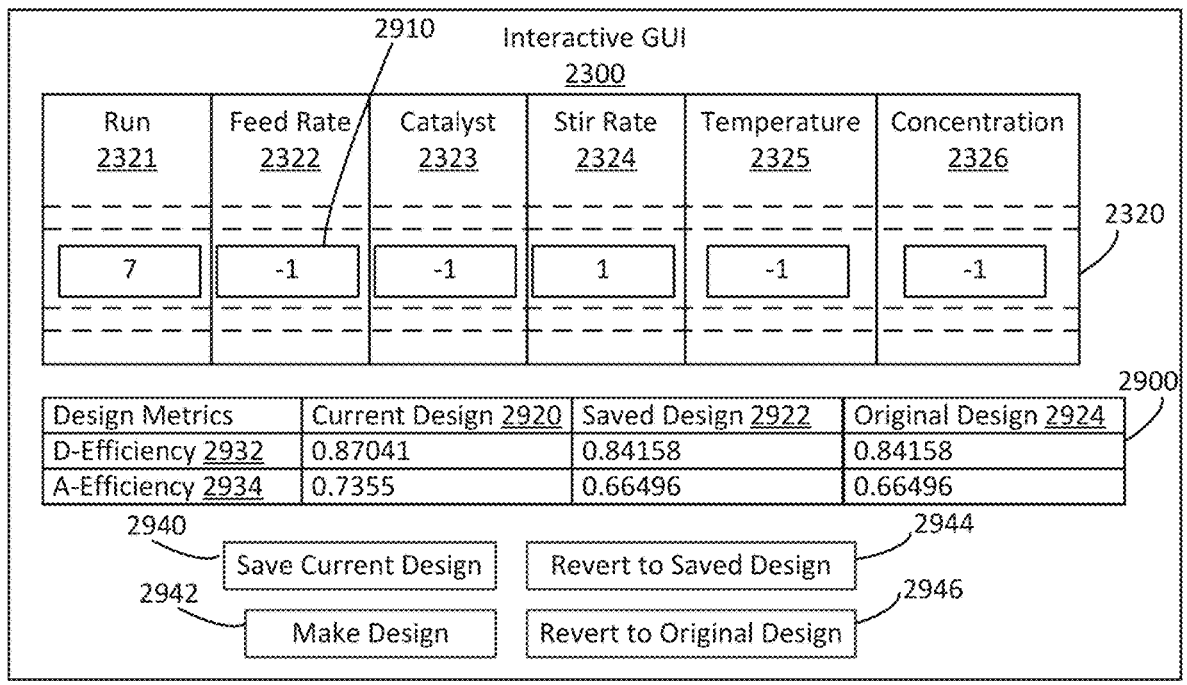

FIGS. 29A and 29B show an example interactive graphical user interface 2300 including a design metrics section 2900 to display one or more holistic scores for evaluating a design of an experiment. For clarity other components of data control 2320 are omitted from FIGS. 29A and 29B. Other control components of interactive graphical user interface 2300 may or may not be present in the example provided with respect to FIGS. 29A and 29B.

In the design metrics section 2900, there are three columns: Current Design 2920, Saved Design 2922, and Original Design 2924. The Current Design 2920 column shows the metrics for the design currently being displayed. In one or more embodiments, manipulating a representation of a factor of the experiment changes the holistic score for the design. For example, a value in the Current Design 2920 column will update in response to a change to the displayed design.

Two popular design metrics for assessing experimental designs are Determinant-efficiency (D-efficiency) 2932 and Average-efficiency (A-efficiency) 2934. As the user changes the factor levels in the particular run, efficiency values will change accordingly to reflect the metrics for the current design. For example, as shown in FIG. 29A, the test condition 2910 is "1" and in FIG. 29B the test condition 2910 is changed to "−1". Accordingly, the D-Efficiency values and A-Efficiency values of the Current Design 2920 have changed.

D-Efficiency is the efficiency of the design to that of an ideal or hypothetical orthogonal design in terms of the D-optimality criterion. A design is D-optimal if it minimizes the volume of the joint confidence region for the vector of regression coefficients according to equation (12):

$$D-\text{Efficiency} = 100\left(\frac{1}{n}|X'X|^{\frac{1}{p}}\right) \quad (12)$$

where X is the model matrix, n is the number of runs in the design and p is the number of terms, including the intercept, in the model.

A-Efficiency is the efficiency of the design to that of an ideal orthogonal design in terms of the A-optimality criterion. A design is A-optimal if it minimizes the sum of the variances of the regression coefficients according to equation (13):

$$A-\text{efficiency} = 100p/(n\text{Trace}(X'X)^{-1})) \quad (13)$$

where X is the model matrix, n is the number of runs in the design and p is the number of terms, including the intercept, in the model.

Other evaluations could be made (e.g., G-efficiency, average variance of prediction, design creation time, etc.). Design creation time is useful in environments in which it may take greater computational time to compute a given experiment outcome based on levels selected for an individual test cases.

Saved Design 2922 column represents visually a storage of the values for a design saved by the user and will update when the user of the graphical user interface 2300 indicates to do so (e.g., by clicking the Save Current Design button 2940) or the user changes the graphical representation (e.g., to project over more or less factors). The values in the Saved Design 2922 column will then change to those shown in the Current Design 2920 column. Original Design 2924 column represents visually a storage of the values for the original design used to generate the initial design and will change only for projection changes. Values in the Saved Design 2922 column and Original Design 2924 column provide the user of the graphical user interface 2300 with a standard for comparing different designs.

As shown in FIG. 29B, changing the Feed Rate 2322 test condition 2910 increased the D-Efficiency 2932 and A-Efficiency 2934 which is a desirable improvement, and the user most likely would save this design. However, if the efficiency had not approved as desired, the user of the graphical user interface 2300 could instead use controls such as the Revert to Saved Design button 2944 or Revert to Original Design button to revert to a better design. Additionally or alternatively, even though the efficiency score may be objectively worse, the user may still save the design if the design achieves other goals (e.g., filling in coverage holes). For instance, a user of the graphical user interface 2300 can evaluate the difference in an efficiency score in conjunction with the visual representation to determine a trade-off with loss of efficiency versus filing in coverage holes.

In one or more embodiments, the user of the graphical user interface 2300 can project down to fewer factors (e.g., unchecking boxes shown in factor control 2330 of FIG. 23) to make improvements in efficiency in that projection and then return back to the original design to see how their changes affected the overall design. For instance, there may be improvements at a lower projection, but result in a slightly worse overall design. The user can then decide whether to accept this loss in efficiency or stick with the original saved design.

In one or more embodiments, the computing device generates the experiment (e.g., a computer simulation experiment) in response to user input. For instance, the user can click the Make Design button 2942 to indicate to the computing device to generate and run an experiment.

One or more embodiments described herein present technical improvement for applications involving conducted experiments according to a design. For instance, in one or more embodiments, a computing device receives results of the experiment according to the design of the experiment. Results can be provided by user input or from a computing device or system performing the testing (e.g., if the computing device is performing the testing). This is also useful for screening to identify key factors that affect responses in an experiment.

The computing device receiving the results can populate the graphical representation with values. Each of the values corresponds to a result of each of the test cases for the experiment according to the design. An example of a viewer that provides analysis of response data is the analysis fractal by SAS Institute Inc. of Cary, N.C. The computing device displays the interactive graphical user interface of the graphical representation comprising the values.

FIGS. 30A-30D illustrate an example graphical representation depicting representations of results of an experiment conducted according to the catalyst experiment as described herein (e.g., in a viewer 2310 in graphical user interface 2300). Instead of row numbers for test cases as shown in FIG. 23 for the catalyst experiment, the value of the results (i.e. a response) of the experiment can be plotted. With the interactivity, a user can see if there are particular regions of interest for the response related to just a few factors. Fitting a model would already give an indication to large effects, which would provide a natural ordering. The plotted values in FIG. 30A where values given for the response (percent rated). The goal of the catalyst experiment is to maximize the response, so higher values are more desirable.

In one or more embodiments, where the computing device receives information comprising results of the experiment according to the design of the experiment, the computing device can select a prioritization of the plurality of axes in the fractal sequence based on the results of the experiment (e.g., in response to testing result or user input). For instance, FIG. 30B illustrates a graphical representation in viewer 2310 depicting results of an experiment with the priority of all the factors (i.e., catalyst, temperature, concentration, feed rate, and stir rate) reordered based on analysis performed by the computing device. In particular, the computing device performed a regression analysis and reducing the model (not shown) suggests the significant terms are the main effects for Catalyst, Temperature, and Concentration, and the interactions Catalyst*Temperature and Temperature*Concentration. Then the graphical representation in the viewer 2310, although still showing all the factors, has catalyst, temperature and concentration shown more prominently. For instance, a catalyst factor is correlated with a main axis 3000 instead of a feed rate factor. A temperature factor is correlated with an axis 3010 that intersects main axis 3000 as part of a first pattern. Alternatively, a user could manually select particular factors to find the most significant factors using, e.g., the factor control 2330 of FIG. 23.

Figures 30C, 30D:
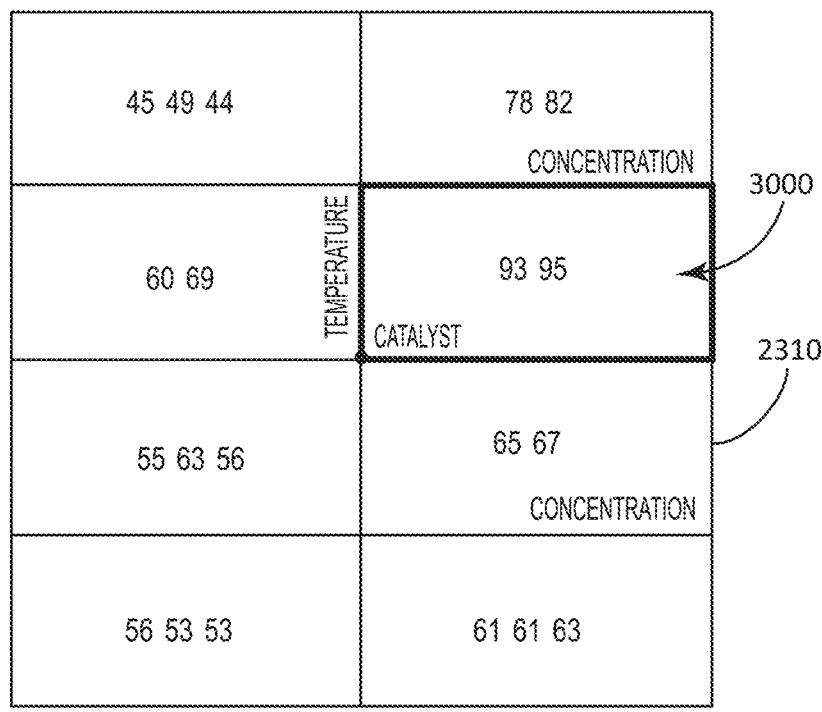

FIG. 30B shows the graphical representation after reordering the plot hierarchy. FIG. 30C is the reordered plot hierarchy, but with the factors Feed Rate and Stir Rate projected over. By examining either of these figures, one can see Catalyst at the high level, Temperature at the high level, and Concentration at the low level provide noticeably larger responses as shown in region 3000 of the viewer 2310.

The plot could also be useful for residual checking by investigating a few potentially significant interactions (based on the given model) that were not originally included. If one sees a pattern in the graphical representation, it can suggest the model is missing one or more terms. For example, consider the reactor data if main effects for Catalyst, Temperature, and Concentration, and the interactions Catalyst*Temperature were included in the model, but Temperature*Concentration was not.

As shown in FIGS. 30A-30C, in one or more embodiments, the results of the experiment are an observed result after conducting the experiment Another way to look for patterns is to plot predicted results, e.g. to determine the design of the experiment.

Another way to look for patterns in data is to plot residuals where a residual is the difference between an observed result and a predicted result FIG. 30D shows a graphical representation plotting the residuals (rounded to 1 decimal place) for the experiment shown in FIGS. 30A-30C. Not only does the graphical representation suggest the residuals have issues with independence, it even points to which term is missing based on the pattern of the residuals.

Figures 31A, 31B:
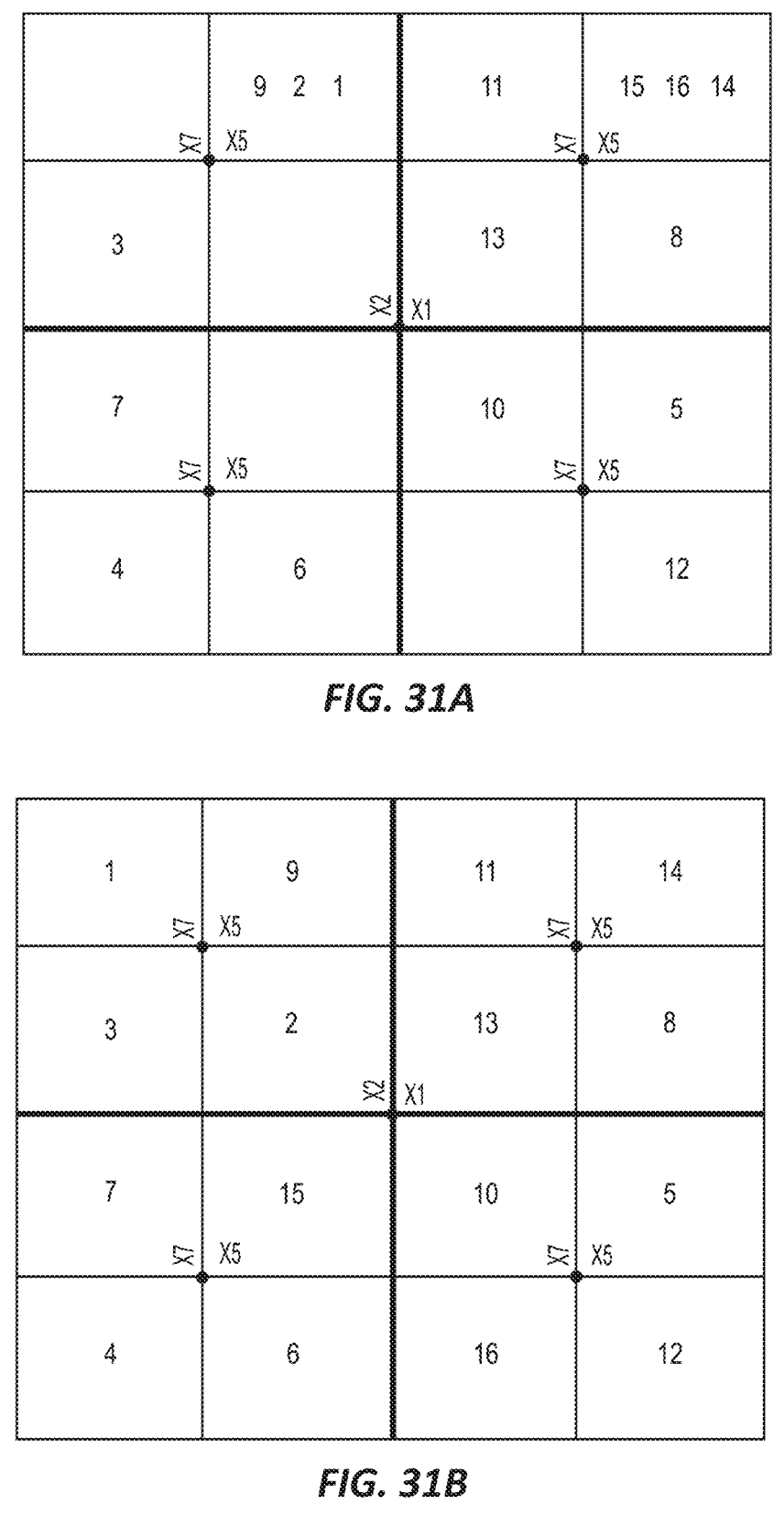

One or more embodiments described herein present technical improvement for applications involving designing or otherwise diagnosing a designed experiment with a particular strength for a combinatorial test design as described herein. In particular, one or more embodiments, provide a tool to investigate particular projections of interest such as how well factors are covered and what needs to be done to make a projection of interest have full coverage. FIGS. 31A-31B illustrates graphical representations for diagnosing covering arrays in at least one embodiment.

Consider a strength 2 or 3 covering array as described herein, with a graphical representation showing four factors of seven factors (i.e., investigating projections into 4 dimensions). FIG. 31A shows a strength 3 binary covering array (that is, any three-factor projection contains every level combination at least once) in 16 runs representing factors X1, X2, X5, and X7. FIG. 31A presents a covering array of a binary case (i.e. 2 level inputs for each factor). However, this same technique could be used for mixed-level covering arrays or covering arrays with more than two levels for one or more factors. FIG. 31A shows four gaps in coverage.

One or more embodiments include a graphical user interface (e.g., graphical user interface 2300) that allows a user to manually adjust the graphical representation or data plotted by the graphical representation as described herein to fill in gaps for the particular projection. In this case runs 1, 2, 15, and 16 can be adjusted to fill in the gaps. That is, (X1, X2, X5, X7) should be (−1, 1, −1, 1), (−1, 1, 1, −1), (−1, −1, 1, 1) and (1, −1, −1, −1). FIG. 31B shows an adjusted design to provide better coverage in the particular projection of interest for factors X1, X2, X5 and X7.

One or more embodiments herein are useful in conjunction with manipulating free cells (also known as "do not care" cells). These are cells in a strength t covering array that do not contribute to the t-Coverage of the covering array. This means that they can be changed to any value from the range of values for the factor without affecting the t-Coverage of the covering array.

FIG. 31A shows a data control 3200 in a graphical user interface 3230 (e.g., graphical user interface 2300) for a design of an experiment comprising seven factors (X1-X7). In one or more embodiments, the computing device displays a representation that test conditions include free cells (e.g., in response to a user marking them as free cells or the computing device allocating certain cells as free cells). Data control 3200 optionally has a Do Not Care 3210 column for toggling each cell in an entire run or row as a free row of do not care cells (i.e. runs 2, 14, 15 and 16). Alternatively or additionally, individual cells could be marked in a particular factor column indicating that the cells may be changed without impacting the coverage of the covering array. This is particularly useful in applications where only some of the cells in a row are free cells. A check mark is shown as an indicator that a cell is a free cell, but any symbol could be used (e.g., a green dot enclosing a check mark). In this example, rows 2, 14, 15, and 16 contain all free cells for each test condition of a row, so these rows could be completely eliminated without affecting 3-Coverage.

Figure 32A:
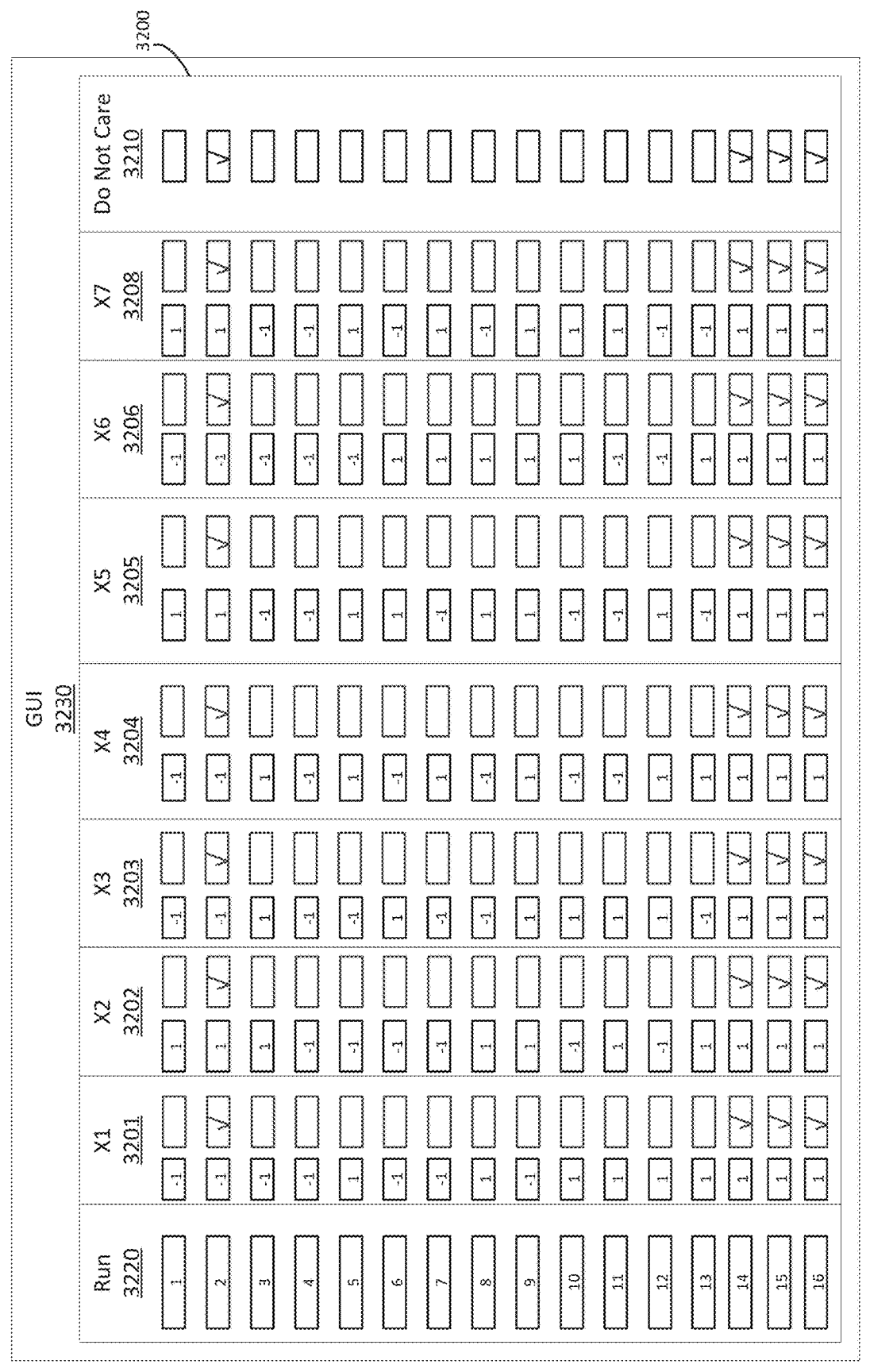

One or more embodiments enable manipulation of the free cells to improve a holistic score for the design of the experiment that is a score related to a strength of a combinatorial test design. FIG. 32B shows graphical user interface 3230 comprising a design metrics section 3240 with a holistic score for indicating 3-Coverage 3242 and a holistic score for indicating 4-Coverage 3244. The runs 2, 14, 15, and 16 have been augmented without changing other rows (e.g., run 1), so the 3-Coverage remained at 1. The 4-Coverage in the original design 3245 was only 0.7125 and is now in the current design 3241 improved to 0.78929.

Figures 32C, 32D:
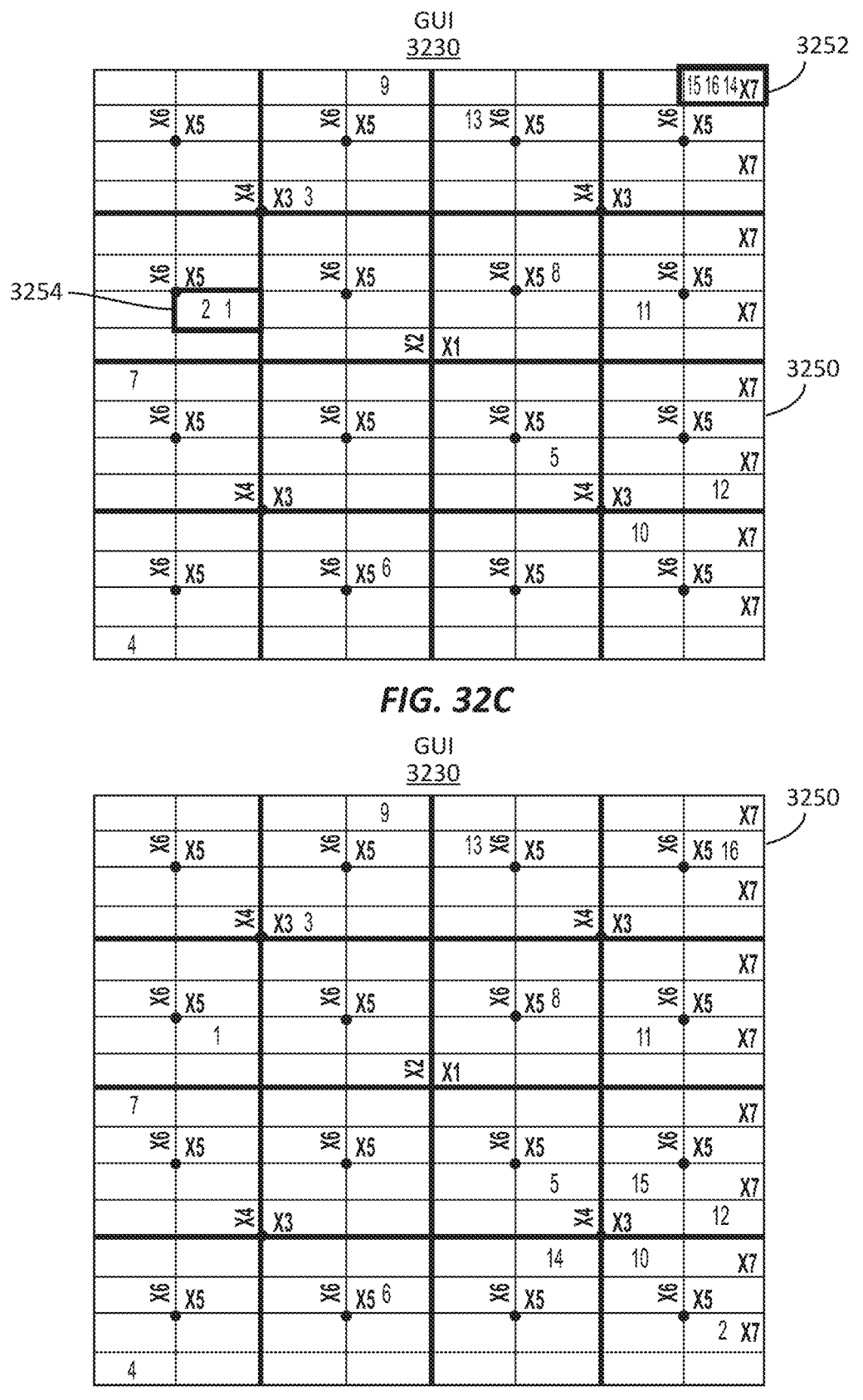

FIG. 32D shows the corresponding graphical representation in a viewer 3250 showing how the design has been optimized to improve coverage from the original design in FIG. 32C. As explained herein, the levels assigned in the data control 3200 could have also been augmented by interaction with the graphical representation. In particular, the viewer 3250 shows that there was duplicate coverage in the original design of FIG. 32C in portions 3254 and 3252 of the viewer 3250. One or more of these test cases could have been manually moved to other portions of the viewer 3250. The new optimized design does not suffer from that same duplication of test cases and is an improved design for an experiment.

One or more embodiments are useful for determining an optimal design for an experiment (e.g., an optimal screening design). For instance, one or more embodiments, are particularly useful in scenarios when the number of factors of an experiment or test runs is too numerous to computationally or visually determine an optimal design for an experiment given time or processing constraints, or in scenarios when there are no known preexisting designs for an experiment given a quantity of requested factors and test cases for an experiment.

Figure 33:
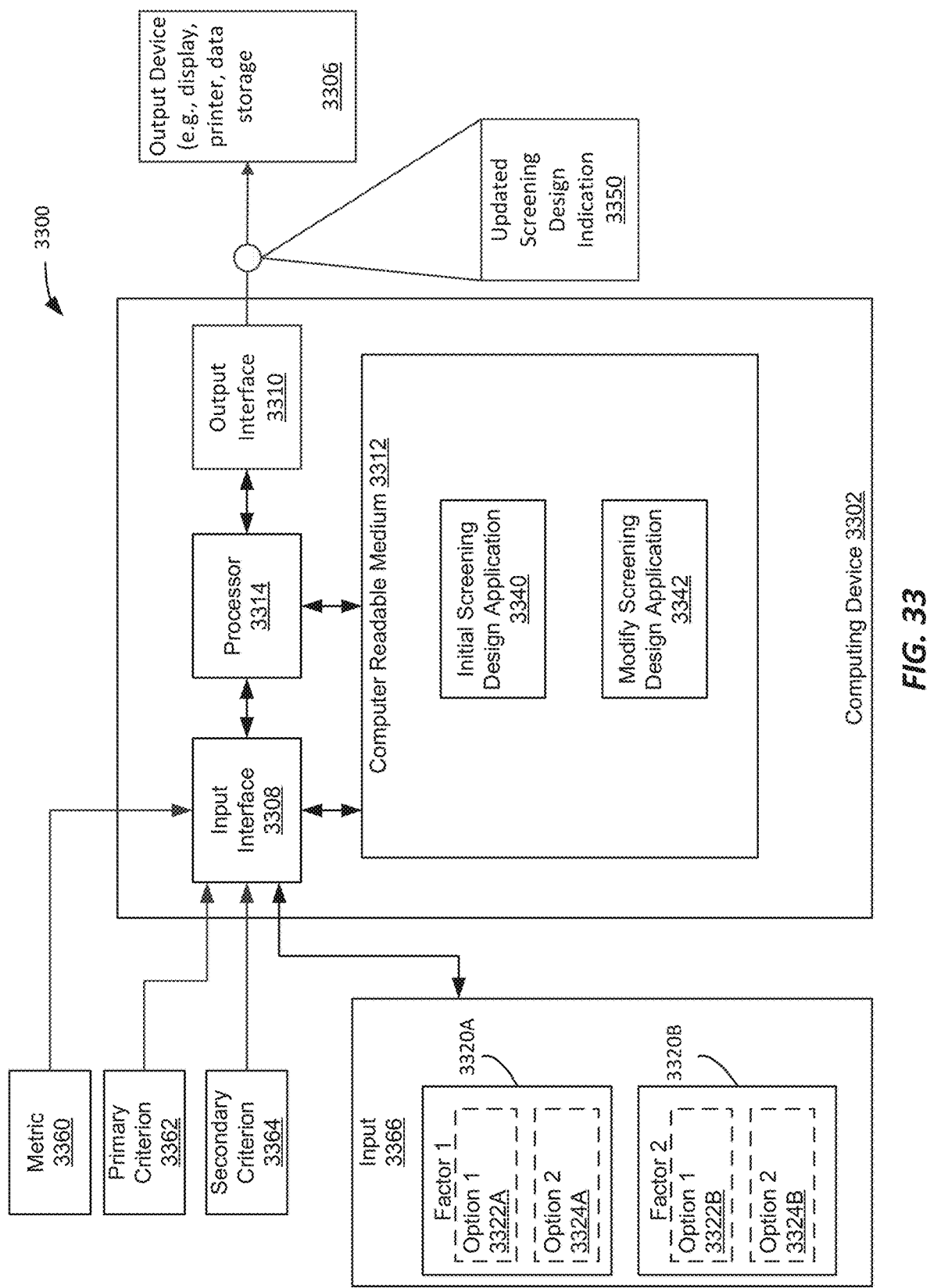
FIG. 33 illustrates an example block diagram of a system for outputting a screening design for an experiment in one or more embodiments.

FIG. 33 illustrates an example block diagram of a system 3300 for outputting a design (e.g., an optimal screening design) for an experiment in one or more embodiments. The system 3300 includes a computing device 3302 useful for outputting a design for an experiment. In one or more embodiments, the computing device 3302 is the same or different from computing devices described herein (e.g., computing device 2102 or computing device 1302).

The system 3300 is configured to exchange information relevant to an output for a design for an experiment between devices (e.g., output device 3306) in the system (e.g., via wired and/or wireless transmission) and/or devices in other systems described herein (e.g., system 1300 and system 2100). For example, a network (not shown) can connect one or more devices of system 3300 to one or more other devices of system 3300, system 2100, or system 1300. In one or more embodiments, fewer, different, and/or additional components than shown can be incorporated into the system 3300 (e.g., components of system 2100 or system 1300).

In one or more embodiments, the computing device 3302 obtains information related to outputting a design of an experiment via an input interface 3308. In one or more embodiments, the input interface 3308 comprises one or more features of an input interface described herein or is an input interface described herein (e.g., input interface 1308). In one or more embodiments, the computing device 3302 obtains metric information (e.g., metric 3360). The metric information includes, for example, a metric indicating a quantity of test cases for an output design of an experiment. Quantity is also sometimes referred to as a number or amount (e.g., a number of test cases or amount of test cases).

The information may be obtained by the computing device 3302 by receiving the information (e.g., entered from a user of the computing device 3302). A metric could be entered or selected by a user from a qualitative label that represents or indicates a metric N As for example, a user could select a qualitative label of a high number of runs to represent a metric of 300 or more test cases. In one or more embodiments, the system 3300 includes (e.g., input or output devices described herein) for receiving information related to the design of an experiment and providing it to the computing device 3302 (e.g., sending or transmitting over input interface 3308). Alternatively, the information is obtained from one or more default values stored in the computing device 3302 (e.g., in computer readable medium 3312).

In one or more embodiments, the computing device 3302 obtains other information relating to a design of an experiment. For instance, the computing device may receive input 3366 indicating multiple factors for the output design. For instance, the input 3366 could be metric information indicating a number of factors (e.g., factors 3320) and options for those factors (e.g., options 3322). Additionally or alternatively, input 3366 could be labels for the particular factors and labels for the options associated with the experiment. For instance, if the experiment were an experiment for a chemical process, the input 3366 could be labels received from a user for factors relevant to the chemical process (e.g., catalysts used, temperature of the solution, stir rate, etc.). The option labels assigned to each factor could be discrete (e.g., different catalyst types) or continuous (e.g., a range of possible temperatures or stir rates). Alternatively, or additionally, the computing device 3302 could have a default number of factors or options (e.g., a default option of 2 for factors that do not specify particular options).

In one or more embodiments, the computing device 3302 obtains one or more criterion for scoring or otherwise evaluating the output design. For instance, the computing device 3302 obtains a primary criterion 3362 and a different secondary criterion 3364 (e.g., criteria that an optimal design would satisfy). The one or more criterion may be input by the user of the computing device 3302 (e.g., by selecting amongst different options for the design). In one or more embodiments, the computing device 3302 displays a graphical user interface (e.g., on an output device 3306) indicating multiple criterion for the primary criterion and/or the secondary criterion for user selection. The computing device 3302 receives user input indicating a selected one or multiple ones of each of a primary criterion or secondary criterion. Additionally or alternatively, the one or more criteria are default values for determining an optimal design.

In one or more embodiments, the computing device 3302 is useful for determining an optimal screening design for an experiment A screening design is used for identifying one or more active factors of the experiment each of which independently effect an outcome of a given test case of the experiment. A common goal of screening designs is to screen through only those inputs that have the greatest effect on the output. Based on the principle of sparsity of effects, a system is usually dominated by only a few factors or low level interactions between factors. Other potential effects, such as interactions between factors and curvature effects, are typically of less importance at the screening design stage.

In one or more embodiments, the primary criterion is used as a measure of design quality for the effectiveness of a screening design. For instance, the primary criterion is related to scoring an efficiency of a screening design at identifying the one or more active factors of an experiment each of which independently effect an outcome of a given test case of the experiment.

In one or more embodiments, the designer of the experiment has additional goals beyond determining an optimal screening design for an experiment. For instance, there may be multiple optimal screening designs and a user of the computing device 3302 can consider other criteria for the screening design different from the primary criterion.

In one or more embodiments, the computing device 3302 has a computer-readable medium 3312 (e.g., computer-readable medium 2112 or 1312) and a processor 3314 (e.g., processor 2114 and/or processor 1314). For instance, computer-readable medium 3312 comprises one or more features of one or more computer-readable mediums described herein or is one of computer-readable mediums described herein (e.g., computer-readable medium 1312 or computer-readable medium 2112). Additionally, or alternatively, processor 3314 comprises one or more features of one or more processors described herein or is one of processors described herein (e.g., processor 1314 or processor 2114). For instance, in one or more embodiments, computer-readable medium 3312 stores instructions for execution by processor 3314. For example, computer-readable medium 3312 comprises instructions for determining a design of an experiment, evaluating or scoring a design of an experiment, and generating an updated design of an experiment.

In one or more embodiments, the initial screening design application 3340 determines whether there are stored instructions (e.g., stored in a computer-readable medium described herein) for generating an initial screening design for the experiment. The initial screening design is for identifying one or more active factors of the experiment each of which independently affect an outcome of a given test case of the experiment. Another words, in one or more embodiments, the initial screening design application 3340 determines whether there is a preexisting stored design (e.g., a known or preexisting design generated from stored instructions) for an initial screening design for the experiment. The preexisting stored design can preexist or is known before any particular obtained input or metrics for an experiment. For instance, the application may have a search or query function for searching, based on possible quantities of factors and test runs for an experiment, stored design instructions for constructing a known or preexisting design. Alternatively or additionally the stored instructions could be related to fetching stored design data or tables correlated with possible quantities of factors and test runs for an experiment (e.g. simple or commonly selected designs may be stored in an electronic library of complete designs). Responsive to determining that there are stored instructions for generating the initial screening design for the experiment, the initial screening design application 3340 selects, using the stored instructions, the initial screening design for the experiment.

In some cases, the initial screening design application 3340 can use stored instructions for an initial screening design to directly construct an output design. For instance, the initial screening design application 3340 determines whether there are stored instructions for generating a test suite correlated with one or more of a possible metric 3360, input 3366 and factors 3320. In some cases, the computing device determines that there are stored instructions and generates, using the stored instructions, an initial screening design for the experiment. In other case, the computing device determines that there are not stored instructions but determines that one or more of the stored instructions can be used to create one or more candidate designs for the experiment. In this case, the initial screening design application 3340, selects one of the candidate designs as the initial screening design. In yet other cases, the computing device determines that there are not stored instructions for the initial screening design for the experiment (e.g., there are not known designs or candidate designs for the experiment), and no selection is performed for an initial screening design for the experiment.

In one or more embodiments, the computer readable medium 3312 comprises stored instructions for generating an initial screening design that is a preexisting design correlated with possible metric 3360, input 3366 and/or factors 3320. In this case, the computing device 3302 can select the initial screening design by executing stored instructions to directly generate, responsive to a given metric indicating an amount of test cases and a given number of factors, one or more candidate initial screening designs. Additionally or alternatively, the computer readable medium 3312 comprises an electronic library of initial screening device correlated with possible metric 3360, input 3366 and/or factors 3320. In this case, the computing device 3302 can select the initial screening design by executing stored instructions for retrieving one or more candidate initial screening designs from memory (e.g., stored in an electronic library).

In one or more embodiments, the initial screening design application 3340 evaluates the initial screening design (e.g., it evaluates a quality of the initial screening design or other criteria for the initial screening design). For instance, the initial screening design application 3340 computes an initial score for a primary criterion for the initial screening design. In one example, the primary criterion is related to a quality of the initial screening design and the initial score indicates an efficiency of the initial screening design at identifying one or more active factors.

In one or more embodiments, the computer readable medium comprises additional applications for refining the initial screening design (e.g., a modify screening design application 3342). The modify screening design application 3342 is shown as a separate application from the initial screening design application 3340 merely as an example. In other examples, functionality described herein for these applications are implemented by a single application or are distributed across different applications. In one or more embodiments, the computing device 3302 comprises a modify screening design application 3342 for determining whether to modify the initial screening design based on modification criteria. For instance, the modification criteria may comprise the secondary criterion in a case where the output design will satisfy or optimize both the first criterion and the secondary criterion. Alternatively or additionally, the modification criteria comprises a quantity of test cases, and indicated factors for the experiment. For instance, the selected initial design may be merely a candidate design as a starting point and modifications are need to ensure an output design has a certain quantity of test cases or factors.

In one or more embodiments, the modify screening design application 3342 responsive to determining, based on the modification criteria, to modify the initial screening design, generates an updated screening design for the initial screening design. For instance, the modify screening design application 3342 generates one or more modified screening designs that each has at least one option for a corresponding test case different from the initial screening design. The modify screening design application 3342 evaluates the one or more modified screening designs by computing a respective score for the primary criterion for each of the one or more modified screening designs. The modify screening design application 3342 determines that each of the one or more modified screening designs satisfies the primary criterion by respectively comparing the respective score for the primary criterion to the initial score for the primary criterion or a threshold score for the primary criterion. The modify screening design application 3342 computes a score for the secondary criterion for a given design of the one or more modified screening designs. The modify screening design application 3342 selects, based on the score for the secondary criterion, a given design of the one or more modified screening designs as the updated screening design.

In one or more embodiments, the modify screening design application 3342 outputs information to output device 3306 via output interface 3310. Output interface 3310 provides an interface for outputting information (e.g., related to a design of an experiment) for review by a user and/or for use by another application or device or multiple applications or devices (e.g., a display, printer, data storage). In one or more embodiments, output device 3306 is a device or is one of devices for displaying information relevant to the experiment (e.g., user selection criteria, design scores, or a design for an experiment).

In one or more embodiments, the computing device 3302 outputs an indication of the updated screening design for the output design of the experiment. For instance, the indication could be the output design itself. As an example, computing device could display, via a graphical user interface, an array for the output design. Each row of the array represents one of the test cases of the experiment and each column of the array represents one of the factors of indicated factors. Alternatively, the updated screening design indication could indicate differences or the presence of differences from a preexisting design (e.g., generated from stored instructions). For instance, the indication could indicate changes in options or a changed evaluation of a design. Output interface 3310 and output device 3306 could be one of or comprise features of output interfaces (e.g., output interface 1310) and output devices (e.g., output device 1306) described herein.

In one or more embodiments, the system 3300 implements a method as described herein (e.g., a method shown in FIGS. 34A and 34B and FIG. 40) for outputting a design for an experiment.

Figure 34A:
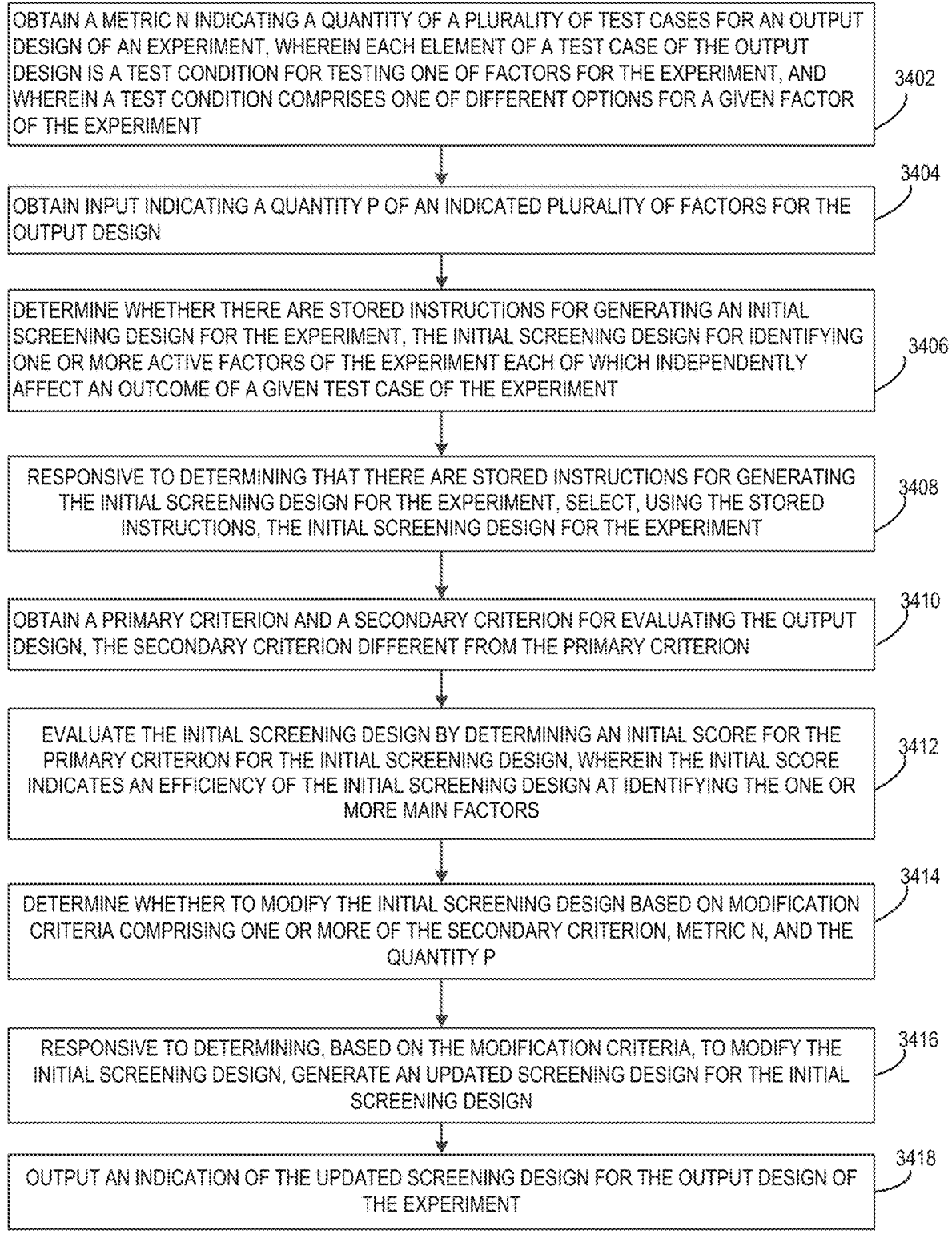
FIGS. 34A and 34B illustrate an example flow diagram for outputting a screening design for an experiment in one or more embodiments.
Figure 34B:
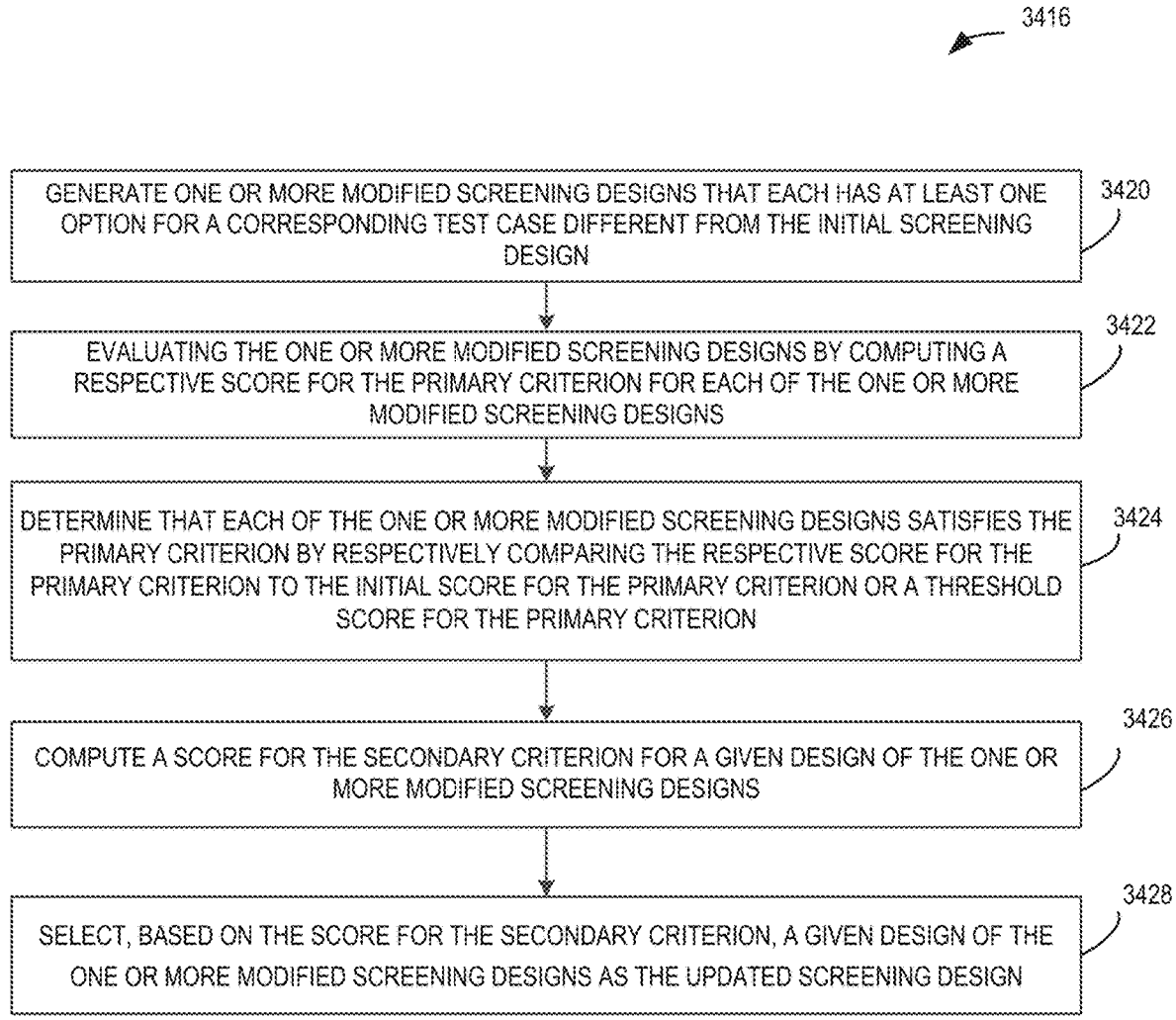

FIGS. 34A and 34B illustrate an example flow diagram for outputting a screening design for an experiment in one or more embodiments.

The method 3400 illustrates an operation 3402 for obtaining a metric N The metric N indicates a quantity of test cases for an output design of an experiment Test cases is also sometimes referred to in the art as runs in an experiment Each element of a test case of the output design is a test condition for testing one of factors for the experiment A test condition comprises one of different options for a given factor of the experiment. In one or more embodiments, the operation comprises receiving the metric N For example, a designer of an experiment may be limited in the amount of test cases for the design. The designer can input the metric N or select a default value for metric N, which may be predefined and stored.

The method 3400 illustrates an operation 3404 for obtaining input indicating a quantity p of indicated factors for the output design. Obtaining could comprise receiving a user selection of a total number of factors with a default level of options (e.g., two options for each factor of the design). Additionally or alternatively, receiving includes receiving from a user specific labels for different types of indicated factors. For example, if the design is an experiment for the operation of a computer, the different labels could include software factors (e.g., an internet browser used) or hardware factors (e.g., a RAM speed). The number of received labels indicates a quantity p of indicated factors for the output design.

The method 3400 illustrates an operation 3406 for determining whether there are stored instructions for generating an initial screening design for the experiment (e.g., a construction procedure for a preexisting design or instructions for fetching data of a preexisting design). The initial screening design is for identifying one or more active factors of the experiment each of which independently effect an outcome of a given test case of the experiment.

The preexisting designs, are for example, based on stored instructions for generating designs known to be optimal in some sense for screening designs with the same number of factors p and runs N. For instance, orthogonality is a desirable characteristic of a designed experiment. Orthogonal designs provide independent estimates of the active effects, which means that removing an effect from the model will not change the estimates of the other effects. For screening designs with every factor at two-levels, orthogonal designs are G, D, A, and I-optimal. A G-optimal design minimizes the maximum prediction variance for a given model. A D-optimal design minimizes the volume of a confidence ellipsoid about the parameter estimates. An A-optimal design minimizes the average variance of the main effects. An I-optimal design minimizes the average variance of prediction.

In developing screening experiments for two-level factors, regular fractional factorial designs, which are orthogonal and globally D-optimal (i.e. 100% D-efficient), exist if Nis a power of two. In addition, non-regular D-optimal orthogonal designs can be generated for almost any Na multiple of four. However, if resource constraints dictate that Nis not a multiple of four, an orthogonal design for two-level factors does not exist, although a D-optimal design may still be possible using computer instructions to directly construct an optimal design (e.g., a D-optimal design). For instance, the preexisting design may be one of multiple preexisting designs (e.g., a preexisting design constructed from a Hadamard matrix or a symmetric circulant block matrix). These types of constructions are discussed in more detail with respect to FIG. 40.

In one or more embodiments, one or more known techniques are used to create instructions for fetching data and/or fetching instructions associated with a preexisting design.

The method 3400 illustrates an operation 3408 for, responsive to determining that there are stored instructions for generating the initial screening design for the experiment, selecting, using the stored instructions, the initial screening design for the experiment. For instance, the operation 3408 could comprise selecting, using the obtained given number of test case N and indicated factors p, one or more instructions for constructing or fetching a preexisting design. This can be considered a direct construction method. The direct construction method may be employed responsive to determining there is a preexisting design (e.g., generated from stored instructions or from an electronic library) for directly generating the initial screening design for the experiment that has N test cases for an experiment of p factors (e.g., during operation 3406). In this case, the operation 3408 could comprise selecting, using stored instructions, as the initial screening design a given one of any preexisting designs that have N test cases for an experiment of p factors, responsive to determining there are stored instructions for directly generating the initial screening design for the experiment that has N test cases for an experiment of p factors.

Alternatively, it is possible that there is no known or stored instructions for generating a design for the obtained given number of test case N and indicated factors p, but a preexisting design is selected as a starting place for determining an optimal design or a candidate construction method. One or more embodiments, using the candidate construction method improve computation time over techniques such as coordinate-exchange algorithms when no known technique exists for directly constructing a design of a given number of test case N and indicated factors p.

The candidate construction method may be employed responsive to determining there is not a preexisting design for directly generating the initial screening design for the experiment that has N test cases for an experiment of p factors. In this case, the operation 3408 could comprise selecting, using the preexisting design, as the initial screening design a candidate screening design that does not have N test cases or does not have p factors. The selection of the initial screening design may be responsive to determining there is not a preexisting design for directly generating the initial screening design for the experiment that has N test cases for an experiment of p factors.

In one example of a direct construction method, the selecting of a preexisting design comprises retrieving stored instructions for directly generating, responsive to a given metric indicating a quantity of test cases and a given quantity of factors, one or more candidate initial screening designs. The stored instructions may comprises at least one set of instructions, correlated with both a given metric indicating a quantity of test cases and a given quantity of factors, to directly generate a screening design. Alternatively or additionally, preexisting designs could be stored in the form of an electronic library.

In another example of a candidate construction method, the selecting comprises determining that the initial screening design that satisfies the metric N and the obtained input with factors p cannot be directly generated from stored instructions. The method comprises selecting one or more candidate screening designs that can be directly generated from the stored instructions.

The method 3400 illustrates an operation 3410 for obtaining a primary criterion and a secondary criterion for evaluating the output design, the secondary criterion different from the primary criterion. For instance, a primary criterion could be used to determine how optimal a design is for screening purposes (e.g., an efficiency at identifying one or more active factors each of which independently effect an outcome of a given test case of the experiment). As an example in an experiment for a baking process for an optimal cookie, a factor could be the temperature of an oven. In the experiment, regardless of the ingredients in the cookie, how long the cookie is mixed, etc., at certain temperatures the cookie will burn. Thus, the temperature of the oven could be considered an active factor in an experiment for active factors in a baking process. A screening design that efficiently determines the importance of the temperature factor would be a better design for this experiment.

There could be multiple types of primary criterion. For example, in one or more embodiments, the operation 3410 comprises displaying a graphical user interface indicating one or more options for selecting, from multiple primary criterion, the primary criterion. As explained above there are known computations for evaluating the optimality of a screening design (e.g., Alias-efficiency, D-efficiency, the G-efficiency, the A-efficiency, and the I-efficiency). Each of the multiple primary criterion could indicate one of different efficiency computations (e.g., computations for computing an Alias-efficiency, D-efficiency, G-efficiency, A-efficiency, and I-efficiency). The operation 3410 may include receiving a user selection of the primary criterion of the multiple primary criterion.

However, a designer may have other goals for the experiment which could be classified as one or more secondary criteria. Consideration of secondary criteria is particularly useful when there are multiple possible candidate designs that would satisfy the primary criterion. For instance, in a non-deterministic system, experiment outcomes for a test case could differ, resulting in error between the outcome dictated from an estimated model and the experimental outcome. The designer of the experiment may then be interested in an error rate for the test cases (i.e., test cases that had different results given the same selected options for factors in the design of the experiment). The secondary criterion could then be a secondary criterion for determining an error rate for outcomes of the experiment according to the output design.

In another example, while the primary criterion is related to the main effects or active factors that independently affect an outcome, a designer may also be interested in an interaction between multiple factors. In this case, the secondary criterion could be a secondary criterion for evaluating an effect of an interaction between multiple factors on outcomes of the experiment according to the output design. For instance, the secondary criterion is a secondary criterion related to minimizing a bias on estimates of the main effects due to multi-factor interactions (e.g., aliasing or a correlation for multiple factors). With correlating factors, there is some biasing effect on the outcome of an experiment for one factor given an option selected for another factor. The method may comprise computing respective model matrices where each represents modeled predicted effects on the outcomes of testing according to a given screening design for computations related to minimizing this bias as described in the context of specific examples below.

The method 3400 illustrates an operation 3412 for evaluating the initial screening design by determining an initial score for the primary criterion for the initial screening design. The initial score indicates an efficiency of the initial screening design at identifying the one or more active factors. For instance, in one or more embodiments, the initial score indicates an Alias-efficiency, D-efficiency, a G-efficiency, an A-efficiency, or an I-efficiency for the primary criterion compared to a respective efficiency of an orthogonal design (e.g., a score out of 100).

The method 3400 illustrates an operation 3414 for determining whether to modify the initial screening design based on modification criteria. For instance, a modification could be used to provide a design with the requested test cases described by metric N, and indicated factors p. Therefore, the modification criteria could include one or more of the metric N, and indicated factors p. Additionally or alternatively, a design could already satisfy the requested test cases described by metric N, and indicated factors p (e.g., if it was directly constructed or a candidate design modified to arrive at the requested test cases). In this case, the design can be refined by consideration of one or more secondary criteria for the design of the experiment. In this case the modification criteria comprises one or more of the secondary criteria.

The method 3400 illustrates an operation 3416 for, responsive to determining, based on the modification criteria, to modify the initial screening design, generating an updated screening design for the initial screening design. In some cases (e.g., when an initial screening design is selected that has N test cases for experiment with p factors), the modification criteria could comprises only the secondary criterion. In this case, the updated screening design is a refinement of the design to consider the secondary criterion. In other cases (e.g., when an initial screening design is selected that does not have N test cases for experiment or does not have p factors for the experiment), the modification criteria may comprise the secondary criterion, the metric N, and the indicated factors p. For instance, the modification criteria may be used to update the initial screening design to satisfy the obtained metric N and the indicated factors p. An initial design may already satisfy N or p. In this case, the modification criterion may comprise only one of these factors. In some cases, additionally (e.g., at the same time or separately), modification criteria is used to refine the initial screening design to consider the secondary criterion. One of ordinary skill in the art will appreciate that in embodiments described herein, the secondary criterion could be multiple different secondary criteria different from the primary criterion.

As one example of generating an updated screening design, the method includes modifying an initial screening design by adjusting a given candidate screening design to have an adjusted screening design with N test cases. For instance, the adjusting could comprise generating a test case and adding the test case to the given candidate screening design. This is particular useful when a candidate screening design does not have sufficient test cases. Additionally or alternatively, the adjusting could include selecting a test case from the given candidate screening design and removing the test case from the given candidate screening design. This is particular useful when a candidate screening design has too many test cases. Additionally or alternatively, a modification could include combining multiple candidate screening designs.

As another example of generating an updated screening design, the operation 3416 comprises generating multiple candidate updated screening designs by modifying one or more options of the adjusted screening design. The operation 3416 comprises computing a respective score for the primary criterion for each of the multiple candidate updated screening designs. The operation 3416 comprises selecting one of the candidate updated screening designs as the generated updated screening design based on the respective score. This is particularly useful when there might be multiple designs that satisfy the primary criterion and the secondary criterion.

The method 3400 illustrates an operation 3418 for outputting an indication of the updated screening design for the output design of the experiment. For instance, the method could comprise displaying, via a graphical user interface, an array for the output design. In one type of array, each row of the array represents one of the test cases of the experiment and each column of the array represents one of the factors of the indicated factors. Of course the orientation of the array could be changed to have test cases represented by the columns and factors represented by the rows. Alternatively or additionally, the updated screening design indication could indicate differences or the presence of differences from a preexisting design (e.g., a changed option for a factor or changed score for the design).

One of ordinary skill in the art will appreciate that the method 3400 could be conducted in different orders then shown in method 3400. For instance, the obtained information in operations 3402, 3404, and 3410 could be obtained in any order or simultaneously. Further, multiple operations could be processed in a single operation or a single operation could comprise multiple operations. For instance, FIG. 34B illustrates example operations for operation 3416.

In one or more embodiments, operation 3416 comprises an operation 3420 for generating one or more modified screening designs that each has at least one option for a corresponding test case different from the initial screening design.

For example, in a case where the secondary criterion is a secondary criterion for determining a model-fitting error rate or pure-error for outcomes of the experiment according to the output design, generating one or more modified screening designs that each has at least one option different from the initial screening design could comprise generating a first modified screening design that has more test cases that are assigned the same options for each factor of a respective test case than the initial screening design. In this way there would be increased test cases that have the same options for respective factors, so that the outcome of these test cases can be observed. For example, it may be useful to measure and account for wide variation in responses with runs with the same setting. In another example, where the secondary criterion is a secondary criterion for determining a prediction error rate, it may be useful to instead generate modified screening designs that have greater diversity in test case scenarios to better explore a design space.

In one or more embodiments, operation 3416 comprises one or more operations useful for ensuring that the modified screening designs still satisfies the primary criterion despite changes. For instance, operation 3416 comprises an operation 3422 for evaluating the one or more modified screening designs by computing a respective score for the primary criterion for each of the one or more modified screening designs.

In one or more embodiments, operation 3416 comprises an operation 3424 for determining that each of the one or more modified screening designs satisfies the primary criterion by respectively comparing the respective score for the primary criterion to the initial score for the primary criterion or a threshold score for the primary criterion. This is useful for ensuring that the modified screening designs still satisfy the primary criterion despite changes (either because one or more of the modified screening designs are better than the initial screening design at satisfying the primary criterion or they satisfy, for instance, a predetermined threshold for the primary criterion).

In one or more embodiments, operation 3416 comprises one or more operations for considering a secondary criterion. For instance, operation 3416 comprises an operation 3426 for computing a score for the secondary criterion for a given design of the one or more modified screening designs. In one or more embodiments, operation 3416 comprises an operation 3428 for selecting, based on the score for the secondary criterion, a given design of the one or more modified screening designs as the updated screening design. For instance, a design can be selected that has a maximum score for the secondary criterion. Alternatively, the scores from the primary criterion and secondary criterion could be weighted or averaged to select a design that has a relatively high score for both criterion.

Figure 35A:
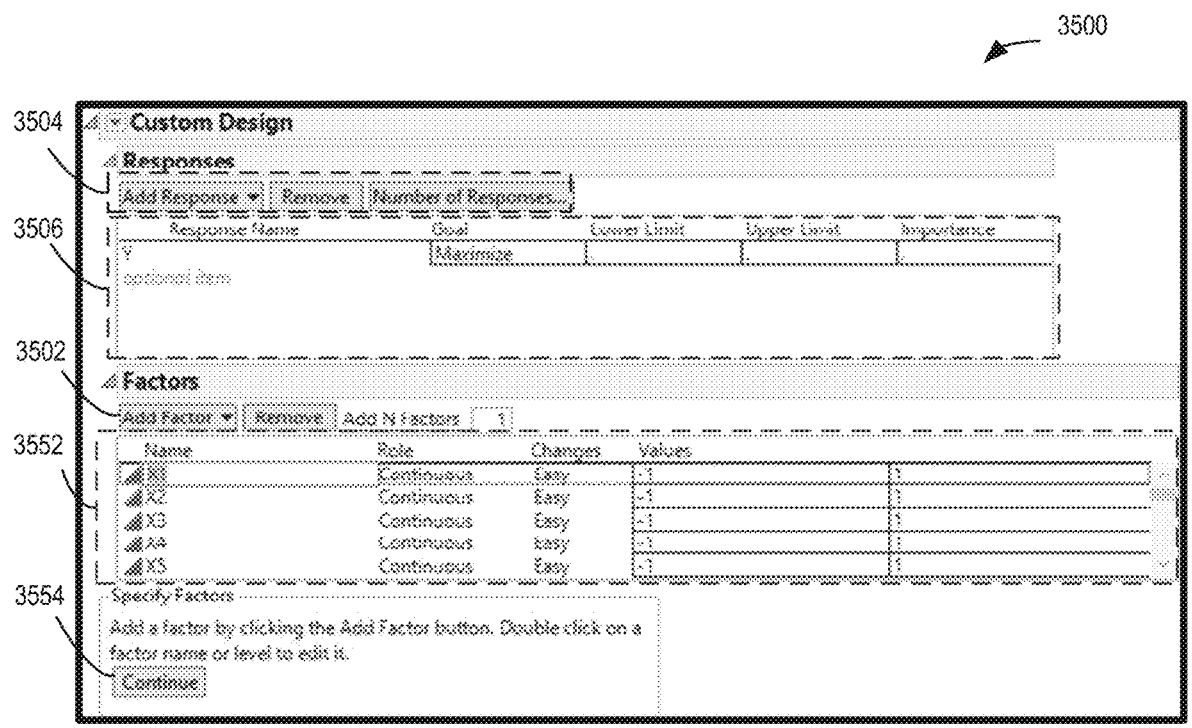
FIGS. 35A and 35B illustrate an example graphical user interface for obtaining factors for an experiment in one or more embodiments.

FIG. 35A illustrate an example graphical user interface 3500 with a dialog window for obtaining factors for an experiment in one or more embodiments.

Figure 35B:
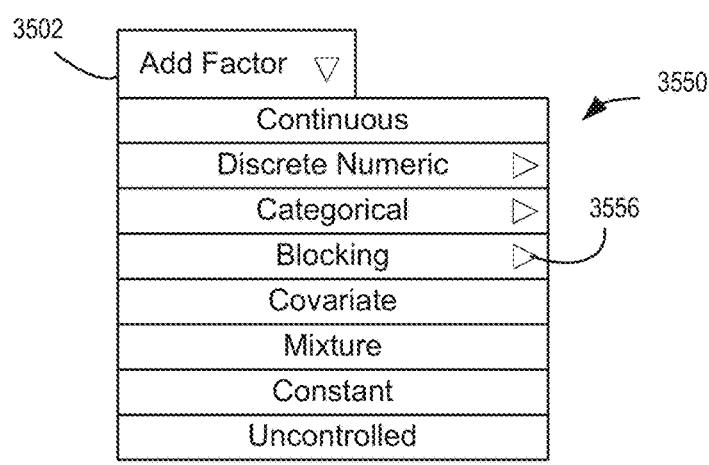

As shown in FIG. 35A, graphical user interface 3500 indicates a user option 3502 for adding factors of different optional types. For instance as shown in FIG. 35B a drop-down menu 3550 may be used to specify one of various types (e.g., continuous, discrete numeric, categorical, blocking, covariate, mixture, constant, and uncontrolled). A user can select in the graphical user interface 3500 a given type of the drop down menu 3550. An indication of type is received for at least one of the indicated factors. The different types shown are merely an example; more or less factor types are possible.

As shown in FIG. 35B, there are possible factor types of a continuous, discrete numeric, and categorical types. A factor of a continuous type indicates that the factor has a range of possible options in the experiment (e.g., within a time period for implementing a test condition). A continuous factor can be set to any value between a lower and upper limit supplied (e.g., set based on the limitations of a process or measurement system). A factor of a discrete numeric type indicates that the factor is continuous in nature, but has set discrete, numeric possible options in the experiment (e.g., 1, 2, or 4 drops of a solution in a chemical experiment). A factor of a categorical type indicates that the factor has set discrete, non-numeric possible options in the experiment (e.g., in an experiment for a computer system the options for an input device factor might be a mouse, track ball or joy stick).

As shown in FIG. 35B, there are also possible factor types of a covariate and blocking type. A covariate factor type indicates the factor affects the experiment outcome but is not controlled like the other factors. Instead, it co-varies with the change in the factor options from one treatment to the next. A blocking factor is a factor type that has an effect on an experimental outcome, but cannot be directly controlled and manipulated by the designer of the experiment in the same way as other factors. In this case, some variables are indicative of a treatment or predictive value by the designer of the experiment of a given factor on outcomes of testing according to the output design of the experiment.

As shown in FIG. 35B, there are also factor types of a mixture, constant and uncontrolled type. A mixture type is a type for a factor that has a relationship with other factors. For example, in a chemical process, a chemical might be composed of two different liquid components. If one factor is related to options for the first liquid component of the chemical and another factor is related to options for the second liquid component of the chemical, indicating the first and second liquid component factors are of a type mixture indicates that together the components must sum to a particular percent of the total mixture. A constant type is a type for a factor that is treated as having a single option. An uncontrolled type is a type for a factor not observed until performing the experiment. This type indicates the options for this factor will be missing in the design of the experiment.

The drop-down menu 3550 could have other drop-down menus to specify other constraints relevant to the factor types (e.g. by clicking an arrow 3556 to display more constraints).

As shown in FIG. 35A, the factors selected could all be of the same type. Alternatively, they could be of different types. FIG. 35A shows an optional window 3552 for selecting a factor to edit the label (e.g. to specify the particular type or options for a factor).

As shown in FIG. 35A, the graphical user interface 3500 may comprise other optional controls or fields for obtaining information relevant to the design of an experiment beyond factors. For instance, a user of the graphical user interface 3500 may want to specify one or more responses for an experiment using optional response controls 3504. As an example, the user may want to have each test case performed more than one time to observe responses or results of the experiment. For instance, the response controls 3504 may comprise the ability to add, remove, or set the number of responses.

Within a given response window 3506, the user of the graphical user interface 3500 may want to set specific goals for an outcome of the experiment (or response) or the importance of that response. For instance, the user may specify for a given response a goal of maximize, match target, minimize, or none. A goal of maximize indicates that the best value is the largest possible. If there are natural lower or upper bounds, these can be specified using the lower limit or upper limit fields of response window 3506. A goal of minimize indicates that the best value is the smallest possible. If there are natural lower or upper bounds, these can be specified using the lower limit or upper limit fields of response window 3506. A goal of match target indicates that the best value is a specific target value. This can be explicitly indicated or can be assumed to be midway between the lower limit and upper limit fields of response window 3506.

The importance field of response window 3506 allows responses to be weighted (e.g., based on the importance of a goal for that response) when there are multiple responses.

The graphical user interface 3500 may have an indication (e.g., continue button 3554) for indicating that the user has specified the response and factors.

Figure 36:
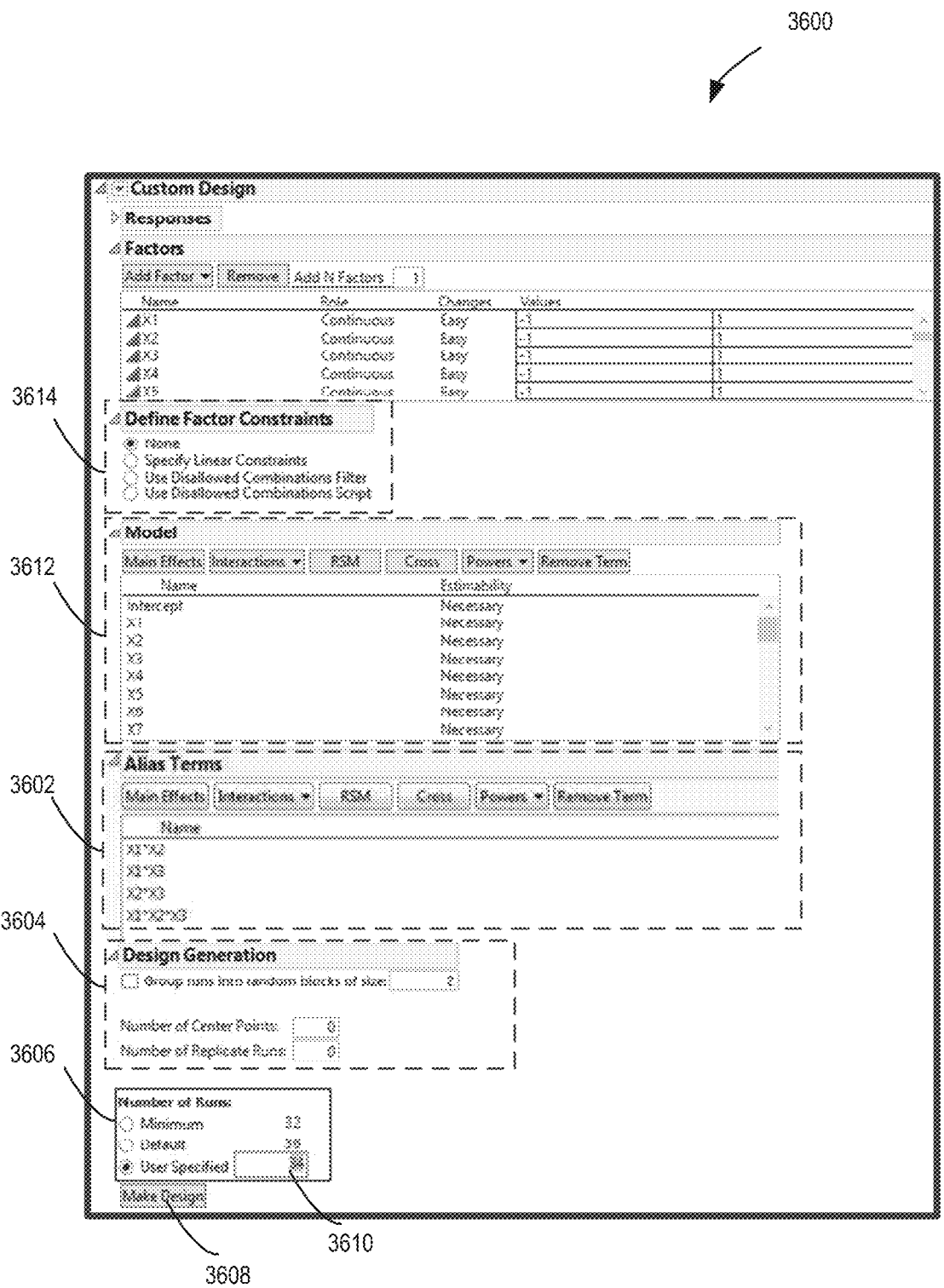
FIG. 36 illustrates an example graphical user interface for obtaining a metric indicating a quantity of test cases of an experiment in one or more embodiments.

FIG. 36 illustrates an example graphical user interface 3600 for obtaining a metric N indicating a quantity of test cases of an experiment in one or more embodiments. The graphical user interface 3600 may have different windows or controls for specifying constraints on the factors, the terms and type of assumed model using to describe the process or experiment being investigated, and the number of experimental runs as well as any additional runs or constraints on those runs.

In particular, as shown in number of runs window 3606, graphical user interface 3600 may optionally allow a user to select a minimum level of runs and/or a default level of runs. A minimum level of runs may allow more additional runs (e.g., to satisfy secondary criteria). The values for the minimum level of runs or defaults may be static values or variable based on, for instance, the number of factors of the experiment Additionally or alternatively, the runs window 3606 allows a user to specify a particular number for the runs (e.g., in a run field 3610). Embodiments herein are useful even if the user selects a number of runs in which there are no preexisting designs that could satisfy the requested design (e.g., there are no stored instructions for generating a preexisting design).

Additional constraints for the design may be input. For example in an optional design generation window 3604, a user may select options to group runs, to set center points or replicate runs. For instance, a center point is useful to set a run such that for each continuous factor of the run, the value of a continuous factor of the run is set midway between the high and low settings. In an optional alias term window 3602, the user may enter alias or correlation properties between factors (e.g., a two-way or three-way interaction between specified factors).

In an optional model window 3612 the user can select constraints on the model. In an optional factor constraints window 3614, the user can select factor constraints. For instance, the user may wish to restrict values for individual factors using a disallowed combinations filter.

Once the user is satisfied with their inputs, the user can select a control to generate a design (e.g., by selecting the Make Design button 3608) and start the process of creating the optimal design that maximizes one or more criteria (e.g., a specified efficiency measure) under the constraints provided by the user (in this case, a specified number of runs in run field 3610).

Figure 37:
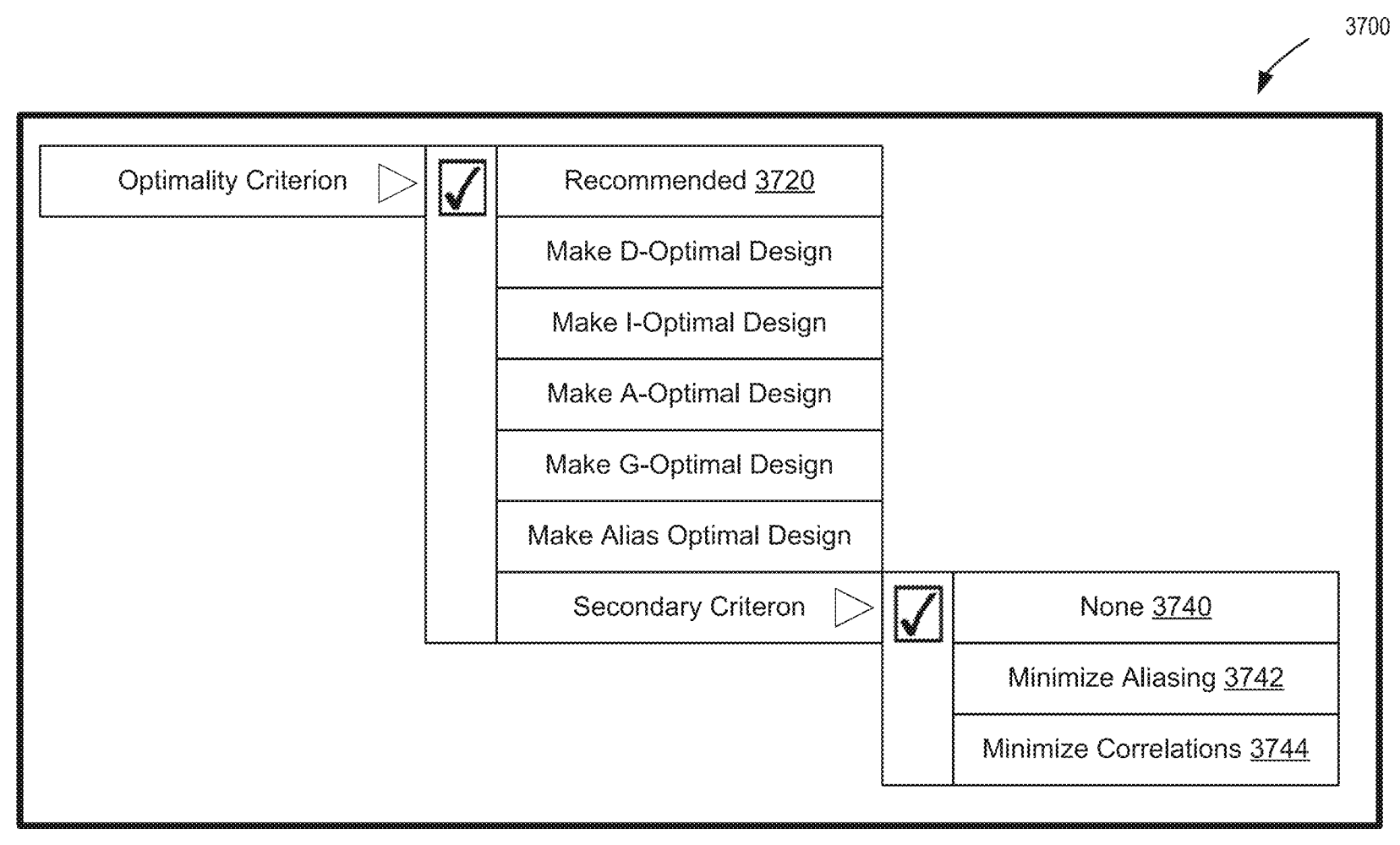

FIG. 37 illustrates an example graphical user interface 3700 for obtaining a primary criterion and a secondary criterion in one or more embodiments. The graphical user interface 3700 gives as an example different options for user selection of a primary criterion for evaluating a design of the experiment as optimal (e.g., an optimal screening design). The user may also be able to set more than one primary criterion (e.g., by selecting one or more of the optimality criterion). The graphical user interface 3700 also gives an option to select a recommended option 3720. The recommended option 3720 may be set to one of the options or may be some weighting between different available options (e.g., a design that satisfies all or certain ones of the criteria).

The user can also optionally set a secondary criterion (e.g., a criterion related to interactions between factors). In the example shown in FIG. 37, the secondary criterion include a minimize aliasing option 3742 and minimize correlations option 3744. With aliased terms, it is indistinguishable which or both of the terms is having an effect on an outcome of an experiment A sample example is shown below in Table 1 for 3 factors with possible different options denoted 1 and 0 in different test cases. The interaction of factors $X_1$ and $X_2$ ($X_{12}$) gives the same options as factor $X_3$. Therefore, factor $X_3$ and interaction factor $X_{12}$ are considered aliased because it is unknown whether factor $X_3$ or interaction factor $X_{12}$ are an active factor in the outcome. With correlation, there is some ability to distinguish between terms, but how well the terms can be distinguished depends on the level of correlation. A lower correlation corresponds to a better ability to distinguish.

TABLE 1

| | Factors | | | |
| --- | --- | --- | --- | --- |
| | $X_1$ | $X_2$ | $X_3$ | $X_{12}$ |
| Test Case 1 | 1 | 1 | 1 | 1 |
| Test Case 2 | 1 | 0 | 0 | 0 |
| Test Case 3 | 0 | 1 | 0 | 0 |
| Test Case 4 | 0 | 0 | 1 | 1 |

Selecting the minimize aliasing option 3742 versus selecting minimize correlations option 3744 can allow a designer control over selection between different possible design options. For example, a first design could have a large number of factors uncorrelated with one another at the cost of a few factors being aliased. A second design could have some level of correlation among all the factors. If the minimize correlations option 3744 is selected, the first design may be selected as having the lowest overall correlations. However, this results in a few factors aliased and so not estimable. If instead the minimize aliasing option 3742 is selected, the second design may be selected as having the lowest aliasing. This might be desirable to spread the correlation around so that every factor has some ability to be estimated.

Selecting the None option 3740 in the graphical user interface 3700 as shown in FIG. 37, means the system will directly construct the optimal design and not spend any additional processing time optimizing a secondary criterion.

If the Minimize Aliasing option 3742 is instead chosen, and there are multiple designs that attain the optimal form (either different construction methods, or if only a subset of factors are needed), an aliasing matrix is minimized. That is, denoting $X_i$ to be the model matrix for the main effects model, and $X_2$ the model matrix for the two-factor interactions, then to minimize the bias on the estimates of the main effects due to two-factor interactions, a computer algorithm picks a subset of columns or designs that minimizes trace (A' A), where:

$$A=(X_1^T X_1)^{-1} X_1^T X_2.$$

If the minimize correlations option 3744 is chosen, a subset of columns or designs is chosen to minimize the average of the absolute entries of $X_1^T X_1$, to minimize the correlations between the main effects model terms.

Another possible criterion not shown in FIG. 37 are possible to allow a designer greater control over the output design. For example an option may be provided to maximize the estimation capacity which relates to the ability to estimate the interactions from subsets of factors. Alternatively, a user option might seek a generalized minimum aberration design that can help minimize the contamination of non-negligible interactions on the estimates of the main effects. Another example could be used to examine if it is possible to have an optimal design that also has some replicated runs for the estimation of pure error. Other secondary criteria not shown in FIG. 37 are possible as described herein.

Figure 38:
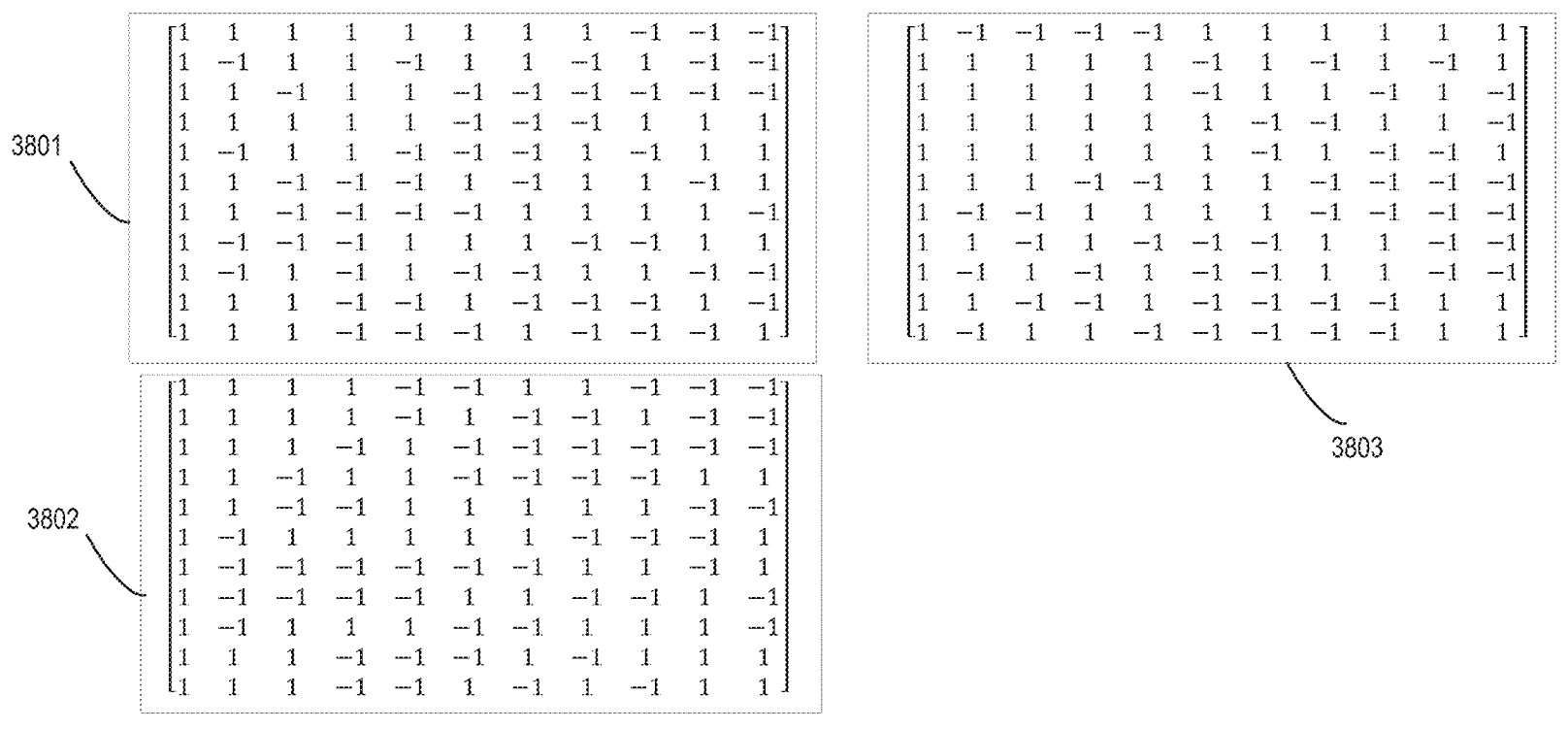

FIG. 38 illustrates an example initial screening design 3801 and modified screening designs 3802 and 3803 in one or more embodiments. It is possible that there are multiple candidate initial screening designs correlated with N respective test cases each with p factors. In one or more embodiments, one or more of the multiple candidate initial screening designs is selected by determining a maximum of respective computed scores for the primary criterion for each of the multiple candidate initial screening designs. Alternatively, one or more of multiple candidate initial screening designs is selected by comparing a primary criterion for each of the multiple candidate initial screening designs to a threshold score for the primary criterion.

In the example shown in FIG. 38, the initial screening design 3801 associated or otherwise represented by a matrix of options for factors minimizes the average correlation among the main effects with minimal confounding among the aliased terms. A possible modified candidate initial screening design 3803 improves a primary criterion for the initial screening design 3801 (e.g., by minimizing predictive uncertainty and improving an A-optimal computation), but at the cost of a secondary criterion by having more confounding among aliased terms. A possible modified candidate initial screening design 3802 minimizes the average correlation between the main effects and aliased terms with minimal confounding among the aliased terms. It is selected as the updated screening design or as an intermediate design to an updated screening design because it is still considered an optimal screening design based on a primary criterion and improves a secondary criterion related to aliased terms unlike possible modified candidate initial screening design 3803.

Figure 39:
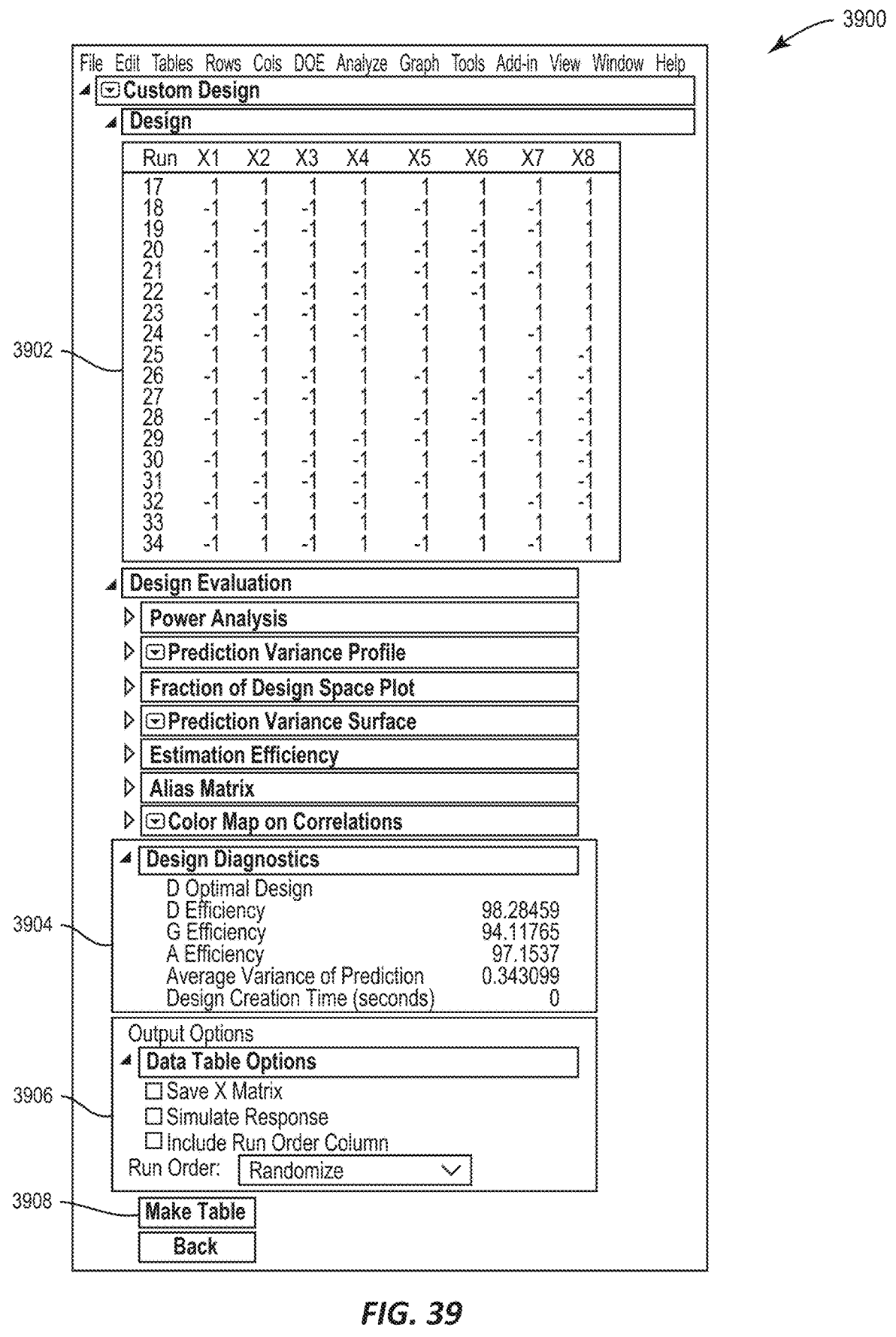

FIG. 39 illustrates an example graphical user interface for outputting an indication of a screening design in one or more embodiments. In one or more embodiments, once a design has been constructed as described herein, a window appears in a graphical user interface 3900 showing the resulting design 3902. Here test runs 17-34 are shown as an array representation for an experiment with 8 factors (X1-X8) and 34 runs. Each row specifies one of two different options for the factors for a test case. A scroll may be provided to show the entire design. Alternatively, other controls may be provided to export a table of the generated options (e.g., make table button 3908). In this example, output option controls 3906 is provided for further manipulation or use of the design (e.g., to simulate responses, include run order column, randomize run order, etc.)

In this example, several diagnostics 3904 are provided to the user for evaluating the design. The designation "D Optimal Design" indicates that the design was constructed to maximize the D Efficiency measure (100 is best). Alternative efficiency measures are also provided for convenience (100 is best for each). In addition to the efficiency measures, the average variance of prediction is provided which is a measure of uncertainty in predicted responses based on a model estimated from the design. It is better to have a lower average variance of prediction. The design creation time is also provided. It is better to have a lower design creation time.

Figure 40:
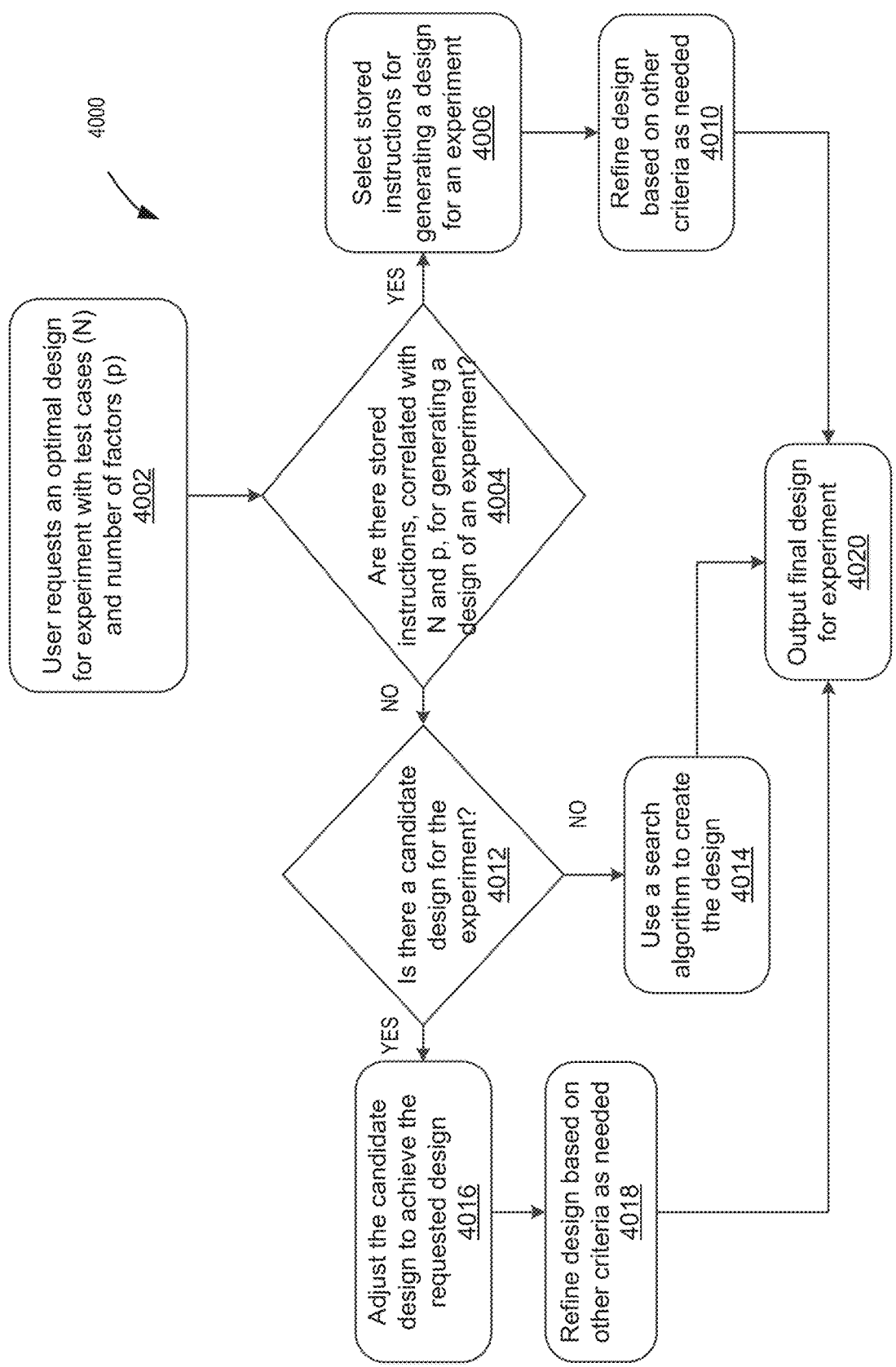
FIG. 40 illustrates an example flow diagram for outputting a screening design for an experiment in one or more embodiments.

FIG. 40 illustrates an example flow diagram 4000 for outputting a outputting a screening design for an experiment in one or more embodiments.

In a first operation 4002, the user requests an optimal design for an experiment with test cases of a quantity N and factors for each test case of a quantity p. For instance, the request can be made via a graphical user interface to input or select defaults for N and p and other information relevant to the design. If the user proceeds to make a design, the method determines in an operation 4004 whether there are stored instructions, correlated with N and p, for generating a design of an experiment. In other words, once the input has been provided, the initial inquiry is to determine whether the design can be directly constructed using known methods (e.g., in preexisting designs). If so, then it remains to determine what method to use for the given inputs in an operation 4006.

If the user input does not match any known case where a design can be directly constructed, rather than start from scratch (e.g., using a search algorithm), it may be more beneficial to use a known direct construction method to build a candidate starting design from which to generate the optimal design through additions to or manipulations of that candidate starting design, and the method proceeds to an operation 4012.

For instance, there are known design catalogs, which can be used as preexisting designs for direct construction, especially for designs not generated using one of general construction procedures below. For example, a table of D-optimal design matrices can be found at this website: http://www.indiana.edu/~maxdet/fullPage.shtml#tableTop.

There are certain known methods, which can be used to create preexisting designs for constructing D-optimal designs for different numbers of runs in some of the following cases:

N is a multiple of 4 (or N≡0 mod 4). This is the case where orthogonal designs are D-optimal.
N is odd and one more than a multiple of 4 (or N≡1 mod 4)
N is even, but not a multiple of 4 (or N≡2 mod 4); and
N is odd and three more than a multiple of 4 (or N≡3 mod 4)

In the case of N≡0 mod 4, a D-optimal design for two level factors may be constructed by generating a Hadamard matrix. There are multiple different construction methods sufficient for generating all the Hadamard matrices up to and including N=300 for Hadamard matrices, N=p. When N>p, any subset of the columns of the Hadamard matrix of order N excluding the first column for the intercept yields an orthogonal (and globally D-optimal) design. For example, one example construction methods for Hadamard matrices is the Sylvester construction method discussed in more detail below as an example.

For the case of N≡1 mod 4, if a Hadamard matrix of order N−1 exists, only the case where N=p requires additional effort for construction. For N>p construction starts by generating a Hadamard matrix of order N−1 and adding a row of ones for simplicity. Again, any subset of columns can be removed to obtain a design with the desired number of factors.

For the case of N≡2 mod 4, for N−1>p, construction starts by generating a Hadamard matrix of order N−2 and adding two orthogonal rows (or near orthogonal if p is odd). For the case N=p, a general construction procedure can use block circulant matrices. The case of N−1=p can easily be derived from a design with N=p by deleting any row.

The case of N≡3 mod 4, is the most computationally difficult except when p≤(N+5)/2. For these values of p, construction starts with generating a Hadamard matrix with N+1 rows and columns. Then, removing the first row and choosing an appropriate subset of columns yields the globally D-optimal design. When p>(N+5)/2 constructions are known for special cases.

Since many of the cases are derived from a Hadamard matrix this is discussed in more detail below. Assuming the standard linear model Y=Xβ+ε, where X represents an N×p design matrix consisting of N runs with each run associated with a combination of levels in p−1 factors (p unknown parameters, including an intercept), Y represents the vector of responses that will be collected during the experiment, β represents the vector of unknown parameters to be estimated from the experimental data, and ε represents the vector of errors between the collected responses and the assumed true underlying mean model Xβ. Technically, X is associated with a particular design D and so is often depicted as X(D), but for the sake of simplifying notation, superscripts and subscripts are used instead to specify a specific design matrix.

The focus here is on generating optimal designs, which give layouts of factor levels per run that optimize a specified criterion of interest for a given total number of runs. Often, this criteria, is related to the information matrix of the design, which is computed as M=X'X, where X' is the transpose of X. Considered as designs with two-level factors and assuming that the two levels have been coded −1 and 1 for each factor.

There are a wide variety of optimal design criteria. D-optimality is given as an example since it is the most commonly used criterion in practice. A design is D-optimal if it maximizes the determinant of M or, equivalently, minimizes the determinant of $M^{-1}$. Maximizing the determinant of M minimizes the volume of the confidence region around the estimates of β for a fixed confidence level. For example, for a simple linear model (β={$β_0,β_1$}'), this would be equivalent to minimizing the 2-dimensional confidence region around {$\hat{β_0}\ \hat{β_1}$}. Thus, D-optimal designs minimize an omnibus measure of the uncertainty about the parameter estimates. Embodiments described herein are applicable for other optimality criteria.

As an example, of generating an initial starting design from known methods, the case where N≡0 mod 4 is discussed. The optimal form of M for this case is $$M_0^* = \begin{bmatrix} N & 0 & 0 & \cdots & 0 \\ 0 & N & 0 & \cdots & 0 \\ 0 & 0 & N & \cdots & 0 \\ \vdots & \vdots & \vdots & \ddots & \vdots \\ 0 & 0 & 0 & \cdots & N \end{bmatrix}$$

Its determinant is $$\det(M_0^*) = N^p.$$

The design matrix $X_0^*$ that achieves this form is a member of the Hadamard class of matrices, often simply referred to as Hadamard matrices. Typically, these matrices must be standardized so that the first column is all 1's (corresponding to the intercept term). The name of this class of matrices acknowledges the work of Jacques Hadamard. See e.g., Hadamard, J. (1893). Resolution d'une question relative aux determinants. *Bulletin des Sciences Mathematiques* 17, 240-246. This work proved that the determinant of $X_0^*$ is the largest determinant among all matrices with binary (−1 or 1) entries and so, as a corollary, showed that $M_0^*$ has the largest determinant among all M matrices created from binary matrices.

One application of construction of a design using a Hadamard matrices is the Sylvester Construction, with a construction:

1. Define $H_1 = [1]$

2. $H_{2^k} = \begin{bmatrix} H_{2^{k-1}} & H_{2^{k-1}} \\ H_{2^{k-1}} & -H_{2^{k-1}} \end{bmatrix}$ for $k = 1, 2, \ldots$ Example $H_1 = [1]$ $H_2 = \begin{bmatrix} [r]1 & 1 \\ 1 & -1 \end{bmatrix}$ $H_4 = \begin{bmatrix} [r]1 & 1 & 1 & 1 \\ 1 & -1 & 1 & -1 \\ 1 & 1 & -1 & -1 \\ 1 & -1 & -1 & 1 \end{bmatrix}$ The Sylvester construction can generate Hadamard matrices with run sizes that are powers of 2. Another example construction method is the Williamson construction for Hadamard matrices. Let $$W = \begin{bmatrix} A & B & C & D \\ -B & A & -D & C \\ -C & D & A & -B \\ -D & -C & B & A \end{bmatrix},$$

where A, B, C, and D are symmetric, circulant matrices of order n with entries ±1 that satisfy $$XY'=YX', \text{ for } X \neq Y \in \{A,B,C,D\}$$

as well as $AA'+BB'+CC'+DD'=4nI_n$

If these conditions are satisfied, then W is a Hadamard matrix of order 4n.

Circulant matrices are matrices of the form $$P = \begin{bmatrix} p_1 & p_2 & p_3 & \cdots & p_N \\ p_N & p_1 & p_2 & \cdots & p_{N-1} \\ p_{N-1} & p_N & p_1 & \cdots & p_{N-2} \\ \vdots & \vdots & \vdots & \ddots & \vdots \\ p_2 & p_3 & p_4 & \cdots & p_1 \end{bmatrix}.$$

so they can be specified by their first row. The Williamson construction requires that the circulant matrices have the additional property of being symmetric.

The matrices A, B, C, and D are often referred to as Williamson-type "plug-in" matrices. Notice that when $A=B=C=D=[1]$ then $W=H_4$. As an example, let:

$$A = \begin{bmatrix} 1 & 1 & 1 \\ 1 & 1 & 1 \\ 1 & 1 & 1 \end{bmatrix}, \text{ and}$$

$$B = C = D = \begin{bmatrix} 1 & -1 & -1 \\ -1 & 1 & -1 \\ -1 & -1 & 1 \end{bmatrix}.$$

Note that A, B, C, and D are ±1 square matrices of order 3 and since $$AA' = \begin{bmatrix} 3 & 3 & 3 \\ 3 & 3 & 3 \\ 3 & 3 & 3 \end{bmatrix}, \text{ and } BB' = CC' = DD' = \begin{bmatrix} 3 & -1 & -1 \\ -1 & 3 & -1 \\ -1 & -1 & 3 \end{bmatrix}.$$

They also satisfy $AA'+BB'+CC'+DD'=12I_3$. Furthermore, since $$AB' = \begin{bmatrix} -1 & -1 & -1 \\ -1 & -1 & -1 \\ -1 & -1 & -1 \\ -1 & -1 & -1 \end{bmatrix} = BA' \text{ and } B = C = D,$$

it follows that $$AB'=BA'; AC'=CA'; AD'=DA'; BC'=CB'; BD'=DB'; CD'=DC'.$$

Since the required conditions are satisfied, we can use A, B, C, and D to construct $H_{12}$ as follows:

$$H_{12} = \begin{bmatrix} 1 & 1 & 1 & 1 & -1 & -1 & 1 & -1 & -1 & 1 & -1 & -1 \\ 1 & 1 & 1 & -1 & 1 & -1 & -1 & 1 & -1 & -1 & 1 & -1 \\ 1 & 1 & 1 & -1 & -1 & 1 & -1 & -1 & 1 & -1 & -1 & 1 \\ -1 & 1 & 1 & 1 & 1 & -1 & 1 & 1 & -1 & 1 & -1 & -1 \\ 1 & -1 & 1 & 1 & 1 & 1 & -1 & 1 & -1 & 1 & -1 \\ 1 & 1 & -1 & 1 & 1 & 1 & 1 & -1 & -1 & -1 & 1 \\ -1 & 1 & 1 & 1 & -1 & -1 & 1 & 1 & -1 & 1 & 1 \\ 1 & -1 & 1 & -1 & 1 & -1 & 1 & 1 & 1 & -1 & 1 \\ 1 & 1 & -1 & -1 & -1 & 1 & 1 & 1 & 1 & 1 & -1 \\ -1 & 1 & -1 & 1 & 1 & 1 & -1 & -1 & 1 & 1 & 1 \\ 1 & -1 & 1 & 1 & -1 & 1 & -1 & 1 & -1 & 1 & 1 & 1 \\ 1 & 1 & -1 & 1 & 1 & -1 & -1 & -1 & 1 & 1 & 1 \end{bmatrix}$$

Other preexisting designs can be defined by other construction methods not specifically described herein (e.g., other preexisting designs constructed from a Hadamard matrix or a circulant block matrix).

Operation 4006 specifies to select stored instructions for generating a design for an experiment. Any which of these construction methods could be used to specify or derive stored instructions for generating a design. However, previously these type of construction methods solely focused on generating a design that maximizes a particular measure of efficiency. That is, once a design is generated, the task is complete; there is no further consideration of additional properties of the design. This often results in undefined or incomplete steps within the construction method (e.g. add an additional run with any combination of factor level inputs). These past approaches did not contemplate refining the design for any sort of secondary criteria. In some cases, there are multiple designs that maximize a particular efficiency, and so these designs are simply catalogued with no other consideration for any further distinctions among them.

Statisticians are interested in other criteria to evaluate a design beyond a measure of efficiency. There are multiple other secondary criteria that can be considered as well. In an operation 4010, these other criteria can be considered by refining the design based on other criteria as needed. For example, if a construction method simply requires adding an additional experimental run to a known design with no specification as to what that run should look, the default might be to make the new run be different from all the other runs before it, resulting in a design that more completely explores the space of possible factor inputs into the process being investigated (e.g., to consider a prediction error rate). A user could optionally select the new run be a repeat of a previous run, which would result in a design that better estimates "pure error" (pure uncertainty within the process untainted by uncertainty introduced in varying factor inputs), which could help yield better estimates of the factor effects. One or more embodiments, improve existing direct construction methods by providing default settings and/or user options representing statistical principles that goes above and beyond the construction methods.

In the case of multiple designs that satisfy an optimal criteria, user options could provide ways to investigate secondary properties of these designs to determine which may be best suited as a default for users. For example, one design might have better predictive properties than another design (reduced uncertainty in predicted responses), but at the cost of making some effects explicitly present in the assumed underlying model completely indistinguishable from effects that, while not explicitly in the assumed model, may actually be present in the true underlying model (this is referred to as "confounding" or "aliasing"). In this case, the user may choose to go with an alternative design based on the default assumption that confounding of effects is much less desirable, while also building in user options to choose the original design should predictive properties be of greater interest. As described with respect to FIG. 37 these secondary criteria can be selected by providing user options. Operation 4020 concludes with outputting a final design for the experiment after refinement.

In the case where there were not stored instructions for generating a design of an experiment to satisfy N and p, the flow diagram 4000 proceeds with an operation 4012 to consider whether there are candidate designs for the experiment. If there are candidate designs, an operation 4016 provides for adjusting the candidate design to achieve the request described (e.g., by methods described herein, such as adding or removing a test case from a candidate design or combining candidate designs). The choice of a starting design may impact the quality of the design further refined using coordinate-exchange. For example, in the case of N≡3 mod 4, where there is less availability in constructions guaranteeing optimality, one can quickly generate a reasonable starting design for p≤(N+5)/2. Similarly, for the saturated cases where a direct construction is not known, one can start by generating a design having the maximal number of columns for the unsaturated case. Then a highly D-efficient design can be obtained by adding columns using some algorithmic optimization approach.

One such algorithmic approach related to adding one or more additional columns, involves adding one element at a time to a column, and choosing the value that maximizes $det(X_1^T X_1)$, or adding random column(s), and using coordinate exchange on that column(s) only, rather than having to iterate over the whole design. This approach improves computational processing over approaches that use coordinate exchange across a whole design from a random starting point. In an operation 4018, the design can be refined based on other criteria described herein.

If there is nota candidate design, an operation 4014 a search algorithm is used to create the design. A search algorithm is the approach taken in other statistical software to generate a design (e.g., one or more software tools offered by SAS Institute Inc. of Cary, N.C., USA such as JMP®). Once the user provided input, a candidate design would be generated at random and then an algorithm would be used to refine the entries of this design to maximize a user-selected measure of the design's efficiency (how well the design minimizes a measure of uncertainty regarding estimates of the factor effects on the response). The user can specify how many random designs to start with. The more starts, the more likely the best design will be found, but at a cost of more computation time.

In one or more embodiments described herein, a search algorithm is now implemented as a last resort for those cases where a design cannot be directly constructed, or a constructible/known design does not exist.

Here, the improvement in design diagnostics brought about by the new flow diagram 4000 are clearly displayed in Tables 2 and 3. Table 2 shows design diagnostics for existing commercially available JMP® version 14. Table 3 shows improvement in design diagnostic using methods described herein.

TABLE 2

| Example | Runs | Factors | D-Efficiency | G-Efficiency | A-Efficiency | Avg Variance of Prediction | Time (sec) |
|---|---|---|---|---|---|---|---|
| 1 | 32 | 31 | 92.61564 | 53.94075 | 85.46805 | 0.413325 | 22.83333 |
| 2 | 33 | 31 | 94.21147 | 61.08052 | 88.52126 | 0.387371 | 16.38333 |
| 3 | 34 | 31 | 94.43427 | 67.74718 | 89.05693 | 0.373821 | 21.71667 |
| 4 | 1059 | 531 | 98.50556 | 96.54483 | 97.02068 | 0.173249 | 206.7833 |

TABLE 3

| Example | Runs | Factors | D-Efficiency | G-Efficiency | A-Efficiency | Avg Variance of Prediction | Time (sec) |
|---|---|---|---|---|---|---|---|
| 1 | 32 | 31 | 100 | 100 | 100 | 0.354167 | 0.18333 |
| 2 | 33 | 31 | 99.09306 | 97.15946 | 98.5089 | 0.348633 | 0 |
| 3 | 34 | 31 | 98.28459 | 94.11765 | 97.1537 | 0.343099 | 0 |
| 4 | 1059 | 531 | 99.96339 | 97.40897 | 99.90521 | 0.168243 | 2.65 |

As shown in Table 3 compared to Table 2, the design time is significantly reduced to nearly instantaneous in some cases. (The true time is not 0; rather, it is simply so small that it has dropped below the display threshold). The time savings are particularly significant in situations such as Example 4 where the number of runs and factors is large (1059 runs and 531 factors). In all the examples, having stored instructions for generating an initial screening design improved processing time. In Example 1 (32 runs), a Hadamard matrix was used as an initial screening design because the number of runs was a multiple of 4. In Example 2 (33 runs), a Hadamard matrix was used as the initial screening design, and the initial screening design was modified to add a run to the Hadamard matrix to achieve a design with 33 runs. In Example 3 (34 runs), a Hadamard matrix was used as the initial screening design, and the initial screening design was modified to add two orthogonal runs to the Hadamard matrix. In Example 4 (1059 runs and 531 factors), a Hadamard matrix with 1060 rows was used as the initial screening design, and the initial screening design was modified to remove a row of the Hadamard matrix and reduce to 531 columns.

Further, the optimization is improved in each of the examples. It should be noted here that the D-Efficiency displayed in Table 3 for Example 3 (34 runs and 31 factors) is the highest efficiency that can be achieved for this number of runs and number of factors. Accordingly, embodiments herein are useful for reducing design time while improving measures of optimization. Further, embodiments herein are useful for optimizing designs to consider secondary criteria beyond optimization criteria.

One or more techniques described herein are useful for applications related to validating data for use in generating a model (e.g., a machine learning algorithm model). One type of model validation technique is a cross-validation technique for assessing how the results of a statistical analysis will generalize to an independent data set. For example, if the model is used to predict responses based on input for various factors, cross-validation can be used to determine how accurate the model is at predicting the responses. Cross-validation can also be referred to as rotation estimation or out-of-sample testing. Embodiments herein are applicable to different types of validations. For example, there are many types of cross-validation. Cross-validation includes exhaustive and non-exhaustive cross-validation. Exhaustive cross-validation techniques test all possible ways to divide an original sample of data for generating a model. Non-exhaustive cross-validations do not compute all ways of splitting the original data sample. Embodiments are particularly useful in validations in which repeated validations are performed to sample different portions of the original sample. For example, with a K-fold cross validation, the original sample is partitioned into K equal sized subsamples, and a single subsample is retained as the validation data for testing the model and the remaining subsamples are used as training data for generating a test model. The validation can be repeated K times with each of the K samples used as the validation data and the results can be averaged. Practitioners may want to repeat the K-fold process several times over different validation sets, often referred to as repeated K-fold cross validation.

Current approaches to K-fold cross-validation involve selecting the data in the different K-fold validation sets by randomly selecting consecutive K-fold cross validation sets. However, this can result in a fold from one set being highly correlated with a fold from another set. Further, current software approaches may have other limitations. For instance, the software may only provide a single data set for validation or independent data sets such that there is no way to optimize different data sets for different validations.

One or more embodiments described herein control assignment of group identifiers to data elements of a data set. For example, one or more embodiments, selectively assign these group identifiers to test case of a data set by considering the data set as a whole. This can achieve an improved grouping assignment design (e.g., orthogonal or near-orthogonal groups) and an improved grouping assignment design between different validations than current approaches to validation (e.g., with better input variation between groups).

Figure 41:
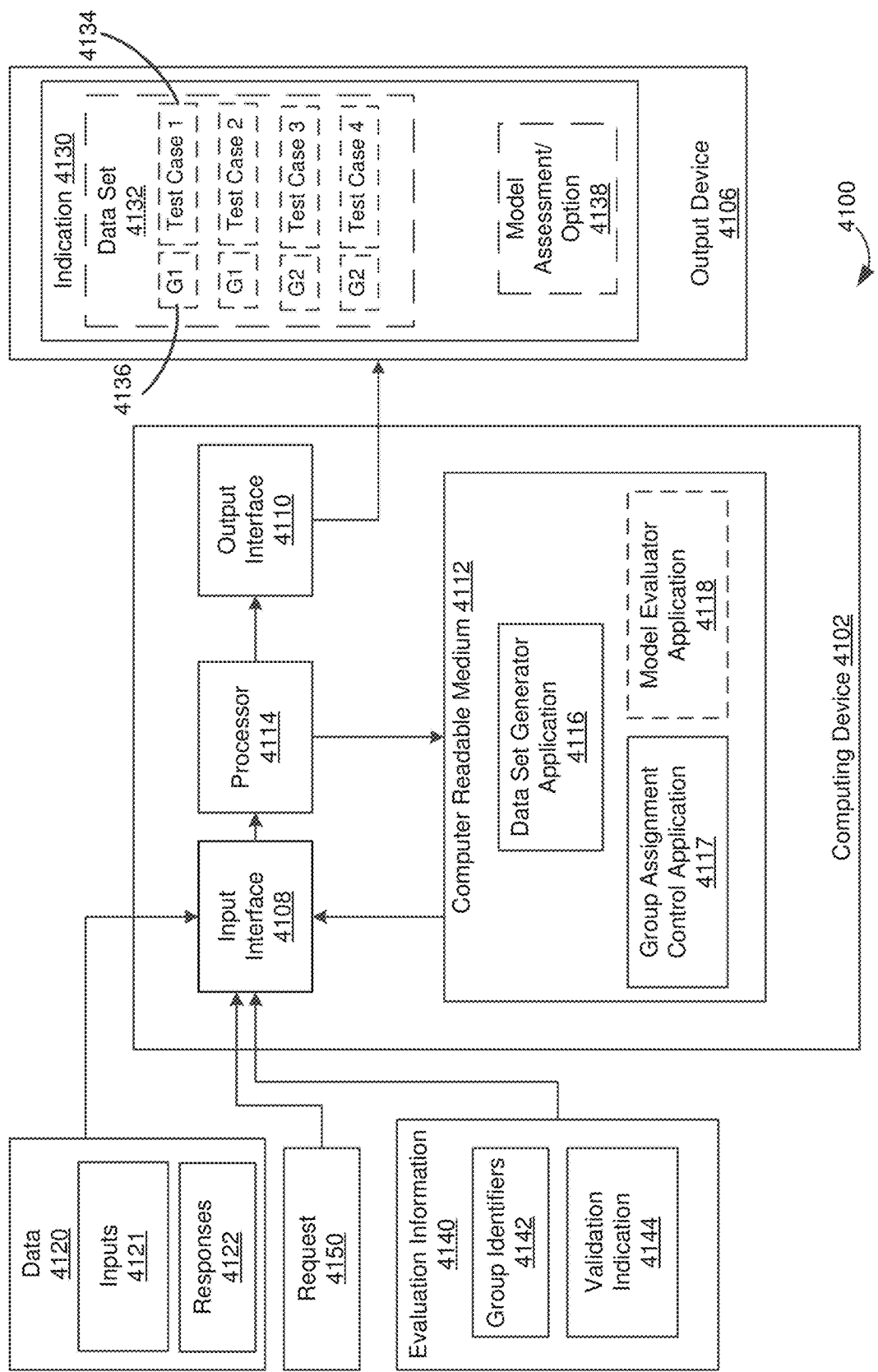
FIG. 41 illustrates an example block diagram with an example of a system for outputting an indication for one or more validations of a model in at least one embodiment of the present technology.

FIG. 41 illustrates a block diagram with an example of a system 4100 for outputting an indication 4130 for one or more validations of a model. The system 4100 includes a computing device 4102 useful for outputting the indication 4130. In one or more embodiments, the computing device 4102 is the same or different from computing devices described herein (e.g., computing device 3302, computing device 2102 or computing device 1302).

The system 4100 is configured to exchange information relevant to outputting the indication 4130 (e.g., between computing device 4102 and output device 4106) in the system (e.g., via wired and/or wireless transmission) and/or devices in other systems described herein (e.g., system 3300, system 2100, and system 1300). For example, a network (not shown) can connect one or more devices of system 4100 to one or more other devices of system 4100, system 3300, system 2100, or system 1300. In one or more embodiments, fewer, different, and/or additional components than shown can be incorporated into the system 4100 (e.g., components of system 3300, system 2100 or system 1300).

In one or more embodiments, the computing device 4102 obtains information related to outputting the indication 4130. In one or more embodiments, the input interface 4108 comprises one or more features of an input interface described herein or is an input interface described herein (e.g., input interface 1308). In one or more embodiments, the computing device 4102 obtains data 4120 for test cases for testing a system. For example, the system could be a physical environment like a city or geographic region, or a machine like an airplane or a computing system. The system could also be a computer-simulated system. A response of the system could be influenced by selection of various options for factors of the system. For example, in the case of a city, the medium housing price or air pollution in the city could be impacted by factors in the city (e.g., medium age of a home in the city, racial make-up of the city, crime rate, etc.).

In one or more embodiments, the data 4120 includes, for example, inputs 4121 each representing a respective option for each of factors in each of respective test cases. For instance, if one of the factors is crime rate, the different options for each of the test cases could be one of different rate ranges (e.g., <5%, 5-15%, >15%).

Additionally, or alternatively, the data 4120 comprises responses 4122 (e.g., a measure of air pollution or medium housing prices) of the system for each of respective test cases. The response could be a result of one or more options selected for a factor for the system or it could be influenced or determined by other factors not present or captured in the test cases. However, the factors may be selected for the test cases because a practitioner or computing system considers selected factors as useful for generating a model to predict responses. For example, based on data regarding system parameters for an airplane, and failure rates given those parameters, certain system parameters may be used to generate a model to predict future airplane failures.

In one or more embodiments, the computing system 4100 is used to collect, generate, or store the data 4120 (e.g., at computing device 4102). Alternatively, or additionally, the computing device 4102 receives the information via an input interface 4108 (e.g., from an input device described herein).

In one or more embodiments, the computing system 4100 is used to evaluate how useful data associated with selected factors is for generating a model. For example, in one or more embodiments, the computing device 4102 receives a request 4150 requesting an evaluation of the data 4120 for generating a model to predict responses based on selected factors. Additionally, or alternatively, the computing device 4102 receives evaluation information 4140 for evaluating a model (e.g., to evaluate in response to request 4150). The evaluation information 4140 may be obtained by the computing device 4102 by receiving the information (e.g., entered from a user of the computing device 4102). Alternatively, the information is obtained or generated from information stored in the computing device 4102 (e.g., in computer readable medium 4112). For instance, the request 4150 could indicate the evaluation information 4140 or information to obtain or trigger a variation of the evaluation information 4140. The request 4150 could be sent in one or more computer messages.

In one or more embodiments, the evaluation selected for the model uses different groups of test cases, and the evaluation information 4140 is related to assigning the different groups of the evaluation. For example, with cross-validation using a holdout method, data 4120 is assigned to two group's a training set for generating a model and a test set for testing the model. The results of the testing can be used by the computing device 4102 to evaluate the model. As another example, K-fold cross validation divides a data sample into k groups with one of the groups used for testing and the rest of the groups used for training. The process is repeated k times with each of the groups getting used as a test group.

In the same embodiments, or different embodiments, the evaluation selected for the model uses different validation sets and the evaluation information is related to the number of validation sets. For example, a given validation (e.g., K-fold or hold-out) could be repeated with different test cases assigned to different groups.

In one or more embodiments, the computing device 4102 obtains evaluation information 4140 by obtaining different group identifiers 4142 for each of different groups for distributing the plurality of test cases for the system. At least one group of the different groups is a test group for testing a respective test model derived from inputs of one or more training groups of remaining groups of the different groups. For example, the computing device 4102 could receive an indication of a total number of groups or total number of test cases within a group, and generate different group identifiers for the different groups. Alternatively, the computing device 4102 could generate the group identifiers from a default value for a selected or requested evaluation method (e.g., 10 groups for a 10-K-fold cross validation). Additionally, or alternatively the computing device could receive the different group identifiers (e.g., from an input device described herein).

In one or more embodiments, the computing device 4102 obtains evaluation information 4140 by obtaining a validation indication 4144 indicating one or more validations for validating a model derived from the data. For instance, a user could provide a quantity of validations. Alternatively, the computing device 4102 could obtain this information implicitly or using a default value (e.g., using a default value of a single validation set unless a user provides an alternative validation number).

In one or more embodiments, the computing device 4102 generates data sets useful for evaluating the model. In the same or different embodiments, the computing device 4102 evaluates the model (e.g., using the generated data sets).

In one or more embodiments, the computing device 4102 has a computer readable medium 4112 (e.g., computer readable medium 3312, 2112 and/or 1312) and a processor 4114 (e.g., processor 3314, processor 2114 and/or processor 1314). For instance, computer readable medium 4112 comprises one or more features of one or more computer readable mediums described herein or is one of computer readable mediums described herein (e.g., computer readable medium 3312, computer readable medium 2112, or computer readable medium). Additionally, or alternatively, processor 4114 comprises one or more features of one or more processors described herein or is one of processors described herein (e.g., processor, 3314, processor 2114, or processor 1314). For instance, in one or more embodiments, computer readable medium 4112 stores instructions for execution by processor 4114. For example, computer readable medium 4112 comprises instructions for generating data sets useful for evaluating the model, and/or instructions for evaluating the model.

In one or more embodiments, the computer readable medium 4112 comprises a data set generator application 4116 comprising stored instructions for generating a data set comprising a respective data element for each of multiple test cases. For instance, a data set is generated for evaluating data for generating a model to predict responses based on multiple factors. A data set can be generated for each validation (e.g., each validation indicated by the validation indication 4144).

Additionally, or alternatively, the computer readable medium 4112 comprises a group assignment control application 4117 comprising stored instructions for controlling assignment of a group identifier of the different group identifiers to test cases (e.g., by assigning a group identifier to each of the respective data elements).

Additionally, or alternatively, the computer readable medium 4112 comprises a model evaluator application 4118 for evaluating a model (e.g., according to a data set generated by the data set generator application 4116 and/or a group assignment according to the group assignment control application 4117).

Data set generator application 4116, group assignment control application 4117 and model evaluator application 4118 are shown for explanation as separate applications. However, computer instructions or operations associated with the applications could be configured differently and/or work together (e.g., in the same application). For example, one or more claimed embodiments are packaged as an add-in where a user can create orthogonal, or near-orthogonal, K-fold validation columns for an existing software tool (e.g., one or more SAS software tools described herein).

In one or more embodiments, the computing device 4102 outputs an indication 4130 of a generated data set for each of one or more validations. For instance, the indication 4130 could be the generated data set itself. FIG. 41 shows a data set 4132 with respective data elements 4136 for assigning a group identifier (e.g., a G1 testing group and a G2 training group). The data set 4132 also comprises test case information 4134 assigned to each of the groups. As an example, computing device 4102 could display on output device 4106, via a graphical user interface, the data set or output it to another computing device or system (not shown) for evaluating the model.

Additionally, or alternatively the indication 4130 could indicate a model assessment or option 4138 itself. For example, the computing device 4102 could display on output device 4106 a score for one or more validations. For example, the model evaluation indicates how much variance a model based on the data accounts for in observed responses of the system according to test cases of the plurality of test cases. For instance, a perfect model trained on training data would be able to predict correctly all the observed responses of the test data with no variance. However, a model could still be useful or valid even if there is marginal variance in the predicted responses compared to the observed responses in the test data. The model evaluation could indicate how valuable that model is by indicating a variance.

Alternatively, or additionally, the computing device 4102 could display on output device 4106 an option for improving a model. For example, if the model is a machine learning algorithm trained on one or more observed inputs and one or more observed responses, the indication 4130 could indicate an option of whether to discard or add test cases to the plurality of test cases to improve the machine learning model.

For example, in one or more embodiments, the computing device 4102 could associate a first group identifier of the different group identifiers with a test group that comprises all the test cases assigned the first group identifier. The computing device 4102 could associate at least a second group identifier of the different group identifiers with a training group that comprises all the test cases assigned the second group identifier. The computing device could then generate a first test model (e.g., generate a machine learning algorithm) based on the training group. The computing device could then generate a first test evaluation of the first test model at predicting the responses for each of respective test cases of the test group. The computing device could then generate, based on all test evaluations generated for each of the one or more validations, a model evaluation of the data for generating the model to predict responses based on the plurality of factors. The computing device could then output an assessment of the model evaluation.

In an example where the validation requires more than one training group (e.g., a K-fold cross-validation, where k is more than 2), the computing device could be configured to receive user input (e.g., via input interface 4108) indicating multiple training groups; and for each of the one or more validations, generate a first test model based on the multiple training groups.

Output interface 4110 and output device 4106 could be one of or comprise features of output interfaces (e.g., output interface 3310 or 1310) and output devices (e.g., output device 3306 or 1306) described herein.

In one or more embodiments, the system 4100 implements a method as described herein (e.g., a method shown in FIGS. 42A-42B) for outputting one or more validations of a model.

Figure 42A:
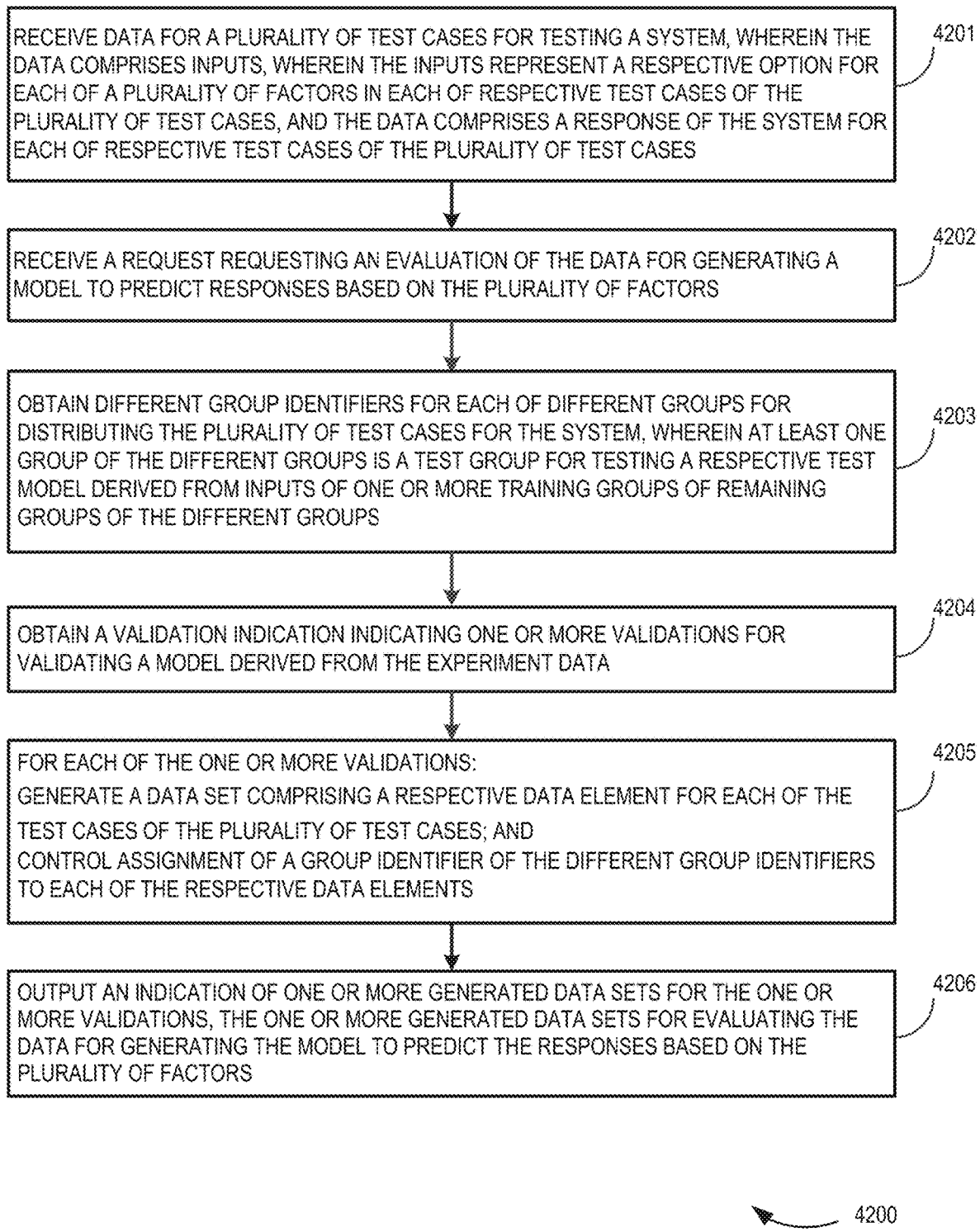
FIG. 42A illustrates an example method for outputting an indication for one or more validations of a model in at least one embodiment of the present technology.

FIG. 42A illustrates a method 4200 for outputting an indication for one or more validations of a model.

An operation 4201 of method 4200 comprises receiving data for a plurality of test cases for testing a system. The data comprises inputs and the inputs represent a respective option for each of a plurality of factors in each of respective test cases of the plurality of test cases. For example, the data could comprise inputs for a continuous factor (e.g., a continuous factor described herein). In this case, the inputs include values within a range of continuous values for the continuous factor. Additionally, or alternatively, the data comprises inputs for a categorical factor. The inputs could then include values representing one of discrete options for the categorical factor within a range of options (e.g., a categorical factor described herein). The data comprises a response of the system for each of respective test cases of the plurality of test cases (e.g., according to the inputs of the test cases).

An operation 4202 of method 4200 comprises receiving a request requesting an evaluation of the data for generating a model to predict responses based on the plurality of factors. An operation 4203 of method 4200 comprises obtaining different group identifiers for each of different groups for distributing the plurality of test cases for the system. For example, a computing device may receive a request by receiving a user request requesting an evaluation of a model using K-fold cross-validation and obtain different group identifiers by generating k group identifiers for each of K-folds of the K-fold cross-validation. In this embodiment or different embodiments, at least one group of the different groups is a test group for testing a respective test model derived from inputs of one or more training groups of remaining groups of the different groups.

An operation 4204 of method 4200 comprises obtaining a validation indication (e.g., indication 4130) indicating one or more validations for validating a model derived from the data. For example, it may be beneficial to have multiple validations for validating a model (e.g., with different data distributions for each of different K-folds).

An operation 4205 of method 4200 comprises for each of the one or more validations: generating a data set comprising a respective data element for each of the test cases of the plurality of test cases and controlling assignment of a group identifier of the different group identifiers to each of the respective data elements. For example, the data set 4132 in FIG. 41 has data elements 4136 for group identifiers. Assignment can be controlled such that the test cases are not merely randomly assigned to groups. Instead they are assigned in a controlled manner to achieve an optimal distribution or some criterion representing an optimal distribution (e.g., an orthogonal or near-orthogonal design). As explained in more detail above criterions according to an orthogonal design could be criterion related to one or more of an Alias-efficiency, a D-efficiency, a G-efficiency, an A-efficiency, or an I-efficiency. The criterion could be provided by a user.

In some embodiments, there are multiple validations. In such cases, it may be useful to control assignment of different group identifiers to each test case of the plurality of test cases (e.g., test case information 4134) such that all test cases identified by a same group identifier of a given validation are distributed among as many of different groups of other validations as possible given one or more criterion for distributing the test cases of a validation according to an orthogonal design.

An operation 4206 of method 4200 comprises outputting an indication of one or more generated data sets for the one or more validations (e.g., indication 4130 as shown in FIG. 41). The one or more generated data sets are for evaluating the data for generating the model to predict the responses based on the plurality of factors.

Figure 42B:
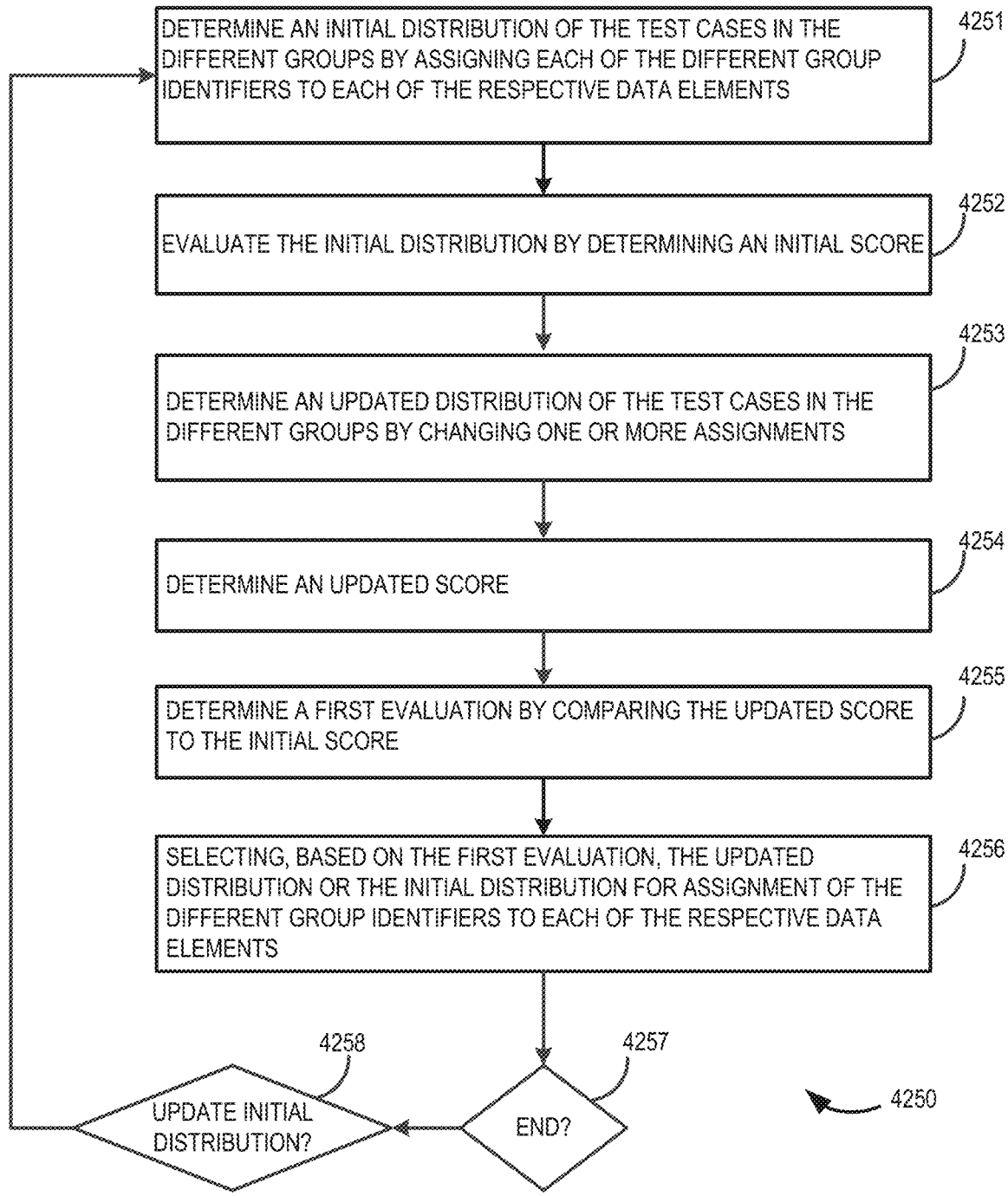
FIG. 42 B illustrates an example method for controlling assignment of group identifiers to data elements in at least one embodiment of the present technology.

In the same or different embodiment as an embodiment for executing method 4200, the design of a given validation could be determined by one or more iterative operations. FIG. 42B provides an example method 4250 for controlling assignment of the group identifier of the different group identifiers to each respective data element of the data set (e.g., as part of operation 4205).

An operation 4251 of method 4250 comprises determining an initial distribution of the test cases in the different groups by assigning each of the different group identifiers to each of the respective data elements. In an example, initial distribution a first group identifier of the different group identifiers is assigned to a data element for one or more test cases of the initial distribution. Determining an initial distribution could comprise, for instance, randomly distributing the group identifiers to each of the test cases or could be a distribution provided by a user. As another example, the method 4250 could be performed over several iterations and the initial distribution could be generated from a previous iteration of the method 4250.

An operation 4252 of method 4250 comprises evaluating the initial distribution by determining an initial score. For instance, the initial score could indicate the initial distribution compared to an orthogonal design or a previous design considered optimal in some way for distributing the test cases in the different groups.

An operation 4253 of method 4250 comprises determining an updated distribution of the test cases in the different groups by changing one or more assignments. For example, an assignment of a first group identifier to a first data element in an initial distribution could be changed to an assignment of a second group identifier of the different group identifiers to the first data element.

In one or more embodiments, the groups do not need to have the same number of test cases, therefore an assignment of a group identifier to one test case could be changed without changing an assignment of a group identifier to any other test cases. For example, a coordinate exchange approach can be used to select a value when changing the assignment. In other cases, assignment could involve swapping identifiers and/or changing multiple identifiers.

The method 4250 could be performed for one or more iterations. For example, an operation 4257 could be used to determine whether to end the method 4250. For example, the decision could be based on a criterion for the score of the updated distribution or an improvement in distribution. Alternatively, or additionally, the decision could be based on user input or computer system input indicating a default level of iterations. If the method is not ended, an operation 4258 can be used to determine whether to update the initial distribution. For example, the initial distribution could be updated in response to a selection of the updated distribution or other control of the initial distribution (e.g., user control).

In one example, of an iterative process in pseudo code, if there are N K-folds sets for a K-fold cross-validation there could be NK runs or iterations.

```
For idx = 1 to N
    Create a random balanced column with K levels // N random K-folds
For runidx = 1 to NK
    For(colidx = 1 to N)
        Consider changing the level of column colidx, in row runidx to any of
        the other K levels, making the change that maximizes the information
        matrix.
Repeat from runidx a set number of times.
Repeat from the beginning with a different set of random columns.
Choose the best design that maximizes the information matrix.
```

For example, it may be beneficial to change a group identifier to switch identifiers between different test cases. For instance, the initial distribution could comprises an assignment of the second group identifier of the different group identifiers to a second data element for a second test case of the initial distribution; and determining the updated distribution could comprise changing the assignment of the first group identifier to an assignment of the second group identifier by switching the assignments of the first data element and the second data element.

Operation 4254-4256 comprise operations to evaluate an updated distribution. An operation 4254 of method 4250 comprises determining an updated score. For example, the updated score could indicate a score for the updated distribution compared to the orthogonal design for distributing the test cases in the different groups. An operation 4255 of method 4250 comprises determining a first evaluation by comparing the updated score to the initial score. An operation 4256 of method 4250 comprises selecting, based on the first evaluation, the updated distribution or the initial distribution for assignment of the different group identifiers to each of the respective data elements.

In one example, the determining the initial score comprises computing |X'X| according to the initial distribution where X is a model matrix for modeling the data according to a given distribution of a validation of the one or more validations. The determining the updated score comprises computing |X'X| according to the updated distribution; and the selecting, based on the first evaluation, the updated distribution comprises selecting based on an indication of a D-efficiency for the updated distribution.

The evaluations could be based on other optimality criterion. For example, a computing device (e.g., computing device 4102) could receive a selection of a criterion for evaluating the updated distribution. The selection could then comprise one of the user's selection, such as an Alias-efficiency, a G-efficiency, an A-efficiency, a D-efficiency or an I-efficiency.

In one or more embodiments, comprising a method, operations could be performed in different orders, simultaneously or in conjunction with other operations described herein. For instance, operations 4201-4204 could be performed in different orders or simultaneously. Operations 4205 could be executed simultaneously with operations of method 4250.

In one or more embodiments, a computing device (e.g., computing device 4102) displays on a display device (e.g., output device 4106) a graphical user interface for user control of an assessment of a model.

Figure 43:
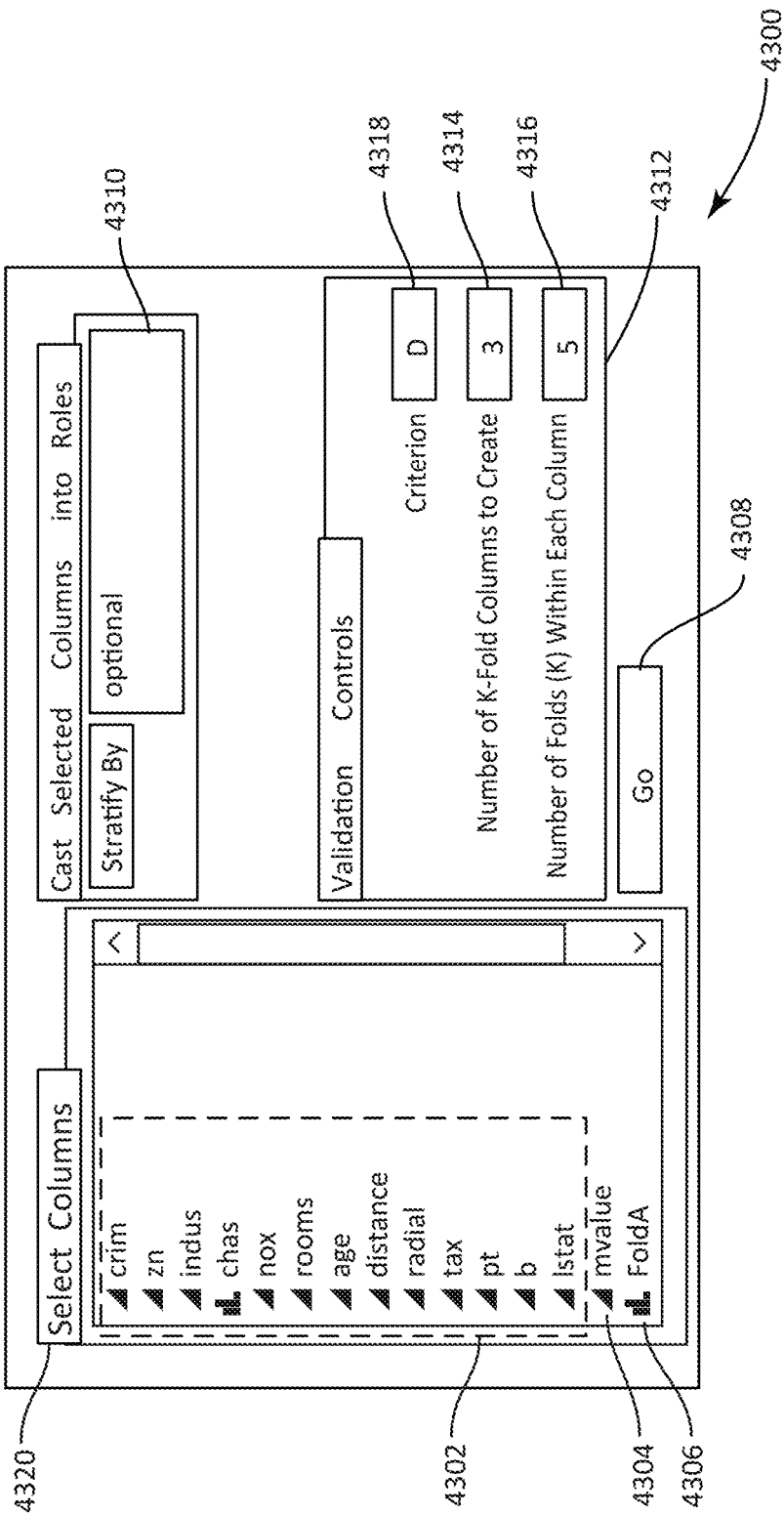
FIG. 43 illustrates an example graphical user interface for user control of an assessment of a model in at least one embodiment of the present technology.

FIG. 43 illustrates an example graphical user interface 4300 for user control of an assessment of a model. In a select columns dialog box 4320, the user can select factors 4302. In this example, the factors selected are factors identified in Boston housing data reported in the Journal of Environmental Economics and Management See Harrison Jr, D., & Rubinfeld, D. L. (1978). Hedonic housing prices and the demand for clean air, *Journal of environmental economics and management* 5 (1), 81-102. Other data sets could be used that have some set of inputs and responses.

An evaluation type 4304 is selected and validation data sets can be generated (e.g., validation 4306).

In this example, the user wants to generate a set of K-fold cross-validation sets (columns) for use in machine learning algorithms that use K-fold cross-validation. Each one of these K-fold sets/columns will partition the data into K (usually equal sized) parts. Repeated K-folds means multiple of these K-fold sets are needed.

In the example, the select columns dialog box 4320 is used to specify instructions for generating a data set in a table format with different columns, but other data format schemes could be used (e.g., selecting rows).

In one or more embodiments, there is a Validations Controls option 4312 for specify user controls on the validation. For instance, the user has a text box 4314 for specifying the number of K-fold columns and a text box 4316 for specifying the number of folds within each column. Other entry methods could be used (e.g., by inserting the identifiers of the K-fold columns into a dialog box or using a slide bar to indicate an amount or number).

The validations controls 4312 could be used to specify other controls or criterion that are used in creating the validations (e.g., in determining a distribution of group identifiers). In the example, shown the user can select a criterion for evaluating the updated distribution in the criterion text box 4318. In this case, the computing device is configured to receive a selection of a criterion for evaluating the updated distribution, and the user has selected a D for D-efficiency. However other selection options could include one or more of Alias-efficiency, a G-efficiency, an A-efficiency, or an I-efficiency.

Additionally, or alternatively, a criterion could relate to a number of changes of group identifiers. For example, a computing device (e.g., computing device 4102) could display, on a display device (e.g., output device 4106), a graphical user interface for user entry indicating a number of changes of group identifiers. The computing device can then receive, from a user of the graphical user interface, via one or more input devices, user input indicating the number of changes of group identifiers. The computing device can determine, based on the user input, a set of updated distributions comprising the updated distribution (e.g., a set of updated distributions generated using method 4250). The computing device can evaluate the updated distribution by evaluating each of the set of updated distributions and select the updated distribution out of the set of updated distributions.

A Cast Selected Columns into Roles dialog box 4310 is used to give a user the ability to specify one or more columns to use as a covariate in creating the K-fold columns or to stratify data to achieve a certain proportion of data observations associated with a particular factor. One or more embodiments can be used to create K-fold validation columns that are near-orthogonal to those covariates. For instance, if the user enters a response as the covariate, the output validations will have a better spread of response data points within each of the folds compared to random assignment with, for instance, all low values of a response within a single fold. One or more inputs or responses can be specified in the Cast Selected Columns into Roles dialog box 4310.

In one or more embodiments, a control is given to generate data sets for the validations or otherwise generate an indication of the validations. In this case by clicking the "Go" button invokes a platform (e.g., JMP's "Custom Design" platform), where the number of factors used by the platform is the value specified by the "Number of K-fold Columns to Create" control text box 4314, and the levels for each factor set to the value specified by the "Number of Folds (K) Within Each Column" control text box 4316. The columns selected by the "Stratify By" control dialog box 4310 are used as covariates within the "Custom Design" platform, which ensures that the values of those columns are used in constructing the design.

Traditional approaches to creating K-folds was to randomly distribute test cases in the different folds. However, claimed embodiments improve on this approach and create multiple K-fold sets.

FIG. 44 illustrates an example portion of a data set 4400 with multiple validations. As shown, there are multiple generated data sets for each validation within data set 4400 for each of test cases 4450. For example, there is a validation set for fold A in column 4401, a validation set for fold B in column 4402, and a validation set for fold C in column 4403. These columns comprise assigned group identifiers (1-5) in each data element of the validation set.

Using one or more embodiments, described herein, K-fold columns are generated by making a number of K-fold sets with K-fold columns that are near-orthogonal under an orthogonal coding. In other words, for any level of a K-folds column, there is an even spread for the remaining levels of the K-folds columns. For example, column 4401 shows a portion of test cases assigned to a first group with the group identifier "1". In other folds shown in columns 4402 and 4403, these same test groups are distributed amongst one of different groups with identifiers 1-5.

In one or more embodiments, generated K-fold sets are data sets that can be passed off to some machine learning algorithm for validation. For example, they can be added to a data table to be used by XGBoost. XGBoost is an optimized distributed gradient boosting library that implements machine learning algorithms under the Gradient Boosting framework. XGBoost can be run in distributed environments (e.g., a parallel processing database provided by Hadoop®). The validation data sets are shown as part of a single data set as shown in FIG. 44. However, the validation sets could be created as separate tables.

For K-fold validation, different groups can be used as a test group and training group, where the training group is used to construct a model that is tested by data of the test group. For instance, a first test model can be constructed or generated with test cases assigned to a first group identifier associated with a training group in a fold (e.g., Fold B of column 4402). A first test evaluation can be generated by testing the first test model with data of test cases assigned a second group identifier associated with a test group. Then, a second test model can be constructed or generated with test cases assigned to the second group identifier associated with a training group in a fold (e.g., Fold B of column 4402). A second test evaluation can be generated by testing the second test model with data of test cases assigned a first group identifier associated with a test group. A model evaluation of all the data for generating the model to predict responses based on the factors can be generated based on multiple test evaluations (e.g., the first test evaluation and the second test evaluation).

There are times where it is helpful to have one or more inputs or responses from data be accounted for in the K-fold sets (e.g., columns indicated in dialog box 4310 in FIG. 43 can be used as covariates). For instance, a computing device (e.g., computing device 4102) can receive a user indication of a first factor (e.g., a factor of factors 4302) to use in controlling assignment of the different group identifiers to each test case of multiple test cases. For example, if a factor selected is a tax rate ratio, the data in column 4404 could be used in assigning group identifiers. Tax rate ratio is shown as numbers in a range of values. A given range can be considered contiguous segments of values. By selecting this factor, for a given validation, control of assignment of the different group identifiers can be made such that all test cases identified by a same group identifier of a given validation of the multiple validations are distributed among all or most of different groups of other validations of the multiple validations, and all test cases with inputs in a particular segment of the contiguous segments are distributed among all of the different groups of the multiple validations.

For example, the portion of the data set 4400 shown has a large distribution of tax rate ratios in column 4404 (ranging from 233 to 469). Segments in this range could comprise one or more segments (e.g., below 350 and 350 or greater). The amount of inputs in a range segment do not need to be the same. As shown, there are inputs in both segments distributed in group 1 of Fold A.

In the same or different embodiment, a given validation set can be used to control assignment in other validation sets. For instance, a computing device (e.g., computing device 4102) can receive a user indication indicating control of assignment of the different group identifiers to each test case of the plurality of test cases is to be based on a group of a first validation of different validations of the one or more validations. For example, a fold (e.g., Fold A of column 4401) can be selected indicating each of its groups (e.g., by selecting a fold column in a select columns dialog 4320). For a second validation of the different validations, a computing device (e.g., computing device 4102) can control assignment of the different group identifiers to each test case of the plurality of test cases such that all test cases of the group of the first validation are distributed among all or most of different groups of other validations of the different validations.

In the same or different embodiment, a computing device (e.g., computing device 4102) can receive a user indication indicating control of assignment of the different group identifiers to each test case of the plurality of test cases is to be based on responses of the test cases. Data can be received comprising a value, associated with a range of values, for the response in each of the respective test cases. For each of multiple validations of the one or more validations, a computing device controls assignment of the different group identifiers to each test case of the plurality of test cases such that: all test cases identified by a same group identifier of a given validation of the multiple validations are distributed among all of different groups of other validations of the multiple validations, and all test cases with inputs in a particular segment of the range of values are distributed among all of the different groups of the other validations of the multiple validations.

Figure 45A:
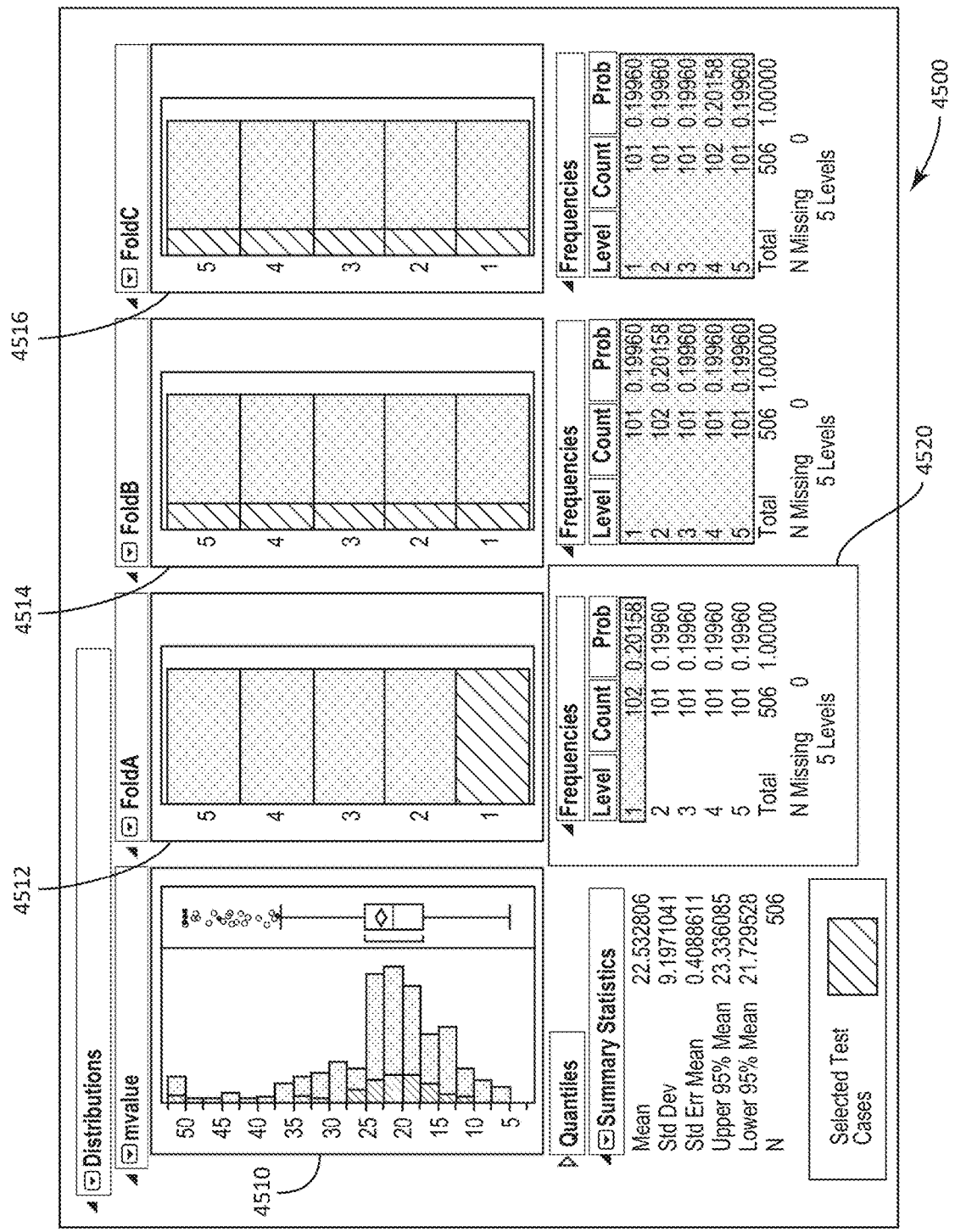
FIGS. 45A-B illustrate an example graphical user interface of distribution of test cases in multiple validations.
Figure 45B:
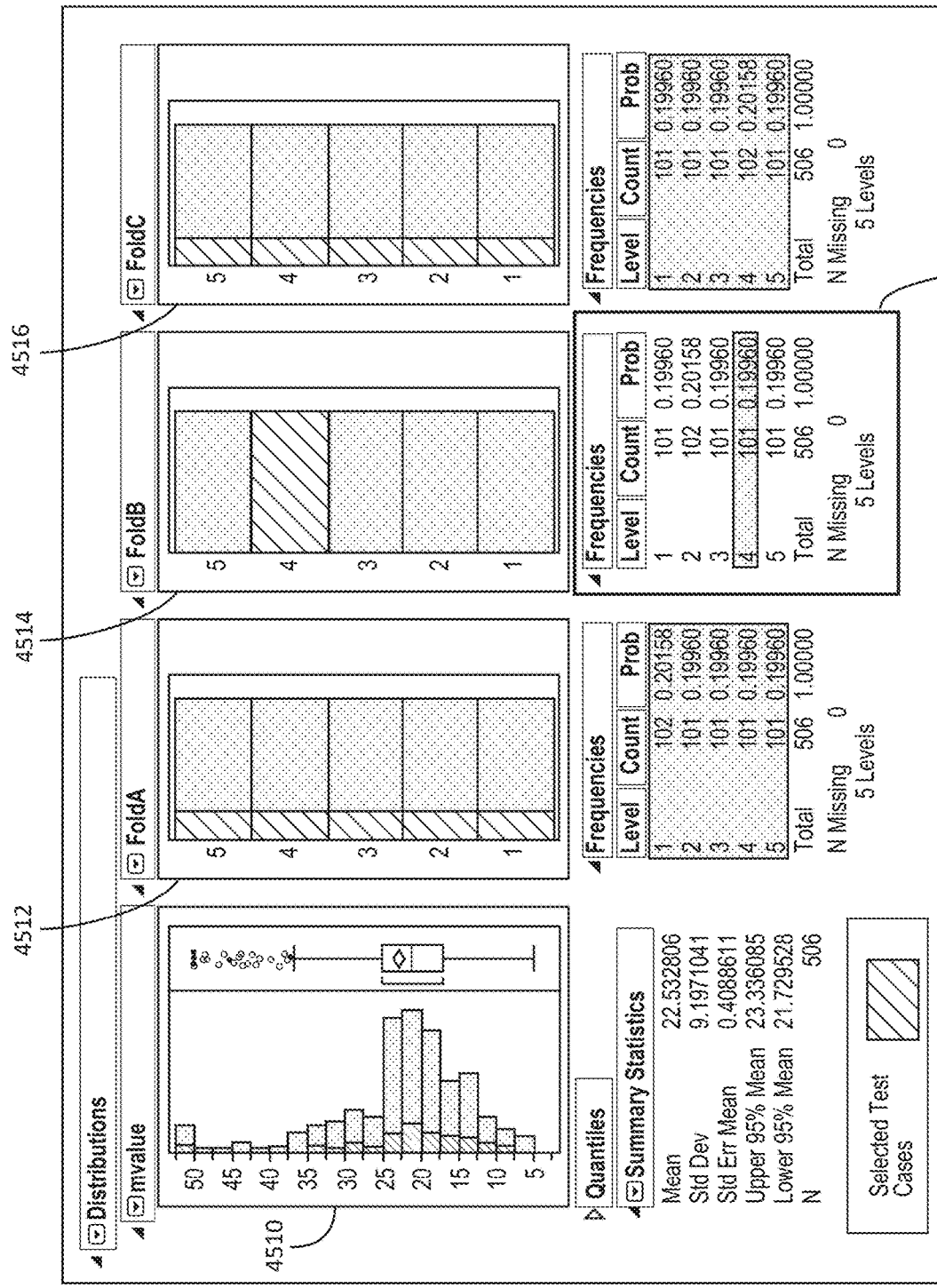

FIGS. 45A-B illustrate an example graphical user interface 4500 showing distribution of test cases in multiple validations. In the example shown in FIG. 45A, graph 4510 shows a representation of a range of mvalues or medium value of owner-occupied homes associated with a response for input data for the identified factors 4302. The mvalues range from 5-55 with an average around 22.5. The mvalue was selected for distribution of cases. Each fold has approximately 101 to 102 test cases assigned a given group identifier from 1 to 5. The test cases assigned to a first group are selected in chart 4520 and shown graphically in graph 4512. As shown in graphs 4514 and 4516, test cases of this first group are in each of the groups of the other validations. Further as shown in graph 4510, the test cases are well distributed among the range of possible mvalues.

In the example shown in FIG. 45B, the test cases assigned to a fourth group of Fold B are selected in chart 4530 and shown graphically in graph 4514. As shown in graphs 4512 and 4516, test cases of this fourth group are in each of the groups of the other validations. Further as shown in graph 4510, the test cases are well distributed among the range of possible mvalues.

In one or more embodiments, multiple factors, response, or validation data sets can be considered in controlling assignment. For example, a computing device (e.g., computing device 4102) may receive a user indication indicating control of assignment of the different group identifiers to each test case of the plurality of test cases is to be based on responses of the test cases as well as a set of the plurality of factors, where the set comprises more than one factor. The computing device receives data comprising a response value associated with a response range of values for the response in each of the respective test cases. The computing device also receives respective values, each associated with a respective range of values for each of the set of the plurality of factors. For each of multiple validations, the computing device controls assignment of the different group identifiers to each test case of multiple test cases such that all test cases identified by a same group identifier of a given validation of the multiple validations are distributed among all of different groups of other validations of the multiple validations. Further, all test cases with inputs in a particular segment of a respective range of values are distributed among all of the different groups of the other validations of the multiple validations and all test cases with inputs in a particular segment of the response range of values are distributed among all of the different groups of the other validations of the multiple validations.

In one or more embodiments, it may be desirable to keep certain test cases grouped within a given validation data set. For example, information may be known about various test cases which shows a relationship or correlation between those test cases. In that case it may be useful to group the test cases in a single group. As one example, if the system is a wild cat ecosystem, and the response is a population of wild cats in an area over time, factors influencing this population may relate or be linked to individuals of the population. For example, a test case that had a factor related to size of a recorded footprint and where it was spotted (e.g., in a particular area of a preserve) may be data from the same animal (e.g., an animal with the same identifier). It may be useful to group data likely to be attributed to a same individual wild cat within a same group to ensure a good distribution of data from different wild cats in different groups.

In this case, assignment may be controlled by using a so-called restricted factor to restrict levels or ranges of that factor with the same group.

FIG. 46 illustrates an example portion of a data set with a restricted factor level in at least one embodiment of the present technology.

In this example, the factor "chas" could stand for Charles River with one level assigned to whether the property was on the river (1) and one level if it was not (0). It would be expected that homes on a river in a land-locked area would have a higher than a comparable home not on a river location. Thus, to discount the artificial increase in medium home prices from this individual factor, the chas factor was restricted such that all levels of 0 were in one or more groups and all levels of 1 were in one or more other groups. In the example, shown in each of the validation sets in columns 4602, 4603 and 4604, chas of 0 are all shown in a group together (although not necessarily the same group in each of the validations).

In one or more embodiments, a computing device (e.g., 4102) receives a restriction request indicating to restrict a factor in some way. For instance, the inputs for a given factor in a set of factors indicates a value associated with a respective range of values for the given factor in each of respective test cases. The respective range of values comprises a respective plurality of segments of a contiguous range of values. The restriction request may indicate to restrict a given segment of the respective plurality of segments to a same group of different groups. For each of multiple validations, a computing device can control assignment of the different group identifiers to each test case of the plurality of test cases such that all test cases identified by a first group identifier of a given indicated validation of the indicated validations comprise the test cases of the given segment.

In one example, of pseudo code for a process to control assignment for N K-folds sets:
1. For each of the N sets, randomly assign each identifier to one of the K-folds.
2. For i=1 to N
   For j=1 to M
      If j is assigned to group p in the K-fold set i, consider swapping the group assignment with all other identifiers. Make the swap (or other change) that maximizes the determinant of the information matrix (transpose(X)*X), where X is the model matrix for the K-fold sets represented as columns. If no swap improves the optimality of the design, keep the design as is.
3. Repeat step 2 a set number of times (say 10) or until no swap is made.
4. Repeat steps 1 to 3 a few times, choosing the K-fold cross-validation columns that maximize the determinant of the information matrix (transpose(X)*X), or using some other optimality criterion.

In the case of a restricted factor, rather than simply changing a single identifier, all the group assignments for data rows of the same value or value range for the restricted factor may be changed as well in a considered distribution.

Figure 47B:
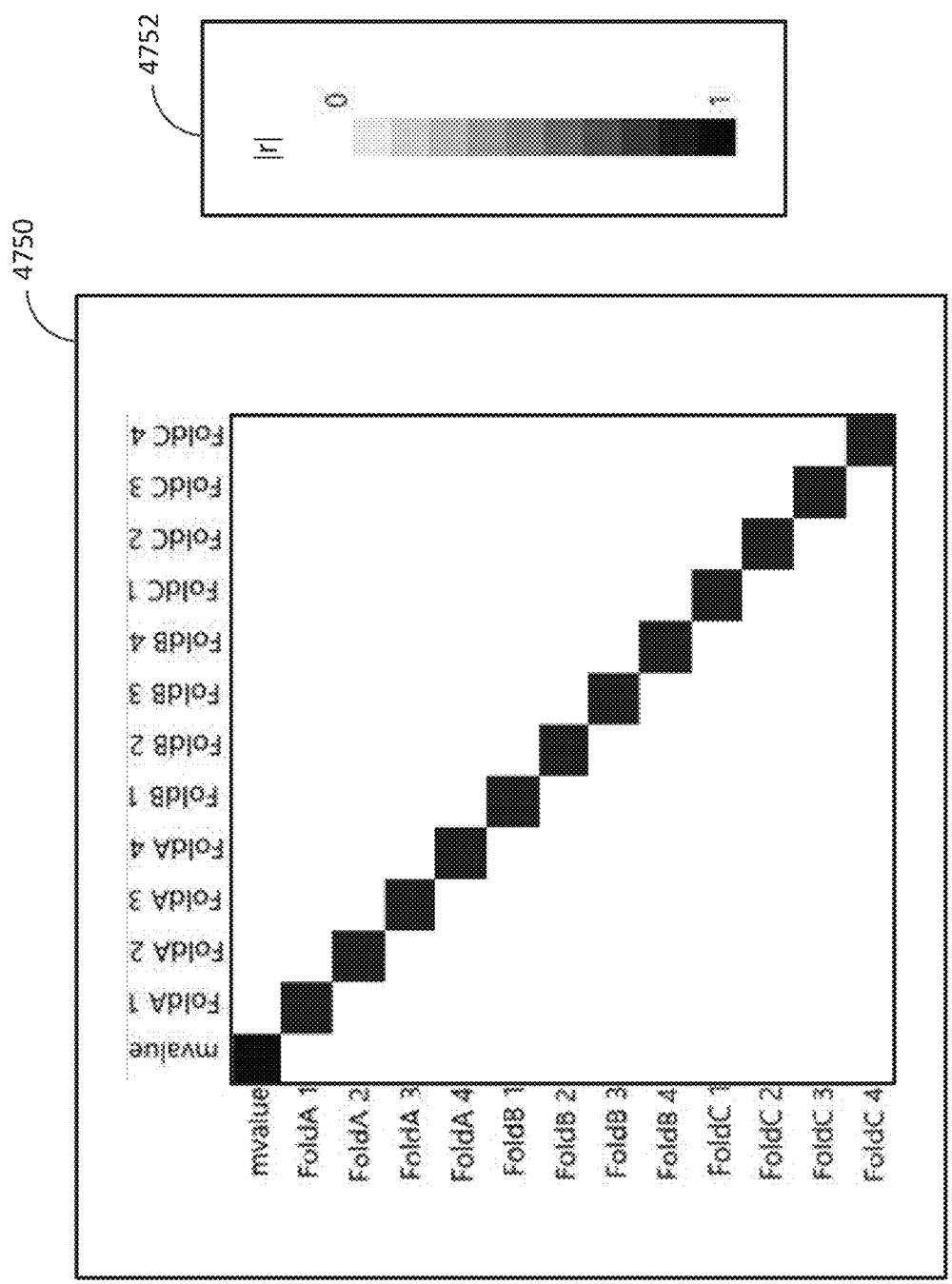

FIGS. 47A-B illustrate example comparison of folds. Such comparisons may be output (e.g., to an output device 4106) to indicate one or more generated data sets for the one or more validations.

FIG. 47A shows a tabular comparison 4700 of 3 K-fold validation columns with 5 groups in each fold, using mvalue as a covariate. When examining the properties of the K-fold columns in relation to mvalue, for each of the validation columns (i.e. Fold A, Fold B, Fold C) and each of the folds, there is a roughly even spread of the mvalue values based on the mean and standard error. In addition, when examining the validation columns and covariate and looking at the correlations between each of the levels of the validation columns and mvalue, the distribution is near-orthogonal in the graph 4750 in FIG. 47B. The key 4752 is used to show the degree of orthogonality. In one or more embodiments, an indication such as graph 4750 shown in FIG. 47B can be output (e.g., from computing device 4102) to indicate one or more validations by representing a degree of orthogonality between groups of the one or more validations. Accordingly, embodiments herein present an improved approach to generating validation sets (e.g., for validating machine learning algorithms).

Figure 48:
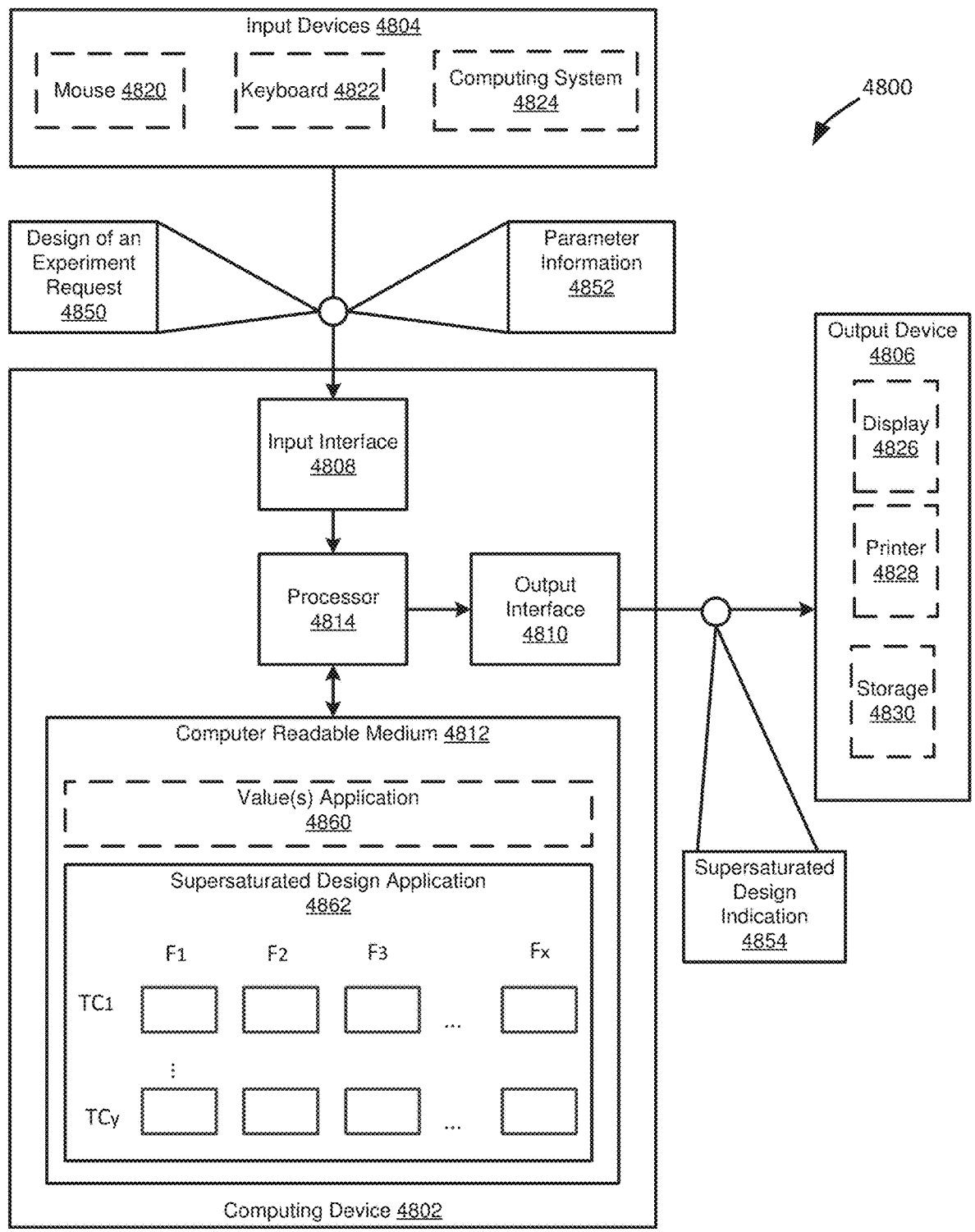
FIG. 48 illustrates an example block diagram of a system for outputting an indication of a supersaturated design in at least one embodiment of the present technology.

FIG. 48 illustrates a block diagram of a system 4800 for outputting an indication 4854 of a supersaturated design. The system 4800 includes one or more devices (e.g., a computing device 4802, input devices 4804, and an output device 4806). For instance, the system 4800 can exchange information between the computing device 4802 and input devices 4804 and between the computing device 4802 and output device 4806 (e.g., via wired and/or wireless transmission). For example, a network (not shown) can connect one or more devices of system 4800 to one or more other devices of system 4800.

Computing device 4802 includes an input interface 4808, an output interface 4810, a computer readable medium 4812, and a processor 4814. In other embodiments, fewer, different, and additional components can be incorporated into computing device 4802.

The computing device 4802 can receive information or requests from one or more input devices 4804 via input interface 4808. For instance, as shown in FIG. 48 the information received by input interface 4808 may include a request 4850 for a design of an experiment. For example, the design may be a request to design an experiment to test combinations of settings or conditions that may lead to an outcome of a machine or system (e.g., a failure of an airplane or computing system). In this case, the design of the experiment may have multiple test cases with each test case of the multiple test cases comprises multiple test conditions for testing one of different factors for the experiment (e.g., different components or environments for the machine or system). A test condition of the multiple test conditions comprises one of different options for a given factor in the design of the experiment. For example, if the factor was an environmental factor for an airplane experiment, one factor may be an altitude or speed for the airplane to fly at or to simulate an airplane flying at. The factor could be a continuous factor and the options would be continuous within one or more ranges (e.g., a range of speeds). The factor could be discrete, and the options could be nominal discrete options (e.g., 460 mph, 575 mph). As another example, if the factor were a component factor for an airplane experiment, one factor may be a categorical factor (e.g., a type of engine) and the options could be discrete options within the category of a type of engine (e.g., a gas turbine engine or a piston engine).

In one or more embodiments, the computing device 4802 also receives one or more inputs or parameters for indicating a type of design for the experiment (e.g., a supersaturated design or group-orthogonal supersaturated design). These parameters may be specifications for the type of design for the experiment. For example, one or more parameters of multiple parameters for the design of the experiment could include or indicate a total number of the plurality of test cases for the design of the experiment, a total number of the different factors for the design of the experiment and/or a total number of different groups for grouping factors of the different factors.

For example, the computing device 4802 can receive parameter information 4852 from the same or different input devices 4804 as it received request 4850. For instance, the computing device 4802 may receive a value for a parameter of multiple parameters for the design of the experiment (e.g., a value indicating 8 total test cases). The parameter information 4852 may be received with or separately from the request 4850. In one or more embodiments, the computing device 4802 stores default values for parameters (e.g., stored in computer readable medium 4812) and the computing device 4802 receives a value for a parameter by receiving a user indication to select or use the default value. More than one value for a parameter may be received and/or respective values for more than one parameter of the multiple parameters may be received.

In one or more embodiments, input devices 4804 comprise one or more devices for user entry (e.g., entry of value for a parameter) into the system 4800. For instance, the input device 4804 could include one or more of a mouse 4820 or a keyboard 4822. Alternatively, or additionally, the input device 4804 includes a display, a track ball, a keypad, one or more buttons, a sensor, a phone, etc. Input interface 4808 in the same or different embodiments further provides an interface for receiving information from another device or machine such as a computing system 4824.

The computing device 4802 outputs information to output device 4806 via output interface 4810. Output interface 4810 provides an interface for outputting information (e.g., information representing a supersaturated design indication 4854) for review by a user and/or for use by another application or device or multiple applications or devices. For example, output interface 4810 interfaces with various output technologies including, but not limited to, display device 4826 and a printer 4828. In the same or different embodiments, output interface 4810 interfaces with a data storage device 4830 for data storage of output information.

In an alternative embodiment, the same interface supports both input interface 4808 and output interface 4810. For example, a touch screen provides a mechanism for user input and for presentation of output to the user. Alternatively, the input interface 4808 has more than one input interface that uses the same or different interface technology. Alternatively, or additionally, the output interface 4810 has more than one output interface that uses the same or different interface technology.

In one or more embodiments, the system 4800 is useful for outputting to output device 4806 an indication 4854 of a supersaturated design. In some embodiments, the output device 4806 may be one or more of a display device 4826, a printer 4828, a data storage device 4830 or another device not shown. For example, the indication 4854 of the supersaturated design may be the design itself displayed on a display device (e.g., a generated test condition for each element of a test case of the design of the experiment). Additionally, or alternatively, the indication 4854 may be an indication of parameters of the design (e.g., for selection of the supersaturated design or generation of the design). Additionally, or alternatively, the indication 4854 may describe one or more properties or features of the design, factors, or test cases of the design (e.g., correlation information between factors according to the supersaturated design).

Computer readable medium 4812 is an electronic holding place or storage for information so the information can be accessed by processor. Computer readable medium 4812 can include, but is not limited to, any type of random access memory (RAM), any type of read only memory (ROM), any type of flash memory, etc. such as magnetic storage devices (e.g., hard disk, floppy disk, magnetic strips), optical disks (e.g., compact disc (CD), digital versatile disc (DVD)), smart cards, flash memory devices, etc.

Processor 4814 executes instructions (e.g., stored at the computer readable medium 4812 for generating the indication). The instructions can be carried out by a special purpose computer, logic circuits, or hardware circuits. In one or more embodiments, processor 4814 is implemented in hardware and/or firmware. Processor 4814 executes an instruction, meaning it performs or controls the operations called for by that instruction. The term "execution" is the process of running an application or the carrying out of the operation called for by an instruction. The instructions can be written using one or more programming language, scripting language, assembly language, etc. Processor 4814 operably couples with input interface 4808, with output interface 4810 and with computer readable medium 4812 to receive, to send, and to process information. Processor 4814 in one or more embodiments can retrieve a set of instructions from a permanent memory device and copy the instructions in an executable form to a temporary memory device that is generally some form of RAM.

In one or more embodiments, computer readable medium 4812 stores instructions for execution by processor 4814. For example, computer readable medium 4812 could comprise instructions for a value(s) application 4860 for generating respective value(s) for each of one or more parameters for the design of an experiment Additionally, or alternatively, the computer readable medium comprises instructions for a supersaturated design application 4862 for generating a supersaturated design for the experiment For example, in one or more embodiments, the computing device 4802 generates a respective value for each of one or more other parameters of the multiple parameters such that the design of the experiment according to the multiple parameters is a supersaturated design. In the supersaturated design the total number factors (e.g., $F_1 \ldots F_x$) is greater than the total number of test cases in the design (e.g., $TC_1 \ldots TC_y$). The generated respective values can be generated for parameters different than parameters in which values were received. In other words, the computing device 4802 can determine missing values needed to generate a supersaturated design.

In the same or different embodiment, the computing device can generate a supersaturated design (e.g., based on values received by computing device 4802 for parameters and/or based on generated values for parameters). In one or more embodiments, the generated supersaturated design for the design of the experiment is a design that distributes each of the different factors into one of different groups. For example, the supersaturated design may be a group-orthogonal supersaturated design in which the groups are designed to be orthogonal to one another or optimal in some way. Factors (e.g., represented in columns) in the design may be partitioned into groups such that the factors/columns within a group are correlated to the others within the same group, but are orthogonal to any factor/column in any other group.

For example, the supersaturated design application 4862 may have different stored combinations of values (e.g., of runs or factors for the experiment) that would yield a group-orthogonal supersaturated design or GO-SSD. The computing device 4802 can be used to let the user specify, for example, either the number of runs of the number of factors. These combinations can be used to suggest values for unspecified parameters (e.g., to present to a user). Selected combinations can then be used to compute or construct a group-orthogonal supersaturated (e.g., without using a constructed design catalog).

In one or more embodiments, one or more applications stored on computer readable medium 4812 are implemented in software (e.g., computer readable and/or computer-executable instructions) stored in computer readable medium 4812 and accessible by processor 4814 for execution of the instructions. The applications can be written using one or more programming languages, assembly languages, scripting languages, etc. The one or more application can be integrated with other analytic tools. In one example, a value(s) application 4860 and a supersaturated design application 4862 are integrated with data analytics software application and/or software architecture such as that offered by SAS Institute Inc. of Cary, N.C., USA. Merely for illustration, the applications are implemented using or integrated with one or more SAS software tools such as JMP®, Base SAS, SAS® Enterprise Miner™, SAS/STAT®, SAS® High Performance Analytics Server, SAS® Visual Data Mining and Machine Learning, SAS® LASR™ SAS® In-Database Products, SAS® Scalable Performance Data Engine, SAS® Cloud Analytic Services, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, and SAS/IML® all of which are developed and provided by SAS Institute Inc. of Cary, N.C., USA.

In one or more embodiments, the system 4800 implements a method as described herein (e.g., a method shown in FIGS. 14, 22A-22B, 60 and 62).

Figure 49:
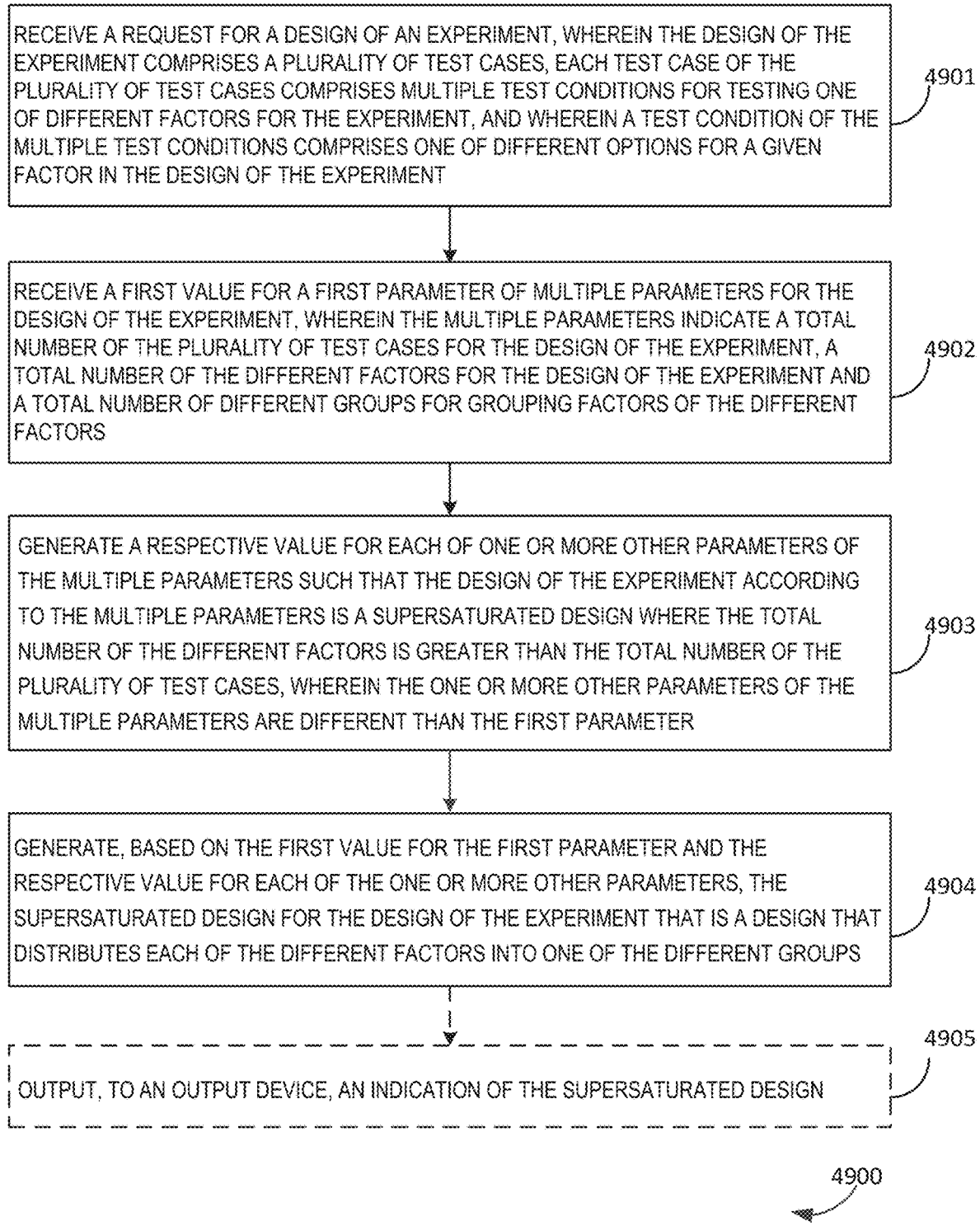
FIG. 49 illustrates an example flow diagram for outputting an indication of a supersaturated design in at least one embodiment of the present technology.

FIG. 49 illustrates a flow diagram for a method 4900 of outputting an indication of a supersaturated design.

An operation 4901 of method 4900 comprises receiving a request for a design of an experiment. For instance, the design of the experiment comprises a plurality of test cases. Each test case of the plurality of test cases comprises multiple test conditions for testing one of different factors for the experiment A test condition of the multiple test conditions comprises one of different options for a given factor in the design of the experiment.

An operation 4902 of method 4900 comprises receiving a first value for a first parameter of multiple parameters for the design of the experiment. The multiple parameters indicate a total number of the plurality of test cases for the design of the experiment, a total number of the different factors for the design of the experiment and a total number of different groups for grouping factors of the different factors. For example, the operation 4902 could comprise receiving the first value by receiving input indicating the total number of the plurality of test cases for the design of the experiment.

Operations 4901 and 4902 could be performed in any order or simultaneously.

An operation 4903 of method 4900 comprises generating a respective value for each of one or more other parameters of the multiple parameters such that the design of the experiment according to the multiple parameters is a supersaturated design where the total number of the different factors is greater than the total number of the plurality of test cases. The one or more other parameters of the multiple parameters are different than the first parameter. For example, options could be presented for parameters such that each of different groups could comprise a same number of factors, and the total number of (unspecified) factors is a power of 2.

In one or more embodiments, the operation 4903 comprises generating multiple options indicating different possible values for each of the one or more other parameters of the multiple parameters. These options may be ones that would allow generation of a complete group-orthogonal supersaturated design. For example, in a case where a computing device has received a selection of a number of test cases, a computing device could generate options indicating different total numbers of the different factors for the design of the experiment and the total number of different groups for the different factors. The multiple options could be displayed (e.g., on an output device 4806 for displaying a graphical user interface shown in FIG. 50B or FIG. 56). A user could then select one of the multiple options.

An operation 4904 of method 4900 comprises generating, based on the first value for the first parameter and the respective value for each of the one or more other parameters, the supersaturated design for the design of the experiment that is a design that distributes each of the different factors into one of the different groups. For example, generating the supersaturated design could be based on a received value for a parameter and based on selected generated parameters.

In one or more embodiments, a supersaturated design is constructed based on a Kronecker product of generated matrices. For example, in one or more embodiments, a computing device selects a respective order for each of one or more Hadamard matrices based on received values and generated values parameters of multiple parameters; and computes, based on the respective order, the one or more Hadamard matrices.

An operation 4905 of method 4900 comprises optionally outputting, to an output device, an indication of the supersaturated design.

Figure 52:
FIG. 52 illustrates an example portion of a generated supersaturated design in at least one embodiment of the present technology.

For example, after the specifications of the parameters are set to the user's liking, the Make Design button 5051 can be used to trigger generation and display of a design (e.g. a design shown in FIG. 52).

Figures 50A, 50B:
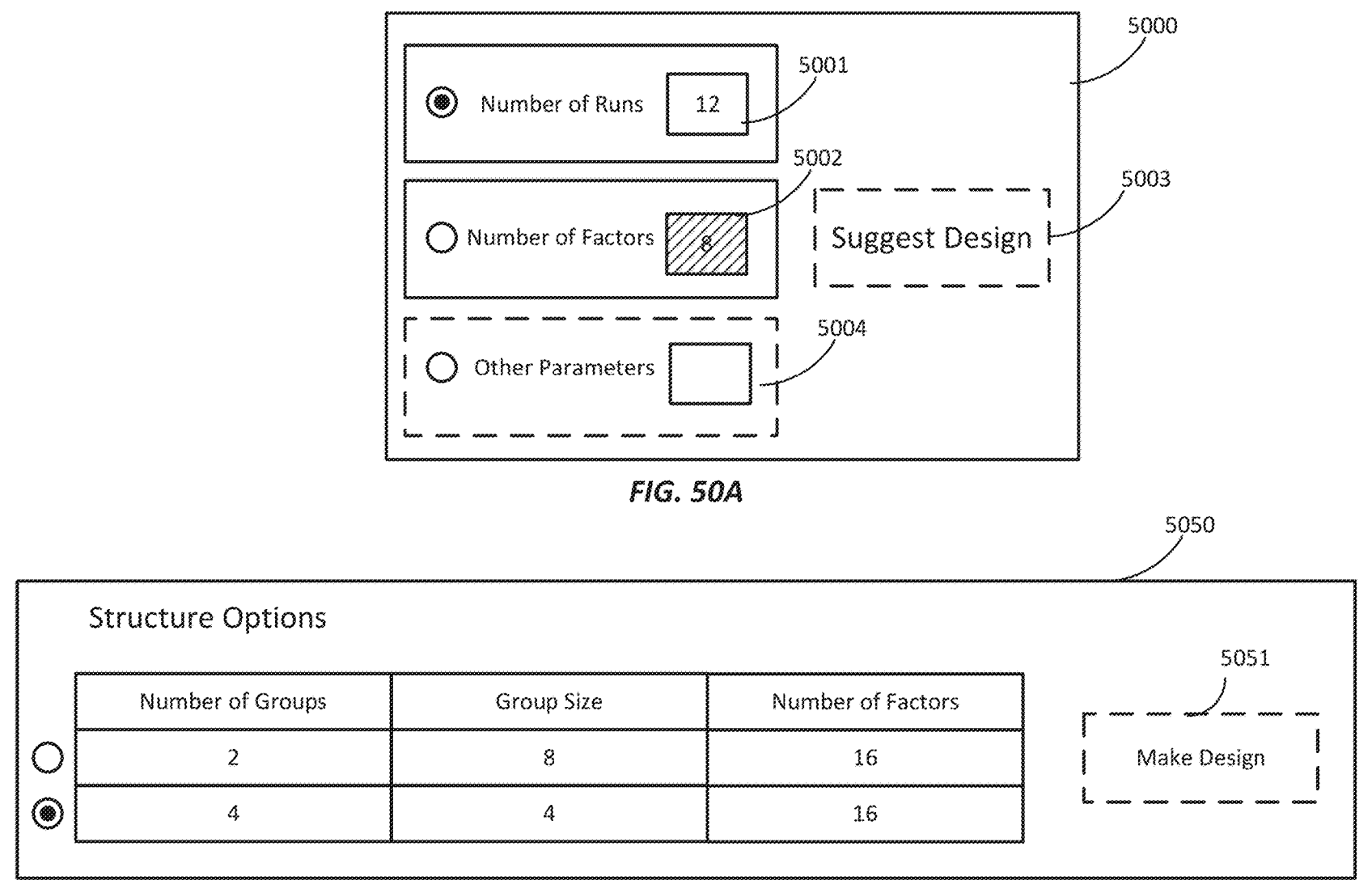

FIGS. 50A-B illustrate graphical user interfaces for generating a supersaturated design (e.g., in accordance with the method 4900).

FIG. 50A illustrates an example graphical user interface 5000 for generating a supersaturated design. As shown in FIG. 50A a text box 5001 can be used to input a value for a first parameter of multiple parameters for the design of the experiment. In this case, the first parameter indicates the total number of test cases (or runs) for the design of the experiment and the user has selected 12 runs. Entry of a value for any one of the multiple parameters could be displayed in the graphical user interface. For example, graphical user interface 5000 shows a text box 5002 for entering a number of factors 5000. Other parameters are possible (e.g., text box 5004). By selecting one of the parameters to enter a value, the other options for entering a value for a parameter could become inoperable to the user. For example, text box 5002 could be grayed out to prevent entry in the box. This could indicate the computing device has enough parameters to suggest a design. The suggest design button 5003 could be used to generate a request for a design of an experiment. Alternatively, inputting the value in the text box 5001 could trigger the request.

In one or more embodiments, the graphical user interface 5050 is part of the graphical user interface 5000 or is a separate interface. In the example shown in FIG. 50A, the user has specified a quantity of runs in the graphical user interface 5050. The user is presented with possible design choices in FIG. 50B given that received parameter information. For example, values could be generated for a number of groups and the group sizes that will accommodate their run size, in addition to the number of factors. Values for the number of groups, a group size or number of factors are displayed in graphical user interface 5050.

Figure 51:
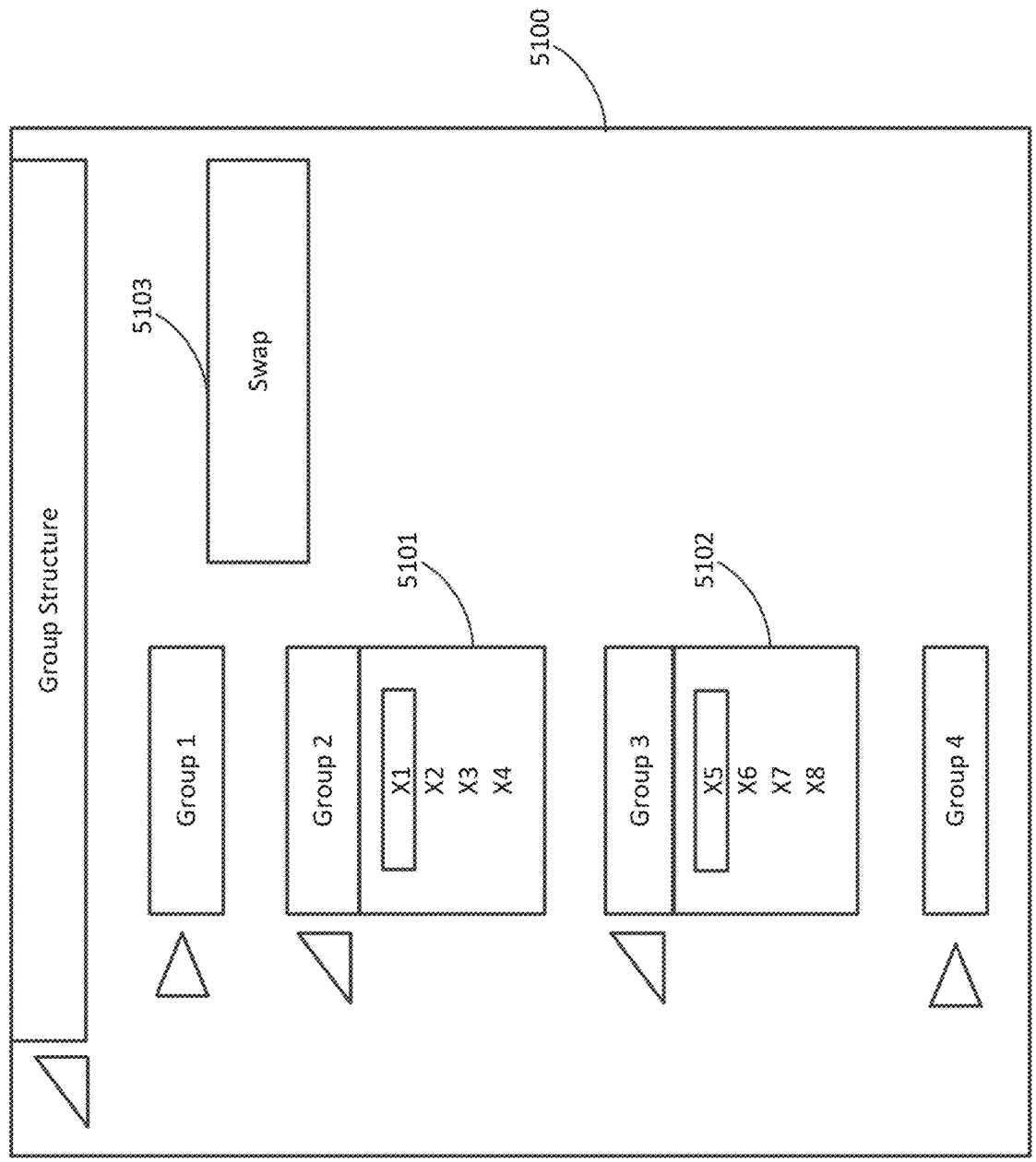
FIG. 51 illustrates an example graphical user interface for customizing factor groups for a supersaturated design in at least one embodiment of the present technology.

FIG. 51 illustrates a graphical user interface 5100 for customizing factor groups for a supersaturated design. In the example shown, four groups are displayed in graphical user interface 5100. In other embodiments, more or less groups are possible. There is an indication of an assignment of the different factors to one of the different groups provided. For example, as shown in the drop-down menu 5101, factors X1, X2, X3, and X4 are assigned to group 2. As shown in the drop-down menu 5102, factors X5, X6, X7, and X8 are assigned to group 3.

In one or more embodiments, a computing device (e.g., computing device 4802) determines an optimal assignment of factors. For example, the computing device may assign factors to different groups for the different factors according to a first design. The computing device computes one or more measures of orthogonality between the different groups according to the first design. For example, a dot product is taken between options for the factors of one group and options for factors of another group. The computing device assigns factors to different groups for the different factors according to a second design, different from the first design, and computes one or more measures of orthogonality between the different groups according to the second design. The computing device selects a selected one of the first design or the second design based on comparing the one or more measures of orthogonality between the different groups according to the first design to the one or more measures of orthogonality between the different groups according to the second design. The computing device can then generate the supersaturated design for the design of the experiment according to the selected one of the first design or the second design.

However, the factors are assigned, in one or more embodiments, a user can update these assignments. For example, a user may believe that different factors may be important to observe. The user may want to separate these important factors into different groups. As shown in FIG. 51, factor X2 is selected and factor X5 is selected. The computing device can receive user input indicating an updated assignment of the different factors to one of the different groups by switching a factor of the different factors from its assigned group of the different groups with a factor in another group of the different groups (e.g., by selecting the swap button 5103). In this case, once the user has completed his choices, the supersaturated design can be based on the updated assignment, received values and/or generated values as described herein.

FIG. 52 illustrates a portion of a generated supersaturated design 5200. As shown in FIG. 52, the generation of a design may include multiple different types of factors. The design shown here is generated with factors including an intercept of a model for the experiment shown in column 5201. Additionally, or alternatively, one or more reserved factors may be generated as part of the supersaturated design 5200 as shown in columns 5202. The reserved factors are test factors used in generating the design of the experiment but are not factors for conducting the experiment They can also be referred to as pseudo-factors or fake-factors. Generating these factors can be used in analysis of the design (e.g., to provide a lack-of-fit estimate or unbiased estimates of error variance). Additionally, or alternatively, multiple experiment factors are present in columns 5203. These are factors present in conducting an experiment.

In one or more embodiments, a computing device (e.g., computing device 4802) assigns design options to each of the reserved factors. The computing device generates, based on the reserved factors with assigned design options, received values/and or generated values, the supersaturated design for the design of the experiment.

The options in this example are assigned by the computing device for each of the different types of factors and the options are represented as "1" and "−1". If the factor is a categorical factor, a "1" is assigned to represent one option and a "−1" is assigned to represent the other. Where the factor is continuous, a 1 can be assigned to represent a high value in the continuous range and the −1 can be assigned to represent a low value in the continuous range. Different values or selection for options can be made. In other examples, a user can assign the option types or change an assigned option type. For example, a user may have a belief as to the direction of an effect (i.e. a positive or negative slope) and a 1 can be assigned to a level expected to increase the response of a model. This may improve the ability of the design to detect active effects.

Figure 53:
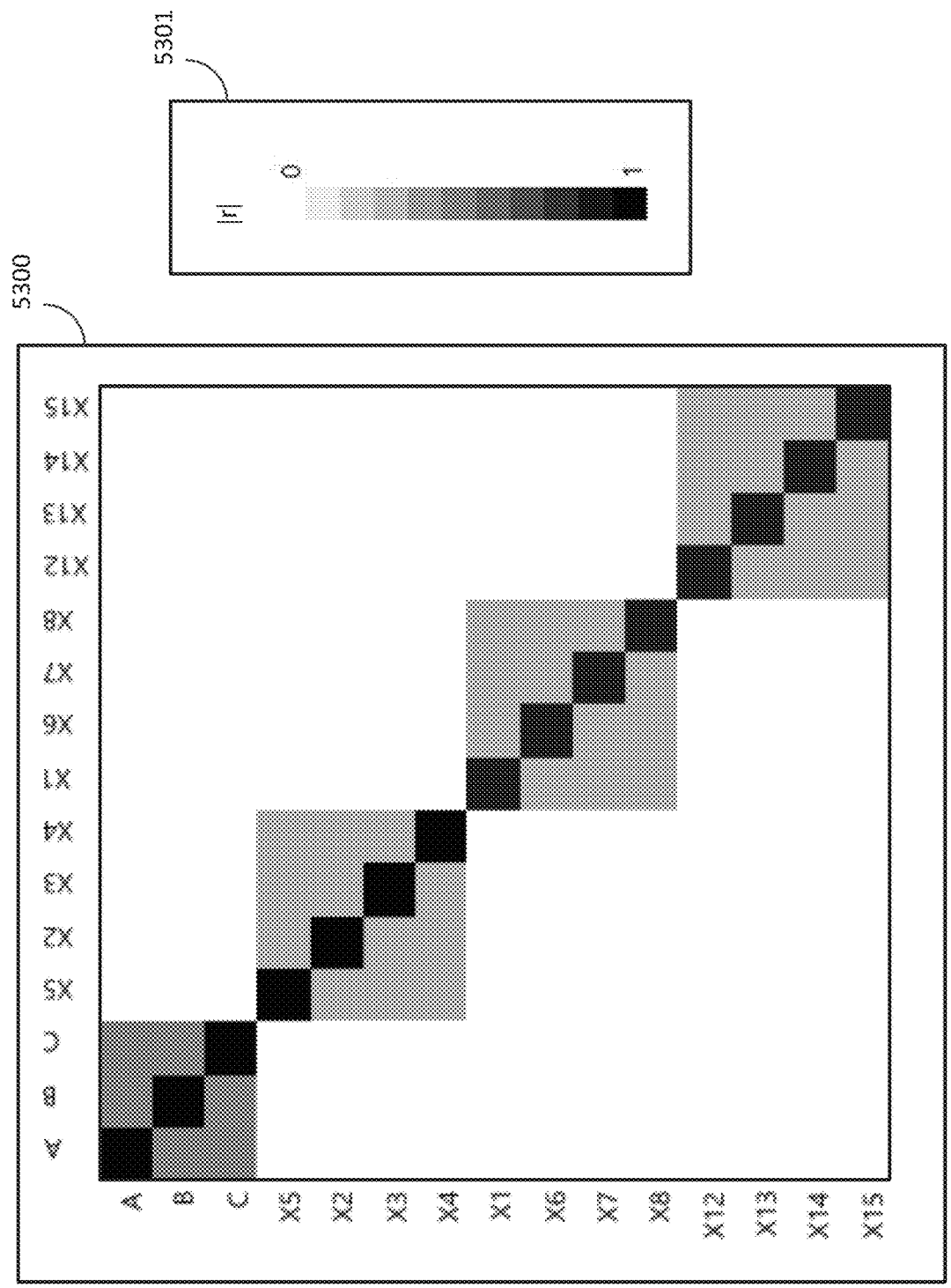
FIG. 53 illustrates an example indication of orthogonality between groups of factors of a generated supersaturated design in at least one embodiment of the present technology.

FIG. 53 illustrates an indication of orthogonality between factors of a generated supersaturated design in a graph 5300. The key 5301 shows a color gradient for indicating measures of orthogonality. In the example, X1 and X5 have been swapped from their groups of FIG. 52. As shown, this swapped design has achieved factors in different groups that are orthogonal to one another represented in the graph 5300 as white for an |r|=0. For example, factors A, B, and C are in one group and show as white at intercepts with X1-X15. Factors are not orthogonal with factors in the same group and show in graph 5300 as gray or black for a nonzero |r|. When a factor intercepts with itself it is represented as black in the graph 5300 because it has an |r|=1. In one or more embodiments, the indication of the supersaturated design may be a graph such as graph 5300 showing the orthogonal relationship between factors of the supersaturated design. The same or different colors could be used to show a measure of orthogonality. This graph 5300 can then serve as an indication that the design is group-orthogonal.

FIG. 54 illustrates an indication of correlation between a portion of factors of a generated supersaturated design. A portion of a correlation matrix 5400 is shown. Factors with correlations to one another (i.e. with a non-zero correlation score) can be isolated to within a single group, in one or more embodiments, such that the factors are not correlated to factors of other groups. The non-zero correlation scores are shown bolded in FIG. 54. Ideally, the scores will be less than 1 and as close to zero as possible. Scores of 1 would mean that the factors are correlated to a degree that one cannot tell the difference between the effects of the factors.

Figure 55:
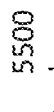
FIG. 55 illustrates an example graphical user interface for customizing factors for a supersaturated design in at least one embodiment of the present technology.

FIG. 55 illustrates a graphical user interface 5500 for customizing factors for a supersaturated design. In one or more embodiments, it may be helpful either in viewing the design or in analyzing the design to assign labels or properties to various factors. Assigning a label or property could comprise changing a default label or property. For example, a computing device (e.g., computing device 4802) may receive user input selecting respective customization for a respective factor. For instance, a computing device could receive user input indicating whether the respective factor of the different factors is continuous or discrete. FIG. 55 shows assigning label factors including experiment-specific factor names 5510 and a factor role 5512 (e.g., continuous, discrete numeric, discrete categorical, etc.) in a stress-test experiment Additionally, or alternatively, a computing device could receive user input indicating a respective range for the respective factor of the different factors. For example, as shown in FIG. 55, a lower bound 5514 and an upper bound 5516 is assigned for each of the factors. In some cases (e.g., where the factor is categorical), the lower and upper band simply represent different options within the category. In one or more embodiments, a computing device generates a corresponding set of two options for the respective factor (e.g., by assigning a "−1" to lower bound 5514 and a "1" to upper bound 5516). The set represents the respective customization for the respective factor (e.g., the computing device maintains a mapping between the user provided bounds and the generated bounds).

Figure 56:
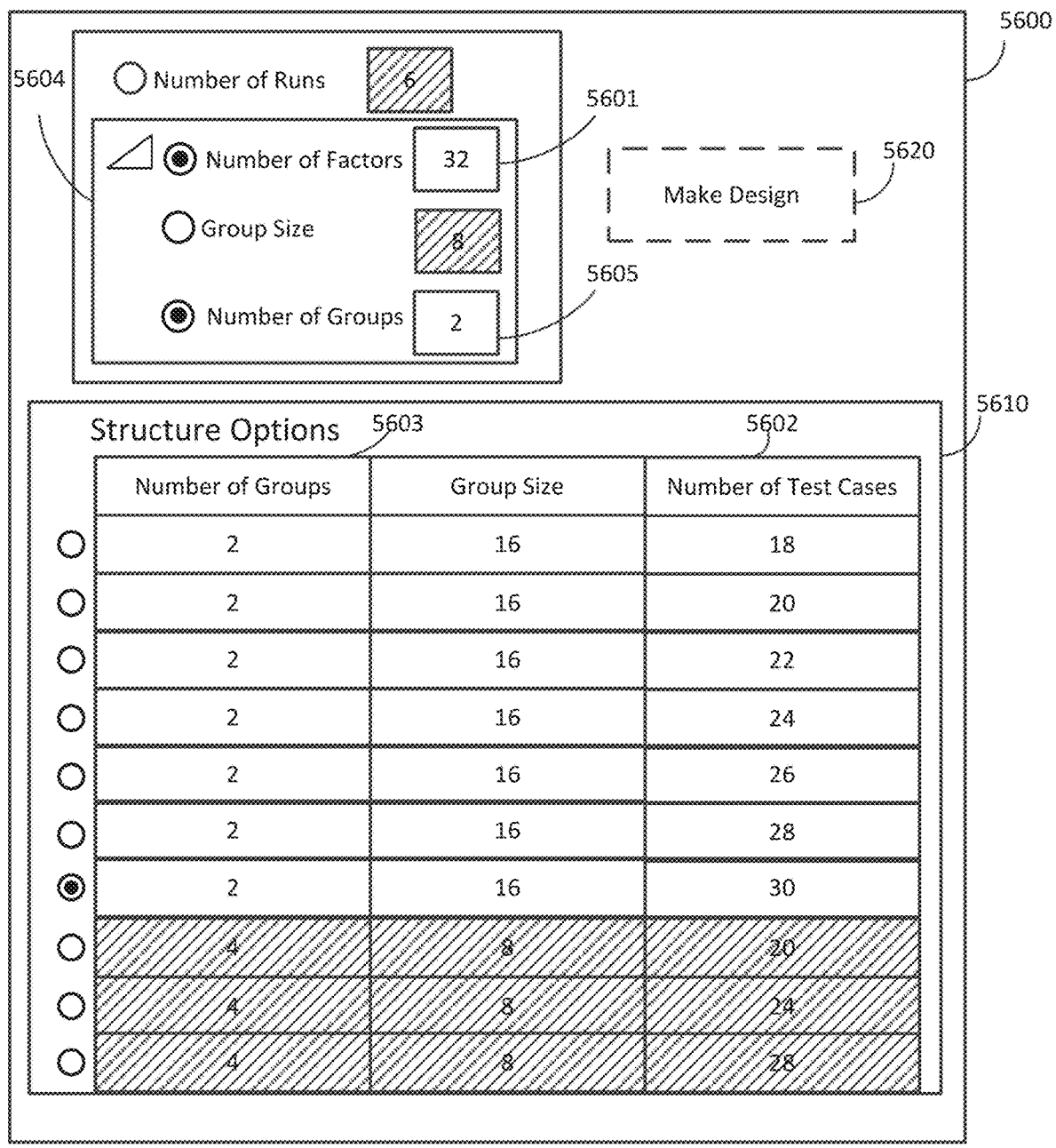
FIG. 56 illustrates an example graphical user interface for generating a supersaturated design in at least one embodiment of the present technology.

FIG. 56 illustrates a graphical user interface 5600 for generating a supersaturated design in an example embodiment. In this example, a computing device (e.g., computing device 4802) receives a value for a parameter indicating a total number of different factors for the design of the experiment by entering a value in the text box 5601. The computing device generates a respective value for each of multiple other parameters by generating multiple options for a parameter. For example, different options are shown in column 5602 for the total number of test cases for the design of the experiment. Different options are shown in column 5603 for the total number of different groups for the different factors. Note that graphical user interface 5600 displays design options showing allowable test cases or run sizes rather than factors as in graphical user interface 5050, since the number of factors has been set.

In one or more embodiments, a computing device displays in a graphical user interface (e.g., graphical user interface 5600) a recommended value for a parameter of the multiple parameters based on one or more goals for the supersaturated design. For example, the options displayed via the graphical user interface 5600 in a structure options box 5710 provide design parameters that would create a group-orthogonal supersaturated design with 32 factors. In one or more embodiments, the computing device receives, from a user of the graphical user interface, a selection of a selected one of the multiple options or a recommended value; and generates the supersaturated design based on the received value and the selected one of the multiple options.

In one or more embodiments, the user may provide values for multiple parameters. For example, as shown in the drop-down box 5604, the user has restricted the factors to two groups by entering a "2" into the text box 5605.

This can restrict the number of suggested structure options in a structure options box 5610 (e.g., by graying out options that would not reflect the user's goals for the design or by not displaying those designs at all).

In this example, the user has explicitly indicated a value for the number of factors and the number of groups. However, in other embodiments a value for a parameter could be implicitly indicated. For example, the group size is implicitly indicated here based on the restrictions placed on the number of factors and number of groups. In other examples, other values could be indicated implicitly or explicitly. For example, the total number of the different groups of the different factors could be implicitly indicated by indicating the number of factors and the total number of factors in a group for the design of the experiment (or group size).

As in other embodiments, a user can generate a design by selecting the make a design button 5620. Additionally, or alternatively, the user sets features about the design as in other embodiments (e.g., the user can now change the design role from continuous to categorical, change the factor names, and change the factor levels).

Figure 57A:
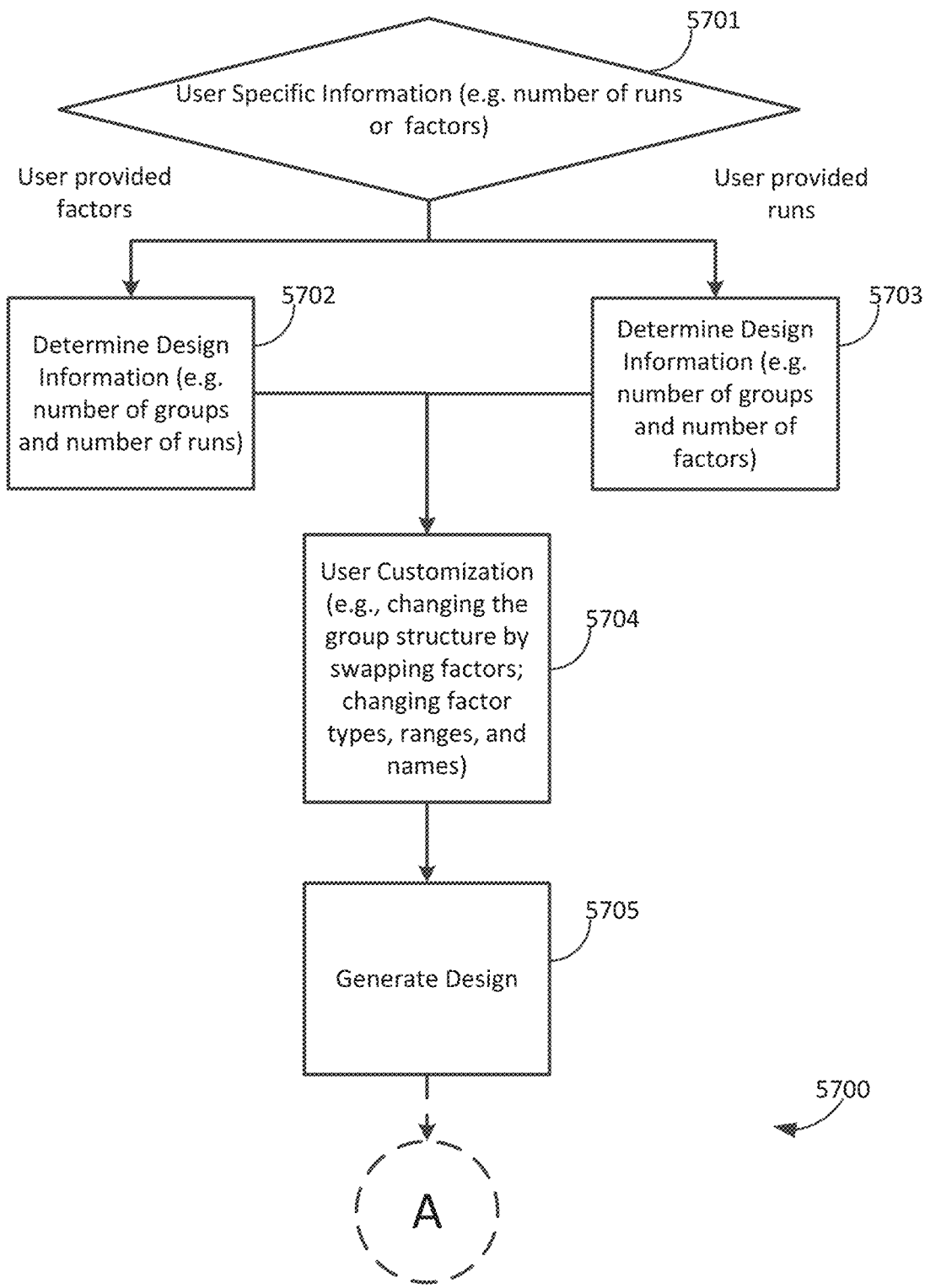
FIG. 57A illustrates an example flow diagram for generating a supersaturated design in at least one embodiment of the present technology.

FIG. 57A illustrates a flow diagram for generating a supersaturated design. In an operation 5701 the method 5700 comprises receiving and/or determining what kind of user specific information is received (e.g., a number of runs or factors). If the user provided values for factors, in an operation 5702 the method 5700 comprises determining design information (e.g., number of groups and/or number of runs). If the user provided for values for runs, in an operation 5703 the method 5700 comprises determining design information (e.g., number of groups and/or number of factors).

In an operation 5704 the method 5700 comprises user customization (e.g., user customization shown in FIG. 51 and FIG. 55).

In an operation 5705 the method 5700 comprises generating a design.

In one example of generating a design, let H be a Hadamard matrix of order m, m≡0(mod 4). Let T be a matrix with more rows w then columns q, and let $$X = H \otimes T \quad (1)$$

where "$\otimes$" is the standard Kronecker product so that X is an mw×mq matrix.

For example, T could be related to an optimal design (e.g., a transpose of a D-optimal design for q runs and w columns) or T could be related to a covering array. In one example let T correspond to the first w rows of a Hadamard matrix of order q. Assuming the first column of both H and T is an n×1 vector of ones which has first column comprised of all 1's. This will be the design (or model) matrix of a main-effects design for the p=mq−1 two-level factors having number of observations n=mw. The first column represents the intercept, while the other columns give the levels of the factors. For convenience of notation, an intercept is a "factor" with one level only, and the factors are labelled according to the columns of X.

Define m groups of factor indices:

$$G_j = \{(j-1)q+1, \ldots, qj\}, j=1, \ldots, m.$$

where q is the number of columns in T, and let $G_j$, j=1 . . . , m denote the submatrix of X comprised of the columns in the jth group. With this setup, it is easy to see that any factor from group $g_j$ is uncorrelated with any factor from another group $G_{j'}$ for j≠j'. To see this, observe that $$X'X = H'H \otimes T'T = mI_m \otimes T'T$$

Thus X'X is a block diagonal matrix, which means that columns corresponding to distinct groups are orthogonal. In particular, X'X has block-diagonal structure comprised of m q×q blocks as follows:

$$X'X = \begin{pmatrix} mT'T & O & \ldots & O \\ O & mT'T & \ldots & O \\ \ldots & \ldots & \ldots & \ldots \\ O & O & \ldots & mT'T \end{pmatrix}$$

where O denotes matrix of all zeros. In addition, all of the matrices $G_j$, for j>1, are balanced. A design constructed using equation (1) is a group-orthogonal supersaturated designs (GO-SSDs).

As an example, assume that based on received values and generated values, a supersaturated design was constructed for 12 test cases and 16 columns (comprising factors, intercept and pseduo-factors). Let H be a 4×4 Hadamard matrix so that m=w=4 and let T be any 4×4 Hadamard matrix with a row removed, so that q=3. The number of rows is mq=12 and the number of columns is mw=16 as required, where:

$$H = \begin{pmatrix} 1 & 1 & 1 & 1 \\ 1 & -1 & 1 & -1 \\ 1 & 1 & -1 & -1 \\ 1 & -1 & -1 & 1 \end{pmatrix} \text{ and } T = \begin{pmatrix} 1 & 1 & 1 & 1 \\ 1 & -1 & 1 & -1 \\ 1 & 1 & -1 & -1 \end{pmatrix}$$

The resulting design 5750 D=H⊗T is shown in FIG. 57B. $P_1$, $P_2$ and $P_3$ denote the three pseudo-factor columns 5751 in the first group, which is used for obtaining an estimate of the error variance. The real experimental factors are denoted in columns 5752. The columns 5751 are not balanced in that there are not the same amount of "1" options as "−1" options in a given factor column. However, all columns corresponding to the real factors in Groups 2 through 4 for columns 5752 are balanced in that there are the same amount of "1" options as "−1" options.

Figure 57C:
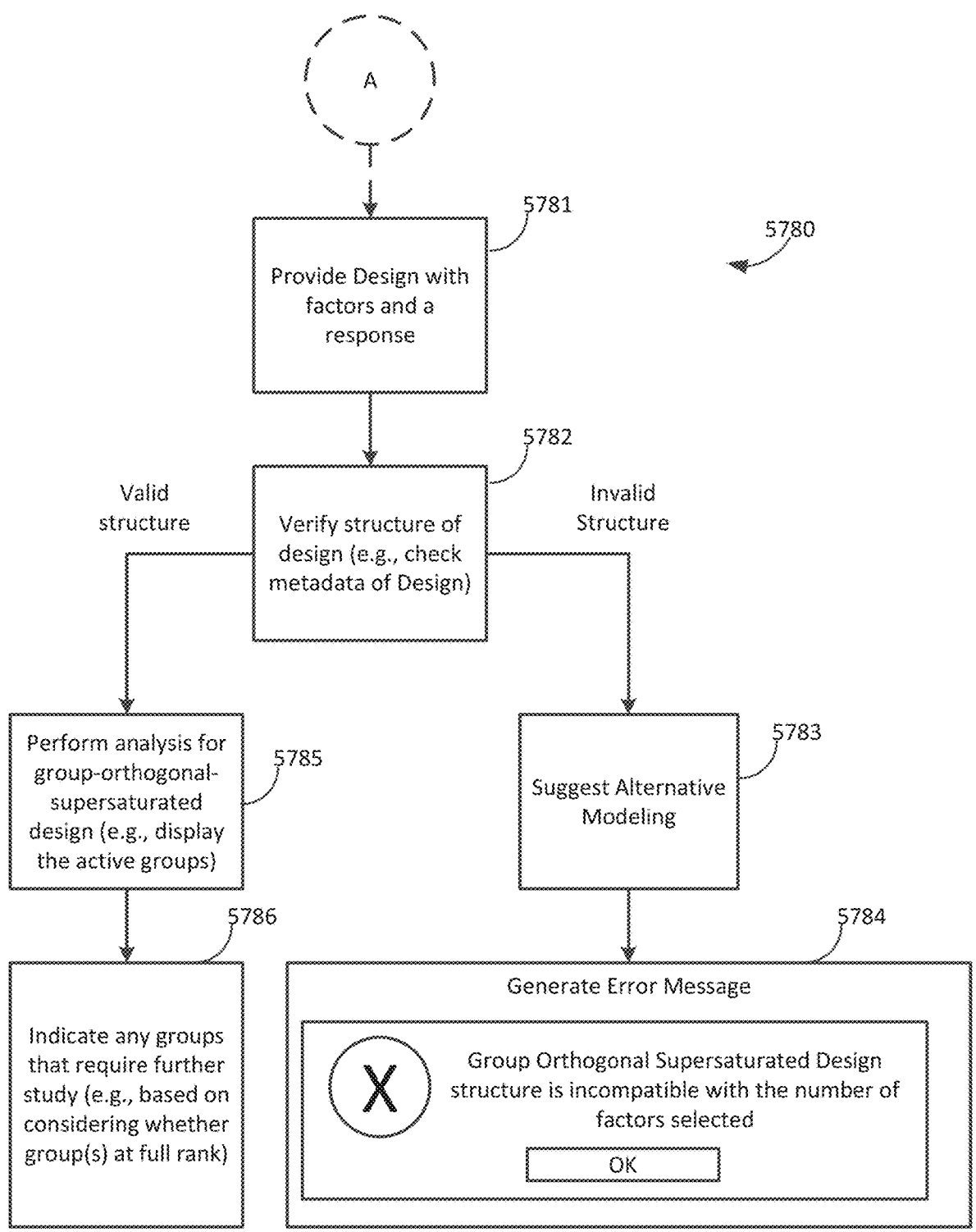
FIG. 57C illustrates an example flow diagram for analyzing a supersaturated design in at least one embodiment of the present technology.

In addition to creating the GO-SSDs, one or more embodiments include analyzing output of an experiment taking advantage of the generated design structure. FIG. 57C illustrates a flow diagram of the method 5780 for analyzing a supersaturated design. It may follow the method 5700 or be separate from FIG. 57A. The method 5780 can be implemented using a computing device (e.g., computing device 4802).

The method 5780 comprises an operation 5781 of providing a design with factors and a response. For example, the design may be a supersaturated design generated using method 5700. The response may come from implementing the experiment according to the design. Alternatively, the design may not even be a supersaturated design at all.

In analyzing the output, one issue is how to handle validating that the design has a group-orthogonal structure. Method 5780 comprises an operation 5782 to verify the structure of the design. For example, a computing device can validate whether the supersaturated design has a group-orthogonal structure. The computing device can selectively, based on whether the supersaturated design has a group-orthogonal structure, generate an analysis of the supersaturated design; and output, to an output device, the indication of the supersaturated design by indicating the analysis of the supersaturated design.

In one or more embodiments, a computing device studies the structure of a design and checks if the structure is group orthogonal by, for instance, partitioning inputs based on their orthogonality to the other factors. Alternatively, or additionally, if the design was created in JMP®, metadata is stored reflecting the number of runs, factors, groups, and group sizes. This metadata can be checked to confirm the structure of the design.

In one or more embodiments, if the structure is not group-orthogonal (i.e. has an invalid structure), an operation 5784 could be used to generate an error message. Additionally, or alternatively, an operation 5783 can be used to suggest alternative modeling. For example, a generalized regression platform (or stepwise regression) could be prepopulated with the main effects model since the GO-SSD analysis cannot be done. The order of operations 5783 and 5784 is merely an example. Operations 5783 and operations 5784 can be performed in any order or performed simultaneously.

In the same or different embodiments, if the structure is group-orthogonal (i.e. has a valid structure), an operation 5785 can be used to perform analysis for a group-orthogonal supersaturated design. As one example, the analysis of the design comprises identifying active factors. An active factor could be indicated as a factor that significantly contributes to an outcome of the experiment. The active groups comprising these active factors could be displayed as part of operation 5785. In one or more embodiments, the operation 5786 could indicate groups that require further study. For example, it could indicate further consideration of whether the groups are at full rank. For instance, if the number of active factors exceeds the rank of a Hadamard matrix used to generate the design, this could indicate that it is difficult to identify the active factors in those groups.

In one or more embodiments, the indication of the supersaturated design comprises an indication of a contribution of the active factor to an outcome of the experiment or other information related to an active factor (e.g., to display active groups).

Figure 58:
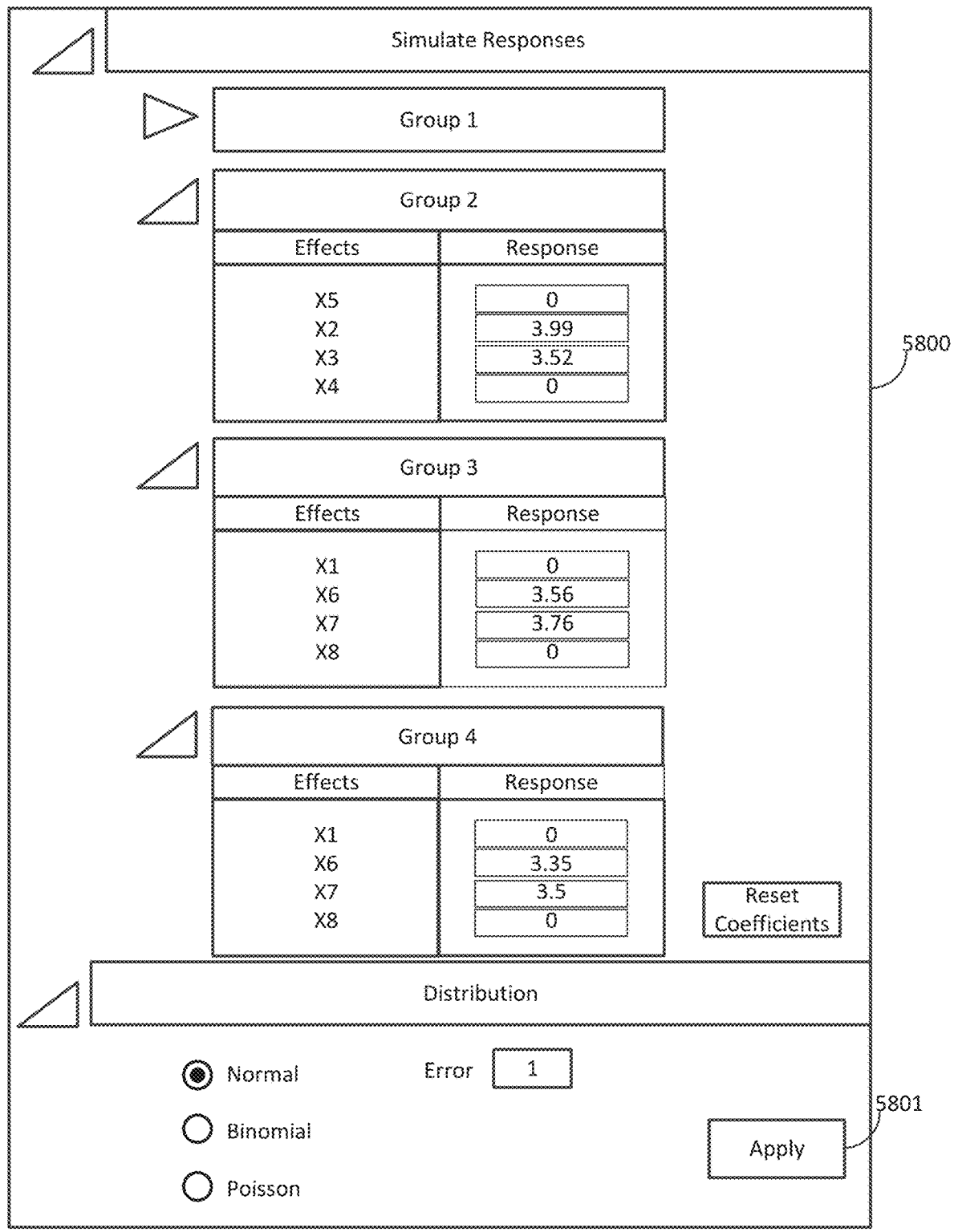
FIG. 58 illustrates an example graphical user interface for simulating responses according to a supersaturated design in at least one embodiment of the present technology.

In one or more embodiments, a computing device (e.g., a computing device 4802) generates a model for determining predicted responses of a computer-simulation of the experiment according to the supersaturated design for the design of the experiment. FIG. 58 illustrates a graphical user interface 5800 for simulating responses according to a supersaturated design. A JMP data table can also be created from the generated design, with responses according to the generated design recorded and analysis completed.

In the example shown in FIG. 58, responses for each of the factors or effects are shown. The model according to these responses would be:

$$y=3.99X2+3.52X3+3.56X6+3.76X7+3.35X6+3.5X7$$

The model may not need to consider all the factors, or the response assigned may be 0. Other features of the model can be selected, such as normal, binomial or poisson distributions and a value for error in the model. In this case a normal distribution is selected. In one or more embodiments, a computing device generates an error variance (e.g., one that is independent of the model). In this case an error variance ($\sigma$) of 1 is selected in graphical user interface 5800. The computing device can generate a simulated set of responses for each of the test cases according to the model, the error variance, and the supersaturated design. The computing device can output, to the output device, an indication of the supersaturated design by outputting the simulated set of responses (e.g., by selecting an apply button 5801).

FIGS. 59A-59B illustrate example graphical user interfaces for an analysis of a supersaturated design. If the structure is valid, an important consideration for displaying the analysis of GO-SSDs is that in addition to the typical concept of identifying important factors, a practitioner will often want to know which groups did and did not have active factors. In one or more embodiments, in indication of the supersaturated design comprises an indication of a contribution of an active factor to an outcome of an experiment according to the supersaturated design. An analysis tool can first display the results per group, where inactive groups (i.e. those with no active factors) are greyed out FIG. 59A shows a graphical user interface 5900 with Groups 1 and 3 grayed out in a 12-run design with 4 groups of 4 factors. Group 2 has 2 active factors (X5 and X6), and Group 4 has one active factor. Information regarding these factors is also displayed. An estimate of an effect of the group is shown for each active factor (e.g., an estimate change in outcome or change in a model slope). The higher the estimate shown the larger the effect of that factor. In this example factor X6 has the largest effect.

One or more embodiments show a standard error or variance of the factor. A t ratio is also shown, which is the estimate divided by the standard error. An absolute value of the t ratio is used to determine a probability of the significance of the factor.

Graphical user interface 5950 is another example of an indication of a contribution of an active factor to an outcome of an experiment according to the supersaturated design.

In this example, the active factors are combined into a combined model parameter estimates 5951.

Other information about a model according to a supersaturated design can be given. For example, a degree of freedom (DF) 5953 for the error can be computed. A degree of freedom indicates the number of independently variable factors effecting an outcome. This is a measure of the freedom in the model (e.g. what extra information or assumptions about the relationship between factors may be limiting the model). A higher value means there should be more confidence in the model because there is a greater independence of factors. It can also be used as a test (F-test) or indicator of active factors. A root mean square estimate (RMSE) 5952 can be computed. The RMSE is a measure of the difference between values predicted by the model and values observed. A user can use this information in deciding to make a model 5954 or run a model 5955.

Accordingly, embodiments herein present techniques useful for generating a design for an experiment (e.g., a supersaturated design) and analyzing a model of the experiment according to the design.

In one or more embodiments, herein a computing system is used to generate a group-orthogonal supersaturated design. In the same or different embodiments, a computing system (e.g., system 4800 and/or a computing device 4802) can generate a supersaturated design that is based on a D-optimal design. D-optimal designs are historically unsuited for supersaturated designs. Bayesian D-optimal designs, for instance, often would have pairs of fully confounded factors (i.e., the effects of factors in different test cases are indistinguishable). However, even with improvements herein with group-orthogonal designs to have flexibility in run size, there are still limitations on the number of runs and number of groups possible. In the absence of information on how to group the factors, a practitioner may end up with all active factors in one group, and an experiment analysis will not be able to identify effects of those factors on the outcome of an experiment. If the effects of factors of test cases in a test suite are indistinguishable, an entire test suite would likely be thrown out as useless for an experiment.

Embodiments herein enable use of test cases in supersaturated designs by adding greater flexibility in producing optimal supersaturated design (e.g., designs that alleviate confounding of factors in traditional approaches for D-optimal designs and designs that improve criteria applicable to supersaturated design).

Figure 60:
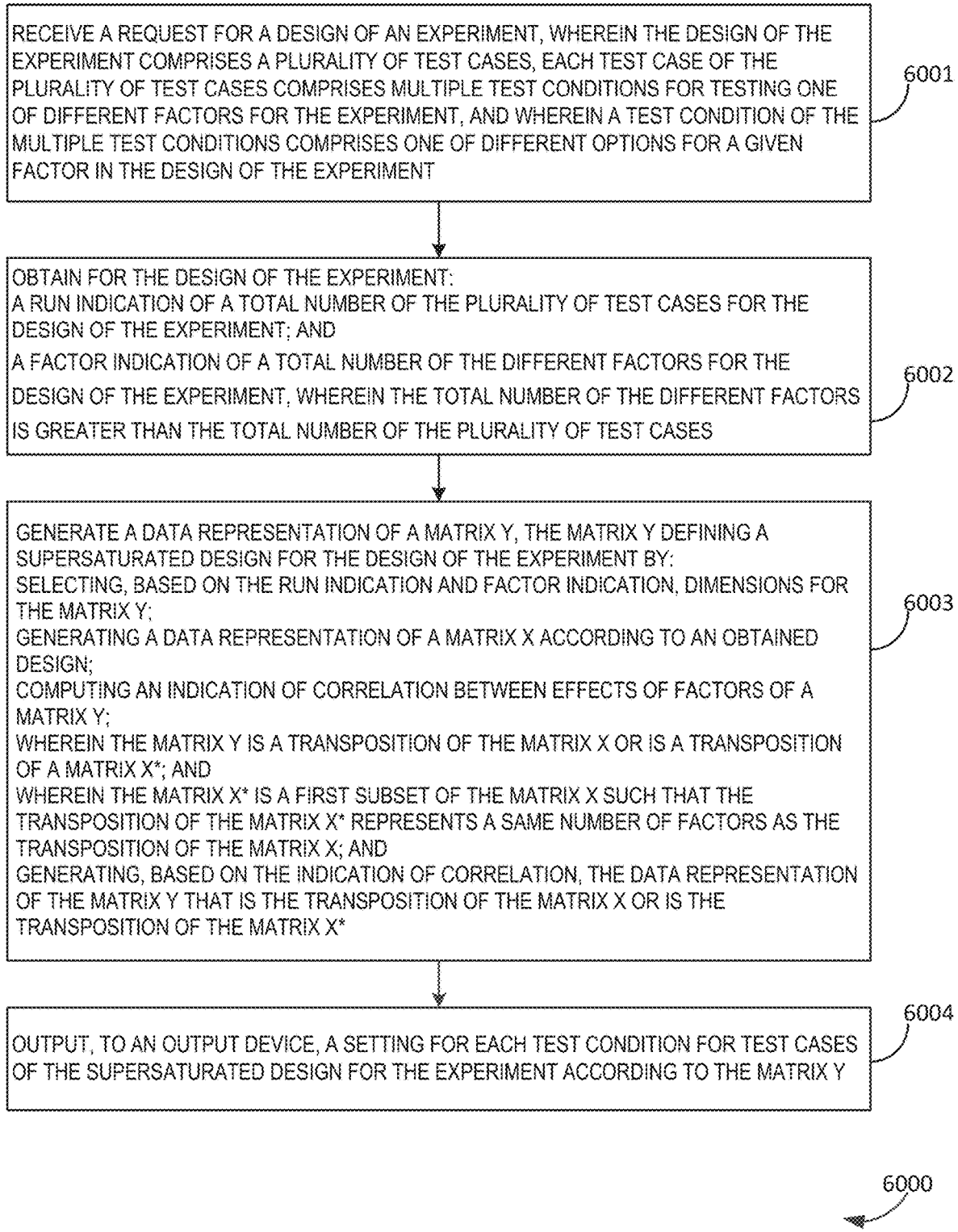
FIG. 60 illustrates an example flow diagram for outputting a setting for each test condition for test cases of a supersaturated design based on a D-optimal design in at least one embodiment of the present technology.

FIG. 60 illustrates a flow diagram for outputting a setting for each test condition for test cases of a supersaturated design that is selected based on an indication of correlation between effects of factors of a candidate design.

An operation 6001 of method 6000 comprises receiving a request for a design of an experiment. The design of the experiment comprises a plurality of test cases. Each test case of the plurality of test cases comprises multiple test conditions for testing one of different factors for the experiment. A test condition of the multiple test conditions comprises one of different options for a given factor in the design of the experiment. For instance, with a two-level design, each test condition is one of two levels (e.g., 1, and −1), where the levels represent two options for a factor (e.g., a high or low temperature in the experiment).

An operation 6002 of method 6000 comprises obtaining for the design of the experiment a run indication of a total number of the plurality of test cases for the design of the experiment and a factor indication of a total number of the different factors for the design of the experiment (e.g., receiving from a user or computing system parameter information, such as parameter information 4852 in FIG. 48). The total number of the different factors is greater than the total number of the plurality of test cases.

An operation 6003 of method 6000 comprises generating a data representation of a matrix Y. The matrix Y defines a supersaturated design for the design of the experiment. The generating the data representation of the matrix Y comprises selecting, based on the run indication and factor indication, dimensions for the matrix Y. For example, the dimensions of the matrix may comprise N number of rows and n number of columns. The generating the data representation of the matrix Y comprises generating a data representation of a matrix X according to an obtained design (e.g., a design obtained by approaches described herein). For example, generating the matrix X according to an obtained design may comprise generating a D-optimal design from adding rows to a pre-defined or constructed matrix (e.g., a Hadamard matrix or a circulant block matrix).

The matrix X has n+1 number of rows and M number of columns. M is greater than or equal to N. The generating the data representation of the matrix Y comprises computing an indication of correlation between effects of factors of a matrix Y. The matrix Y is a transposition of the matrix X or a matrix X*. Matrix X* is a first subset of the matrix X such that the transposition of matrix X* represents a same number of factors as a transposition of matrix X. The generating the data representation of the matrix Y comprises generating, based on the indication of correlation, the data representation of the matrix Y that is a transposition of the matrix X or the matrix X*. A transposition of the matrix X or matrix X* may have some advantages over other supersaturated designs (e.g., because of its D-optimality). The indication of the correlation can be used to select between possible matrices (e.g., matrix X or X*). For example, correlation of rows of X may correspond to columns of Y.

An operation 6004 of method 6000 comprises outputting, to an output device, a setting for each test condition for test cases of the supersaturated design for the experiment according to the matrix Y.

Figures 61A, 61B:
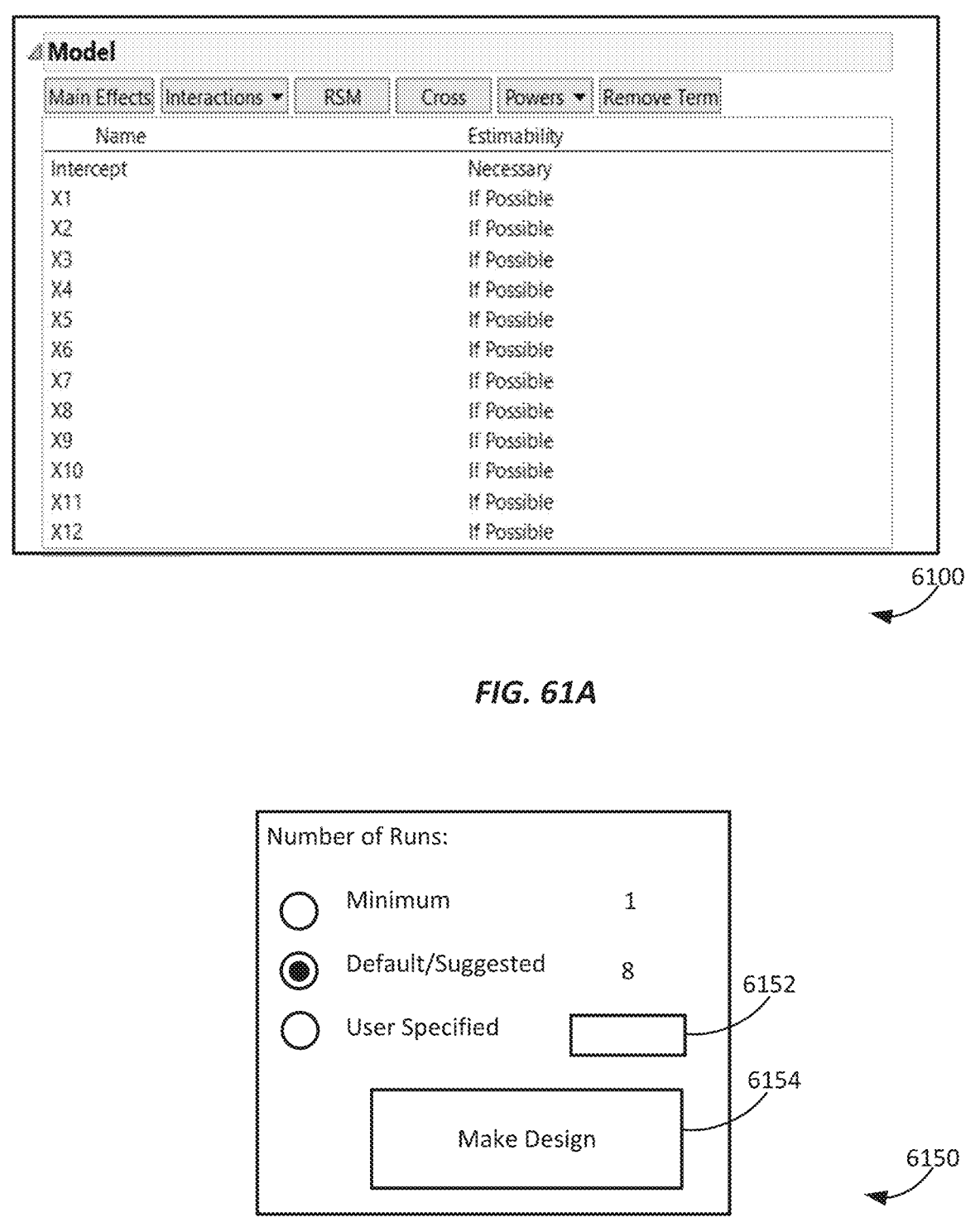

FIG. 61A illustrates an example graphical user interface 6100 for providing factors. In this example, the user requests an 8-run design for 12 factors and adds 12 continuous and/or discrete factors. In this case the user is interested in studying as many of the main effects of the factors as possible. The graphical user interface receives a user selection of the main effect model terms for all the factors and sets their estimability to "If Possible" as opposed to "Necessary". In this case there is an additional factor ("Intercept") set for an intercept for the design that is necessary. In other cases, the user could have indicated an emphasis on estimability for certain factors by also setting them to "Necessary".

In one or more embodiments, the different factors for the experiment comprise one or more discrete factors. The test conditions comprise at least two levels representing respective discrete options for each of the one or more discrete factors. A computing system described herein outputs a setting for each test condition of a design by outputting a respective selection between two levels for respective ones of the one or more discrete factors in each test case of the plurality of test cases.

Additionally, or alternatively, the different factors for the experiment comprise one or more continuous factors with one or more respective ranges of options. The test conditions comprise at least two levels representing respective options for each of the one or more continuous factors within the one or more respective ranges of options. A computing system described herein outputs the setting for each test condition of a design by outputting a respective selection between two levels for respective ones of the one or more continuous factors in each test case of the plurality of test cases. For instance, the experiment could correspond to an experiment for a machine learning algorithm with different hyperparameters. The hyperparameters could be continuous factors with range(s) of options. The setting could indicate a value for a hyperparameter of the machine learning algorithm.

In one or more embodiments, the user can select a role for the factor of type continuous or discrete and values corresponding to one of levels for options for the factor. FIG. 55, for example, shows setting roles 5512 of continuous, discrete numeric or discrete categorical, and values corresponding to a lower level 5514 and an upper level 5516 for each of those factor types.

FIG. 61B illustrates an example graphical user interface 6150 for providing runs. In this example, the user selects a default 8 for the number of runs. This default may be a parameter suggested by a computing system according to embodiments described herein. Alternatively, the user could have specified a different number of runs in text box 6152. The user selects Make Design button 6154 to request a design according to the parameters provided by the user in FIGS. 61A and 61B.

Figure 62:
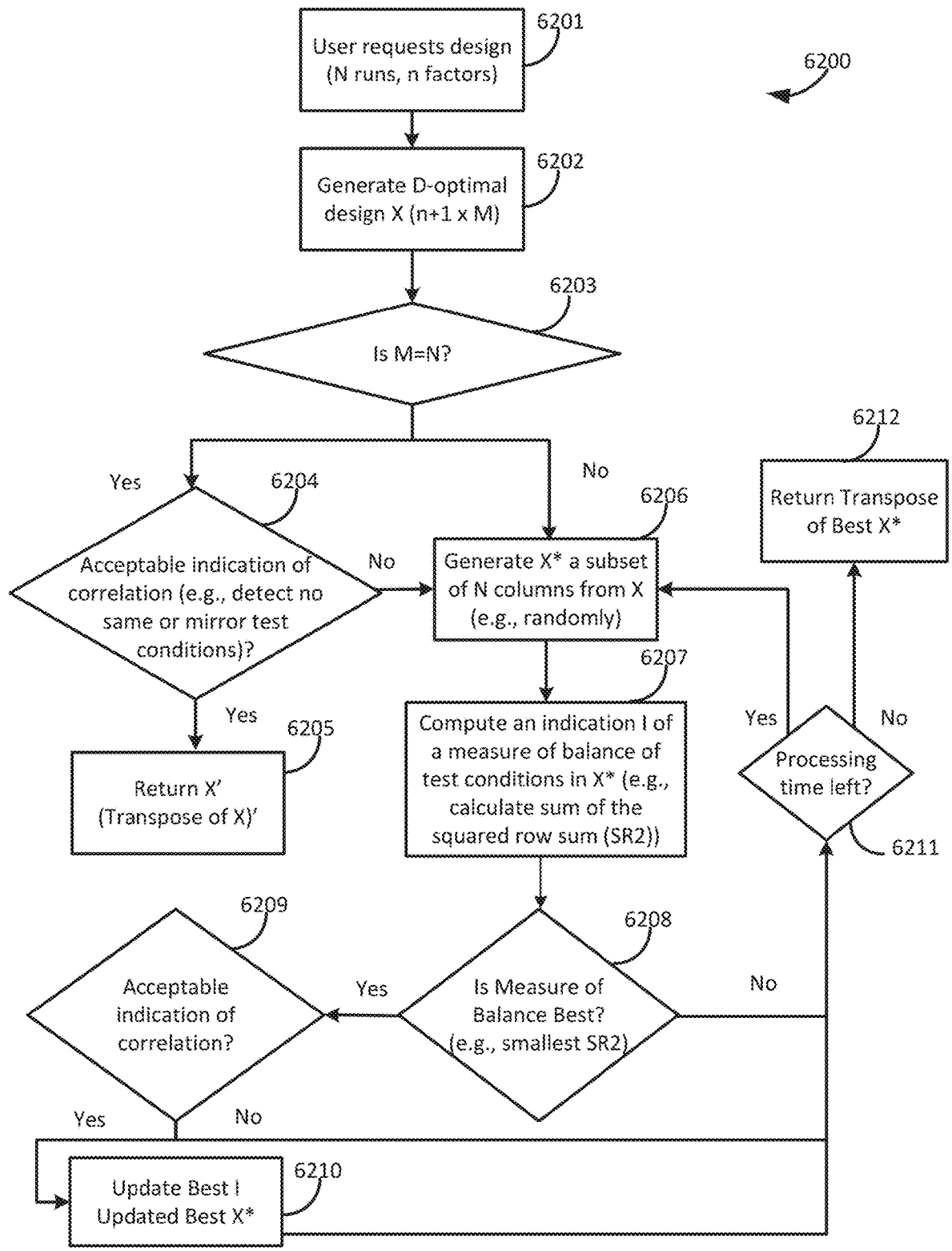
FIG. 62 illustrates an example flow diagram for returning a supersaturated design in at least one embodiment of the present technology.

FIG. 62 illustrates a flow diagram of a method 6200 for returning a supersaturated design according to a matrix Y. The method 6200 can be implemented by computing systems described herein.

Figure 63A:
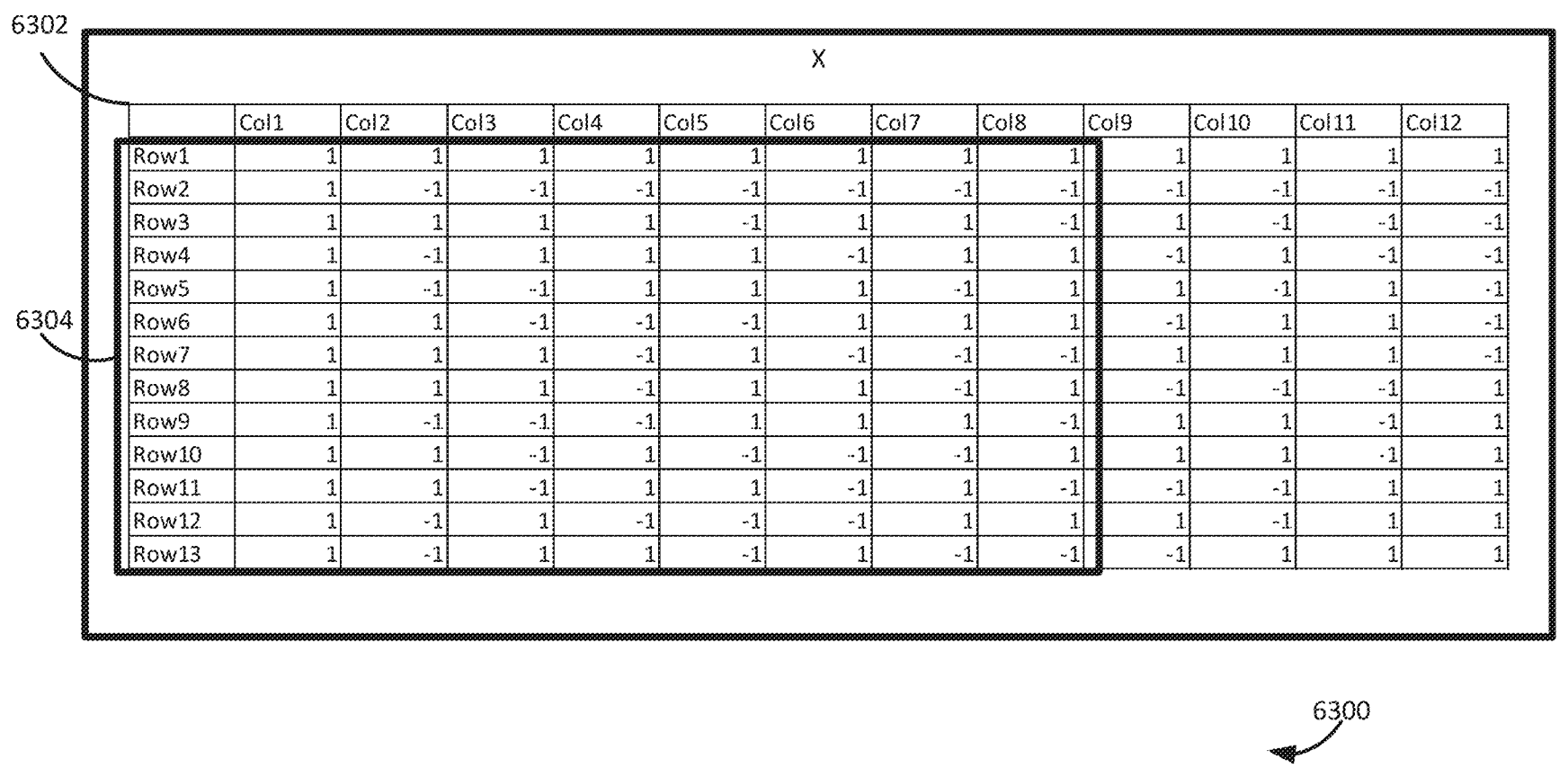

In an operation 6201, the user requests a design (e.g., a supersaturated design with N runs and n factors). In an operation, 6202, a computing system generates a D-optimal design, X, with (n+1) runs and M columns (where M>=N). The design can be a chemical weighing or two-level design in that a given value in the matrix will take on one of two values. The extra row can be added to provide for an intercept row as described herein. FIG. 63A illustrates a data representation 6300 of a D-optimal design where a given element of matrix 6302 has one of two values (1 or −1). In this case, Row 1 corresponds to the intercept row, but it could have been any row.

In one or more embodiments, multiple D-optimal designs are possible responsive to the given dimensions of the matrix X (e.g., based on a run indication and factor indication). A computing system can select between multiple D-optimal designs. For example, a design can be selected with the highest D-efficiency score or highest other efficiency score described herein (e.g., A-efficiency). A design can be selected based on one or more secondary criteria related to balancing test conditions for a factor as described herein. For instance, the one or more secondary criteria may be related to an evaluation of a $E(s^2)$ criterion, a $UE(s^2)$ criterion, or both, wherein:

$$E(s^2) = \frac{\sum_{i \neq j=2}^{n} \Sigma s_{ij}^2}{(n-1)(n-2)};$$

$$UE(s^2) = \frac{\sum_{i \neq j=1}^{n} \Sigma s_{ij}^2}{n(n-1)};$$

where n is the number of columns of a matrix Y for a supersaturated design; and s is the elements of a matrix S where S=Y'Y. The $E(s^2)$ criterion may assume all factors are balanced (equal levels of + and −1's) such that s1j=0 for all j=2, . . . n, whereas that requirement can be relaxed with a $UE(s^2)$ criterion. A design or set of designs may be selected that minimizes a value for the criterion or meets a threshold value for the criterion. Additionally, or alternatively, other second criteria can be considered such as amount of maximization of the number of level-balanced factors.

In the example, in FIG. 61A-61B, the user requests an 8×12 supersaturated design. This means that a computed intermediate matrix X for computing the supersaturated design would correspond to a 13×8 design. In an example, to get the 13×8 design, a subset of columns is selected from a 13×12 design (e.g., subset 6304 in FIG. 63A). For both the chemical weighing design, and the D-optimal supersaturated design standpoint, the criterion is not affected by the choice of subset. However, some designs are more desirable than others according to other criteria. There may be one or more factors that are heavily unbalanced in the number of times that factor is used at its low value versus its high value. A practitioner would want the factors balanced as much as possible while remaining a D-optimal supersaturated design.

If the matrix X requires additional rows, a computing system can selectively add rows favorable to a supersaturated design application (e.g., rows that are not identical to rows already in the matrix X, rows that are not mirror-image rows to rows already in the matrix X, rows that are themselves a balanced subset, and/or add rows that further balance the matrix X. A mirror row has the same value for each element of the row as another row multiplied by −1.

An intercept row for the design can be selected. A computing system can set the intercept row to a same option for each test condition. For example, if the intercept row will be the first row of a final design, a computing system multiplies the columns of X by −1 for any column in which the first row is −1. This has no effect on the optimality of X but ensures the first row of a final design is set to 1 for all columns.

In an operation 6203 it is determined whether M is equal N. In other words, does the matrix X have the same number of columns already as the requested design?

If M=N, an operation 6204 comprises computing an indication of correlation between effects of factors of a matrix Y that is a transposition of matrix X. In this example, the method 6200 comprises detecting favorable test conditions for correlation. For example, if it is determined that there is an acceptable indication of correlation (e.g., no rows in X are the same or mirrors), in an operation 6204, then a D-optimal supersaturated design is given by X' (transpose of X) in an operation 6205.

Otherwise, if a computing system determines that M is not equal to N; subsets X* of the matrix X can be considered. An operation 6206 of method 6200 comprises generating an X* which is a subset of N columns from X. For example, the subset can be a random selection of N columns. As shown, in FIG. 63A, for instance, a subset 6304 of 8 columns is taken from matrix 6302 to form a matrix X*. An operation 6207 comprises computing a respective indication of a measure of balance of test conditions in X*.

In some embodiments, multiple candidate matrices that are each a different subset of matrix X and each represent the same number of factors as matrix X can be selected (e.g., for a set number of times). The method 6200 can be used to compute a respective indication of a measure of balance of test conditions for respective factors for each of the multiple candidate matrices; and select, based on a given respective indication for each of the multiple candidate matrices, a matrix X* for outputting a supersaturated design. For example, the operation 6208 comprises determining whether a current matrix has the best measure of balance. A measure of balance could indicate a number of level-balanced (or nearly level-balanced) factors and/or number of orthogonal (or nearly orthogonal) pairs of factors for a design resulting from the matrix.

In some embodiments, if the measure of balance of test conditions is better, further analysis of the design can be conducted. For example, an operation 6209 comprises computing an indication of correlation between effects of factors of a matrix Y that is the transposition of the matrix X*. It is then determined whether the indication of correlation is acceptable. For instance, the computing may comprise detecting favorable test conditions for a supersaturated design such as a set of test conditions indicating that that there is no row in matrix X* with a same or mirror test conditions as another row. In an operation 6210, the indication I is updated and the X* is updated based on detecting the set of test conditions. Alternatively, if the indication of correlation is not acceptable, in one or more embodiments, a computing system refrains from selecting a matrix for transposition (e.g., a matrix with two or more rows with same test conditions or two or more rows with mirror test conditions).

If the measure of balance of test conditions is not better or the indication of correlation is not acceptable, the process may generate another subset if it is determined that there is still processing time left in an operation 6211. For example, in one or more embodiments, a computing system obtains a process indication indicating an amount of allowed time, or number of computations, for processing the measure of balance of test conditions. Alternatively, or additionally, the processing time may be set based on the number of possible candidate matrices (e.g., a ratio of the number of possible candidate matrices).

In an operation 6212, the best design is returned by transposing the best X*.

FIGS. 63A-63C illustrate example data representations of matrixes (e.g., computed according to the method 6200 in FIG. 62). In FIG. 63A, matrix 6302 is derived from 12×12 Hadamard matrix with row 1 added to form a 13×12 D-optimal design (chemical weighing design). In this example, the design is also UE($s^2$) optimal.

In one or more embodiments, (e.g., according to the method shown in FIG. 62 different subsets (e.g., subset 6304) are taken and evaluated for criteria for a supersaturated design (e.g., computing a measure of balance of test conditions).

FIG. 63B shows an example of blindly taking the first 8 columns of the design in FIG. 63A and taking the transposition. The first factor (column 2) has 7 values at −1 and only 1 at +1, which is undesirable.

In this example, a respective indication of a measure of balance of test conditions of subset 6304 (e.g., an operation 6207 of the method 6200 in FIG. 62) is computed according to equation:

$$SR2 = \sum_{i}^{B} \left( \sum_{j}^{A} w_{ij} \right)^2$$

where i is one or more indexes for rows of a respective candidate matrix corresponding to subset (e.g., subset 6304); j is one or more indexes for columns of the respective candidate matrix; A is a total number of columns of the respective candidate matrix; B is a total number of rows of the respective candidate matrix; and w is a value assigned to a location of the respective candidate matrix indexed by row i and column j. A minimum SR2 value is preferred as a proxy for more evenly balanced columns. The SR2 data value 6334 for the design in FIG. 63B is 96. In this case, the equation for SR2 can be simplified to begin at j=1 to avoid additional process for the intercept row.

Using method 6200 in FIG. 62, another candidate matrix can be selected. In this case the SR2 value for design in FIG. 63C produces a value of 36 versus 96 with the naïve approach. FIG. 63 C is selected as the minimum SR2 of computed values and has more desirable criteria for supersaturated designs. For instance, the factors (columns 2 through 13) are in the worst-case 5 at one setting and 3 at the other reflecting a better balance of settings for factors.

In one or more embodiments, a candidate matrix may be further vetted by computing an indication of correlation (e.g., in operation 6209 of FIG. 62). For instance, several candidate matrices may have similar SR2 values or are under a threshold requirement for an SR2 value.

In this example, the matrix 6362 in FIG. 63C can be used to compute an indication of correlation. For example, computing the indication of correlation comprises determining a correlation $\varphi_j$, between column j and all other columns of matrix Y resulting from the transposition of the candidate matrix, calculated for each column according to equation for an overall correlation:

$$\varphi_j = \sum_{i=2}^{m} p_{ij}^2$$

where $p_{ij}$ is correlation between columns i and j; and m is number of columns in the matrix Y.

A design may be selected that minimizes a maximum of the $\psi_j$, that minimizes an average of the $\varphi_j$ values, or that minimizes the maximum absolute correlation (i.e., minimize the maximum of |ρij|).

Different design diagnostics can be performed on, and different options set for, a supersaturated design (e.g., diagnostics and options shown in FIG. 39). For example, in output options 3906 of FIG. 39, the user can select save X Matrix to output a data table (e.g., to enter responses according to the settings, to provide scripts for model analysis, to statistically evaluate the design, etc.). In one or more embodiments, statistical tools can be used to represent properties of settings for the test conditions (e.g., statistical software to generate and evaluate a design such as one or more software tools offered by SAS Institute Inc. of Cary, N.C., USA like JMP®).

In one or more embodiments, a computing system computes a respective indication of a measure of balance of test conditions of a candidate matrix by evaluating one or more of: a measure of orthogonality between factors according to a supersaturated design according to matrix based on the transposition of the candidate matrix; error in fitting a model according to the supersaturated design; and closeness to a Bayesian D-optimal design.

Figure 64A:
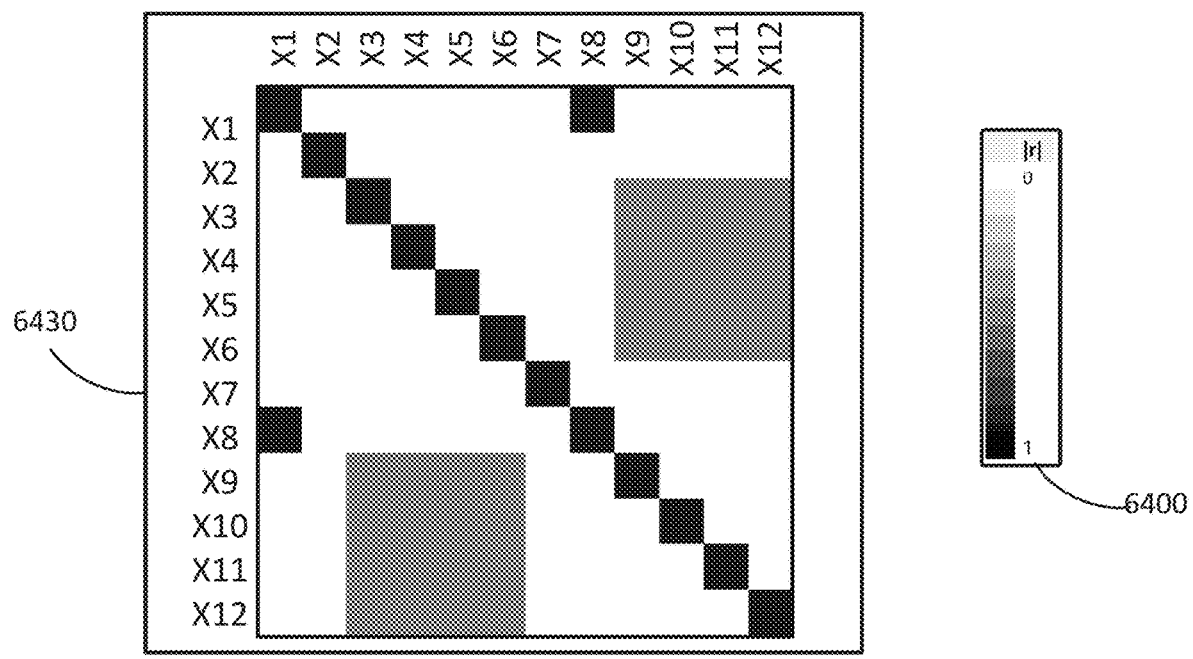
FIGS. 64A-64B illustrate example correlation maps in at least one embodiment of the present technology.
Figure 64B:
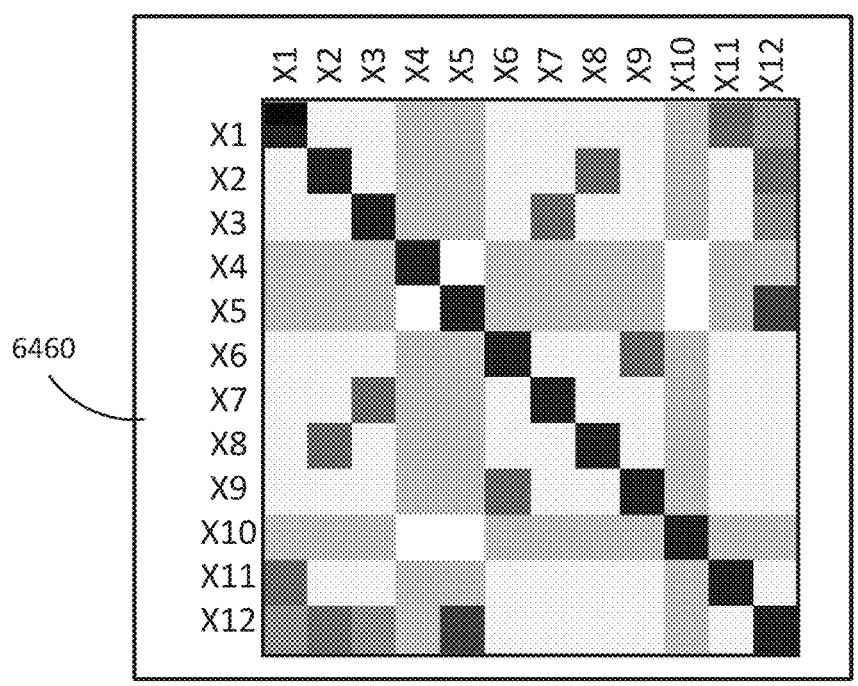

FIGS. 64A-64B illustrate example correlation maps generated according to approaches described herein. In one or more embodiments, a computing system described herein generates a representation of a measure of correlation or orthogonality between factors of the matrix Y according to the setting for each test condition for the test cases of the supersaturated design for the experiment according to the matrix Y.

For example, FIGS. 64A and 64B show degrees of a measure of orthogonality according to a key 6400. Factors with a |r| of close to 1 are confounded factors or variables, such that the effect of a test condition for a given one of the confounded factors cannot be distinguished from an effect of a test condition for another of the confounded variables.

FIG. 64A was generated using traditional approaches for generating a D-optimal chemical balance weighing design for supersaturated designs. With these approaches, there may be factors in the supersaturated designs that are confounded, which would occur if there were replicate rows in the original design. FIG. 64A shows an example of confounding according to existing approaches. In FIG. 64A, the correlation map 6430 shows that factor X1 and factor X8 are completely correlated or confounded factors. Several other factors show some degree of correlation (e.g., factor X3 with factors X9, X10, X11, and X12).

In contrast, FIG. 64B shows a spread through the factors with lower overall |r| values achieved with embodiments described herein. Further, no factor is completely correlated (i.e., |r|≠1).

In one or more embodiments, a computing system outputs the setting for each test condition for the test cases of the supersaturated design for the experiment according to the matrix Y by displaying in a graphical user interface the representation of the measure of correlation or orthogonality corresponding to these settings.

In one or more embodiments, a computing system described herein generates a representation of efficiency of estimating a factor in modeling the supersaturated design for the experiment FIGS. 65A-65B illustrate example representations of efficiency of estimating a factor in modeling a supersaturated design. FIG. 65A shows a displayed graphical user interface 6500 corresponding to the settings of FIG. 64A, and FIG. 65B shows a displayed graphical user interface 6500 corresponding to the settings of FIG. 64B. For each of the factors and the intercept, a fractional increase in confidence interval (CI) length and relative standard (Std) error of estimate is estimated. Lower values for these criteria represent a better design.

The fractional increase in confidence interval length compares the length of a parameter's confidence interval to an ideal design (e.g., an orthogonal D-optimal design would have a fractional increase of zero for each of the parameters).

The relative standard (Std) error of estimate gives a ratio of the standard deviation of a parameter's estimate to the error standard deviation. The relative standard error can be defined as the diagonal entries of a posterior distribution covariance matrix equal to:

$$(X'X+K^2)^{-1}$$

where K is a diagonal matrix with 1's on the diagonal and zero's elsewhere. The element is zero for necessary terms and 1 for possible main effects. X is a matrix of the response of the system according to the supersaturated design. Smaller values on the diagonal entries indicate a better design. Bayesian D-optimal designs maximize a determinant of the inverse of the posterior covariance matrix (i.e., $\det(X'X+K^2)$).

As shown in FIG. 65A, some factors had high values for confidence interval length and relative standard error of estimate compared to the values in FIG. 65B. Further, the values in FIG. 65B where more similar than the values found in FIG. 65A, indicating FIG. 65B had a better spread to the design.

In one or more embodiments, a computing system described herein outputs the setting for each test condition for the test cases of the supersaturated design for the experiment according to the matrix Y by displaying in a graphical user interface the representation of an efficiency corresponding to those settings.

Overall, the settings corresponding to FIG. 64B and FIG. 65B show an improvement of the design corresponding to FIGS. 64A and 65B. The relative Bayesian D-efficiency between FIGS. 64A and 65B is 99% (i.e., there is little loss in Bayesian D-efficiency), but there are no confounded factors, and the design is still a D-optimal supersaturated design and $UE(s^2)$ optimal.

Designed experiments can be used to study the impact of changes to product or process settings (or factors of a design) on quantities of interest, such as batch yield. It is often not practical, possible, or desirable for certain combinations of factor settings to occur together. A simple example is that it would not be useful to have an experiment to cook food at the highest oven temperature for the longest time possible, or the lowest temperature possible in combination with the shortest time. A designer may wish to define a disallowed combination that would exclude these extreme values for factors of oven temperature and cooking time in a design for a baking experiment. In general, however, these constraints can be arbitrarily complicated, nonlinear, and combine both continuous (e.g., any time amount or temperature amount in a range) and categorical design factors (e.g., ingredient options). A designer may want a set of inputs that advances a user-goal for the design system (like temperature and cooking time for an optimal cookie hardness) that disregards a disallowed combination (like the baking extremes). Embodiments described herein can be used to easily and automatically facilitate the optimization and use of a model that is fit on acquired data in a way that satisfies design constraints (e.g., disallowed combinations).

For instance, a designer may want a computing system to produce a suggested set of inputs that advances a user-defined goal for a design system and is not disallowed according to one or more disallowed combinations. Alternatively, or additionally, a computing system may make other suggestions to the user. For instance, constraints may make it impossible to generate a design that satisfies all the constraints given a user-defined model. A computer system can suggest a modification of a user-defined model such that a computer-generated design can be generated according to computer suggested modification that accounts for a disallowed combination and/or one or more additional constraints on computer generation.

Figure 66:
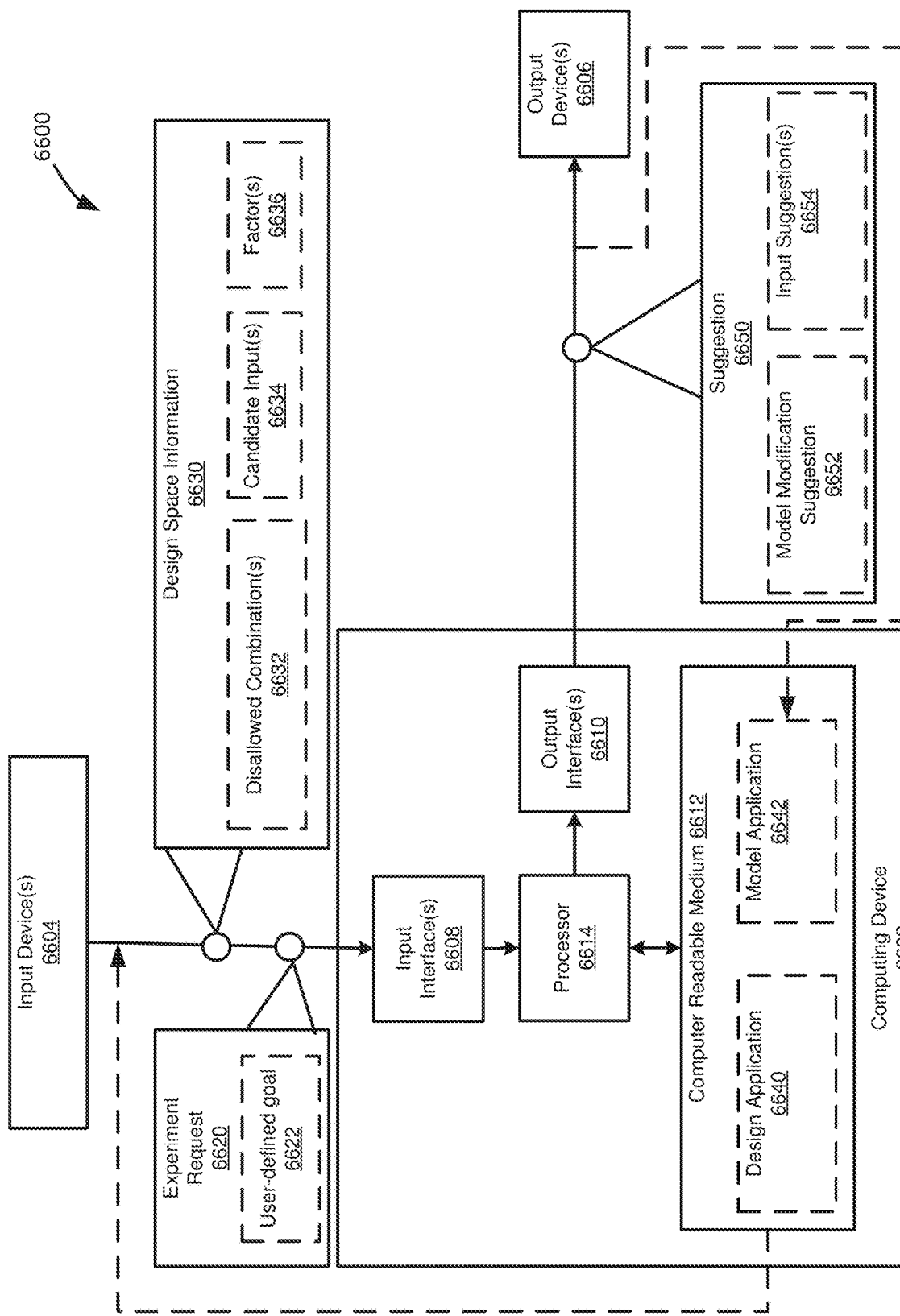
FIG. 66 illustrates an example system for generating a suggestion for a design system in at least one embodiment of the present technology.

FIG. 66 illustrates an example system 6600 for generating a suggestion (e.g., a model modification suggestion 6652 and/or an inputs suggestion 6654) in one or more embodiments. System 6600 includes a computing device 6602.

In one or more embodiments, the system 6600 includes one or more input devices 6604 described herein for receiving design or experiment messages via one or more input interfaces 6608. For instance, the computing device 6602 receives an experiment request 6620 and/or design space information 6630. The design space may be used for designing a design system provided by the computing device 6602 or another device in the system 6600 not shown. A design system can be used to generate and/or test designs (e.g., for determining responses to inputs for factors in an experiment). Alternatively, or additionally, the system 6600 includes one or more output devices 6606 (e.g. one or more display, printer, or storage devices) for outputting via one or more output interfaces 6610 a suggestion 6650 responsive to the experiment request 6620.

In one or more embodiments, the experiment request 6620 may include a request for the computing device 6602 regarding a design for designing an experiment or designing a design system (e.g., according to the design space information 6630). The design space information 6630 could include factors 6636 (e.g., factors in an experiment or settings in a design system for an experiment) and/or candidate inputs 6634 for one or more of the factors 6636. For instance, the factors 6636 could include a first factor with a first set of candidate inputs for the first factor and a second factor with a second set of candidate inputs for the second factor. Alternatively, or additionally, the design space information 6630 comprises one or more disallowed combinations 6632. For instance, the disallowed combination could comprise a first set of values for the first factor of the plurality of factors that are restricted from being assigned to the first factor from the first set of candidate inputs if the second factor of the plurality of factors is assigned one of a second set of values from the second set of candidate inputs. As an example of a disallowed combination in a baking experiment, the temperature of an oven may be restricted from being assigned a value greater than 400 degrees when the cooking time is assigned a value greater than 30 minutes. The design space information 6630 could comprise more or less information (e.g., additional constraints or features of the design). For instance, the design space information 6630 may include a number of runs in a design (e.g., runs with no disallowed combinations) or whether a factor is continuous or categorical. The design space information 6630 may be used for the computing device 6602 to determine or define a design space.

The information or messages can be received from another computing system or can be manually input by a user of the system 6600 via input device(s) 6603 (e.g., a keyboard or touch screen for user entry of data). For instance, the Disallowed Combinations option in JMP® provided by SAS Institute Inc. of Cary, N.C. allows users to specify regions in the design space that are not allowable for a variety of reasons. This could be physical constraints such as where it is undesirable to a user run certain factors together within particular ranges or where one or more factors are not relevant at certain settings of another factor. Disallowed combinations may be specified as a Boolean expression. Additionally, or alternatively, the computing device 6602 may have stored information (e.g., defaults) pertaining to the experiment request 6620 or design space information 6630, and the computing device 6602 can obtain information from itself.

As an example, the experiment request 6620 may include a request for the computing device 6602 to identify a set of inputs that will provide a response of a design system that advances a user-defined goal for the design system. Accordingly, the experiment request 6620 may comprise a user-defined goal 6662 (e.g., the goal may be related to a set of inputs that maximize or minimize a criterion for an experiment). The computing device 6602 may output one or more input suggestion(s) 6654.

As another example, the computing device 6602 may receive a request for a computer-generated design of an experiment (e.g., to identify a set of inputs). The computing device 6602 may determine that a user-defined model cannot be generated. Accordingly, the computing device 6602 may generate a model modification suggestion 6652 for resolving the problem (e.g., identification of factors that cannot be estimated under the model, discretizing continuous factors represented in the model, and/or a modification of a disallowed combination represented in the user-defined model). The system 6600 is configured to exchange information between devices in the system (e.g., via wired and/or wireless transmission). For example, a network (not shown) can connect one or more devices of system 6600 to one or more other devices of system 6600. Alternatively, or additionally, the system 6600 is integrated into one device (e.g., the computing device 6602 comprises a touch screen for entry of an experiment request 6620 and/or design space information 6630 or display of suggestion 6650).

The computing device 6602 has a computer-readable medium 6612 and a processor 6614. In one or more embodiments, computer-readable medium 6612 comprises one or more features of a computer-readable medium described herein or is a computer-readable medium described herein (e.g., computer-readable medium 1312, computer-readable medium 3312, computer-readable medium 4112, and computer-readable medium 4812). In one or more embodiments, processor 6614 comprises one or more features of a processor described herein or is a processor described herein (e.g., processor 1314, processor 3314, processor 4114, and processor 4814).

In one or more embodiments, the computer-readable medium 6612 comprises instructions for a design application 6640. For instance, if the computing device receives a request to identify a set of inputs, the design application 6640 can be used to select those inputs. For instance, responsive to the request to identify the set of inputs, the computing device 6602 can generate a design for the design space that provides a plurality of design cases for generating the response of the design system. The computing device 6602 can obtain responses of the design system generated for multiple design cases of the design for the design system. The design application 6640 can be used to select at least one design case based on obtained responses of the design system for the multiple design cases.

Embodiments herein describe in more detail further optimization techniques for generating the design for the design space. The design application 6640 can be used to generate the responses (e.g., if the design system is modeled by a computer model) or the design application 6640 can receive those from another computing system or user. The computer model may be user-defined or generated by the computing device 6602 (e.g., in response to a suggested modification of a user-defined model). The computer model may account for constraints like the one or more disallowed combinations 6632.

The computing device 6602 can, based on the at least one design case, output an indication of a suggested set of inputs for the design system, wherein the suggested set of inputs advances the user-defined goal for the design system and is not disallowed according to the one or more disallowed combinations. For instance, the response of the suggest set of inputs can approach a maximum or minimum of a criterion related to the user-defined goal.

Alternatively, or additionally, the computer-readable medium 6612 comprises instructions for a model application 6642. The model application 6642 can be used to generate a computer suggested modification of a user-defined model. For instance, the computing device 6602 may determine that there are one or more disallowed combinations that constrain computer generation of a computer-generated design based on the design space information 6630. The computing device 6602 may also determine one or more additional constraints on computer generation of the computer-generated design (e.g., that the factors 6636 in the design comprise continuous factors). The model application 6642 may evaluate if a user-defined model can be generated according to the disallowed combination and the one or more additional constraints. Responsive to determining that the user-defined model cannot be generated, the model application 6642 may generate a computer suggested modification of the user-defined model such that the computer-generated design can be generated according to the computer suggested modification. The computer suggested modification accounts for the disallowed combination and the one or more additional constraints on computer generation. For instance, the computer suggestion modification may modify the disallowed combination for the user-defined model to account for discretized continuous factors. As another example, the computer suggestion modification may identify a problematic aspect of the model (e.g., a disallowed combination or model terms that cannot be estimated due to disallowed combinations). Additional examples of computer suggested modifications are provided in more detail herein (e.g., in FIGS. 77B, 78C, 79C, 80B, 81B, and 82C).

In one or more embodiments, fewer, different, and additional components can be incorporated into computing device 6602. For instance, system 6600 may comprise components for generating responses according to the design application 6640. In one or more embodiments, there can be multiple input devices or computing systems (e.g., one to input the experiment request 6620 and another to input the design space information 6630). In the same or different embodiments, there can be multiple output devices or computing systems (e.g., one to receive a model modification suggestion 6652 and one to receive an input suggestion 6654). As another example, the same interface supports both input interface 6608 and output interface 6610. For example, a touch screen provides a mechanism for user input and for presentation of output to the user. Alternatively, the input interface 6608 has more than one input interface that uses the same or different interface technology. Alternatively, or additionally, the output interface 6610 has more than one output interface that uses the same or different interface technology. The computing device 6602 can be considered a computing system.

Figure 67:
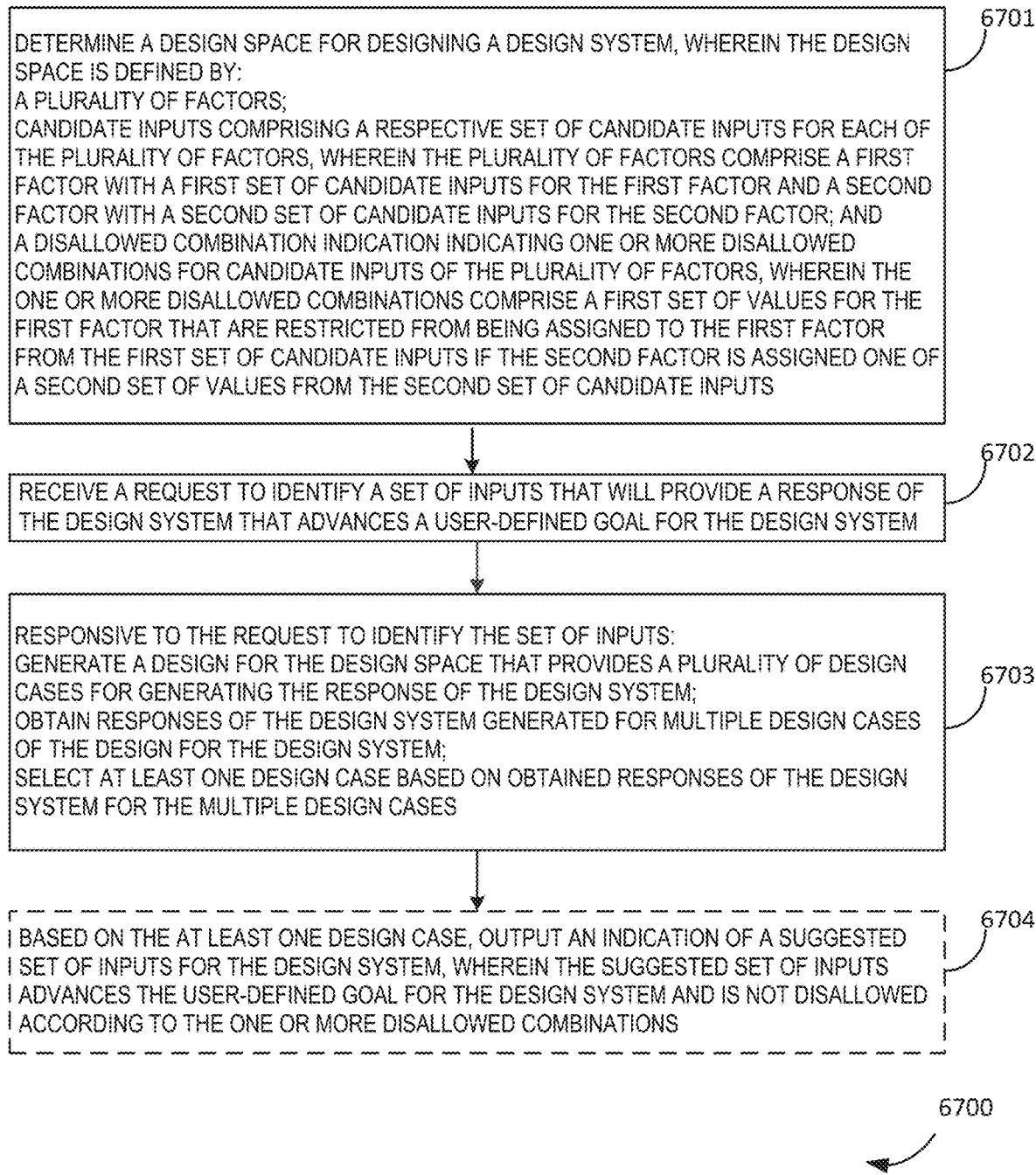
FIG. 67 illustrates an example flow diagram for generating a suggested set of inputs for a test system in at least one embodiment of the present technology.

In one or more embodiments, the system 6600 (or components of system 6600 such as computing device 6602) implements one or more methods described herein (e.g., a method shown in FIG. 67 and/or FIG. 76) for outputting a suggestion 6650. FIG. 67 illustrates an example flow diagram of a method 6700 for generating a suggested set of inputs for a test system.

The method 6700 comprises an operation 6701 for determining a design space for designing a design system. The design space is defined by a plurality of factors. The design space is further defined by candidate inputs comprising a respective set of candidate inputs for each of the plurality of factors. The plurality of factors comprise a first factor with a first set of candidate inputs for the first factor and a second factor with a second set of candidate inputs for the second factor. In this example, the design space is further defined by a disallowed combination indication indicating one or more disallowed combinations for candidate inputs of the plurality of factors. The one or more disallowed combinations comprise a first set of values for the first factor that are restricted from being assigned to the first factor from the first set of candidate inputs if the second factor is assigned one of a second set of values from the second set of candidate inputs. A given set could comprise one or more inputs. Further, a given disallowed combination could comprise involvement with more than two factors.

The method 6700 comprises an operation 6702 for receiving a request to identify a set of inputs that will provide a response of the design system that advances a user-defined goal for the design system. For instance, the request could comprise a request to identify the set of inputs that will maximize, minimize, or meet a target for a criterion for a response of the design system according to the user-defined goal for the design system and the disallowed combination indication.

The method 6700 comprises an operation 6703 responsive to the request to identify the set of inputs. For instance, the operation 6703 comprises generating a design for the design space that provides a plurality of design cases for generating the response of the design system. The operation 6703 comprises obtaining responses of the design system generated for multiple design cases of the design for the design system. The operation 6703 comprises selecting at least one design case based on obtained responses of the design system for the multiple design cases (e.g., selecting a design case of the multiple design cases or a derived design case estimated to closet approach maximizing or minimizing a criterion for a response of a design system). More than one design could be generated and the best setting selected from amongst the designs (e.g., based on a user defined criterion or desirability).

In one or more embodiments, the method 6700 optionally comprises an operation 6704 for, based on the at least one design case, outputting an indication of a suggested set of inputs for the design system. The suggested set of inputs advances the user-defined goal for the design system and is not disallowed according to the one or more disallowed combinations. For instance, the indication of the suggested set of inputs comprises a set of inputs from a design case that achieves a maximum or minimum response of design cases tested in the design or derived from the design.

In one or more embodiments, it is possible that a design does not comprise an optimal point according to a user-defined goal. However, the suggested set of inputs can be useful for pointing in a right direction toward an optimal design point or the suggested set of inputs may be extrapolated from the responses of tested design points.

FIGS. 68A-C and 69A-B illustrate example disallowed combinations for one or more embodiments described herein. The examples can be implemented using a profiler tool in JMP® or other tools for allowing a user to examine a disallowed combination. The profiler tool in JMP® allows users to examine the effect of each factor in a model on the output as well as the interplay between factors on that same output. It also allows users the ability to find optimal settings for each factor. A commonly used feature in JMP® is "maximize desirability", which finds the settings of factors that maximize (or minimize, depending on which option is selected in the computing system) one or more responses.

Embodiments herein allow a profiler to account for disallowed combinations in searching for optimal settings so that optimization, such as maximize desirability, is performed over the constrained region. With disallowed combinations two or more factors have particular settings which cannot be included together, for instance, in the same row of a design. From the profiler perspective, this implies that those settings should not be allowed to be set together at the same time.

Figure 68A:
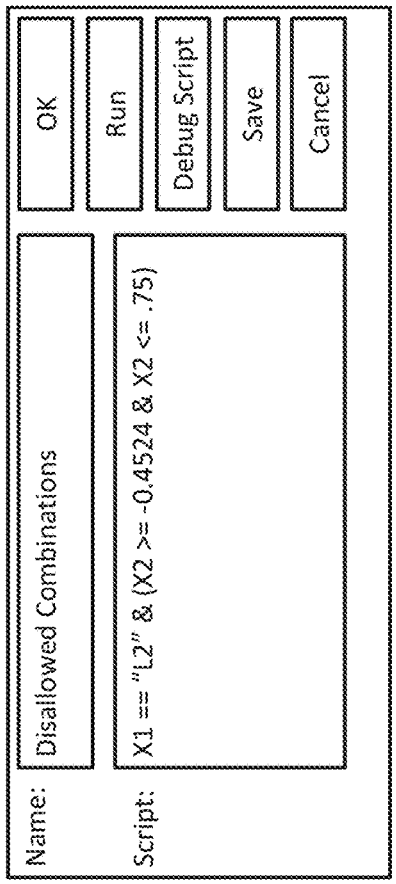
FIGS. 68A-C and 69A-B illustrates example disallowed combinations in at least one embodiment of the present technology.

FIG. 68A shows an example disallowed combination in the graphical user interface 6800. The disallowed combination is given as X1=="L2" & (X2>=−0.4524 & X2<=0.75). In this example, the design space has a categorical factor $X_1$. that can be an IA or L2 setting and two continuous factor X2 and X3 that can be assigned values in respective ranges for the factors.

Figure 68C:
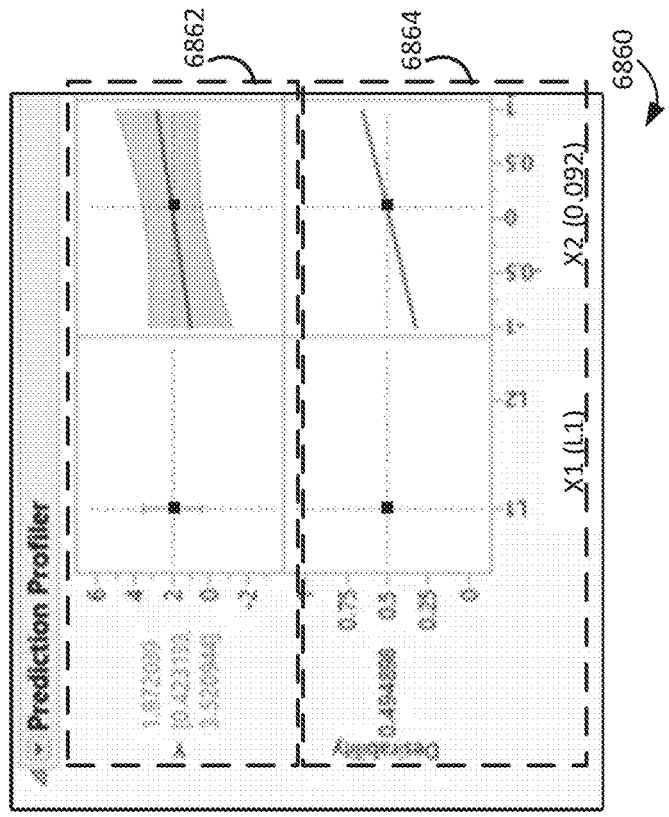
Figure 68B:
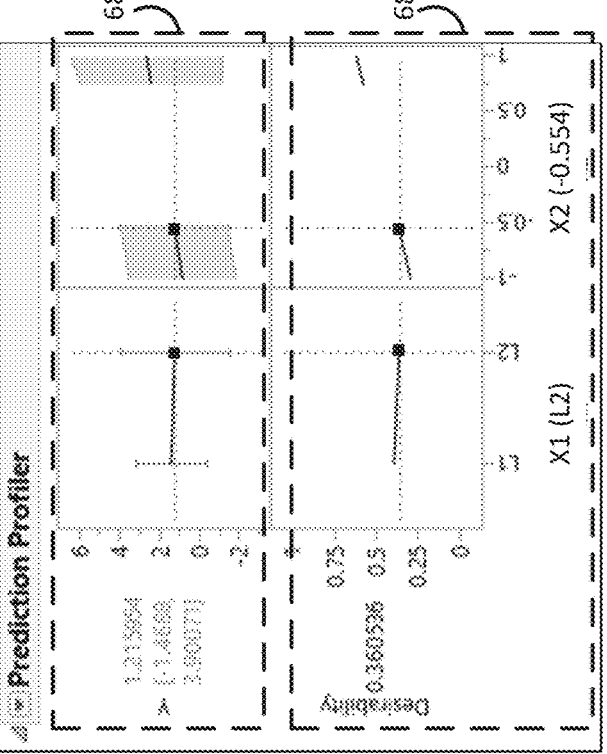

FIG. 68B shows an example graphical representation 6832 in the prediction profiler 6830 for JMP® where X1 is assigned a value of L2 and X2 is assigned a value of −0.554. Predicted responses Y are plotted given those settings. These setting combinations are not disallowed, but as shown in FIG. 68B when X1 is assigned the level L2, certain values of X2 are removed from the prediction profiler 6830 viewer of the graphical representation 6832 to indicate to a user this is a not an option given the other settings for the factors. Evaluations of the settings are also plotted in the prediction profiler 6830 based on a desirability criterion. As shown in graphical representation 6834, there is a gap in the potential to improve desirability for the X2.

FIG. 68C shows another example graphical representation 6862 in the prediction profiler 6860 for JMP® where X1 is assigned a value of IA and X2 is a assigned a value of 0.092.

Predicted responses Y are plotted given those settings. These setting combinations are not disallowed, but as shown in FIG. 68C when X2 is assigned the value of 0.092 the possibility of assigning X1 to L2 is removed from the prediction profiler 6860 viewer of the graphical representation 6862 to indicate to a user this is a not an option given the other settings for the factors. Evaluations of the settings are also plotted in the prediction profiler based on a desirability criterion. As shown in graphical representation 6864 desirability cannot be changed for the X1 factor in FIG. 68C given the settings for the factors. However, in FIG. 68B, the graphical representation 6834 shows that desirability for the $X_1$ factor cannot be improved in contrast to the example in FIG. 68B.

Figure 69A:
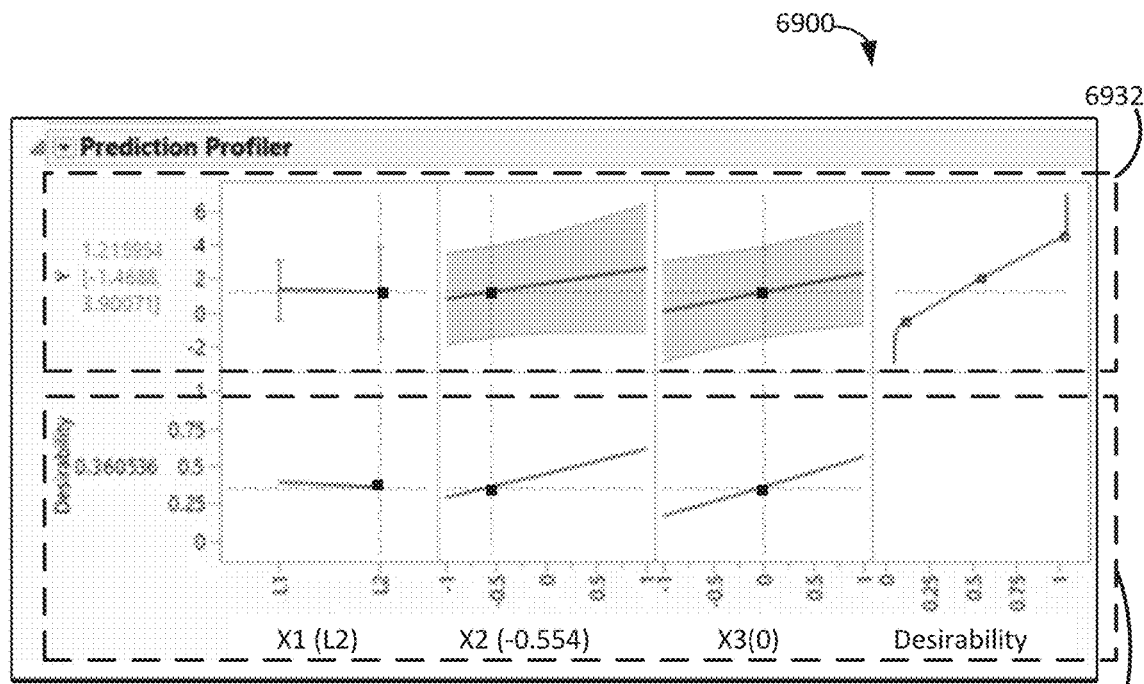
Figure 69B:
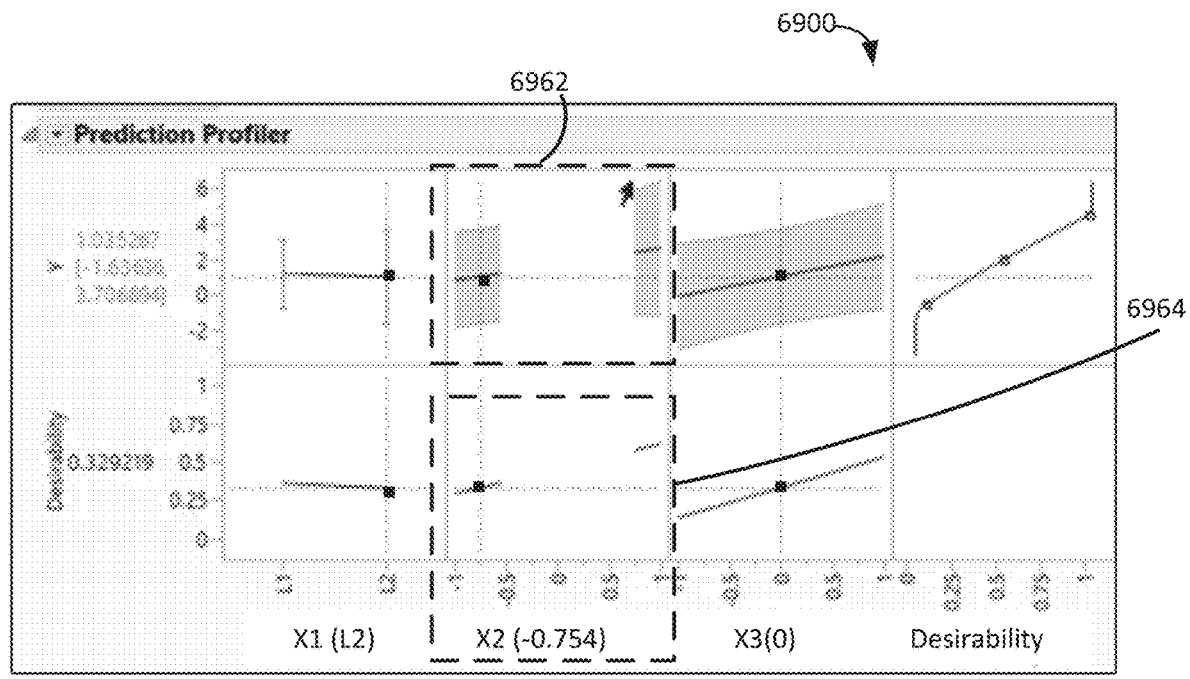

FIG. 69A shows an example graphical representation 6932 in the prediction profiler 6900 for JMP® where X1 is assigned a value of L2, X2 is assigned a value of −0.554, and X3 is assigned a value of 0. In this example there is no disallowed combination. FIG. 69B shows the disallowed combination of FIG. 68A applied to the graphical representation 6932 in the prediction profiler 6900. The response graph 6962 has been altered to reflect the values of X2 that cannot be assigned given the value of X1. The desirability graph 6964 has also been altered to reflect undefined values in a region for X2.

Accordingly, embodiments herein provide graphical representations that allow a user to easily and visually adjust settings for input values for factors when there are disallowed combinations. Embodiments herein also allow a computing system to select optimum settings for a user when there are disallowed combinations without the user needing to adjust settings. The presence of disallowed combinations results in a constrained design region, which can traditionally be difficult for optimization algorithms to handle. Optimal settings may lie on the boundary of the region and/or the design region may be unusually shaped and non-convex, all making optimization over the space difficult and time consuming. Optimal settings can be particularly difficult to find in scenarios with continuous types of factors, such as factors with a range of inputs with nonlinear constraints defined by a function or a range of inputs bounded by linear constraints. Performing optimization with a mix of categorical and continuous factors that are constrained linearly or nonlinearly is also very difficult.

Figure 70A:
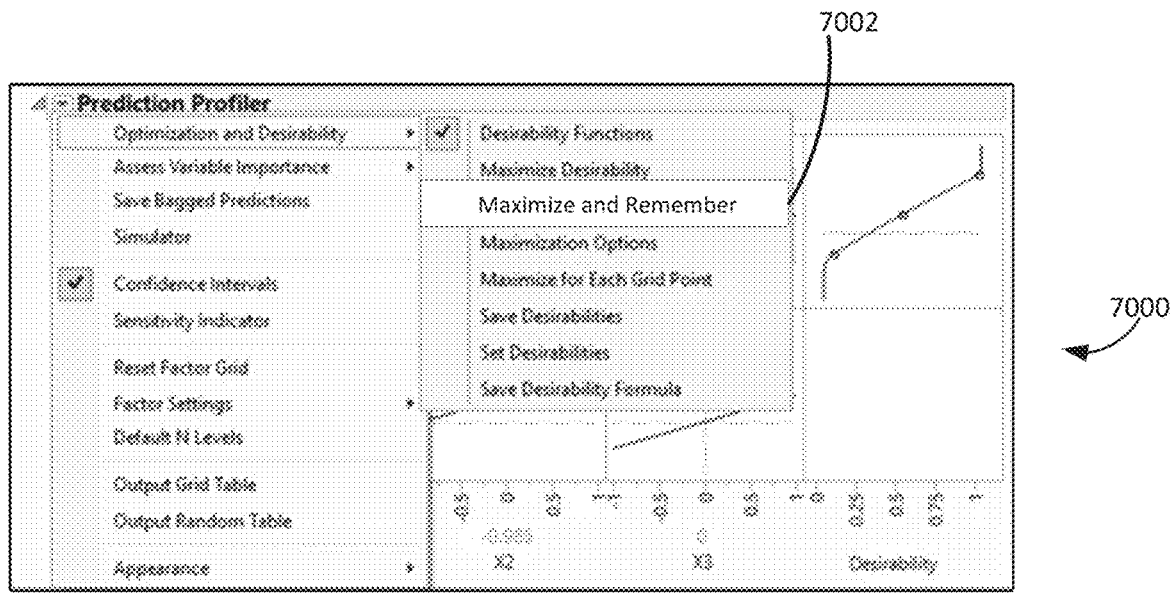
FIGS. 70A-B illustrate an example of a suggest set of inputs that maximize a user goal in at least one embodiment of the present technology.
Figure 70B:
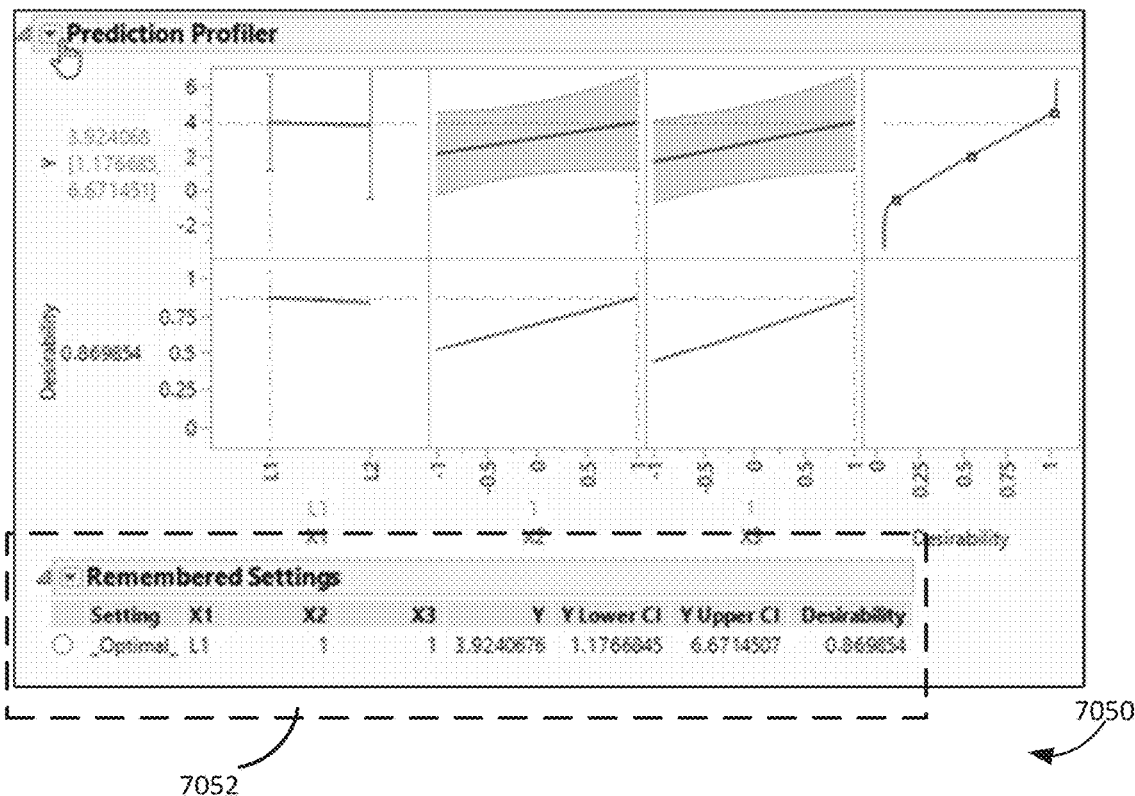

FIGS. 70A-B illustrate an example of using a computing tool herein to provide a suggested set of inputs that maximize a user goal.

In FIG. 70A, the computer system receives an instruction to maximize desirability. The user selects the optimization goal 7002 of maximize and remember in the graphical user interface 7000. The computing system receives the request to identify the set of inputs that will provide the response of the design system according to a model that advances the user-defined goal for the design system. In this example, a multiple linear regression model was used, and the user has selected the optimization goal 7002 of "maximize and remember" to maximize a response criterion and remember the maximization in further optimization. In other examples different models or optimization goals could be used.

The computing system in this example obtains a computer model for generating a response of a design system according to a respective input of each respective set of candidate inputs according to a design generated by the computing system.

The computing system generates a design for the design space that provides design cases for testing the response of the design system according to the computer model. The computing system inputs one or more of the design cases of the design into the computer model. Embodiments herein can use the coverage properties of covering arrays to aid in the optimization procedure by evaluating the function over the constrained region at specific points. Covering arrays are special designs used in a variety of settings including software testing. For software testing they are used to evaluate software across large numbers of input parameters in very few runs. FIG. 20B shows an example graphical user interface for generating a covering array. They are generally useful for problems where there is a deterministic function, to which the functions to be optimized will belong (since once a model is fit, that model is deterministic). The number of runs of the covering array are partly determined by the strength t of the covering array, which ensures that for every subset of t factors, all possible combinations of levels of those factors occur at least once in the design. For instance, FIG. 15 shows an example covering array of strength 2. FIG. 31A shows a strength 3 covering array.

The covering array platform within JMP® can incorporate disallowed combinations in construction. The covering array platform also has a post-construction optimization step meant to reduce the number of runs for the specified set of factors to save processing times, but this need not be used for the covering arrays.

For a given data set of factors and disallowed combinations, a computing system (e.g., one comprising the profiler) will generate a covering array of specified strength that spans the factor space. The computing system will evaluate the estimated function over the factor settings given by the covering array to determine the current optimal output. For instance, the computing system will evaluate obtained responses of the design system according to the computer model for each design case of the design. The computing system will perform additional local optimization as needed at the levels of the current optimal setting. The computing system will return the optimal settings for use with the profiler.

FIG. 70B shows a graphical user interface 7050 with a suggestion 7052 with suggested settings for X1-X3 factors and the response value based on returned responses and maximum desirability score obtained for those settings.

Figure 71A:
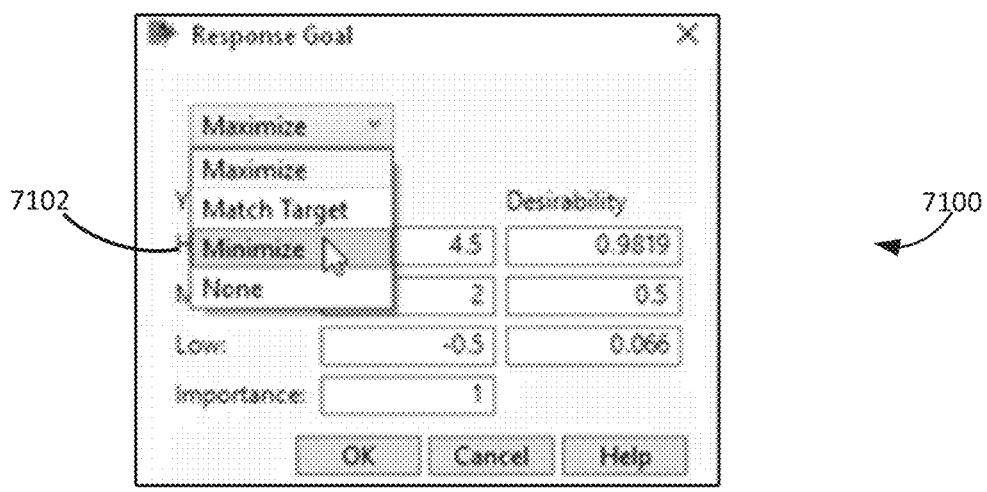
FIGS. 71A-B illustrate an example of a suggest sets of inputs that minimize a user goal in at least one embodiment of the present technology.
Figure 71B:
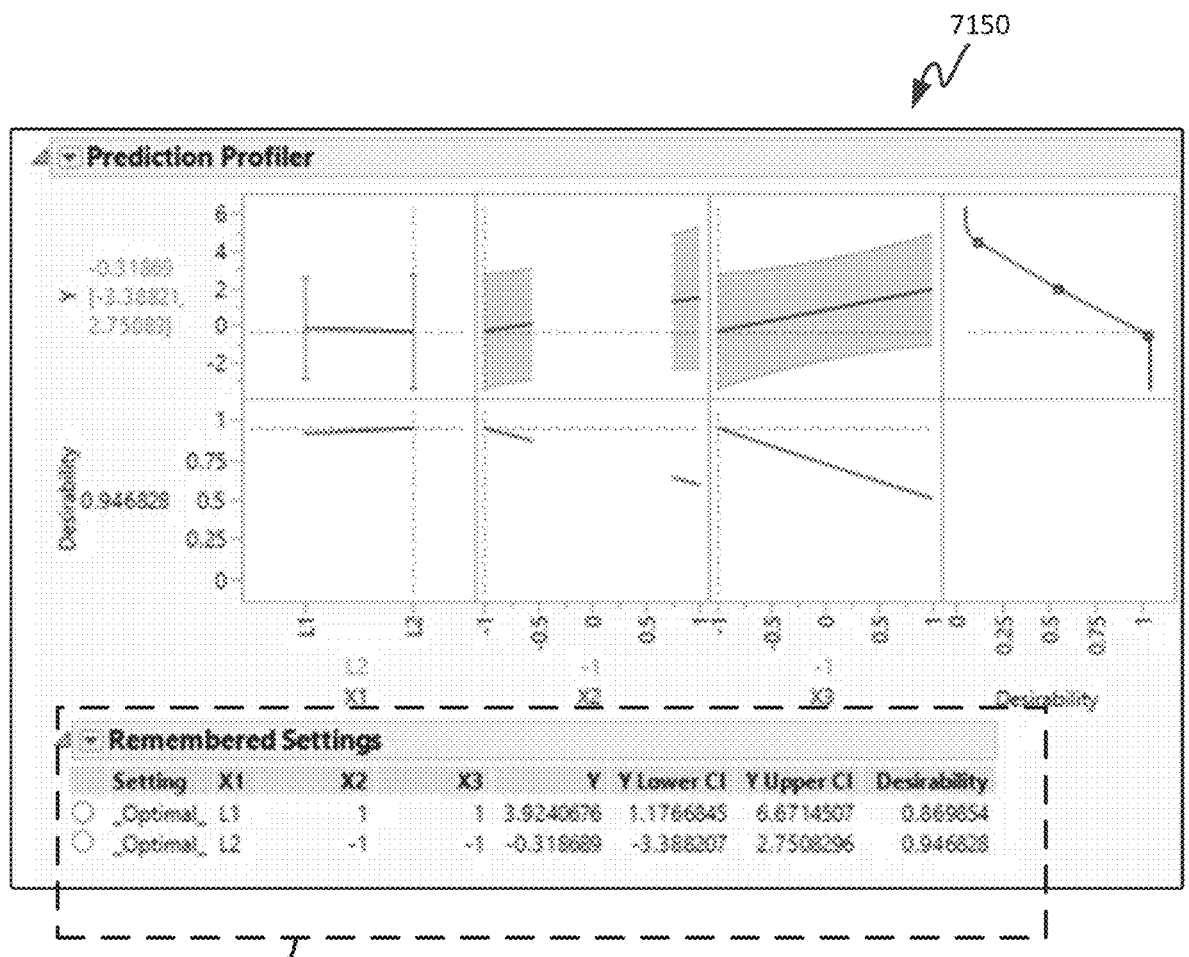

FIGS. 71A-B illustrate an example of a suggested sets of inputs that minimize a user goal. In this example, the goal 7102 was selected in graphical user interface 7100 of FIG. 71A to minimize a criterion (although as shown in FIGS. 70A-B other goals could be selected liked to maximize or match a target).

FIG. 71B shows a graphical user interface 7150 with suggestion 7052 of settings. In this case, the suggested settings include settings for two different optimizations. The first setting finds a solution for an optimization problem addressing a maximum for a constrained region: {X1=L1, X2=1, X3=1}. The second setting finds a solution for an optimization problem addressing a minimum for the constrained region: {X1=L2, X2=−1 and X3=−1}. The two approaches can use different desirability functions and their respective responses (Y) and desirability scores are also displayed in graphical user interface 7150 for the user to further consider the settings. In these examples, the settings given where the global optimum for each separate optimization problem.

However, one or more embodiments need not guarantee that a global optimal is found. Even in scenarios in which a global optimum is not found, embodiments can still improve the speed at which optimization is conducted by essentially "pointing" the optimization algorithm in the right direction.

Initial testing of optimization using covering arrays of different strengths has indicated very good performance, even with covering arrays of strength 2 which have very few runs when compared to the complete design space. FIGS. 72-75 illustrate studies performed of the performance. This tests start with a full factorial design where the true maximum value is known. Then covering arrays of various strengths were tested to see if the subset contained the maximum value. The simulations generated multiple covering arrays of the varying strengths to see how often the covering arrays hit the maximum, as well as a distribution of the maximum values for each. The examples used had most or all of the factors as influencing the response, and disallowed combinations. The simulations revealed that a strength 3 covering array did quite well as a starting point. This is not surprising as strength 2 covering arrays tend to be very small for the run size in these examples. However, in simpler examples, it was not uncommon that even strength 2 could find the optimal.

FIG. 72 illustrates example performance results for a suggested set of inputs for categorical factors of two levels. The disallowed-combination column 7202 specifies disallowed combinations for a user defined model specified in model column 7206. The number-of-runs column 7204 gives the number of runs necessary to generate a full-factorial covering array for the model without the disallowed combination. The number of optimal settings columns 7208 specifies the number of optimal responses to a run that can be found given various covering array strengths. In this experiment, the optimal response was known a priori given an optimum criterion.

Full factorial column 7210 gives a number of runs needed for a full factorial covering array given the disallowed combination. The disallowed combination reduces the number of potential design points, reducing the number of needed runs from, for instance, 640 to 64 for model 7220. For a strength 2 covering array for model 7220, it took 7 runs to cover this design and one of the runs had an optimum response. On the other end of the spectrum, a strength 5 covering array took 91 runs to cover this design and 7 of the runs had an optimum response.

For each of the models in model column 7206, the factors X1-X5 where two levels.

Table 7300 in FIG. 73 illustrates example performance results for a suggested set of inputs for categorical factors with more than two levels. Each of these example experiments had the same disallowed combination shown in disallowed combination row 7310, but different models shown in model column 7320. These models where more complex than the experiments shown in FIG. 72. These models each had 10 factors. Further model 7322 had 4 levels for factor X4 and 3 levels for factor X6.

In this experiment, a covering array of each strength was generated to see how often an optimum was found. For instance, for model 7322, the optimum response was a value of 2.3. This optimum was found in covering arrays of full factorial and strength 3 and 4. For instance, in the full factorial covering array the optimum response was obtained in approximately 20 runs of 1,920 runs. Only in covering array of strength 2 was the optimum response not generated. However, the response of 1.4 was close to the optimum response of 2.3. This behavior of finding the optimum with at least a strength 3 covering array seen with table 7200 in FIG. 72 was reflected in higher complexity models as shown in table 7300.

FIG. 74 illustrates example performance results in Table 7400 for a suggested set of inputs for categorical factors and discretized continuous factors. The model complexity was increased for 10 factors and several of the factors had more than two levels. Further, in each of the models 7420, factors X1 and X3 where continuous factors that were discretized for generating a covering array according to techniques described in more detail herein. A disallowed combination for each of the models is specified in disallowed combination row 7410. As shown, the disallowed combination has been modified from a received initial set to account for the discretized factors (e.g., "X1=L1"). An initial set of disallowed combinations could also be modified for other reasons (e.g., to generate a covering array of a particular strength).

With this level of complexity, the optimal responses in Table 7400 was not consistently found, but values close to the optimum value where found. For instance, with respect to model 7420B, the optimum value was 8.5, which was found in covering arrays of full factorial and covering arrays of strength 4 and 5. However, in covering arrays of strengths 2 and 3, optimum responses of 7.3 and 7.9 where found. In just 16 runs, a good estimate of the optimum was returned and in 164 runs the optimum was returned. Thus, FIGS. 72-74 show that even with complex models, good estimates of responses can be returned with a small amount of runs according to techniques herein.

For instance, in one or more embodiments, a computing system can obtain a strength t for a covering array that is greater than or equal to two, but need not be a full factorial covering array and adequately construct a design based on this covering array that will produce a good estimate of an optimum response.

Figure 75B:
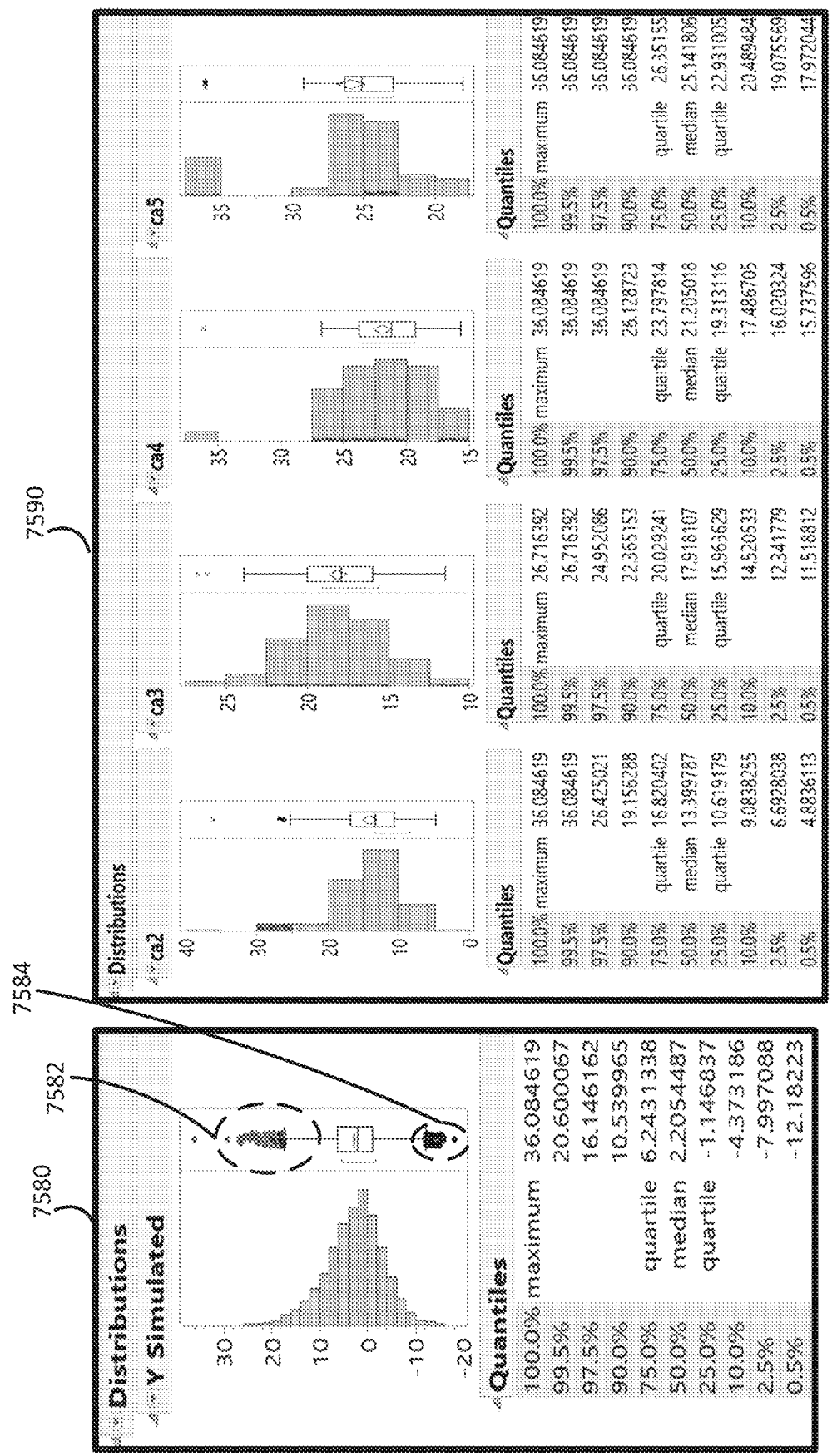

FIGS. 75A-75B illustrates example performance results for a suggested set of inputs for categorical factors and discretized continuous factors where there is more than one local optimum. The techniques herein search different regions so it is possible that local optimums may affect an average optimum response.

In the experiment shown in FIGS. 75A and 75B, the model 7510 has a disallowed combination 7520. Each of the covering arrays of various strengths given in strength row 7550 were generated one hundred times. An average was taken of the response (the maximum function value) for covering arrays of a particular strength as shown in average max function value row 7560. An optimum response 7530 is achieved according to the settings 7540 for most of the covering arrays of strength 2-5 even in this scenario where there was more than one local optimum. For instance, as shown in coverage row 7570, at least one row comprises the optimum response for all but the covering array of strength 3. However, because of the multiple local optimum, the average response in average max function value row 7560 was lower than the absolute optimum response because the other local optimum weighted the responses.

However, plotting the results rather than taking an average can account for these local optimums. FIG. 75B shows an example distribution of the responses plotted in graph 7580. There is a cluster of responses in area 7582 around 33 the optimum response and a cluster of responses in area 7584 around −15, a secondary local optimum. Graph 7590 shows box-and-whisker plots for each of the covering arrays showing a distribution that captures values close to the optimum response.

Several designs (or updated designs) may also be generated in the search for the optimum settings. For instance, each assigned input of the updated design cases may be within a respective pre-defined range from a respective element of the at least one design case (e.g., a design case found to be optimal in a previous design). For instance, the updated designs can be updated using one or more optimization techniques such as a genetic algorithm, particle swarm optimization, and simulated annealing. The computing system can generate responses of the design system according to the updated design cases; and output the indication of the suggested set of inputs based on the responses of the design system according to the updated design cases. This can be useful for identifying local optimums.

However, since close optimums were found at even low strength t covering arrays, a computing system can select a strength of the covering array to, for instance, balance processing goals with need to find an optimum. For instance, a computing system obtains design space information that includes a strength t of a covering array for the design. The covering array strength can be user-defined or could be a default setting (e.g., based on limiting the number of runs or picking a strength likely to lead to good estimates). The computing system can generate a design by generating data representing the covering array of the strength t where all possible combinations for inputs within the design space involving t factors of the plurality of factors appear in the design. The design space can be restricted by a disallowed combination and the covering array can account for this restriction.

In one or more embodiments, the covering array is improved by using information about the model, such as the significance of model terms. For instance, a variable strength covering array could be used to focus on those factors that appear to be the most important, whereby a subset of the factors will have a higher strength (say strength 3) than the overall covering array (which would be strength 2). A computing system could also receive an indication of one or more prioritized factors. For instance, the computing system could receive them from a user and/or the computing system could determine the prioritized factors from received information. As an example, the computing system could determine the prioritization based on model terms (e.g., factors with large coefficient in a model may indicate a greater weight of those factors in the model). In the model 7510 in FIG. 75A, factors with a coefficients whose absolute value is greater than 1.5 could be considered prioritized (e.g., factor X2). For interacting factors, a computing system could take the maximum coefficient for any term a factor is involved in, or some function of the sum of terms it is involved in (e.g., the sum of absolute values or squared coefficients). The computing system can then generate the design by generating data representing a variable strength covering array whereby the one or more prioritized factors have a greater strength than other factors of the plurality of factors in the design.

In one or more embodiments, optimization techniques are used to improve the starting point for the covering array. For instance, simulated annealing can be used to improve upon the starting point from the covering array, but different optimization techniques may be used for the starting point. For instance, in some experiments (e.g., ones involving continuous factors), it is useful to distribute design points of design uniformly across a design space to observe responses in the experiment for different input factors at that design point Such a design can be considered a space-filling design. In a space-filling design, points are spread out within the design space (e.g., in all dimensions). Points may be spread out or separated from one another in the design space based on a criterion for separating the selected design points in the design space. The computing system can generate the design for the design space that is a space-filing design that separates the design points in the design space.

Space-filling designs are typically employed for experiments to select several different inputs for a given factor distributed across the design space. For example, if the experiment is a strain experiment on a bottle, the design space may be a model of a bottle, and a factor for the experiment could be a location on the bottle to apply a test strain. The researcher will want to design the experiment to test several different locations to apply the strain on the bottle. Each of design points of the space-filling design could then correspond to a design case in a design suite for designing the experiment according to the space-filling design.

Practitioners to provide options for factors of a space-filing design may include a grid approach (i.e. checking different values within the range at regular intervals). They may also use a fast-flexible space-filling design (e.g., using a MaxPro criterion to generate a space-filling design).

For example, the computing device can obtain a space-filling design by mapping the design space onto a matrix with rows and columns. The computing device can determine primary clusters for the design space, each containing a different set of representative design points that is mutually exclusive of representative design points in other primary clusters of the design space. The computing device can select the selected design points by selecting a representative design point from each primary cluster that minimizes a MaxPro criterion based on:

$$\min_{D} \psi(D) = \left\{ \frac{1}{\binom{n}{2}} \sum_{i=1}^{n-1} \sum_{j=i+1}^{n} \frac{1}{\prod_{l=1}^{p} (x_{il} - x_{jl})^2} \right\}^{1/p}$$

where $\psi(D)$ is the criterion; i, j, l are integer counters; n is an integer number of primary clusters for the design space; p is an integer number of continuous variables for the design space; and $x_{ab}$ is an entry in row a and column b of the matrix.

Other approaches could be used to determine a space-filling design. If there are categorical factors for example, a space-filling design can be constructed using a modified MaxPro criterion, minimax or maximin Latin hypercube designs or designs using any other space-filling criterion.

Further, while covering arrays are typically used with categorical factors, the use of covering arrays can be extended to be used in the presence of both disallowed combinations and linear/nonlinear constraints. This can be accomplished by discretizing continuous factors and treating them as categorical for the purposes of generating the covering array. The resolution at which the optimal settings are found will depend on the resolution of the discretization. A user can set the number of levels for the continuous factor that achieves a balance of discretization for exploration versus the size of the covering array (e.g., 10 or more discrete options, such as 11 levels, to start for a continuous factor may be reasonable). The continuous factors may be considered an additional constraint on computer generation of a design.

Figure 76:
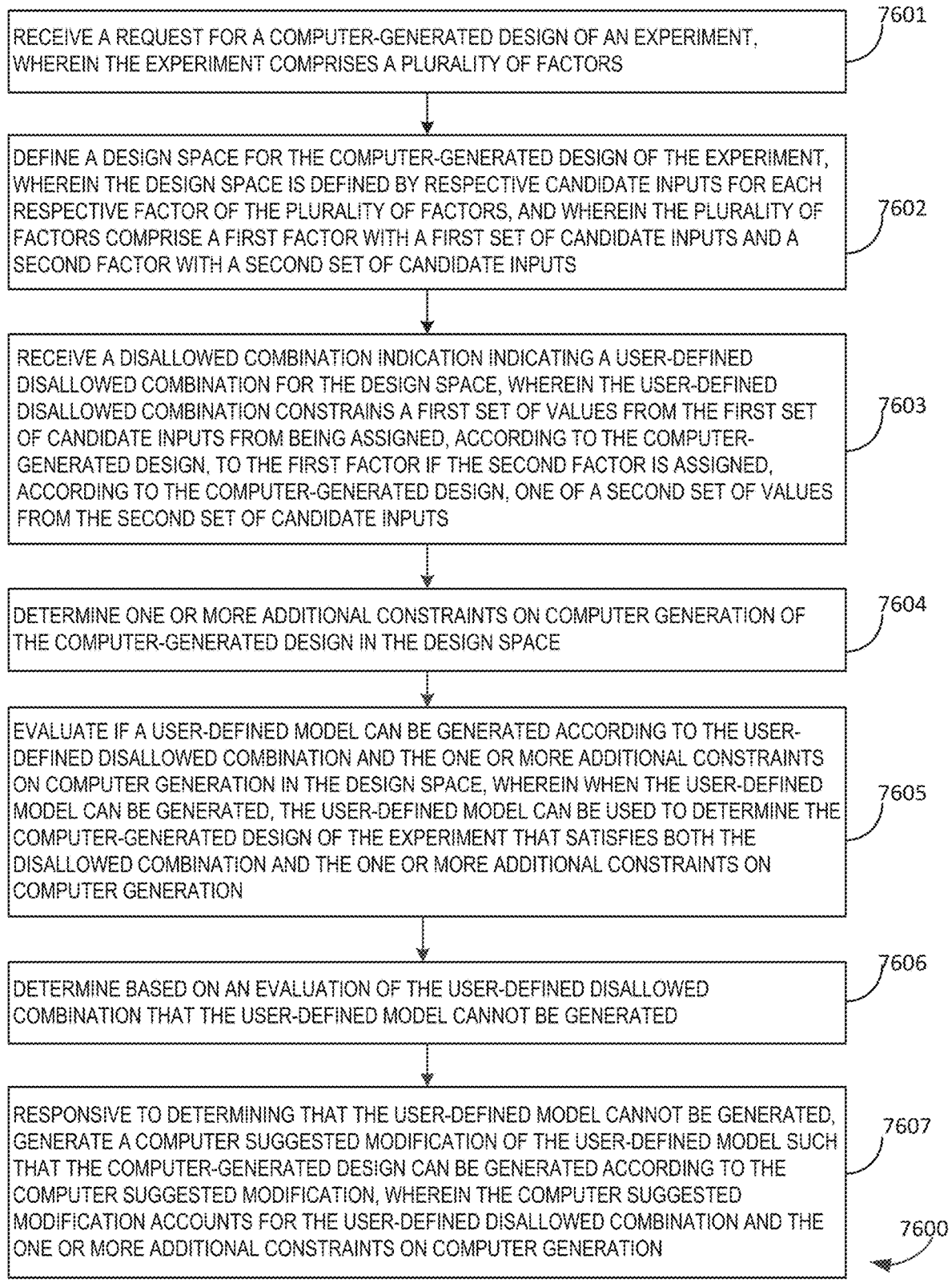
FIG. 76 illustrates an example flow diagram for evaluating if a user-defined model can be generated according to the disallowed combination and one or more additional constraints on computer generation in a design space in at least one embodiment of the present technology.

Computing systems described herein can also be used to account for one or more disallowed combinations and one or more additional constraints on computer generation described in more detail herein. FIG. 76 illustrates an example flow diagram of a method 7600 for evaluating if a user-defined model can be generated according to the disallowed combination and the one or more additional constraints on computer generation in the design space.

The method 7600 comprises an operation 7601 for receiving a request for a computer-generated design of an experiment. The experiment comprises a plurality of factors. One or more operations of method 7600 can be the same as or occur in conjunction with one or more operations of method 6700 in FIG. 67. For example, the request could be a request or responsive to a request for suggested settings described herein (e.g., in operation 6702 of method 6700).

The method 7600 comprises an operation 7602 for defining a design space for the computer-generated design of the experiment. The design space is defined by respective candidate inputs for each respective factor of the plurality of factors. The plurality of factors comprise a first factor with a first set of candidate inputs and a second factor with a second set of candidate inputs.

Figures 77A, 77B:
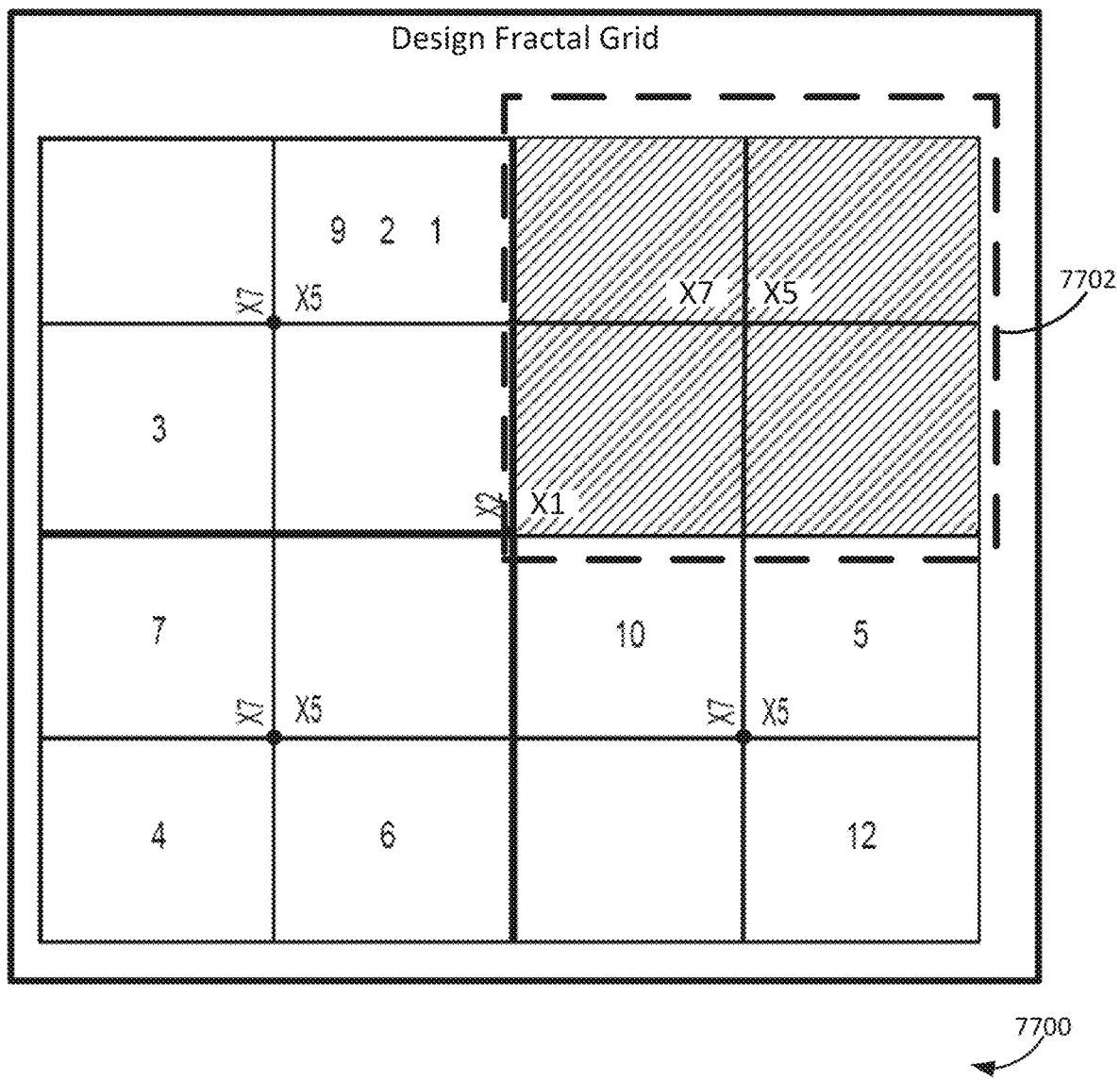
FIG. 77A illustrates an example graphical representation of a disallowed combination in at least one embodiment of the present technology.
FIG. 77B illustrates an example graphical user interface comprising a suggested modification of a user-defined disallowed combination in at least one embodiment of the present technology.

The method 7600 comprises an operation 7603 for receiving a disallowed combination indication indicating a user-defined disallowed combination for the design space. The user-defined disallowed combination constrains a first set of values from the first set of candidate inputs from being assigned, according to the computer-generated design, to the first factor if the second factor is assigned, according to the computer-generated design, one of a second set of values from the second set of candidate inputs. For instance, as shown in FIG. 77A, values in the region 7702 cannot be used for designing an experiment.

The method 7600 comprises an operation 7604 for determining one or more additional constraints on computer generation of the computer-generated design in the design space (e.g., model constraints, processing constraints, data storage constraints, operation constraints, factor constraints, etc.).

The method 7600 comprises an operation 7605 for evaluating if a user-defined model can be generated according to the disallowed combination and the one or more additional constraints on computer generation in the design space. When the user-defined model can be generated, the computer-generated model can be used to produce the computer-generated design of the experiment that satisfies both the disallowed combination and the one or more constraints on computer generation.

The method 7600 comprises an operation 7606 for determining based on an evaluation of the user-defined disallowed combination that the user-defined model cannot be generated.

The method 7600 comprises an operation 7607 for, responsive to determining that the user-defined model cannot be generated, generating a computer suggested modification of the user-defined model such that the computer-generated design can be generated according to the computer suggested modification that accounts for the disallowed combination and the one or more additional constraints on computer generation. For instance, embodiments herein can generate or aid a user in generating a design given the disallowed combination and the one or more additional constraints on computer generation.

One or more embodiments provide graphical representation for assisting the user in determining if the disallowed combination is resulting in an expected design region. An interactive visualization tool described herein can be used to show the subclauses of a disallowed combination allowing a user to easily visually identify regions where points cannot be generated. FIG. 77A shows an example graphical representation 7700 of a design fractal grid with a highlighted portion or grayed-out region 7702 showing the disallowed combination.

This can work both before and after design creation. Before, it lets the user visualize the design space indicated by a disallowed combinations (e.g., without plotted data points). For instance, a computer suggested modification of a disallowed combination could be provided to the user by displaying in the graphical user interface an indication of a particular disallowed combination of the user-defined combinations or an indication of a particular modified combination.

In the example shown in FIG. 77A, the design has a disallowed combination where X1=="+" && L2=="+". The design fractal shades the disallowed region and design cases after design creation are shown. Accordingly, there are no design cases allowed in the region 7702 so no data from design cases plotted in region 7702. This in contrast to the design in graphical representation shown in FIG. 31A, for example, that has data plotted in the upper right quadrant of the graphical representation shown in FIG. 31A.

In this example, the graph in graphical user interface 7700 is shown as a grid view according to embodiments described herein. For instance, the design space comprises a main axis corresponding to a first factor (X1) with secondary axis intercepting the main axis with k−1 secondary axis, where k is the total number of candidate inputs for the second factor (X2). In this example there is only one axis X2 because the second factor is a two-level factor. In one or more embodiments, axes corresponding to the user-defined disallowed combination define pixels in the graphical representation that are a different pattern than other regions in the design space. For instance, in this example, the grayed-out region 7702 is shown with a different pattern (e.g., stripes or a different color) than other regions in the design space. Alternatively, or additionally, the grayed-out region could have a unique pattern of an outline of the region defined by the axes.

Alternatively, or additionally, the graph in graphical user interface 7700 could be in other views with a graphical representation of the design space comprising axes and a fractal sequence described herein (e.g., tree view with a unique pattern for the axes of the tree view or a region proximate to the axes).

FIG. 77B illustrates an example graphical user interface comprising a suggested modification of a user-defined disallowed combination.

It can be difficult for users (including expert users) to specify model terms when there are disallowed combinations. The user could be requesting for a computer-generated design of an experiment for estimating the effect of multiple factors. The computing system in additional to the constraints of a disallowed combination may be further constrained by constraints pertaining to estimating the effect of one or more factors of the multiple factors.

As an example, consider a disallowed combination with X1=="L1" && X2=="L1". In the presence of this disallowed combination, the interaction X1*X2 cannot be estimated. If a model term is included that cannot be estimated due to a disallowed combination, a computing system may spend time trying to create the design or fail to create the design.

In one or more embodiments, a computing system identifies the issue before spending processing time trying to create the design, by checking model terms and the disallowed combinations before trying to create the design. The computing system can then answer the question is the model specified possible given the disallowed combination? One or more embodiments further provide an alert message that tells the user exactly what the issue is if it cannot be specified. For example, a computing system generates a computer suggested modification of the user-defined model by displaying in the graphical user interface an indication of one or more factors of the multiple factors that could not be estimated according to the user-defined model based on the user-defined disallowed combination. An example alert message is in FIG. 77B indicating factors X1 and X2 that could not be estimated.

Alternatively, or additionally, the computing system can generate a computer-generated design based on a computer suggested modification of the user-defined model. The computer-generated design of the experiment comprises one or more of test cases where each test case comprises an assigned value in an updated design space updated based on the suggested modification of the disallowed combination. The outcome of an experiment according to this design can be plotted in a graph such as the one shown in FIG. 77A or can be used to generate suggested settings as described herein.

A graphical user interface (e.g., graphical user interface 7700) can be used to display a graphical representation of the initial design space with a visual distinction made between design points corresponding to design points of the user-defined disallowed combination and other design points of the design space (e.g., by defining a different pattern for regions comprising the design points). A visual display can be useful for the user to consider modifying the disallowed combination or consider modify design points given the disallowed combination.

Figure 78A:
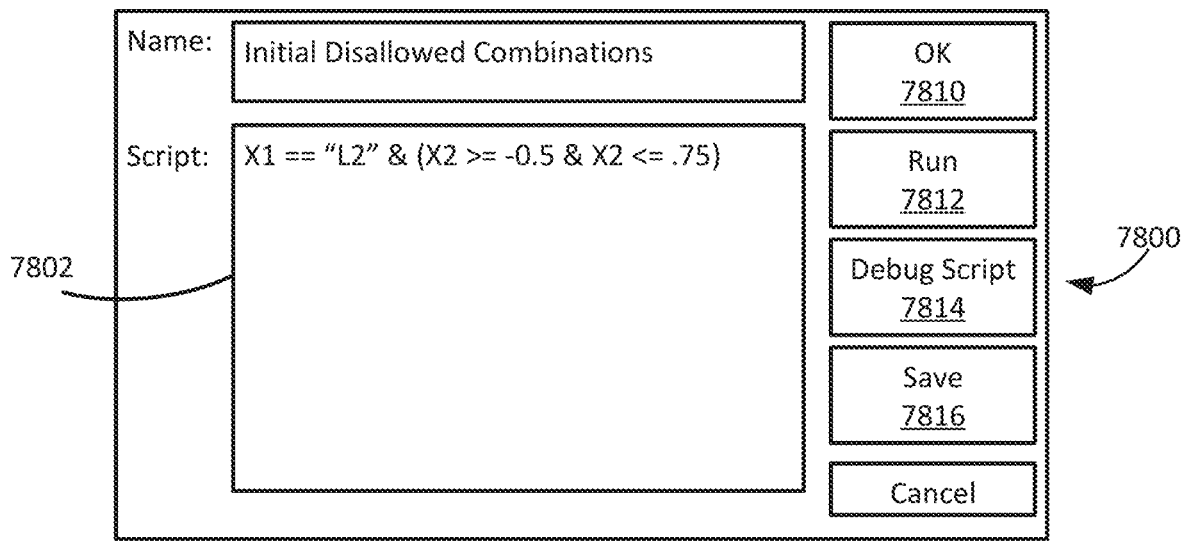
FIGS. 78A-C illustrate example graphical user interfaces for modifying a user-defined disallowed combination in at least one embodiment of the present technology.
Figure 78B:
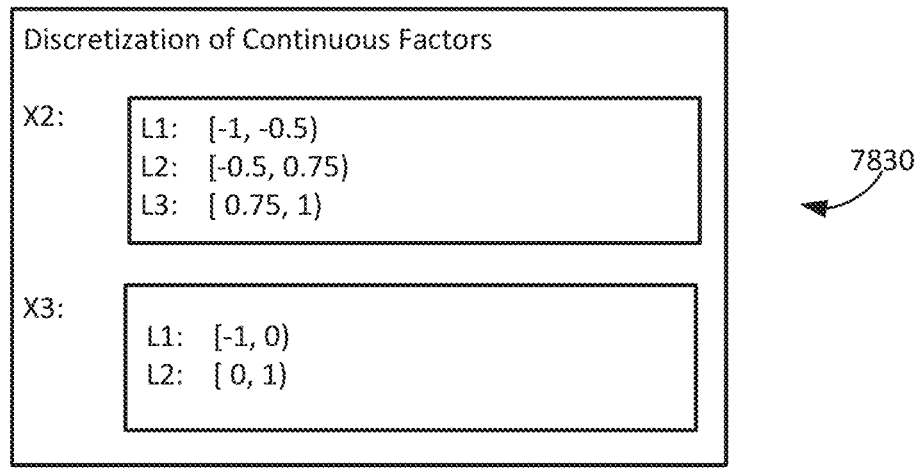
Figure 78C:
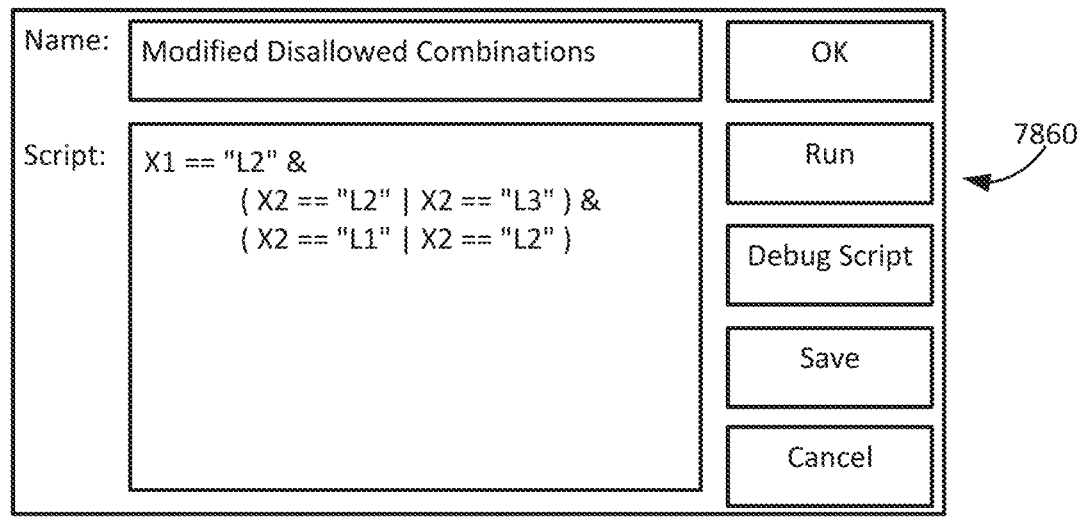

In one or more embodiments, a computing system on its own modifies the user-defined disallowed combination or a suggested design point FIGS. 78A-C illustrate example graphical user interfaces displayed by a computing system described herein for modifying a user-defined disallowed combination. FIG. 78A shows an example where a computing system receives a disallowed combination indication from a user via a graphical user interface 7800.

In this example, the computing system has one or more additional constraints on computer generation of a computer-generated design in addition to the disallowed combination. For instance, the constraint may be related to constraints on continuous factors for a particular design. The computing system for a particular design may discretizes continuous factors of the design to have a modified set of candidate inputs with discrete values. The computing system may modify the user-defined disallowed combination to accommodate the discretized factors. One or more embodiments allow discretizing factors without the user needing to manually convert continuous factor and manually transform any disallowed combination clause that involves a continuous factor to a categorical factor space. Discretizing factors can be useful, for instance, when using covering arrays.

This example involves a three-factor design where X1 is a 2-level categorical factor and X2, X3 are continuous factors which range between −1 and 1. The disallowed combination for this design is shown in FIG. 78A. Script text box 7802 of graphical user interface 7800 displays an indication of the disallowed combination: X1=="L2" & (X2>=−0.5 & X2<=0.75). As shown the disallowed combination indication may be indicated by a computer instruction (e.g., a script that can be processed by a computer). The disallowed combination indication may comprise an indication of multiple factors. In this example, it indicates factors X2 and X2. Alternatively, or additionally, the disallowed combination indication indicates one or more Boolean operators (e.g., an "and" operator &, and an "or" operator |).

In one or more embodiments, a computing system receives, via a graphical user interface, a request for a computer-generated design of an experiment (e.g., according to the disallowed combination). For instance, the user may select one of various controls for indicating that the user is instructing the computing system to generate the design. For instance, the user may select OK control 7810 or Run control 7812. The user may also suspect there is a problem with the script and indicate to the computing system to debug the script using debug-script control 7814. Or the user may save the script using save control 7816 for later indicating to the computing system the user is instructing the computing system to generate the design.

In one or more embodiments, a computing system discretizes the continuous factor to have a modified set of candidate inputs with discrete values by determining boundaries of a first set of candidate inputs that are disallowed according to the user-defined disallowed combination from allowed values remaining according to the one or more functions for a continuous factor. For example, a continuous factor could be segmented using techniques like equivalence partitioning.

In this example, the automatic discretization approach traverses the disallowed combination expression in script text box 7802 looking for continuous factors. For each continuous factor, the computing system extracts the value associated with the factor from the subclause where the factor is found. The approach then merges these extracted values with the minimum and maximum values from the factor range to determine the partitioning scheme. This partitioning approach can provide a better representation of options for a continuous factor than equivalence partitioning.

Since X2 is the only continuous factor that participates in the disallowed combination in this example, the computing system determines boundaries of the set of values for X2 by extracting all indicated values pertaining to the continuous factor from the user-disallowed combination (e.g., values −0.5 and 0.75 would be extracted). These values would then be merged with −1 and 1 to yield the following partitioning scheme for X2: [−1, −0.5, 0.75, 1].

This partitioning scheme means that X2 can be represented by a three-level categorical factor shown in graphical user interface 7830 of FIG. 78B. The levels for each of factors X2 and X3 are denoted by "Ln" where n is an index for the level.

X2 has the levels: L1 taking on an input in the range [−1, −0.5); L2 taking on an input in the range [−0.5, 0.75); and L3 taking on an input in the range [0.75, 1). Accordingly, a minimum or maximum for a respective value bin is based on a respective indicated value of the partitioning scheme. In this example, a minimum value for all the value bins for factor X2 corresponds to a minimum value of the original candidate inputs (i.e., −1); and a maximum value for all the value bins corresponds to a maximum value of the first set of candidate inputs (i.e., 1).

As shown in the example, a size of each of the value bins for a factor or between factors need not be the same. This technique adequately looks at representative samples from aspects of the design space expected to have different impacts on the outcome of a design. One or more values can be selected from each of the value bins for the design (e.g., a midpoint and/or end point from each of the multiple value bins).

In this example, factors that do not participate in a disallowed combination are partitioned into two partitions, using the midpoint of the range as the partition boundary. More or less partitions could be defined for these factors (e.g., based on user-specified constraints or defaults in the computing system). Since X3 does not participate in the disallowed combination, it is represented by a two level categorical factor where L1 can be assigned a value in the range [−1, 0) and L2 can be assigned a value in the range [0, 1).

As shown in the example, the computing system can determine multiple value bins based on a total number of determined boundaries of the first set of values, and select a value from each of the value bins.

The level specification could be used for constructing a covering array with level specification {2, 3, 2} (corresponding to factors {X1, X2, X3}). An example corresponding disallowed combination for this covering array is shown in graphical user interface 7860 of FIG. 78C. The new disallowed combination derived from the original disallowed combination is: X1=="L2" & (X2=="L2"|X2=="L3") & (X2=="L1"|X2=="L2"). The new disallowed combination accounts for the original disallowed combination by accounting for important characteristics of the disallowed combination such important boundaries found in the original disallowed combination.

The disallowed combination can be used for the computing system to generate a computer suggested modification of the user-defined model by indicating a modification of the user-defined disallowed combination based on the modified set of candidate inputs with discrete values shown in graphical user interface 7830 of FIG. 78B. Alternatively, or additionally, the computing system can output the computer-generated design of the experiment according to the modification of the user-defined disallowed combination based on the modified set of candidate inputs with discrete values. Alternatively, or additionally, the computing system can display in a graphical user interface the computer-generated design of the experiment with the modification of the user-defined disallowed combination based on the modified set of candidate inputs with discrete values (e.g., in a fractal grid described herein).

This example was useful for using information in the disallowed combination itself regarding the inputs to determine partitions for continuous factors in constructing a covering array. However, this example is applicable to other applications where a factor is discretized.

Further, the disallowed combination can be more complex. FIGS. 79A-C illustrate example graphical user interfaces for modifying a user-defined disallowed combination with a more complex disallowed combination than shown in FIGS. 78A-C.

FIG. 79A shows a graphical user interface 7900 with a disallowed combination indication in the script text box 7902. The disallowed combination indication comprises a plurality of user-defined disallowed combinations each restricting assignment of candidate inputs pertaining to a different combination of factors (joined by an "or" operator |). The disallowed combination for the original design in this example is: X1=="L2" & (X2>=−0.5 & X2<=0.75) |X1=="L1" & X2<=0.2.

In this example, the disallowed combination is more complex because a particular continuous factor appears in several clauses of the disallowed combination expression. Further, the disallowed combination shows a variety of value types for the factors. For instance, the disallowed combination includes level values where each level value corresponds to one or more options for a given factor (e.g., X1=="L2"). The disallowed combination includes a range of numerical factors corresponding to one or more options for a given factor (e.g., X2>=−0.5). Other value types include discrete numerical values.

X2 is the only continuous factor that participates in the disallowed combination but X2 participates in two clauses and so the values −0.5 and 0.75 would be extracted from the first clause and 0.2 from the second clause. These values would be merged with −1 and 1 to yield the following partitioning scheme for X2: [−1, −0.5, 0.2, 0.75, 1].

This partitioning scheme means that X2 would be represented by a four level categorical factor as shown in graphical user interface 7930 where for X2 has levels: L1: [−1, −0.5); L2: [−0.5, 0.2); L3: [0.2, 0.75); and L4: [0.75, 1).

The level specification for a covering array in this case would be {2, 4, 2} and the corresponding disallowed combination for the covering array is shown in graphical user interface 7960 where X1=="L2" & (X2=="L2"|X2=="L3"|X2=="L4") & (X2=="L1"|X2=="L2"|X2=="L3")|X1=="L1" & (X2=="L1"|X2=="L2").

Embodiments herein are also useful for addressing or fixing other types of problems in the disallowed combination besides issues related to continuous factors.

Figure 80A:
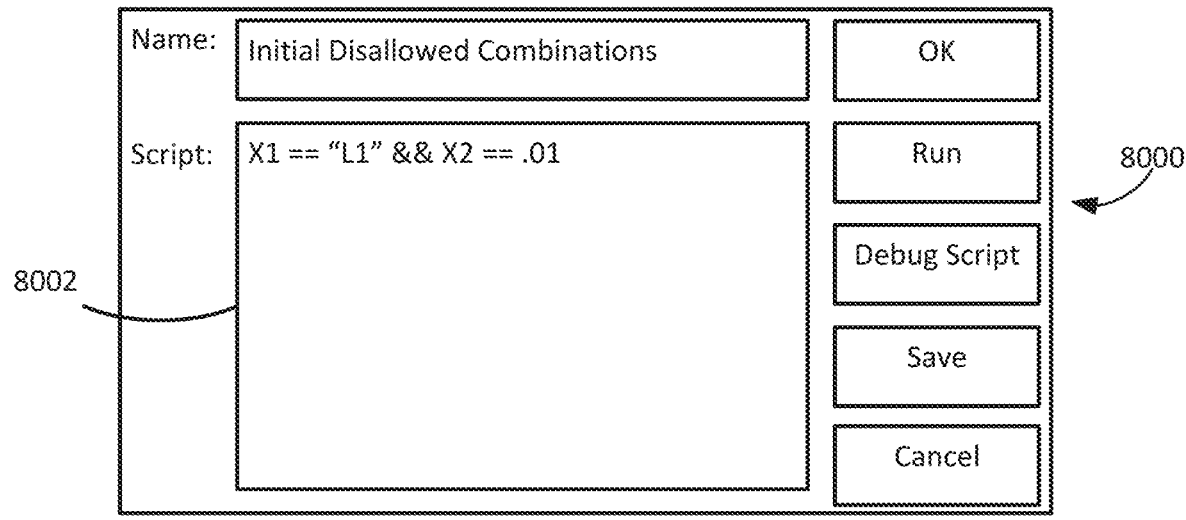
FIGS. 80A-B illustrate example graphical user interfaces for modifying a user-defined disallowed combination in at least one embodiment of the present technology.
Figure 80B:
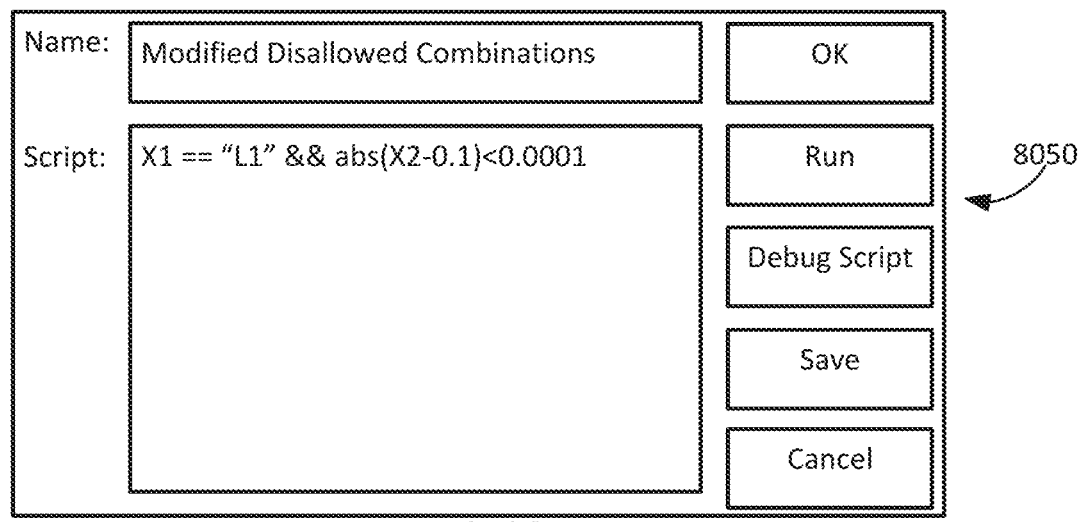

FIGS. 80A-B illustrate example graphical user interfaces for modifying a user-defined disallowed combination based on a constraint related to a floating-point representation.

In this example, the design space is defined by a discrete numeric variable X2 that can take on the values {0.1, 0.3, 10, 30}, with a categorical factor X1. Graphical user interface 8000 shows a script text box 8002 representing the disallowed combination: X1=="L1" &&X2==0.1.

Because of the floating-point representation of 0.1, the X2==0.1 may not evaluate to true when the computing system is considering that value as constraints on computer storage may mean the computer stores it as something like 0.10000000000000001. In this case, the computer generation of the computer-generated design is constrained by the disallowed combination as well as operations on a particular value. In this case, the operations on the particular value comprises operations pertaining to an equality within the disallowed combination script in text box 8002.

In order to resolve this computer storage constraint, the computing system modifies the particular value in the user-defined disallowed combination by replacing the equality in the user-defined disallowed combination with a representation of: |F1−X|<0.001, where F1 is a factor value, and X equals the particular value.

For instance, the computing system fixes the disallowed combination to be as the user defined in graphical user interface 8050 of FIG. 80B to be: X1=="L1" && abs(X2−0.1)<0.0001, where abs refers to the absolute value.

The computing system can check for discrete numeric factors involved with an equality and display the "fuzzy equals" for the user. Additionally, or alternatively, the computing system can use level names (e.g., X1) instead of numerical offsets (e.g., 1). That is, for a categorical factor where the first level is "L1", both X1=="L1" or X1==1 can be recognized as equivalent by the computing system.

In one or more embodiments where the constraint is based on operations of a particular value, the computing system can generate a computer suggested modification of the user-defined model by indicating a modification of the particular value in the user-defined disallowed combination. Alternatively, or additionally, the computing system can output the computer-generated design of the experiment according to the modification of the particular value in the user-defined disallowed combination; or display in a graphical user interface, the computer-generated design of the experiment with the modification of the particular value in the user-defined disallowed combination.

Figure 81A:
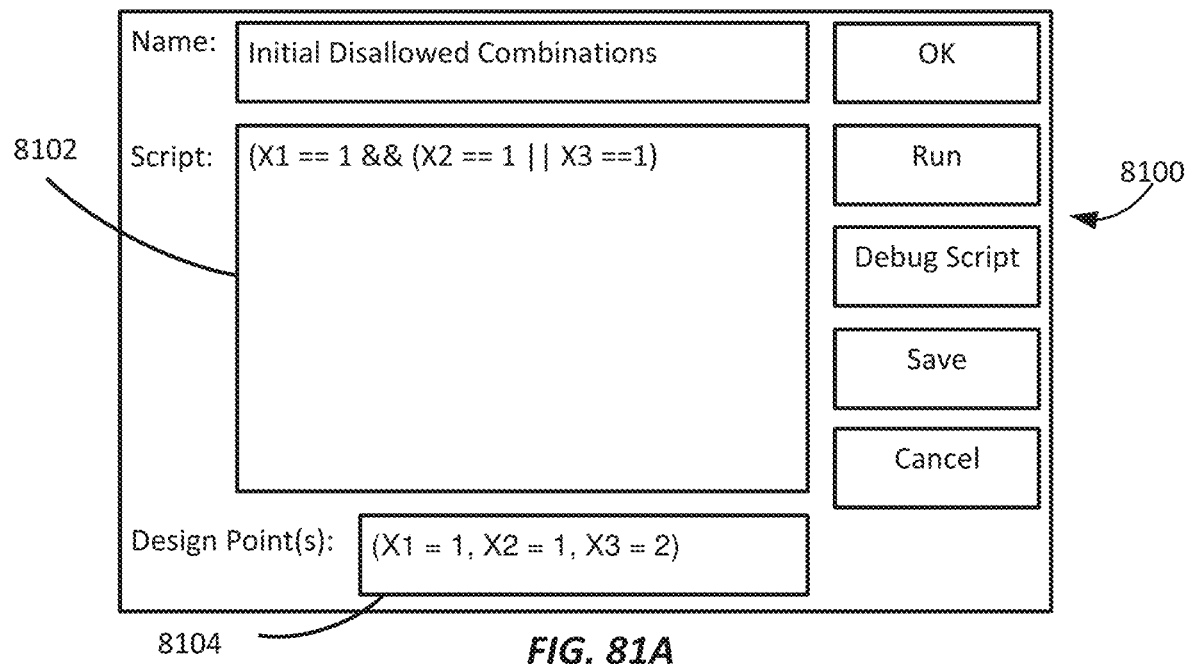
FIGS. 81A-B illustrate example graphical user interfaces for modifying a design point in at least one embodiment of the present technology.
Figure 81B:
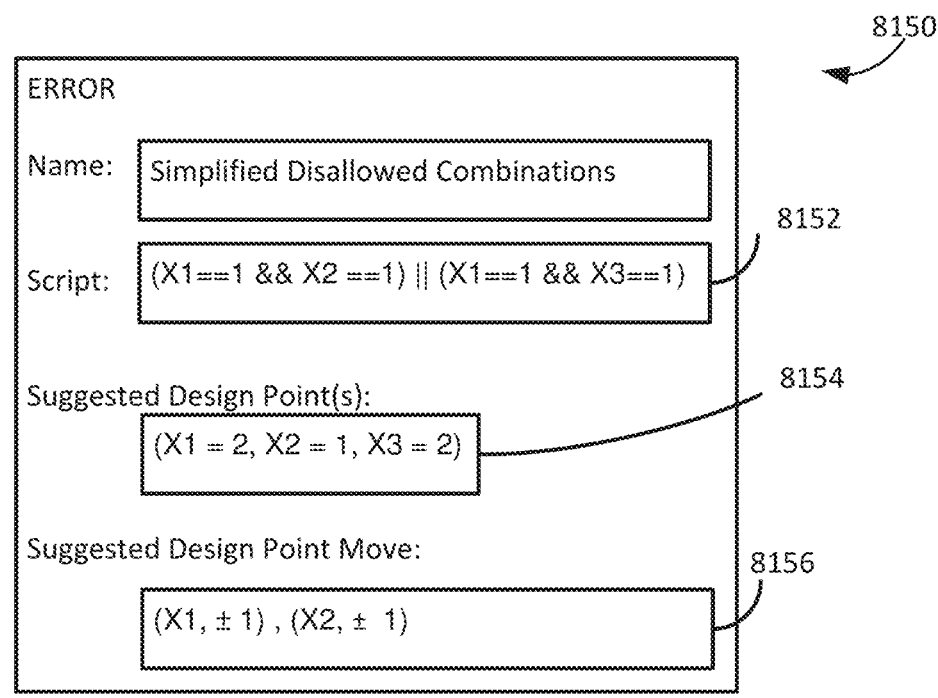
Figure 3:
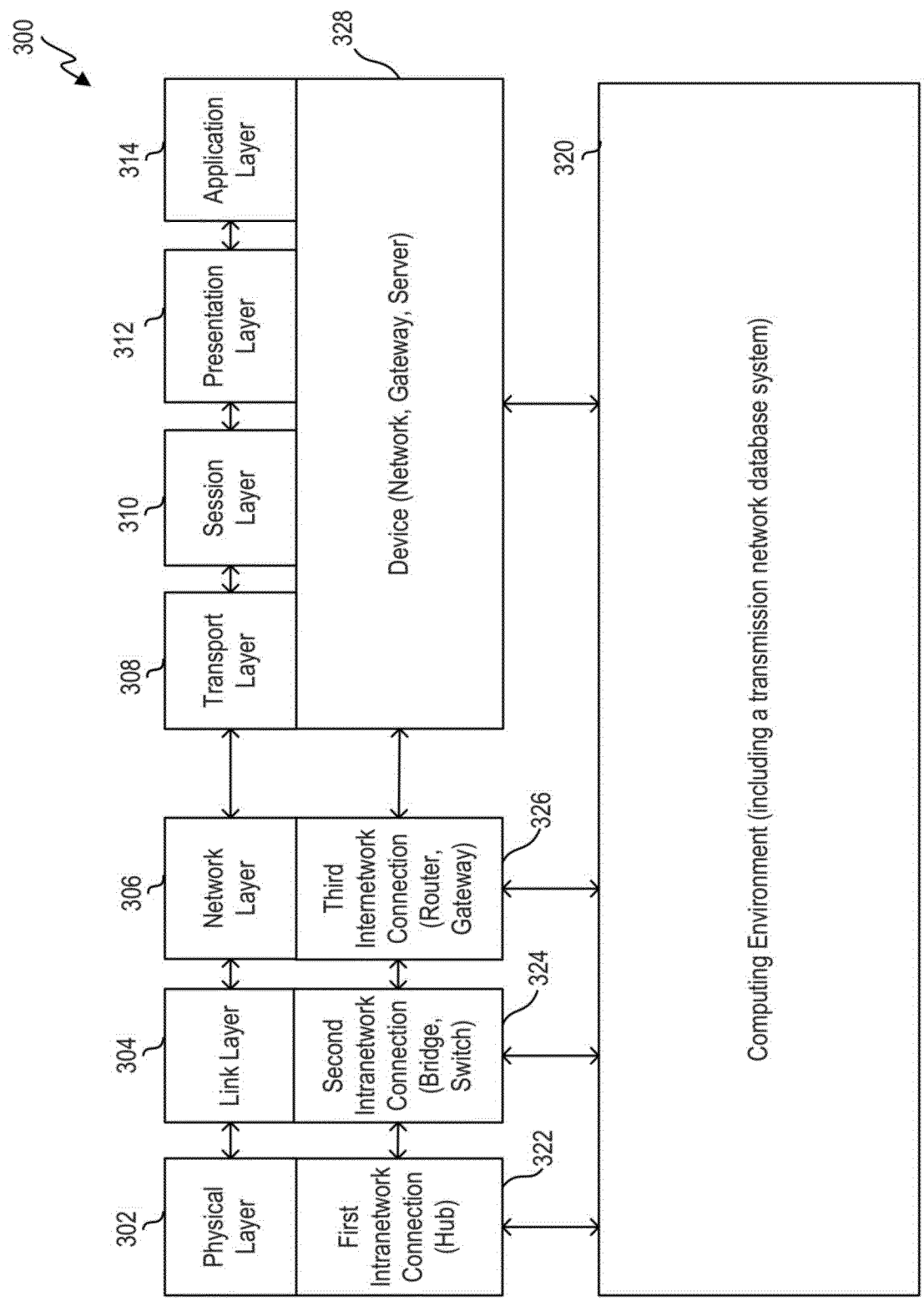

FIGS. 81A-B illustrate example graphical user interfaces for modifying a design point. For a proposed design point generated internally (e.g., by a user or the computing system), the computing system can determine if it is allowable with respect to the disallowed combination expression. One or more embodiments allow for partitioning a disallowed combination into simplified subclauses. Information in the disallowed combination itself about the inputs that are reflected in the disallowed combinations can be used in this form to "fix" issues or tell if a user has specified an input that is not specified in the list of design factors.

For example, say a user specifies a disallowed combination for input X1, X2 and X3 as (X1==1 && (X2==1||X3==1)) as shown in the script text box 8102 of graphical user interface 8100 of FIG. 81A. This expression is simplified to its simplest subclauses: (X1==1 &&X2==1) ||(X1==1 &&X3==1) as shown in script text box 8152 of graphical user interface 8150 in FIG. 81B.

Once the computing system has a disallowed combination expression separated into subclauses, it allows the computing system to use information from the subclauses to measure how many subclauses are violated and which ones by a received initial design point. The initial design point comprises a respective assigned value for each factor of the design space. In this example, for 3 factors, the computing system is considering the point (X1=1, X2=1, X3=2) shown in design point(s) text box 8104 given the disallowed combination: (X1==1 && (X2==1||X3==1). The disallowed combination could be user-defined or a suggested modification of a user-defined disallowed combination using techniques described herein. The simplified disallowed combination expression is: (X1==1 && X2==1)||(X1==1 && X3==1) with two subclauses defining the disallowed region.

In one or more embodiments, the computing system reports that one out of 2 of the disallowed subclauses has been satisfied ((X1==1 && X2==1)) by the received initial design point. In other words, a pair of respective assigned values of the initial design point is indicated by the user-defined disallowed combination or a suggested modification of the user-defined disallowed combination. In one or more embodiments, the computing system generates a correction of the initial design point by: generating an alternative design point for the initial design point that is not excluded by the user-defined disallowed combination or the computer suggested modification of the user-defined model; or generating a distance to augment a respective assigned value according to the initial design point.

For instance, information from the other subclause can be used to note that X1 appears elsewhere, but X2 does not, and the computing system could fix the proposed point by attempting other possible values for X2. As shown in suggested design points text box 8154, suggested design points are provided by the computing system to suggest alternative design points that would comply with the disallowed combination. Alternatively, or additionally, the computing system can evaluate how close an allowed design point is to the region defined by the disallowed combination. For instance, as shown in suggested design point move 8156 a range of movement to move to an allowed region is provided. For continuous factors, the computing system could also measure "how far" a point is from being allowed based on the boundaries specified by a subclause.

In one or more embodiments, disallowed combinations are modified for suggesting inputs for a user-defined goal as described herein. FIGS. 82A-C illustrate example graphical user interfaces for modifying a user-defined disallowed combination based on a constraint related to discretized factors. In this example, discretized factors are produced for generating a covering array for generating a design for suggesting inputs for factors X1, X2, and X3. As shown in FIG. 82A, the script text box 8202 of graphical user interface 8200 displays the disallowed combination for these factors as: X1=="L2" && (X2>=0 && X2<=1)||X2>=−0.5 && X2<=0.5 && (X3>=0.5 && X3<=1).

Here, X1 is a two-level factor, and X2 and X3 are continuous. In this case, X2 participates in the subclauses: X1=="L2" && (X2>=0 && X2<=1) and X2>=−0.5 && X2<=0.5 && (X3>=0.5 && X3<=1). Since X2 participates in two subclauses, the computing system accounts for the boundaries from each subclause that X2 is involved in. In this example, the boundaries −0.5, 0, 0.5, 1 are used to define the partitions for X2. The factors of the covering array then become: X1: 2 levels (i.e. "L1" and "L2"); X2: 4 levels (i.e. [−1, −0.5), [−0.5, 0), [0, 0.5), [0.5, 1], which become "L1", "L2", "L3" and "L4"); and X3: 2 levels (i.e. [−1, 0), [0, 1], which become "L1" and "L2")

Candidate inputs for the X2 factor are shown in graphical user interface 8230 of FIG. 82B. A modified disallowed combination is shown in graphical user interface 8260 of FIG. 82C. The disallowed combination for the covering array in categorical factor space then becomes: X1=="L2" && X2=="L3"||X1=="L2" && X2=="L4"||X2=="L2" && X3=="L1"||X2=="L2" && X3<="L2"||X2=="L3" && X3="L1"||X2=="L3" && X3<="L2".

The request for a computer-generated design of an experiment may be a request for a covering array where all possible combinations involving t factors of the plurality of factors appear in a test suite for the experiment. Each element of a test case of the test suite is a test condition for testing an assigned candidate input to one of the plurality of factors. The one or more additional constraints on the computer generation of the computer-generated design in the design space could comprise a given strength of the covering array (e.g., user-supplied or a default). For instance, graphical user interface 8200 allows the user to specify the strength tin textbox 8204 (e.g., t=4 shown to generate a high likelihood of returning optimum settings). The computer suggested modification may comprise an indication of missing values in the covering array oft strength according to the user-defined disallowed combination. For instance, in graphical user interface 8260 there is an error message 8262 indicating there will be missing values for covering arrays of strength t=3 or greater even with given disallowed combination. The computing system could then generate suggested settings from a lower strength t covering array, such as a covering array of strength 2.

What is claimed is:

1. A computer-program product tangibly embodied in a non-transitory machine-readable storage medium, the computer-program product including instructions operable to cause a computing system to:
 determine a design space for designing a design system, wherein the design space is defined by:
  a plurality of factors;
  candidate inputs comprising a respective set of candidate inputs for each of the plurality of factors, wherein the plurality of factors comprise a first factor with a first set of candidate inputs for the first factor and a second factor with a second set of candidate inputs for the second factor; and a disallowed combination indication indicating one or more disallowed combinations for candidate inputs of the plurality of factors, wherein the one or more disallowed combinations comprise a first set of values for the first factor that are restricted from being assigned to the first factor from the first set of candidate inputs if the second factor is assigned one of a second set of values from the second set of candidate inputs;

generate a graphical user interface to receive, from a user:
the candidate inputs;
the disallowed combination indication; and
a request to identify a set of inputs that will provide a response of the design system that advances a user-defined goal for the design system; and responsive to the request to identify the set of inputs:
generate a design for the design space that provides a plurality of design cases for generating the response of the design system;
obtain a computer model for generating responses of the design system that advance the user-defined goal for the design system;
generate the responses according to the computer model for multiple design cases of the design for the design system;
obtain responses of the design system for the multiple design cases of the design;
generate graphical representations of:
the one or more disallowed combinations; and
based on the at least one design case, an indication of a suggested set of inputs for the design system, wherein the suggested set of inputs advances the user-defined goal for the design system and is not disallowed according to the one or more disallowed combinations;
output, to the graphical user interface, the graphical representations of the one or more disallowed combinations and the suggested set of inputs for the design system to a display; and
receive, via the graphical user interface, input selecting at least one design case based on the obtained responses of the design system for the multiple design.

2. The computer-program product of claim 1, wherein the instructions are operable to cause the computing system to:
obtain a strength t for a covering array; and
generate the design by generating data representing the covering array of the strength t where all possible combinations for inputs within the design space involving t factors of the plurality of factors appear in the design,
wherein the design is restricted by the candidate inputs and the disallowed combination indication.

3. The computer-program product of claim 2, wherein the instructions are operable to cause the computing system to obtain the strength t for the covering array that is:
greater than or equal to two, and
less than a strength of a full factorial covering array.

4. The computer-program product of claim 1, wherein the instructions are operable to cause the computing system to:
receive an indication of one or more prioritized factors in the plurality of factors; and
generate the design by generating data representing a variable strength covering array whereby the one or more prioritized factors have a greater strength than other factors of the plurality of factors in the design.

5. The computer-program product of claim 1, wherein the instructions are operable to cause the computing system to:
generate updated design cases different from design cases of the design, wherein each assigned input of the updated design cases is within:
the design space defined by the plurality of factors, the candidate inputs, and the disallowed combination indication; and
a respective pre-defined range from a respective element of the at least one design case;
generate responses of the design system according to the updated design cases; and
output the indication of the suggested set of inputs based on the responses of the design system according to the updated design cases.

6. The computer-program product of claim 5, wherein the instructions are operable to cause the computing system to generate the updated design cases using a genetic algorithm of the design.

7. The computer-program product of claim 1,
wherein the request comprises a request to identify the set of inputs that will maximize or minimize a response of the design system according to the user-defined goal for the design system and the disallowed combination indication; and
wherein the indication of the suggested set of inputs comprises a set of inputs from a design case that achieves a maximum or minimum response of design cases tested in the design or derived from the design.

8. The computer-program product of claim 1, wherein the instructions are operable to cause the computing system to:
obtain the computer model for generating the responses of the design system according to a respective input of each respective set of candidate inputs;
generate the design for the design space that provides the plurality of design cases for testing the response of the design system according to the computer model;
input one or more of the design cases of the design into the computer model; and
obtain the responses of the design system according to the computer model for each design case of the design.

9. The computer-program product of claim 1, wherein the instructions are operable to cause the computing system to receive the disallowed combination indication by:
receiving, from the user of the computing system, an initial set of disallowed combinations; and
generating the one or more disallowed combinations based on modifying the initial set of disallowed combinations.

10. The computer-program product of claim 9, wherein the instructions are operable to cause the computing system to:
determine that the initial set of disallowed combinations prevents generating a covering array of a particular strength; and
modify the initial set of disallowed combinations to generate the design to comprise the covering array of the particular strength.

11. The computer-program product of claim 1,
wherein the first factor is a continuous factor and the first set of candidate inputs comprise a continuous range of inputs; and
wherein the second factor is a categorical factor and the second set of candidate inputs comprise discrete options for the second factor.

12. The computer-program product of claim 1,
wherein the first factor is a continuous factor and the first set of candidate inputs comprise a first continuous range of inputs with nonlinear constraints defined by a function; and
wherein the second factor is a continuous factor and the second set of candidate inputs comprise a second continuous range of inputs bounded by linear constraints.

13. The computer-program product of claim 1,
wherein the first factor is a continuous factor and the first set of candidate inputs comprise a continuous range of inputs; and
wherein the instructions are operable to cause the computing system to discretize the first factor of the plurality of factors by modifying the first set of candidate inputs to have 10 or more discrete options.

14. The computer-program product of claim 1,
wherein the first factor is a continuous factor and the first set of candidate inputs comprise a continuous range of inputs;
wherein the instructions are operable to cause the computing system to discretize the first factor to have discrete options by:
    determining boundaries between the first set of values, which are from the first set of candidate inputs and disallowed according to the one or more disallowed combinations, from allowed values in the first set of candidate inputs;
    determining multiple value bins based on a total number of determined boundaries of the first set of values; and
    selecting a value from each of the value bins.

15. The computer-program product of claim 14, wherein:
the determining the boundaries of the first set of values comprises extracting all indicated values pertaining to the continuous factor from the one or more disallowed combinations; and
the determining the multiple value bins comprises merging extracted indicated values with the first set of candidate inputs by setting:
    a minimum or maximum for a respective value bin of the multiple value bins based on a respective one of all the indicated values;
    a minimum value for all the value bins corresponding to a minimum value of the first set of candidate inputs; and
    a maximum value for all the value bins corresponding to a maximum value of the first set of candidate inputs.

16. The computer-program product of claim 1,
wherein the design comprises design points defined by the plurality of design cases; and
wherein the instructions are operable to cause the computing system to generate the design for the design space that is a space-filing design that separates the design points in the design space.

17. A computer-implemented method comprising:
determining a design space for designing a design system,
    wherein the design space is defined by:
        a plurality of factors;
        candidate inputs comprising a respective set of candidate inputs for each of the plurality of factors, wherein the plurality of factors comprise a first factor with a first set of candidate inputs for the first factor and a second factor with a second set of candidate inputs for the second factor; and
        a disallowed combination indication indicating one or more disallowed combinations for candidate inputs of the plurality of factors, wherein the one or more disallowed combinations comprise a first set of values for the first factor that are restricted from being assigned to the first factor from the first set of candidate inputs if the second factor is assigned one of a second set of values from the second set of candidate inputs;
generating a graphical user interface to receive, from a user:
    the candidate inputs;
    the disallowed combination indication; and
    a request to identify a set of inputs that will provide a response of the design system that advances a user-defined goal for the design system; and
responsive to the request to identify the set of inputs:
    generating a design for the design space that provides a plurality of design cases for generating the response of the design system;
    obtaining a computer model for generating responses of the design system that advance the user-defined goal for the design system;
    generating the responses according to the computer model for multiple design cases of the design for the design system;
    obtaining responses of the design system for the multiple design cases of the design;
    generating graphical representations of:
        the one or more disallowed combinations; and
        based on the at least one design case, an indication of a suggested set of inputs for the design system, wherein the suggested set of inputs advances the user-defined goal for the design system and is not disallowed according to the one or more disallowed combinations;
    outputting, to the graphical user interface, the graphical representations of the one or more disallowed combinations and the suggested set of inputs for the design system to a display; and
    receiving, via the graphical user interface, input selecting at least one design case based on the obtained responses of the design system for the multiple design.

18. The computer-implemented method of claim 17,
wherein the computer-implemented method further comprises obtaining a strength t for a covering array; and
wherein the generating the design for the design space comprises generating data representing the covering array of the strength t where all possible combinations for inputs within the design space involving t factors of the plurality of factors appear in the design; and
wherein the design is restricted by the candidate inputs and the disallowed combination indication.

19. The computer-implemented method of claim 18, wherein the obtaining the strength t comprises obtaining the strength t for the covering array that is:
greater than or equal to two, and
less than a strength of a full factorial covering array.

20. The computer-implemented method of claim 17,
wherein the computer-implemented method further comprises receiving an indication of one or more prioritized factors in the plurality of factors; and
wherein the generating the design comprises generating data representing a variable strength covering array whereby the one or more prioritized factors have a greater strength than other factors of the plurality of factors in the design.

21. The computer-implemented method of claim 17, wherein the computer-implemented method further comprises:
   generating updated design cases different from design cases of the design, wherein each assigned input of the updated design cases is within:
      the design space defined by the plurality of factors, the candidate inputs, and the disallowed combination indication; and
      a respective pre-defined range from a respective element of the at least one design case;
   generating responses of the design system according to the updated design cases; and
   wherein the outputting the indication of the suggested set of inputs comprises outputting the suggested set of inputs based on the responses of the design system according to the updated design cases.

22. The computer-implemented method of claim 21, wherein the generating the updated design cases comprises generating the updated design cases using a genetic algorithm of the design.

23. The computer-implemented method of claim 17, wherein the request comprises a request to identify the set of inputs that will maximize or minimize a response of the design system according to the user-defined goal for the design system and the disallowed combination indication; and
   wherein the indication of the suggested set of inputs comprises a set of inputs from a design case that achieves a maximum or minimum response of design cases tested in the design or derived from the design.

24. The computer-implemented method of claim 17, wherein the computer-implemented method further comprises obtaining the computer model for generating the of the design system according to a respective input of each respective set of candidate inputs;
   wherein the generating the design for the design space comprises generating the design that provides the plurality of design cases for testing the response of the design system according to the computer model;
   wherein the computer-implemented method further comprises inputting one or more of the design cases of the design into the computer model; and
   wherein the obtaining the responses of the design system comprises obtaining the responses according to the computer model for each design case of the design.

25. The computer-implemented method of claim 17, wherein the computer-implemented method further comprises obtaining the disallowed combination indication by:
   receiving, from the user, an initial set of disallowed combinations; and
   generating the one or more disallowed combinations based on modifying the initial set of disallowed combinations.

26. The computer-implemented method of claim 25, wherein the computer-implemented method further comprises:
   determining that the initial set of disallowed combinations prevents generating a covering array of a particular strength; and
   modifying the initial set of disallowed combinations to generate the design to comprise the covering array of the particular strength.

27. The computer-implemented method of claim 17, wherein the first factor is a continuous factor and the first set of candidate inputs comprise a continuous range of inputs; and
   wherein the second factor is a categorical factor and the second set of candidate inputs comprise discrete options for the second factor.

28. The computer-implemented method of claim 17, wherein the first factor is a continuous factor and the first set of candidate inputs comprise a first continuous range of inputs with nonlinear constraints defined by a function; and
   wherein the second factor is a continuous factor and the second set of candidate inputs comprise a second continuous range of inputs bounded by linear constraints.

29. The computer-implemented method of claim 17, wherein the design comprises design points defined by the plurality of design cases; and
   wherein the generating the design for the design space comprises generating the design for the design space that is a space-filing design that separates the design points in the design space.

30. A computing device comprising processor and memory, the memory containing instructions executable by the processor wherein the computing device is configured to:
   determine a design space for designing a design system, wherein the design space is defined by:
      a plurality of factors;
      candidate inputs comprising a respective set of candidate inputs for each of the plurality of factors, wherein the plurality of factors comprise a first factor with a first set of candidate inputs for the first factor and a second factor with a second set of candidate inputs for the second factor; and
      a disallowed combination indication indicating one or more disallowed combinations for candidate inputs of the plurality of factors, wherein the one or more disallowed combinations comprise a first set of values for the first factor that are restricted from being assigned to the first factor from the first set of candidate inputs if the second factor is assigned one of a second set of values from the second set of candidate inputs;
   generate a graphical user interface to receive, from a user:
      the candidate inputs;
      the disallowed combination indication; and
      a request to identify a set of inputs that will provide a response of the design system that advances a user-defined goal for the design system; and
   responsive to the request to identify the set of inputs:
      generate a design for the design space that provides a plurality of design cases for generating the response of the design system;
      obtain a computer model for generating responses of the design system that advance the user-defined goal for the design system;
      generate the responses according to the computer model for multiple design cases of the design for the design system;
      obtain responses of the design system for the multiple design cases of the design;
      generate graphical representations of:
         the one or more disallowed combinations; and
         based on the at least one design case, an indication of a suggested set of inputs for the design system, wherein the suggested set of inputs advances the user-defined goal for the design system and is not disallowed according to the one or more disallowed combinations;

output, to the graphical user interface, the graphical representations of the one or more disallowed combinations and the suggested set of inputs for the design system to a display; and receive, via the graphical user interface, input selecting at least one design case based on the obtained responses of the design system for the multiple design.

* * * * *

UNITED STATES PATENT AND TRADEMARK OFFICE
CERTIFICATE OF CORRECTION

PATENT NO. : 11,194,940 B2
APPLICATION NO. : 17/144420
DATED : December 7, 2021
INVENTOR(S) : Joseph Albert Morgan et al.

It is certified that error appears in the above-identified patent and that said Letters Patent is hereby corrected as shown below:

In the Drawings

Delete drawing sheet 3, substitute therefor the replacement sheet 3, as shown on the attached page.

In the Specification

Column 12, Line 23, delete "network 114,", and insert --network 108,--, therefor.

Column 15, Line 57, delete "314", and insert --320--, therefor.

Column 16, Line 57, delete "314", and insert --320--, therefor.

Column 16, Line 60, delete "314", and insert --320--, therefor.

Column 16, Line 64, delete "314", and insert --320--, therefor.

Column 16, Line 66, delete "314", and insert --320--, therefor.

Column 17, Line 1, delete "314", and insert --320--, therefor.

Column 17, Line 3, delete "314", and insert --320--, therefor.

Column 17, Line 7, delete "314", and insert --320--, therefor.

Column 17, Line 10, delete "314", and insert --320--, therefor.

Column 17, Line 19, delete "314", and insert --320--, therefor.

Column 18, Line 24, delete "be receive", and insert --be received--, therefor.

Signed and Sealed this
Seventeenth Day of May, 2022

Katherine Kelly Vidal
*Director of the United States Patent and Trademark Office*

CERTIFICATE OF CORRECTION (continued)
U.S. Pat. No. 11,194,940 B2

Column 19, Line 23, delete "grid nodes).", and insert --grid nodes.--, therefor.

Column 23, Line 8, delete "DMBS 628", and insert --DBMS 628--, therefor.

Column 23, Line 18, delete "602 and 620", and insert --602 and 610--, therefor.

Column 23, Line 20, delete "602 and 620", and insert --602 and 610--, therefor.

Column 23, Line 35, delete "DMBS 628", and insert --DBMS 628--, therefor.

Column 23, Line 38, delete "DMBS 628", and insert --DBMS 628--, therefor.

Column 38, Line 32, delete "and 1 columns", and insert --and $l$ columns--, therefor.

Column 38, Line 33, delete "for i=1, . . . , 1.", and insert --for i=1, . . . , $l$ .--, therefor.

Column 38, Line 34, delete "subset oft", and insert --subset of $t$--, therefor.

Column 71, Line 34, delete "Nis", and insert --$N$ is--, therefor.

Column 71, Line 35, delete "any Na", and insert --any $N$ a--, therefor.

Column 71, Line 37, delete "Nis not", and insert --$N$ is not--, therefor.

Column 93, Line 30, delete "could comprises", and insert --could comprise--, therefor.

Column 94, Line 45, delete "See Harrison", and insert --*See* Harrison--, therefor.

Column 108, Line 16, delete "group g,", and insert --group $G_j$,--, therefor.